US012725483B2

(12) United States Patent
Colvin

(10) Patent No.: US 12,725,483 B2
(45) Date of Patent: Sep. 1, 2026

(54) SYSTEMS AND METHODS FOR ARTIFICIAL INTELLIGENCE DRIVEN CASINO-STYLE GAME ANALYSIS USING MANUAL UPDATING OF MODEL PARAMETERS

(71) Applicant: Sierra Artificial Neural Networks, Las Vegas, NV (US)

(72) Inventor: David Colvin, Las Vegas, NV (US)

( * ) Notice: Subject to any disclaimer, the term of this patent is extended or adjusted under 35 U.S.C. 154(b) by 0 days.

(21) Appl. No.: 19/246,380

(22) Filed: Jun. 23, 2025

(65) Prior Publication Data

US 2025/0378735 A1 Dec. 11, 2025

Related U.S. Application Data

(63) Continuation of application No. 19/068,989, filed on Mar. 3, 2025, which is a continuation-in-part of application No. 18/354,505, filed on Jul. 18, 2023, now abandoned.

(60) Provisional application No. 63/501,389, filed on May 10, 2023.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G06N 3/0464*** | (2023.01) |
| ***G07F 17/32*** | (2006.01) |

(52) U.S. Cl.
CPC ....... *G07F 17/3227* (2013.01); *G06N 3/0464* (2023.01); *G07F 17/3213* (2013.01); *G07F 17/3234* (2013.01)

(58) Field of Classification Search
CPC ... G07F 17/32; G07F 17/3214; G07F 17/3222
USPC ........................ 463/1, 20, 22, 25, 30, 31, 39
See application file for complete search history.

(56) References Cited

U.S. PATENT DOCUMENTS

| | | | | |
|---|---|---|---|---|
| 6,186,894 B1 * | 2/2001 | Mayeroff | ................ | G07F 17/34 463/16 |
| 9,456,086 B1 * | 9/2016 | Wu | ..................... | H04M 3/5233 |
| 9,736,308 B1 * | 8/2017 | Wu | ..................... | H04M 3/5233 |
| 11,100,753 B1 * | 8/2021 | Huke | .................... | G07F 17/323 |
| 2019/0347188 A1 * | 11/2019 | Sobran | ................... | G06N 20/00 |
| 2023/0377421 A1 * | 11/2023 | Russ | ...................... | G06N 20/00 |
| 2024/0050854 A1 * | 2/2024 | Bakalash | ............... | G06N 3/045 |

(Continued)

*Primary Examiner* — Adetokunbo O Torimiro

(74) *Attorney, Agent, or Firm* — FisherBroyles, LLP; Rob L. Phillips

(57) ABSTRACT

Methods and systems for developing a game of chance for land-based slot machines or online or mobile gaming platforms using an artificial intelligence (AI) game design system is disclosed. Executable instructions or computer-readable files are generated using an AI system trained with machine learning based on past or current game characteristics data and/or past game performance data. The AI system is refined through manual input to adjust model parameters. A preprocessing component formats input or output data for use by a neural network. The resulting files are used to operate an electronic gaming machine comprising a display, processor, memory, user interface, and a monetary input for cash or cashless play or an online or mobile platform comprising a computing device, remote server, or cloud-based system.

64 Claims, 132 Drawing Sheets

(56) References Cited

U.S. PATENT DOCUMENTS

2024/0362968 A1 10/2024 Lyons et al.
2025/0205604 A1* 6/2025 Polti ........................ A63F 13/60

* cited by examiner

1475

1490

1485

Typical Casinos Perfomance Report
Detail Ordered By Bank / Description
Slot Data From 2023-01-01 to 2023-01-31

2800

| Casino (2802) | Area (2804) | Bank (2806) | Machine Num (2808) | Serial (2810) | MFG (2812) | Game Theme (2814) | Denom (2816) | Game Type (2818) |
|---|---|---|---|---|---|---|---|---|
| A101 | 01 | 03 | 01 | 1046358 | SUPPLIER 11 | Electronic Table Game | 0.50 | ETG 101 |
| A101 | 01 | 03 | 02 | 1046359 | SUPPLIER 11 | Electronic Table Game | 0.50 | ETG 101 |
| A101 | 01 | 03 | 03 | 1046360 | SUPPLIER 11 | Electronic Table Game | 0.50 | ETG 101 |
| A101 | 01 | 03 | 04 | 1046361 | SUPPLIER 11 | Electronic Table Game | 0.50 | ETG 101 |
| A101 | 01 | 03 | 08 | 1046362 | SUPPLIER 11 | Video Reel | 0.50 | ETG 101 |
| A101 | 01 | 03 | 09 | 1046363 | SUPPLIER 11 | Video Reel | 0.50 | ETG 101 |
| A101 | 01 | 03 | 10 | 1046364 | SUPPLIER 11 | Video Reel | 0.50 | ETG 101 |
| A101 | 01 | 03 | 11 | 1050109 | SUPPLIER 11 | Video Reel | 0.50 | ETG 101 |
| A201 | 02 | 25 | 01 | 1060513 | SUPPLIER 11 | Video Reel | 0.01 | Reel 712 |
| A201 | 02 | 25 | 02 | 1060514 | SUPPLIER 11 | Video Reel | 0.01 | Reel 712 |
| A201 | 02 | 25 | 03 | 1060516 | SUPPLIER 11 | Video Reel | 0.01 | Reel 655 |
| A201 | 02 | 25 | 04 | 1060515 | SUPPLIER 11 | Video Reel | 0.01 | Reel 655 |
| A301 | 07 | 44 | 01 | 1060145 | SUPPLIER 11 | Video Reel | 0.01 | Reel 523A |
| A301 | 07 | 44 | 02 | 1060146 | SUPPLIER 11 | Video Reel | 0.01 | Reel 523A |
| A301 | 07 | 44 | 03 | 1060147 | SUPPLIER 11 | Video Reel | 0.01 | Reel 523B |
| A301 | 07 | 44 | 04 | 1060148 | SUPPLIER 11 | Video Reel | 0.01 | Reel 523B |
| A301 | 07 | 44 | 05 | 1060141 | SUPPLIER 11 | Video Reel | 0.01 | Reel 377 |
| A301 | 07 | 44 | 06 | 1060142 | SUPPLIER 11 | Video Reel | 0.01 | Reel 377 |
| A301 | 07 | 44 | 07 | 1060143 | SUPPLIER 11 | Video Reel | 0.01 | Reel 377 |
| A301 | 07 | 44 | 08 | 1060144 | SUPPLIER 11 | Video Reel | 0.01 | Reel 377 |
| A401 | 08 | 10 | 01 | 1046267 | SUPPLIER 11 | Video Reel | 0.01 | Reel 445 |
| A401 | 08 | 10 | 02 | 1046222 | SUPPLIER 11 | Video Reel | 0.01 | Reel 445 |
| A401 | 08 | 10 | 03 | 1046227 | SUPPLIER 11 | Video Reel | 0.01 | Reel 445 |
| A401 | 21 | 72 | 01 | 1060253 | SUPPLIER 11 | Video Reel | 0.05 | Reel 691 |
| A401 | 21 | 72 | 02 | 1060254 | SUPPLIER 11 | Video Reel | 0.05 | Reel 691 |
| A401 | 21 | 72 | 03 | 1060255 | SUPPLIER 11 | Video Reel | 0.05 | Reel 691 |
| A401 | 21 | 72 | 04 | 1060256 | SUPPLIER 11 | Video Reel | 0.05 | Reel 691 |
| A401 | 21 | 72 | 05 | 1060257 | SUPPLIER 11 | Video Reel | 0.01 | Reel 497A |
| A401 | 21 | 72 | 06 | 1060258 | SUPPLIER 11 | Video Reel | 0.01 | Reel 497B |
| A501 | 21 | 72 | 07 | 1060259 | SUPPLIER 11 | Mechanical Reel | 0.25 | Reel 497C |
| A501 | 21 | 72 | 08 | 1060260 | SUPPLIER 11 | Mechanical Reel | 0.25 | Reel 497D |

ooooo

*Fig. 28A*

Typical Casinos Perfomance Report
Detail Ordered By Bank / Description
Slot Data From 2023-01-01 to 2023-01-31

2800

| Reels (2820) | Max Bet (2822) | Cabinet (2824) | Act WPU Net LF (2826) | Theo WPU Net LF (2828) | Coin In PU (2830) | Lease Fee PU (2832) | Free Play PU (2834) | Act Hold % Net LF (2836) |
|---|---|---|---|---|---|---|---|---|
| 0R0L | 500 | 27" DUAL SCREEN | 412 | 178 | 9,639 | 28 | 0 | 4.27 |
| 0R0L | 500 | 27" DUAL SCREEN | 203 | 90 | 5,533 | 28 | 0 | 3.67 |
| 0R0L | 500 | 27" DUAL SCREEN | 233 | 20 | 2,260 | 28 | 0 | 10.31 |
| 0R0L | 500 | 27" DUAL SCREEN | 343 | 114 | 6,612 | 28 | 0 | 5.19 |
| 0R0L | 500 | 27" DUAL SCREEN WHEEL | 313 | 64 | 4,279 | 28 | 0 | 7.31 |
| 0R0L | 500 | 27" DUAL SCREEN WHEEL | 48 | 10 | 1,775 | 28 | 0 | 2.70 |
| 0R0L | 500 | 27" DUAL SCREEN | 404 | 135 | 7,598 | 28 | 0 | 5.32 |
| 0R0L | 500 | 27" DUAL SCREEN | 382 | 202 | 10,732 | 28 | 0 | 3.56 |
| 5R3L | 600 | 49" PORTRAIT | 518 | 556 | 4,401 | 35 | 149 | 11.77 |
| 5R3L | 600 | 49" PORTRAIT | 441 | 604 | 4,758 | 35 | 79 | 9.27 |
| 5R3L | 500 | 49" PORTRAIT | 222 | 305 | 2,484 | 35 | 83 | 8.96 |
| 5R3L | 500 | 49" PORTRAIT | 305 | 347 | 2,796 | 35 | 123 | 10.92 |
| 5R1024L | 750 | 49" PORTRAIT | 371 | 496 | 3,740 | 20 | 53 | 9.92 |
| 5R1024L | 750 | 49" PORTRAIT | 158 | 191 | 1,527 | 20 | 11 | 10.37 |
| 5R1024L | 750 | 43" PORTRAIT | 164 | 134 | 1,130 | 20 | 22 | 14.49 |
| 5R1024L | 750 | 43" PORTRAIT | 463 | 440 | 3,368 | 20 | 32 | 13.74 |
| 5R1024L | 750 | 43" PORTRAIT | 572 | 626 | 4,824 | 40 | 113 | 11.86 |
| 5R1024L | 750 | 43" PORTRAIT | 465 | 299 | 2,453 | 40 | 70 | 18.97 |
| 5R1024L | 750 | 43" PORTRAIT | 417 | 386 | 3,084 | 40 | 63 | 13.52 |
| 5R1024L | 750 | 43" PORTRAIT | 567 | 613 | 4,726 | 40 | 106 | 11.99 |
| 5R243L | 888 | 27" DUAL SCREEN | 992 | 641 | 4,810 | 28 | 121 | 20.62 |
| 5R243L | 888 | 27" DUAL SCREEN | -801 | 550 | 4,155 | 28 | 110 | -19.28 |
| 5R243L | 888 | 27" DUAL SCREEN WHEEL | 978 | 633 | 4,755 | 28 | 98 | 20.56 |
| 5R50L | 800 | 49" PORTRAIT LAP | 700 | 716 | 5,663 | 20 | 74 | 12.36 |
| 5R50L | 800 | 49" PORTRAIT LAP | 471 | 415 | 3,342 | 20 | 36 | 14.08 |
| 5R50L | 800 | 49" PORTRAIT WAP | 329 | 454 | 3,647 | 20 | 72 | 9.03 |
| 5R50L | 800 | 49" PORTRAIT WAP | 577 | 774 | 6,103 | 20 | 46 | 9.45 |
| 5R1024L | 800 | 55" PORTRAIT | 77 | 535 | 4,005 | 20 | 54 | 1.93 |
| 5R1024L | 800 | 55" PORTRAIT | 273 | 304 | 2,353 | 20 | 46 | 11.60 |
| 5R1024L | 800 | SLANT MECHANICAL REEL | 388 | 369 | 2,821 | 20 | 32 | 13.75 |
| 5R1024L | 800 | SLANT MECHANICAL REEL | 137 | 269 | 2,088 | 20 | 35 | 6.57 |

Typical Casinos Perfomance Report
Detail Ordered By Bank / Description
Slot Data From 2023-01-01 to 2023-01-31

2800

| Theo Hold % Net LF (2838) | Hold % Var (2840) | Arith Hold % (2842) | Unit Days (2844) | Active Units (2846) | Theo Per Hour (2848) | Util % (2850) | Hrs / Wk > 50% Util (2852) | Games Played (2854) | Jackpots (2856) | Min Date (2858) |
|---|---|---|---|---|---|---|---|---|---|---|
| 1.85 | 2.42 | 2.14 | 16 | 1 | $174 | 5 | 0 | 9,129 | 1,600 | 2023-01-16 |
| 1.63 | 2.03 | 2.14 | 16 | 1 | $119 | 4 | 0 | 7,669 | 1,440 | 2023-01-16 |
| 0.90 | 9.41 | 2.14 | 16 | 1 | $83 | 2 | 0 | 4,478 | 0 | 2023-01-16 |
| 1.72 | 3.48 | 2.14 | 16 | 1 | $139 | 4 | 0 | 7,839 | 1,332 | 2023-01-16 |
| 1.49 | 5.83 | 2.14 | 16 | 1 | $88 | 4 | 0 | 7,977 | 0 | 2023-01-16 |
| 0.56 | 2.14 | 2.14 | 16 | 1 | $95 | 2 | 0 | 3,058 | 0 | 2023-01-16 |
| 1.77 | 3.55 | 2.14 | 16 | 1 | $112 | 6 | 0 | 11,158 | 74 | 2023-01-16 |
| 1.88 | 1.68 | 2.14 | 16 | 1 | $152 | 6 | 0 | 11,589 | 1,530 | 2023-01-16 |
| 12.62 | -0.85 | 13.42 | 19 | 1 | $130 | 19 | 0 | 38,382 | 4,035 | 2023-01-13 |
| 12.68 | -3.42 | 13.42 | 19 | 1 | $122 | 22 | 0 | 44,307 | 1,248 | 2023-01-13 |
| 12.27 | -3.32 | 13.68 | 19 | 1 | $91 | 16 | 0 | 27,137 | 1,259 | 2023-01-13 |
| 12.43 | -1.51 | 13.68 | 19 | 1 | $111 | 14 | 0 | 24,963 | 4,982 | 2023-01-13 |
| 13.27 | -3.35 | 13.81 | 31 | 1 | $132 | 16 | 0 | 56,416 | 2,514 | 2023-05-11 |
| 12.50 | -2.13 | 13.81 | 31 | 1 | $131 | 7 | 0 | 23,267 | 0 | 2023-05-11 |
| 11.88 | 2.61 | 13.65 | 31 | 1 | $126 | 5 | 0 | 18,038 | 0 | 2023-05-11 |
| 13.06 | 0.68 | 13.65 | 31 | 1 | $131 | 15 | 0 | 51,612 | 1,432 | 2023-05-09 |
| 12.98 | -1.11 | 13.81 | 31 | 1 | $127 | 22 | 0 | 71,439 | 2,869 | 2023-05-09 |
| 12.18 | 6.79 | 13.81 | 31 | 1 | $128 | 11 | 0 | 36,010 | 0 | 2023-05-09 |
| 12.51 | 1.01 | 13.81 | 31 | 1 | $121 | 15 | 0 | 48,033 | 0 | 2023-05-09 |
| 12.96 | -0.97 | 13.81 | 31 | 1 | $141 | 19 | 0 | 63,089 | 3,257 | 2023-05-06 |
| 13.32 | 7.30 | 13.90 | 31 | 1 | $195 | 14 | 0 | 59,641 | 7,344 | 2023-05-06 |
| 13.23 | -32.51 | 13.90 | 31 | 1 | $179 | 13 | 0 | 56,165 | 51,091 | 2023-05-06 |
| 13.31 | 7.25 | 13.90 | 31 | 1 | $204 | 13 | 0 | 56,326 | 21,663 | 2023-05-06 |
| 12.65 | -0.29 | 13.01 | 31 | 1 | $93 | 33 | 29 | 99,432 | 5,500 | 2023-05-06 |
| 12.41 | 1.68 | 13.01 | 31 | 1 | $93 | 19 | 0 | 58,441 | 4,882 | 2023-05-06 |
| 12.46 | -3.43 | 13.01 | 31 | 1 | $95 | 21 | 0 | 62,379 | 1,617 | 2023-01-01 |
| 12.68 | -3.23 | 13.01 | 31 | 1 | $94 | 35 | 32 | 105,128 | 9,230 | 2023-01-01 |
| 13.36 | -11.43 | 13.86 | 31 | 1 | $152 | 15 | 0 | 54,142 | 16,925 | 2023-01-01 |
| 12.93 | -1.33 | 13.78 | 31 | 1 | $129 | 10 | 0 | 37,795 | 20 | 2023-01-01 |
| 13.07 | 0.67 | 13.78 | 31 | 1 | $153 | 11 | 0 | 36,639 | 7,549 | 2023-01-01 |
| 12.91 | -6.34 | 13.86 | 31 | 1 | $125 | 10 | 0 | 33,375 | 1,530 | 2023-01-01 |

Typical Casinos Perfomance Report
Detail Ordered By Bank / Description
Slot Data From 2023-01-01 to 2023-01-31

| Plays Per Min. (2860) | Ave Bet (2862) | Min Bet (Rated) (2864) | Max Bet (Rated) (2866) | Act WPU Net LF Index Floor (2868) | Act WPU Net LF Index MFG (2870) | Act WPU Net LF Index GameType (2872) | Act WPU Net LF Index Denom (2874) | Act WPU Net LF Index Area (2876) | Theo WPU Net LF Index Floor (2878) |
|---|---|---|---|---|---|---|---|---|---|
| 8.0 | $16.89 | $0.54 | $141.82 | (43) | 41 | (59) | (60) | (30) | (74) |
| 8.0 | $11.54 | $0.60 | $237.22 | (72) | (31) | (80) | (80) | (65) | (87) |
| 8.0 | $8.08 | $0.60 | $101.79 | (67) | (20) | (77) | (77) | (60) | (97) |
| 8.0 | $13.50 | $0.65 | $136.61 | (52) | 18 | (66) | (66) | (41) | (84) |
| 8.0 | $8.58 | $0.55 | $69.29 | (56) | 7 | (69) | (69) | (47) | (91) |
| 8.0 | $9.29 | $0.55 | $141.71 | (93) | (84) | (95) | (95) | (92) | (99) |
| 8.0 | $10.89 | $0.55 | $187.14 | (44) | 38 | (60) | (60) | (31) | (81) |
| 8.0 | $14.82 | $0.55 | $142.25 | (47) | 31 | (62) | (63) | (35) | (71) |
| 7.4 | $2.18 | $0.70 | $35.00 | (40) | 39 | (4) | (2) | (27) | (34) |
| 7.4 | $2.04 | $0.70 | $35.00 | (49) | 19 | (18) | (17) | (38) | (28) |
| 6.4 | $1.74 | $0.60 | $30.48 | (74) | (40) | (59) | (58) | (69) | (64) |
| 6.4 | $2.13 | $0.60 | $30.00 | (65) | (18) | (43) | (42) | (57) | (59) |
| 7.8 | $2.06 | $0.74 | $85.00 | (57) | (3) | (43) | (52) | (58) | (41) |
| 7.8 | $2.03 | $0.71 | $42.93 | (82) | (59) | (76) | (80) | (82) | (77) |
| 7.9 | $1.94 | $0.71 | $81.57 | (81) | (57) | (75) | (79) | (82) | (84) |
| 7.9 | $2.02 | $0.75 | $85.00 | (47) | 20 | (30) | (41) | (48) | (48) |
| 7.3 | $2.09 | $0.75 | $88.70 | (34) | 49 | (13) | (27) | (35) | (25) |
| 7.3 | $2.11 | $0.75 | $85.00 | (47) | 21 | (29) | (40) | (47) | (64) |
| 7.3 | $1.99 | $0.75 | $85.00 | (52) | 9 | (36) | (47) | (53) | (54) |
| 7.3 | $2.32 | $0.75 | $85.00 | (35) | 48 | (14) | (27) | (36) | (27) |
| 9.4 | $2.50 | $0.55 | $88.80 | 14 | 158 | 51 | 27 | 104 | (24) |
| 9.4 | $2.29 | $0.55 | $88.80 | (192) | (309) | (222) | (203) | (265) | (35) |
| 9.4 | $2.62 | $0.54 | $88.80 | 12 | 155 | 49 | 25 | 101 | (25) |
| 6.7 | $1.77 | $0.74 | $8.11 | (20) | 82 | 7 | (10) | (24) | (15) |
| 6.7 | $1.77 | $0.80 | $8.03 | (46) | 23 | (28) | (40) | (49) | (51) |
| 6.7 | $1.81 | $0.80 | $8.13 | (62) | (14) | (50) | (58) | (64) | (46) |
| 6.7 | $1.80 | $0.53 | $8.42 | (34) | 50 | (12) | (26) | (38) | (8) |
| 8.0 | $2.29 | $0.80 | $80.00 | (91) | (80) | (88) | (90) | (92) | (36) |
| 8.1 | $1.93 | $0.80 | $80.00 | (69) | (29) | (58) | (65) | (71) | (64) |
| 7.8 | $2.39 | $0.79 | $80.00 | (56) | 1 | (41) | (50) | (58) | (56) |
| 7.7 | $1.94 | $0.80 | $80.00 | (84) | (64) | (79) | (82) | (85) | (68) |

Typical Casinos Perfomance Report
Detail Ordered By Bank / Description
Slot Data From 2023-01-01 to 2023-01-31

| 2880 Theo WPU Net LF Index MFG | 2882 Theo WPU Net LF Index GameType | 2884 Theo WPU Net LF Index Denom | 2886 Theo WPU Net LF Index Area | 2888 Coin In PU Index Floor | 2890 Coin In PU Index MFG | 2892 Coin In PU Index GameType | 2894 Coin In PU Index Denom | 2896 Coin In PU Index Area |
|---|---|---|---|---|---|---|---|---|
| 76 | (79) | (81) | (69) | 19 | 59 | (51) | (51) | 41 |
| (11) | (89) | (91) | (84) | (32) | (9) | (72) | (72) | (19) |
| (80) | (98) | (98) | (96) | (72) | (63) | (89) | (88) | (67) |
| 12 | (86) | (88) | (80) | (18) | 9 | (67) | (66) | (3) |
| (37) | (92) | (93) | (89) | (47) | (29) | (78) | (78) | (37) |
| (90) | (99) | (99) | (98) | (78) | (71) | (91) | (91) | (74) |
| 33 | (84) | (86) | (76) | (6) | 26 | (62) | (61) | 11 |
| 99 | (76) | (79) | (64) | 33 | 77 | (46) | (45) | 57 |
| 23 | 1 | 5 | (20) | (54) | 22 | (17) | (7) | (50) |
| 33 | 10 | 14 | (13) | (50) | 32 | (10) | 1 | (46) |
| (33) | (45) | (43) | (56) | (74) | (31) | (53) | (48) | (72) |
| (23) | (37) | (35) | (50) | (71) | (23) | (47) | (41) | (68) |
| 7 | (24) | (36) | (43) | (61) | 4 | (42) | (47) | (49) |
| (59) | (71) | (75) | (78) | (84) | (58) | (76) | (78) | (79) |
| (71) | (79) | (83) | (85) | (88) | (69) | (82) | (84) | (85) |
| (6) | (33) | (43) | (49) | (65) | (7) | (47) | (52) | (54) |
| 35 | (4) | (19) | (28) | (50) | 34 | (25) | (31) | (34) |
| (36) | (54) | (61) | (66) | (75) | (32) | (62) | (65) | (67) |
| (17) | (41) | (50) | (56) | (68) | (15) | (52) | (56) | (58) |
| 32 | (6) | (20) | (29) | (51) | 31 | (26) | (33) | (36) |
| 38 | (2) | (17) | 50 | (50) | 33 | (25) | (31) | (22) |
| 18 | (16) | (29) | 28 | (57) | 15 | (35) | (41) | (33) |
| 36 | (3) | (18) | 48 | (51) | 32 | (26) | (32) | (23) |
| 54 | 10 | (7) | (20) | (42) | 57 | (12) | (19) | (31) |
| (11) | (37) | (46) | (54) | (65) | (7) | (48) | (52) | (60) |
| (2) | (31) | (41) | (49) | (62) | 1 | (43) | (48) | (56) |
| 66 | 18 | 0 | (14) | (37) | 69 | (5) | (13) | (26) |
| 15 | (18) | (31) | (40) | (59) | 11 | (37) | (43) | (52) |
| (35) | (53) | (60) | (66) | (76) | (35) | (63) | (66) | (72) |
| (21) | (44) | (52) | (59) | (71) | (22) | (56) | (60) | (66) |
| (42) | (59) | (65) | (70) | (78) | (42) | (67) | (70) | (75) |

| | | | | |
|---|---|---|---|---|
| Ways or line game: | Line | | | |
| Number of rows: | 3 | | | |
| Number of vertical reels: | 5 | | | |
| Number of lines if line game: | 9 | | | |
| Number of ways if ways game: | - | | | |
| Number of RTP segments: | 3 | | | |
| RTP percentages for regular game/sub-bonus/ feature bonus/other (based on a 100% model): | 30%/35%/35% | | | |
| Number of base symbols, i.e, royal symbols: | 6 | | | |
| Base symbols win amounts: | 2 pays: | 3 pays: | 4 pays: | 5 pays: |
| A symbol payout: | .3x | 1.0x | 2.0x | 5.0x |
| Target standard deviation: | 2.95 | | | |
| K symbol payout: | .2x | .5x | 1.0x | 3.0x |
| Target standard deviation: | 2.85 | | | |
| Q symbol payout: | .1x | .4x | .7x | 1.5x |
| Target standard deviation: | 2.72 | | | |
| J symbol payout: | .1x | .4x | .7x | 1.5x |
| Target standard deviation: | 2.5 | | | |
| 10 symbol payout: | .1x | .3x | .5x | 1.0x |
| Target standard deviation: | 2.38 | | | |
| 9 symbol payout: | .1x | .3x | .5x | 1.0x |
| Target standard deviation: | 2.33 | | | |
| Number of special symbols: | 4 | | | |
| Special symbol no. 1 payout: | 0 | 1.0x | 2.0x | 3.0x |
| Target standard deviation: | 3.11 | | | |
| Special symbol no. 2 payout: | 0 | 1.5x | 3.0x | 1.5x |
| Target standard deviation: | 3.32 | | | |
| Special symbol no. 3 payout: | 0 | 2.5x | 5.0x | 10x |
| Target standard deviation: | 3.48 | | | |
| Special symbol no. 4 payout: | 0 | 5.0x | 10.0x | 20.0x |
| Target standard deviation: | 4.25 | | | |
| Wild symbols Y/N: | 1 | | | |
| Reels which allow wild symbols: | 2 3 4 | | | |
| Feature symbols: | 1 | | | |
| Feature type: | Free games | | | |
| Feature multiplier: | 3 | | | |
| Feature multiplier static of variable: | static | | | |
| Feature trigger/frequency: | 3 scattered = 5 free games/142<br>4 scattered = 10 free games/892<br>5 scattered = 15 free games/2399 | | | |
| Retrigger Y/N: | Y | | | |
| Retrigger Frequency: | 7.2 | | | |
| ○○○ | ○○○ | | | |

| | | | | | |
|---|---|---|---|---|---|
| Ways or line game: | Ways | | | | |
| Average games per hour: | 912 | | | | |
| Reel spin time: | 2.38 | | | | |
| Feature time: | 3 scattered - 94 | | | | |
| | 4 scattered - 171 | | | | |
| | 5 scattered - 255 | | | | |
| Retrigger time: | 58 | | | | |
| Standard reel spin bounce back Y/N: | Y | | | | |
| Number of vertical reels: | 5 | | | | |
| Number of lines if line game: | - | | | | |
| Number of ways if ways game: | 1024 | | | | |
| Any win frequency: | 4.85 | | | | |
| Number of base symbols, i.e, royal symbols: | 6 | | | | |
| A symbol: | 1: | 2: | 3: | 4: | 5: |
| Frequencies: | 15 | 29 | 148 | 325 | 517 |
| K symbol: | 1: | 2: | 3: | 4: | 5: |
| Frequencies: | 13 | 26 | 128 | 295 | 444 |
| Q symbol: | 1: | 2: | 3: | 4: | 5: |
| Frequencies: | 12 | 24 | 120 | 266 | 388 |
| J symbol: | 1: | 2: | 3: | 4: | 5: |
| Frequencies: | 12 | 24 | 120 | 266 | 388 |
| 10 symbol: | 1: | 2: | 3: | 4: | 5: |
| Frequencies: | 10 | 22 | 102 | 232 | 371 |
| 9 symbol: | 1: | 2: | 3: | 4: | 5: |
| Frequencies: | 10 | 22 | 102 | 232 | 371 |
| Number of special symbols: | 4 | | | | |
| Special symbol no. 1: | 1: | 2: | 3: | 4: | 5: |
| Frequency: | 18 | 32 | 135 | 418 | 608 |
| Special symbol no. 2: | 1: | 2: | 3: | 4: | 5: |
| Frequency: | 19 | 35 | 144 | 591 | 925 |
| Special symbol no. 3: | 1: | 2: | 3: | 4: | 5: |
| Frequency: | 20 | 37 | 162 | 612 | 1211 |
| Special symbol no. 4: | 1: | 2: | 3: | 4: | 5: |
| Frequency: | 24 | 39 | 182 | 701 | 1925 |
| Wild symbols Y/N: | Y | | | | |
| Reels which allow wild symbols: | 2 3 5 | | | | |
| Feature symbols: | 1 | | | | |
| Feature type: | Free games | | | | |
| Feature multiplier: | 0 | | | | |
| Feature multiplier static of variable: | static | | | | |
| Feature trigger/frequency: | 3 scattered = 5 free games/121 | | | | |
| | 4 scattered = 10 free games/781 | | | | |
| | 5 scattered = 15 free games/3199 | | | | |
| ○ ○ ○ | ○ ○ ○ | | | | |

| | | | | | | |
|---|---|---|---|---|---|---|
| Game Name | | Game Numbe | | Math Designer | | |
| **Hoo's Wild** | | **23-117** | | **John Doe** | | |
| | | | | | | |
| **Original** | Revison 2 | Revison 3 | Revison 4 | Revison 5 | Revison X | |
| **Date: 124-23** | Date: | Date: | Date: | Date: | Date: | |
| | | | | | | |
| Game Type | | | | | | |
| Line | | **Ways** | | Other | | |
| | | | | | | |
| Reel Type | | | | | | |
| **Standard** | | Expanding | | Random Exp | | |
| | | | | | | |
| Base Reel Config | | **Standard** | | Non-standard | | |
| Number of verical ree | | **5** | | | | |
| Number of rows | | **4** | | | | |
| | | | | | | |
| **Return to Player Percentage (RTP) Based on:** | | | **100%** | 90% | | |
| Base | Feature 1 | Feature 2 | Feature 3 | Feature 4 | Free Games | |
| **25%** | **35%** | | | | **40%** | |
| | | | | | | |
| Bet Config Options | (Select all that apply) | | | | | |
| **30, 60, 90, 120, 150** | | | | | | |
| **50, 100, 150, 200, 25** | | | | | | |
| **75, 150, 225, 300, 37** | | | | | | |
| 88, 188, 288,388, 488 | | | | | | |
| 100, 200, 300, 400, 5 | | | | | | |
| | | | | | | |

| Denominations Available | (Select all that apply) | | | | | |
|---|---|---|---|---|---|---|
| **$0.01** | | | | | | |
| **$0.02** | | | | | | |
| **$0.05** | | | | | | |
| **$0.10** | | | | | | |
| **$0.25** | | | | | | |
| **$0.50** | | | | | | |
| **$1.00** | | | | | | |
| $2.00 | | | | | | |
| $5.00 | | | | | | |
| $10.00 | | | | | | |
| $25.00 | | | | | | |
| $50.00 | | | | | | |
| | | | | | | |
| Minimum Cost-to-cover (Select all that apply) | | | | | | |
| **$.25/$.50** | | | | | | |
| **$.50/$1.00** | | | | | | |
| **$.75/$1.00** | | | | | | |
| $1.00/$2.00 | | | | | | |
| $1.50/$2.00 | | | | | | |
| | | | | | | |
| Base Game Details | | | | | | |
| Max Game Pays | **150x** | | | | | |
| Probability of >100x | **0.00015** | | | | | |
| Standard Deviation Base | Very High | High | **Medium** | Low | | |
| | | | **3.35** | | | |
| | | | | | | |
| Play Type Incldued | (Select all that apply) | | | | | |

| | | | | | | |
|---|---|---|---|---|---|---|
| **Standard** | | **Yes** | No | | | |
| **Free Games** | Retriggers | **Yes** | No | **Variable** | Fixed | |
| | | | | **Yes** | No | Frequency |
| **Number of Free Gam** | | | | **6** | | **160** |
| | | | | **10** | | **275** |
| | | | | **15** | | **600** |
| | | | | **20** | | **1,500** |
| **Min FG Pays/Game** | | | | **0x** | | |
| **Max FG Pays/Game** | | | | **150x** | | |
| **Voaltility** | **Very High** | High | Medium | Low | | |
| **Standard Deviation of FG** | **6.25** | | | | | |
| **Wild Replacement** | Symbol Replace | **Special Sym.** | | | | **35** |
| Added Wilds | | | | | | |
| Expanding Wilds | | | | | | |
| Hold and Spin | | | | | | |
| Drop and Spin | | | | | | |
| Cascading Reels | | | | | | |
| Expanding Reels | | | | | | |
| 3 Pot Game | | | | | | |
| Random Expanding Reels | | | | | | |
| **Cash on Reels (Value** | .5x, 1x, 2x, 5x, 10x, 20, 50x, 100x | | | **Frequency** | | **2** |
| | | | | | | |
| Symbols Included and Pays | | 2 Symbols | 3 Symbols | 4 Symbols | 5 Symbols | |
| **Ace** | | | **.2x** | **.4x** | **1x** | |
| **King** | | | **.2x** | **.4x** | **1x** | |
| **Queen** | | | **.1x** | **.2x** | **.5x** | |
| **Jack** | | | **.1x** | **.2x** | **.5x** | |

| | | | | | | |
|---|---|---|---|---|---|---|
| **10** | | | **.05x** | **.1x** | **.2x** | |
| 9 | | | | | | |
| **Special Symbol 1** | | | **1x** | **3x** | **10x** | |
| **Special Symbol 2** | | | **1x** | **4x** | **12x** | |
| **Special Symbol 3** | | | **2x** | **10x** | **25x** | |
| **Special Symbol 4** | | | **5x** | **20x** | **100x** | |
| SpeciaSymbol 5 | | | | | | |
| **Wild** | | | | | | |
| **Max Pays All Wilds** | | | **150x** | | | |
| | | | | | | |
| Progressives | **Yes** | No | | | | |
| If Yes, number of level | **4** | Reset Value | Incrementatio | Index to Wager | | Probability |
| Name | **Mega** | $1.000.00 | 0.10% | Yes | **No** | **0.00005** |
| | **Major** | $100.00 | 0.15% | Yes | **No** | **0.0001** |
| | **Minor** | $25.00 | 0.25% | Yes | **No** | **0.0004** |
| | **Mini** | $10.00 | 0.40% | Yes | **No** | **0.002** |
| | | | | | | |
| Free games added to progressives | | **Yes** | No | | | |
| Progressive Name | **Free Games** | **Fixed FG** | Progressive FG | | | |
| **Mega** | **50** | | | | | |
| **Major** | **20** | | | | | |
| **Minor** | **10** | | | | | |
| **Mini** | **5** | | | | | |

Game Name: Heroes and Villains VAR 05

Base Game Reel Weights

| SYMBOL | REEL 1 | REEL 2 | REEL 3 | REEL 4 | REEL 5 |
|---|---|---|---|---|---|
| WILD | 0 | 1 | 1 | 2 | 0 |
| PIC1 | 3 | 4 | 3 | 3 | 3 |
| PIC2 | 4 | 4 | 3 | 4 | 3 |
| PIC3 | 4 | 3 | 4 | 5 | 3 |
| PIC4 | 4 | 3 | 4 | 3 | 3 |
| PIC5 | 5 | 3 | 4 | 5 | 3 |
| A | 5 | 8 | 6 | 4 | 6 |
| K | 6 | 6 | 4 | 6 | 6 |
| Q | 8 | 5 | 8 | 6 | 8 |
| J | 4 | 8 | 6 | 7 | 7 |
| T | 8 | 8 | 6 | 6 | 6 |
| N | 7 | 8 | 9 | 8 | 9 |
| SCATTER | 4 | 0 | 4 | 0 | 3 |
| DIE | 1 | 1 | 2 | 1 | 1 |
| Totals | 63 | 62 | 64 | 60 | 61 |

| | |
|---|---|
| Cycle: | 914941440 |
| Minimum Wager: | 30 |
| Ways | 243 |
| Max Lines: | - |
| Reels | 5 |
| Symbols per Reel | 3 |

| | |
|---|---|
| Base Game | 20.103% |
| Dice Feature | 50.564% |
| Free Spins | 21.927% |
| Total RTP (from sim) | 92.710% |
| Free Spins Hit Rate | 189.778 |

Feature Reels

| SYMBOL | REEL 1 | REEL 2 | REEL 3 | REEL 4 | REEL 5 |
|---|---|---|---|---|---|
| BLANK | 50 | 50 | 52 | 48 | 48 |
| DIE | 13 | 12 | 12 | 12 | 13 |
| Totals | 63 | 62 | 64 | 60 | 61 |

Total Pay Profile

| Prize | Hits | P() | Hit Rate | RTP |
|---|---|---|---|---|
| 300 | 218700 | 2.39032E-04 | 4183.545679 | 0.239% |
| 150 | 2021760 | 0.002209715 | 452.5470085 | 1.105% |
| 90 | 801900 | 0.00087645 | 1140.967003 | 0.263% |
| 75 | 4380480 | 0.004787716 | 208.8678501 | 1.197% |
| 60 | 15781392 | 0.017248527 | 57.97596562 | 3.450% |
| 45 | 14958756 | 0.016349414 | 61.16427329 | 2.452% |
| 30 | 59543802 | 0.065079359 | 15.36585521 | 6.508% |
| 15 | 43877916 | 0.047957076 | 20.8519803 | 2.398% |
| 9 | 22827420 | 0.024949597 | 40.08080808 | 0.748% |
| 6 | 40911480 | 0.044714862 | 22.36392915 | 0.894% |
| 3 | 77613228 | 0.084828629 | 11.78847296 | 0.848% |

| | | | | | |
|---|---|---|---|---|---|
| | | | | | |
| 1.959 | 236,153,520.0 | 0.258107798 | 3.874 | 50.564% | Dice Feature |
| | | | | | |

| | | | | | |
|---|---|---|---|---|---|
| 41.6130 | 4821120 | 0.005269321 | 189.778 | 21.927% | Free Spins |
| | | | | | |
| | 523911474 | 0.309240375 | 3.234 | 92.594% | |

| Paytable | Of a Kind | | | | |
|---|---|---|---|---|---|
| **SYMBOL** | **5** | **4** | **3** | **2** | **1** |
| WILD | 0 | 0 | 0 | 0 | 0 |
| PIC1 | 300 | 150 | 45 | 0 | 0 |
| PIC2 | 150 | 75 | 30 | 0 | 0 |
| PIC3 | 150 | 75 | 30 | 0 | 0 |
| PIC4 | 90 | 45 | 15 | 0 | 0 |
| PIC5 | 90 | 45 | 15 | 0 | 0 |
| A | 60 | 30 | 9 | 0 | 0 |
| K | 60 | 30 | 6 | 0 | 0 |
| Q | 60 | 30 | 6 | 0 | 0 |
| J | 60 | 30 | 3 | 0 | 0 |
| T | 45 | 15 | 3 | 0 | 0 |
| N | 30 | 15 | 3 | 0 | 0 |
| SCATTER | 0 | 0 | 30 | 0 | 0 |
| DIE | 0 | 0 | 0 | 0 | 0 |

Adjust the Pay Profile Values after changing any pay values!

Wild Multiplier 1

Base Game Rules:

3x5 243 Ways video Slot.
Each DIE that lands on the reel window will 'roll' displaying a61Pips.
Each rolled Pip will fire into the top screen, in the same vertical reel, and damage the symbols found there.
When a symbol in the top screen receives hits equal to it's set hit points, it will be destroyed and reveal a prize.
3 SCATTERs triggers the Treasure Trove Feature.

| | |
|---|---|
| Pick Feature: | The Pick Feature can be awarded from a Block Win.<br>Player is prompted to select 1 of the 3 items displayed.<br>Player can win Credits or Free Games. |
| Feature Game Rules: | 3 SCATTERs triggers the Treasure Trove free spins.<br>Player is awarded 8 free spins.<br>The reels are replaced with thefeautre reel strips that contain only DIE and BLANK symbols.<br>The Top Screen will transition into the Treasure Trove top consisting of a specific set of symbols and the Default Treasure Trove.<br>Each DIE will roll between 1 and 6 Pips, each Pip will damage a symbol on the same reel verticall above it.<br>Once all symbols have been destroyed, all further Pips will attack the default Treasure Trove.<br>Each Pip targeting the Treasure Trove will immediately award a credit prize or an additional free spin. |

| | |
|---|---|
| Top Paytable Award | 900 |
| P(Top Paytable Award) | 0.00841678 |
| Hit Rate | 118.810252 |
| RTP from Simulation | 92.710% |

| MASTER SYMBOL LIST | Paytable values | |
|---|---|---|
| | 0 | |
| WILD | 300 | 500 |
| PIC1 | 150 | 250 |
| PIC2 | 150 | 250 |

| | | |
|---|---|---|
| PIC3 | 90 | 250 |
| PIC4 | 90 | 250 |
| PIC5 | 60 | 150 |
| A | 60 | 150 |
| K | 60 | 125 |
| Q | 60 | 125 |
| J | 45 | 125 |
| T | 30 | 100 |
| N | 0 | 100 |
| SCATTER | 0 | 100 |
| DIE | 150 | 100 |
| | 75 | 100 |
| | 75 | 100 |
| | 45 | 75 |
| | 45 | 75 |
| | 30 | 75 |
| | 30 | 50 |
| | 30 | 50 |
| | 30 | 50 |
| | 15 | 50 |
| | 15 | 50 |
| | 0 | 50 |
| | 0 | 50 |
| | 45 | 25 |
| | 30 | 25 |
| | 30 | 25 |
| | 15 | 25 |
| | 15 | 15 |
| | 9 | 10 |
| | 6 | 10 |
| | 6 | 5 |

| Pay Profile Values |
|---|
| 300 |
| 150 |
| 90 |
| 75 |
| 60 |
| 45 |
| 30 |
| 15 |
| 9 |
| 6 |
| 3 |
| |
| |

| | |
|---|---|
| RTP | 50.564% |
| Feature P() | 0.258 |
| Hit Rate | 3.874 |

| Dice in Window | P() | AVG | Hit Rate |
|---|---|---|---|
| 0 | 0.742 | 0 | |
| 1 | 0.229 | 0.2290 | 4.367 |
| 2 | 0.027 | 0.0549 | 36.414 |
| 3 | 0.002 | 0.0048 | 620.250 |
| 4 | 0.000 | 0.0002 | 21474.474 |
| 5 | 0.000 | 0.0000 | 1882595.556 |
| | 1 | 0.288936 | |

Die Appearance P()

| Symbol | Reel 1 | Reel 2 | Reel 3 | Reel 4 | Reel 5 |
|---|---|---|---|---|---|
| DIE | 3 | 3 | 6 | 3 | 3 |
| Not DIE | 60 | 59 | 58 | 57 | 58 |
| Total | 63 | 62 | 64 | 60 | 61 |

| Symbol | Reel 1 | Reel 2 | Reel 3 | Reel 4 | Reel 5 |
|---|---|---|---|---|---|
| DIE | 0.048 | 0.048 | 0.094 | 0.050 | 0.049 |
| Not DIE | 0.952 | 0.952 | 0.906 | 0.950 | 0.951 |
| Total | 1 | 1 | 1 | 1 | 1 |

Die Appearance Patterns

| Reel 1 | Reel 2 | Reel 3 | Reel 4 | Reel 5 | Number | P() | Avg PipsTriggered | Total AVG | "Win" | Avg |
|---|---|---|---|---|---|---|---|---|---|---|
| 0 | 0 | 0 | 0 | 0 | 0 | 0.742 | 0.0 | 0.0000 | 0 | 0 |
| 1 | 0 | 0 | 0 | 0 | 1 | 0.037 | 3.5 | 0.1298 | 52.5 | 1.947467031 |
| 0 | 1 | 0 | 0 | 0 | 1 | 0.038 | 3.5 | 0.1320 | 52.5 | 1.980474947 |
| 0 | 0 | 1 | 0 | 0 | 1 | 0.077 | 3.5 | 0.2686 | 52.5 | 4.029242134 |
| 0 | 0 | 0 | 1 | 0 | 1 | 0.039 | 3.5 | 0.1367 | 52.5 | 2.049965296 |
| 0 | 0 | 0 | 0 | 1 | 1 | 0.038 | 3.5 | 0.1343 | 52.5 | 2.014621067 |
| 1 | 1 | 0 | 0 | 0 | 2 | 0.002 | 7.0 | 0.0132 | 105 | 0.198047495 |
| 1 | 0 | 1 | 0 | 0 | 2 | 0.004 | 7.0 | 0.0269 | 105 | 0.402924213 |
| 1 | 0 | 0 | 1 | 0 | 2 | 0.002 | 7.0 | 0.0137 | 105 | 0.20499653 |
| 1 | 0 | 0 | 0 | 1 | 2 | 0.002 | 7.0 | 0.0134 | 105 | 0.201462107 |
| 0 | 1 | 1 | 0 | 0 | 2 | 0.004 | 7.0 | 0.0273 | 105 | 0.409753437 |
| 0 | 1 | 0 | 1 | 0 | 2 | 0.002 | 7.0 | 0.0139 | 105 | 0.208471047 |
| 0 | 1 | 0 | 0 | 1 | 2 | 0.002 | 7.0 | 0.0137 | 105 | 0.204876719 |
| 0 | 0 | 1 | 1 | 0 | 2 | 0.004 | 7.0 | 0.0283 | 105 | 0.424130751 |
| 0 | 0 | 1 | 0 | 1 | 2 | 0.004 | 7.0 | 0.0278 | 105 | 0.416818152 |
| 0 | 0 | 0 | 1 | 1 | 2 | 0.002 | 7.0 | 0.0141 | 105 | 0.212065375 |
| 1 | 1 | 1 | 0 | 0 | 3 | 0.000 | 10.5 | 0.0020 | 157.5 | 0.030731508 |
| 1 | 1 | 0 | 1 | 0 | 3 | 0.000 | 10.5 | 0.0010 | 157.5 | 0.015635329 |
| 1 | 1 | 0 | 0 | 1 | 3 | 0.000 | 10.5 | 0.0010 | 157.5 | 0.015365754 |
| 1 | 0 | 1 | 1 | 0 | 3 | 0.000 | 10.5 | 0.0021 | 157.5 | 0.031809806 |
| 1 | 0 | 1 | 0 | 1 | 3 | 0.000 | 10.5 | 0.0021 | 157.5 | 0.031261361 |
| 1 | 0 | 0 | 1 | 1 | 3 | 0.000 | 10.5 | 0.0011 | 157.5 | 0.015904903 |
| 0 | 1 | 1 | 1 | 0 | 3 | 0.000 | 10.5 | 0.0022 | 157.5 | 0.032348956 |
| 0 | 1 | 1 | 0 | 1 | 3 | 0.000 | 10.5 | 0.0021 | 157.5 | 0.031791215 |
| 0 | 1 | 0 | 1 | 1 | 3 | 0.000 | 10.5 | 0.0011 | 157.5 | 0.016174478 |
| 0 | 0 | 1 | 1 | 1 | 3 | 0.000 | 10.5 | 0.0022 | 157.5 | 0.032906696 |
| 1 | 1 | 1 | 1 | 0 | 4 | 0.000 | 14.0 | 0.0001 | 210 | 0.002156597 |

| | | | | | | | | | | |
|---|---|---|---|---|---|---|---|---|---|---|
| 1 | 1 | 1 | 0 | 1 | 4 | 0.000 | 14.0 | 0.0001 | 210 | 0.002119414 |
| 1 | 1 | 0 | 1 | 1 | 4 | 0.000 | 14.0 | 0.0001 | 210 | 0.001078299 |
| 1 | 0 | 1 | 1 | 1 | 4 | 0.000 | 14.0 | 0.0001 | 210 | 0.00219378 |
| 0 | 1 | 1 | 1 | 1 | 4 | 0.000 | 14.0 | 0.0001 | 210 | 0.002230962 |
| 1 | 1 | 1 | 1 | 1 | 5 | 0.000 | 17.5 | 0.0000 | 262.5 | 0.000139435 |
| | | | | | | 1.000 | 280.000 | 1.011 | 15.169 | 15.169 |

Avg Pips Per Reel

| | Reel 1 | Reel 2 | Reel 3 | Reel 4 | Reel 5 |
|---|---|---|---|---|---|
| Avg Pips | 3.5 | 3.5 | 3.5 | 3.5 | 3.5 |

Die Pip Weights

| Pips | Reel 1 | Reel 2 | Reel 3 | Reel 4 | Reel 5 |
|---|---|---|---|---|---|
| 1 | 1 | 1 | 1 | 1 | 1 |
| 2 | 1 | 1 | 1 | 1 | 1 |
| 3 | 1 | 1 | 1 | 1 | 1 |
| 4 | 1 | 1 | 1 | 1 | 1 |
| 5 | 1 | 1 | 1 | 1 | 1 |
| 6 | 1 | 1 | 1 | 1 | 1 |
| | 6 | 6 | 6 | 6 | 6 |

Die Pip P()s

| Pips | Reel 1 | Reel 2 | Reel 3 | Reel 4 | Reel 5 |
|---|---|---|---|---|---|

| | | | | | |
|---|---|---|---|---|---|
| 1 | 0.167 | 0.167 | 0.167 | 0.167 | 0.167 |
| 2 | 0.167 | 0.167 | 0.167 | 0.167 | 0.167 |
| 3 | 0.167 | 0.167 | 0.167 | 0.167 | 0.167 |
| 4 | 0.167 | 0.167 | 0.167 | 0.167 | 0.167 |
| 5 | 0.167 | 0.167 | 0.167 | 0.167 | 0.167 |
| 6 | 0.167 | 0.167 | 0.167 | 0.167 | 0.167 |
| | 1 | 1 | 1 | 1 | 1 |

Abs P()

| Pips | Reel 1 | Reel 2 | Reel 3 | Reel 4 | Reel 5 |
|---|---|---|---|---|---|
| 1 | 0.008 | 0.008 | 0.016 | 0.008 | 0.008 |
| 2 | 0.008 | 0.008 | 0.016 | 0.008 | 0.008 |
| 3 | 0.008 | 0.008 | 0.016 | 0.008 | 0.008 |
| 4 | 0.008 | 0.008 | 0.016 | 0.008 | 0.008 |
| 5 | 0.008 | 0.008 | 0.016 | 0.008 | 0.008 |
| 6 | 0.008 | 0.008 | 0.016 | 0.008 | 0.008 |

"Prize"Awards

| Pips | Reel 1 | Reel 2 | Reel 3 | Reel 4 | Reel 5 |
|---|---|---|---|---|---|
| 1 | 15.000 | 15.000 | 15.000 | 15.000 | 15.000 |
| 2 | 30.000 | 30.000 | 30.000 | 30.000 | 30.000 |
| 3 | 45.000 | 45.000 | 45.000 | 45.000 | 45.000 |
| 4 | 60.000 | 60.000 | 60.000 | 60.000 | 60.000 |
| 5 | 75.000 | 75.000 | 75.000 | 75.000 | 75.000 |
| 6 | 90.000 | 90.000 | 90.000 | 90.000 | 90.000 |

"Prize" Avg

| Pips | Reel 1 | Reel 2 | Reel 3 | Reel 4 | Reel 5 |
|---|---|---|---|---|---|
| 1 | 0.119 | 0.121 | 0.234 | 0.125 | 0.123 |
| 2 | 0.238 | 0.242 | 0.469 | 0.250 | 0.246 |

| | | | | | | |
|---|---|---|---|---|---|---|
| 3 | 0.357 | 0.363 | 0.703 | 0.375 | 0.369 | |
| 4 | 0.476 | 0.484 | 0.938 | 0.500 | 0.492 | |
| 5 | 0.595 | 0.605 | 1.172 | 0.625 | 0.615 | |
| 6 | 0.714 | 0.726 | 1.406 | 0.750 | 0.738 | |
| Prize Sum | 2.500 | 2.540 | 4.922 | 2.625 | 2.582 | |
| RTP | 8.333% | 8.468% | 16.406% | 8.750% | 8.607% | 50.564% |

| Brand / Theme Report All | | | | | | |
|---|---|---|---|---|---|---|
| Brand | Theme | Games | Coin In | Theo Win | Actual Win | Days on Floor |
| ETG110 | ETG110 | 32 | 2.47 | 0.78 | 1.11 | 198 |
| Series 101 | Theme 101-A | 22 | 1.64 | 1.61 | 1.71 | 99 |
| Series 101 | Theme 101-B | 43 | 0.70 | 0.67 | 0.85 | 55 |
| Theme 110 | Theme 110 | 55 | 0.42 | 0.48 | 0.47 | 135 |
| Series 102 | Theme 102-A | 101 | 1.25 | 1.10 | 1.22 | 225 |
| Series 102 | Theme 102-B | 22 | 1.25 | 1.01 | 1.31 | 225 |
| Series 103 | Theme 103-A | 37 | 0.66 | 0.71 | 0.55 | 59 |
| Series 103 | Theme 103-B | 49 | 0.77 | 0.66 | 0.62 | 59 |
| Theme 111 | Theme 111 | 88 | 1.33 | 1.20 | 0.99 | 90 |
| Theme 112 | Theme 112 | 120 | 1.88 | 1.60 | 1.71 | 17 |
| Theme 113 | Theme 113 | 98 | 0.85 | 0.80 | 0.97 | 32 |
| Theme 114 | Theme 114 | 67 | 0.30 | 0.30 | 0.18 | 90 |
| Theme 115 | Theme 115 | 34 | 0.87 | 0.94 | 0.90 | 62 |
| Series 104 | Theme 104-A | 54 | 0.43 | 0.49 | 0.45 | 397 |
| Series 104 | Theme 104-B | 54 | 0.50 | 0.60 | 0.65 | 397 |
| Series 104 | Theme 104-C | 54 | 0.29 | 0.32 | 0.23 | 397 |
| Series 105 | Theme 105-A | 29 | 1.59 | 1.62 | 1.72 | 215 |
| Series 105 | Theme 105-B | 29 | 1.32 | 1.29 | 1.41 | 215 |
| Series 105 | Theme 105-C | 29 | 1.44 | 1.46 | 1.30 | 215 |
| Series 106 | Theme 106-A | 74 | 0.61 | 0.58 | 0.55 | 625 |
| Series 106 | Theme 106-B | 74 | 0.69 | 0.66 | 0.63 | 625 |
| Theme 115 | Theme 115 | 51 | 1.05 | 1.33 | 1.35 | 233 |

```
<?xml version="1.0" encoding="UTF-8" standalone="no"?>
<PayTableSet>
  <MenuDescription>Super Gold 5x5 92% version 0</MenuDescription>
  <GameDef>
    <GameType>SuperGold</GameType>
    <CardSize>5x5</CardSize>
    <Pattern>Single</Pattern>
    <NumCards>1</NumCards>
    <MinRTP>92.00</MinRTP>
    <MaxRTP>92.00</MaxRTP>
    <BaseMinRTP>74.17</BaseMinRTP>
    <BaseMaxRTP>74.17</BaseMaxRTP>
    <BonusMinRTP>17.84</BonusMinRTP>
    <BonusMaxRTP>17.84</BonusMaxRTP>
    <CardsPerWin>3.68</CardsPerWin>
    <CardsPerBonus>19.65</CardsPerBonus>
    <CardsPerRetrigger>0.00</CardsPerRetrigger>
    <PayTable>
      <MaxBallsDrawn>35</MaxBallsDrawn>
      <PayRow>
        <MinCalls>0</MinCalls>
        <MaxCalls>11</MaxCalls>
        <PayMult>50.0</PayMult>
        <PayMultMax>50.0</PayMultMax>
        <CardsPerEvent>769.31</CardsPerEvent>
      </PayRow>
      <PayRow>
        <MinCalls>12</MinCalls>
        <MaxCalls>12</MaxCalls>
        <PayMult>30.0</PayMult>
        <PayMultMax>30.0</PayMultMax>
        <CardsPerEvent>1438.12</CardsPerEvent>
      </PayRow>
      <PayRow>
        <MinCalls>13</MinCalls>
        <MaxCalls>13</MaxCalls>
        <PayMult>25.0</PayMult>
        <PayMultMax>25.0</PayMultMax>
        <CardsPerEvent>1050.48</CardsPerEvent>
      </PayRow>
      <PayRow>
        <MinCalls>14</MinCalls>
        <MaxCalls>14</MaxCalls>
        <PayMult>15.0</PayMult>
        <PayMultMax>15.0</PayMultMax>
        <CardsPerEvent>787.82</CardsPerEvent>
      </PayRow>
      <PayRow>
        <MinCalls>15</MinCalls>
        <MaxCalls>15</MaxCalls>
        <PayMult>12.0</PayMult>
        <PayMultMax>12.0</PayMultMax>
```

```
  <CardsPerEvent>604.16</CardsPerE
</PayRow>
<PayRow>
  <MinCalls>16</MinCalls>
  <MaxCalls>16</MaxCalls>
  <PayMult>11.0</PayMult>
  <PayMultMax>11.0</PayMultMax>
  <CardsPerEvent>472.28</CardsPerE
</PayRow>
<PayRow>
  <MinCalls>17</MinCalls>
  <MaxCalls>17</MaxCalls>
  <PayMult>9.0</PayMult>
  <PayMultMax>9.0</PayMultMax>
  <CardsPerEvent>375.42</CardsPerE
</PayRow>
<PayRow>
  <MinCalls>18</MinCalls>
  <MaxCalls>18</MaxCalls>
  <PayMult>8.0</PayMult>
  <PayMultMax>8.0</PayMultMax>
  <CardsPerEvent>302.88</CardsPerE
</PayRow>
<PayRow>
  <MinCalls>19</MinCalls>
  <MaxCalls>19</MaxCalls>
  <PayMult>5.0</PayMult>
  <PayMultMax>5.0</PayMultMax>
  <CardsPerEvent>247.61</CardsPerE
</PayRow>
<PayRow>
  <MinCalls>20</MinCalls>
  <MaxCalls>23</MaxCalls>
  <PayMult>4.0</PayMult>
  <PayMultMax>4.0</PayMultMax>
  <CardsPerEvent>38.88</CardsPerEv
</PayRow>
<PayRow>
  <MinCalls>24</MinCalls>
  <MaxCalls>27</MaxCalls>
  <PayMult>3.0</PayMult>
  <PayMultMax>3.0</PayMultMax>
  <CardsPerEvent>21.42</CardsPerEvent>
</PayRow>
<PayRow>
  <MinCalls>28</MinCalls>
  <MaxCalls>31</MaxCalls>
  <PayMult>2.0</PayMult>
  <PayMultMax>2.0</PayMultMax>
  <CardsPerEvent>13.38</CardsPerEvent>
</PayRow>
<PayRow>
```

```
      <MinCalls>32</MinCalls>
      <MaxCalls>35</MaxCalls>
      <PayMult>1.0</PayMult>
      <PayMultMax>1.0</PayMultMa
      <CardsPerEvent>9.37</CardsPerEvent
    </PayRow>
  </PayTable>
  <MultiplierPool>
    <TotalCount>1002</TotalCount>
    <PoolRow>
      <Value>1</Value>
      <Count>951</Count>
    </PoolRow>
    <PoolRow>
      <Value>3</Value>
      <Count>12</Count>
    </PoolRow>
    <PoolRow>
      <Value>4</Value>
      <Count>16</Count>
    </PoolRow>
    <PoolRow>
      <Value>5</Value>
      <Count>10</Count>
    </PoolRow>
    <PoolRow>
      <Value>7</Value>
      <Count>6</Count>
    </PoolRow>
    <PoolRow>
      <Value>10</Value>
      <Count>4</Count>
    </PoolRow>
    <PoolRow>
      <Value>20</Value>
      <Count>3</Count>
    </PoolRow>
  </MultiplierPool>
</GameDef>
<GameDef>
  <GameType>SuperGold</GameTyp
  <CardSize>5x5</CardSize>
  <Pattern>Single</Pattern>
  <NumCards>4</NumCards>
  <MinRTP>92.00</MinRTP>
  <MaxRTP>92.00</MaxRTP>
  <BaseMinRTP>75.44</BaseMinRTP
  <BaseMaxRTP>75.44</BaseMaxRTP
  <BonusMinRTP>16.56</BonusMinR
  <BonusMaxRTP>16.56</BonusMax
  <CardsPerWin>8.07</CardsPerWin
  <CardsPerBonus>21.53</CardsPerB
```

Figure 35D:
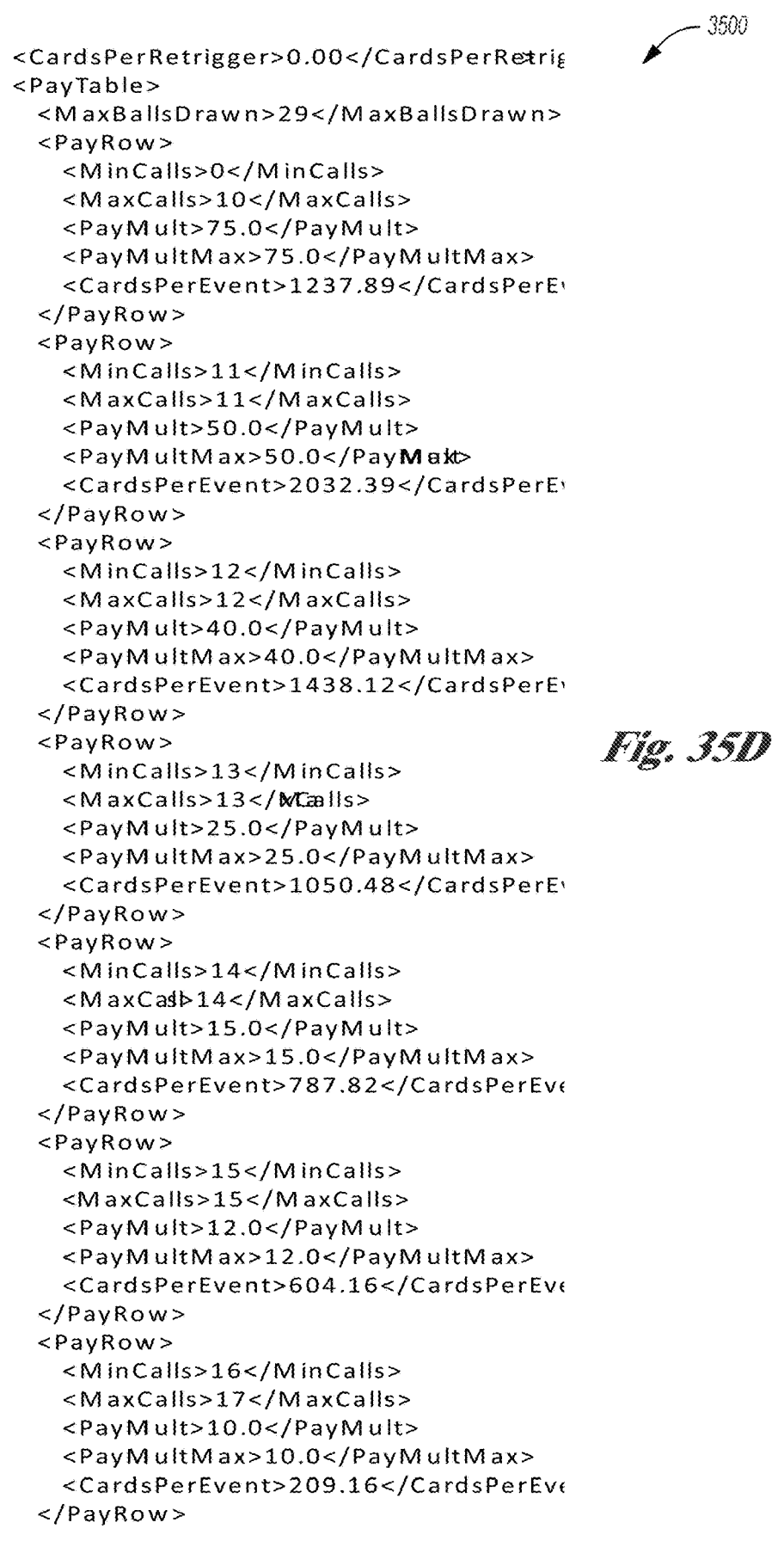

```
<CardsPerRetrigger>0.00</CardsPerRetrig
<PayTable>
  <MaxBallsDrawn>29</MaxBallsDrawn>
  <PayRow>
    <MinCalls>0</MinCalls>
    <MaxCalls>10</MaxCalls>
    <PayMult>75.0</PayMult>
    <PayMultMax>75.0</PayMultMax>
    <CardsPerEvent>1237.89</CardsPerE
  </PayRow>
  <PayRow>
    <MinCalls>11</MinCalls>
    <MaxCalls>11</MaxCalls>
    <PayMult>50.0</PayMult>
    <PayMultMax>50.0</PayMultMax>
    <CardsPerEvent>2032.39</CardsPerE
  </PayRow>
  <PayRow>
    <MinCalls>12</MinCalls>
    <MaxCalls>12</MaxCalls>
    <PayMult>40.0</PayMult>
    <PayMultMax>40.0</PayMultMax>
    <CardsPerEvent>1438.12</CardsPerE
  </PayRow>
  <PayRow>
    <MinCalls>13</MinCalls>
    <MaxCalls>13</MaxCalls>
    <PayMult>25.0</PayMult>
    <PayMultMax>25.0</PayMultMax>
    <CardsPerEvent>1050.48</CardsPerE
  </PayRow>
  <PayRow>
    <MinCalls>14</MinCalls>
    <MaxCalls>14</MaxCalls>
    <PayMult>15.0</PayMult>
    <PayMultMax>15.0</PayMultMax>
    <CardsPerEvent>787.82</CardsPerEve
  </PayRow>
  <PayRow>
    <MinCalls>15</MinCalls>
    <MaxCalls>15</MaxCalls>
    <PayMult>12.0</PayMult>
    <PayMultMax>12.0</PayMultMax>
    <CardsPerEvent>604.16</CardsPerEve
  </PayRow>
  <PayRow>
    <MinCalls>16</MinCalls>
    <MaxCalls>17</MaxCalls>
    <PayMult>10.0</PayMult>
    <PayMultMax>10.0</PayMultMax>
    <CardsPerEvent>209.16</CardsPerEve
  </PayRow>
```

```
  <PayRow>
    <MinCalls>18</MinCalls>
    <MaxCalls>19</MaxCalls>
    <PayMult>9.0</PayMult>
    <PayMultMax>9.0</PayMultMax>
    <CardsPerEvent>136.23</CardsPerE
  </PayRow>
  <PayRow>
    <MinCalls>20</MinCalls>
    <MaxCalls>21</MaxCalls>
    <PayMult>8.0</PayMult>
    <PayMultMax>8.0</PayMultMax>
    <CardsPerEvent>93.31</CardsPerEv
  </PayRow>
  <PayRow>
    <MinCalls>22</MinCalls>
    <MaxCalls>23</MaxCalls>
    <PayMult>7.0</PayMult>
    <PayMultMax>7.0</PayMultMax>
    <CardsPerEvent>66.66</CardsPerEv
  </PayRow>
  <PayRow>
    <MinCalls>24</MinCalls>
    <MaxCalls>25</MaxCalls>
    <PayMult>5.0</PayMult>
    <PayMultMax>5.0</PayMultMax>
    <CardsPerEvent>49.39</CardsPerEv
  </PayRow>
  <PayRow>
    <MinCalls>26</MinCalls>
    <MaxCalls>27</MaxCalls>
    <PayMult>4.0</PayMult>
    <PayMultMax>4.0</PayMultMax>
    <CardsPerEvent>37.81</CardsPerEv
  </PayRow>
  <PayRow>
    <MinCalls>28</MinCalls>
    <MaxCalls>29</MaxCalls>
    <PayMult>2.0</PayMult>
    <PayMultMax>2.0</PayMultMax>
    <CardsPerEvent>29.84</CardsPerEv
  </PayRow>
</PayTable>
<MultiplierPool>
  <TotalCount>1098</TotalCount>
  <PoolRow>
    <Value>1</Value>
    <Count>1047</Count>
  </PoolRow>
  <PoolRow>
    <Value>3</Value>
    <Count>12</Count>
```

```
</PoolRow>
      <PoolRow>
        <Value>4</Value>
        <Count>16</Count>
      </PoolRow>
      <PoolRow>
        <Value>5</Value>
        <Count>10</Count>
      </PoolRow>
      <PoolRow>
        <Value>7</Value>
        <Count>6</Count>
      </PoolRow>
      <PoolRow>
        <Value>10</Value>
        <Count>4</Count>
      </PoolRow>
      <PoolRow>
        <Value>20</Value>
        <Count>3</Count>
      </PoolRow>
    </MultiplierPool>
  </GameDef>
  <GameDef>
    <GameType>SuperGold</GameType>
    <CardSize>5x5</CardSize>
    <Pattern>Single</Pattern>
    <NumCards>9</NumCards>
    <MinRTP>92.00</MinRTP>
    <MaxRTP>92.00</MaxRTP>
    <BaseMinRTP>76.00</BaseMinRTP>
    <BaseMaxRTP>76.00</BaseMaxRTP>
    <BonusMinRTP>16.00</BonusMinRTP>
    <BonusMaxRTP>16.00</BonusMaxRTP>
    <CardsPerWin>13.10</CardsPerWin>
    <CardsPerBonus>22.45</CardsPerBonus>
    <CardsPerRetrigger>0.00</CardsPerRetrig
    <PayTable>
      <MaxBallsDrawn>26</MaxBallsDrawn>
      <PayRow>
        <MinCalls>0</MinCalls>
        <MaxCalls>9</MaxCa
        <PayMult>150.0</PayMult>
        <PayMultMax>150.0</PayMultMax>
        <CardsPerEvent>2113.95</CardsPerE
      </PayRow>
      <PayRow>
        <MinCalls>10</MinCalls>
        <MaxCalls>10</MaxCalls>
        <PayMult>75.0</PayMult>
        <PayMultMax>75.0</PayMultMax>
        <CardsPerEvent>2987.05</CardsPerE
```

| | | | | | | |
|---|---|---|---|---|---|---|
| | | | | | | |
| Game Name | | Game Numbe | | Math Designer | | |
| **Hoo's Wild** | | **23-117** | | **John Doe** | | |
| | | | | | | |
| **Original** | Revison 2 | Revison 3 | Revison 4 | Revison 5 | Revison X | |
| **Date: 124-23** | Date: | Date: | Date: | Date: | Date: | |
| | | | | | | |
| Game Type | | | | | | |
| **Line** | | Ways | | Other | | |
| | | | | | | |
| Code Base | **C++** | | | | | |
| Operating System | **Ubuntu 20.04** | | | | | |
| | | | | | | |
| Target Play Rate/hour | **850** | | | | | |
| Spin Time Per Reel: | **2.7 Seconds** | | | | | |
| Lag Time Between Reels: | **0.12 Seconds** | | | | | |
| Average Free Game Time: | **135 Seconds** | | | | | |
| | | | | | | |
| Reel Type | | | | | | |
| **Standard** | | Expanding | | Random Exp | | |
| | | | | | | |
| Base Reel Config | | **Standard** | Non-standard | Reel Width | Reel Pos Height | Coordinate |
| Number ofverical reels | | **5** | | | **510** | **11** |
| Number of rows | | **4** | | **629** | | **15** |
| Symbol coordinates | | **Standard** | Special | Coordinates | **Center** | Upper Left |
| | | | | | | |

| | | | | | | |
|---|---|---|---|---|---|---|
| | | | Resolution | | | |
| Display Type Portrait | **Yes** | No | **3840x2160** | | | |
| Display Type Dual | Yes | No | 3840x2160 | | | |
| Display Type Triple | Yes | No | 3840x2160 | | | |
| Standard Topper | **Yes** | No | **3840x2160** | | | |
| Wheel Topper | Yes | No | 2160x2160 | | | |
| Mystery Progressive | Yes | **No** | 3840x2160 | | | |
| | | | | | | |
| | | | | | | |
| | | | | | | |
| **Return to Player Percentage (RTP) Based on:** | | | **100%** | 90% | | |
| Base | Feature 1 | Feature 2 | Feature 3 | Feature 4 | Free Games | |
| **25%** | **35%** | | | | **40%** | |
| | | | | | | |
| Bet Config Options | (Select all that apply) | | | | | |
| **30, 60, 90, 120, 150** | | | | | | |
| **50, 100, 150, 200, 250** | | | | | | |
| **75, 150, 225, 300, 375** | | | | | | |
| 88, 188, 288,388, 488 | | | | | | |
| 100, 200, 300, 400, 50 | | | | | | |
| | | | | | | |
| Denominations Available | (Select all that apply) | | | | | |
| **$0.01** | | | | | | |
| **$0.02** | | | | | | |
| **$0.05** | | | | | | |
| **$0.10** | | | | | | |
| **$0.25** | | | | | | |
| **$0.50** | | | | | | |
| **$1.00** | | | | | | |

| | | | | | | |
|---|---|---|---|---|---|---|
| $2.00 | | | | | | |
| $5.00 | | | | | | |
| $10.00 | | | | | | |
| $25.00 | | | | | | |
| $50.00 | | | | | | |
| | | | | | | |
| MinimumCost-to-cover (Select all that apply) | | | | | | |
| **$.25/$.50** | | | | | | |
| **$.50/$1.00** | | | | | | |
| **$.75/$1.00** | | | | | | |
| $1.00/$2.00 | | | | | | |
| $1.50/$2.00 | | | | | | |
| | | | | | | |
| Base Game Details | | | | | | |
| Max Game Pays | **150x** | | | | | |
| Probability of >100x | **0.00015** | | | | | |
| Standard Deviation Base | Very High | High | **Medium** | Low | | |
| | | | 3.35 | | | |
| | | | | | | |
| Play Type Incldued | (Select all that apply) | | | | | |
| **Standard** | | **Yes** | No | | | |
| **Free Games** | Retriggers | **Yes** | No | **Variable** | Fixed | |
| | | | | **Yes** | No | Frequency |
| **Number of Free Game** | | | | **6** | | **160** |
| | | | | **10** | | **275** |
| | | | | **15** | | **600** |
| | | | | **20** | | **1,500** |
| **Min FG Pays/Game** | | | | **0x** | | |
| **Max FG Pays/Game** | | | | **150x** | | |

| Voaltility | Very High | High | Medium | Low | | |
|---|---|---|---|---|---|---|
| Standard Deviation of FG | 6.25 | | | | | |
| **Wild Replacement** | Symbol Replace | **Special Sym. 2** | | | | **35** |
| Added Wilds | | | | | | |
| Expanding Wilds | | | | | | |
| Hold and Spin | | | | | | |
| Drop and Spin | | | | | | |
| Cascading Reels | | | | | | |
| Expanding Reels | | | | | | |
| Random Expanding Reels | | | | | | |
| **Cash on Reels (Values** | .5x, 1x, 2x, 5x, 10x, 20, 50x, 100x | | | **Frequency** | | **2** |
| | | | | | | |
| Symbols Included and Pays | | 2 Symbols | 3 Symbols | 4 Symbols | 5 Symbols | File Number |
| **Ace** | | | **.2x** | **.4x** | **1x** | **A-Ben** |
| **King** | | | **.2x** | **.4x** | **1x** | **K-Ben** |
| **Queen** | | | **.1x** | **.2x** | **.5x** | **Q-Ben** |
| **Jack** | | | **.1x** | **.2x** | **.5x** | **J-Ben** |
| **10** | | | **.05x** | **.1x** | **.2x** | **10-Ben** |
| **9** | | | | | | **9-Ben** |
| **Special Symbol 1** | | | **1x** | **3x** | **10x** | **2107** |
| **Special Symbol 2** | | | **1x** | **4x** | **12x** | **2108** |
| **Special Symbol 3** | | | **2x** | **10x** | **25x** | **2109** |
| **Special Symbol 4** | | | **5x** | **20x** | **100x** | **2110** |
| Special Symbol 5 | | | | | | |
| **Wild** | | | | | | **1642** |
| **Max Pays All Wilds** | | | **150x** | | | |

| | | | | | | |
|---|---|---|---|---|---|---|
| **Background Image** | | | | | file number | |
| **Jungle Image** | Swamp | Amazon | **Africa** | Rain Forest | **3141** | |
| **Background Animatio** | Yes | **No** | | | | |
| **ReelBackground Image** | | | | | **4050** | |
| **Main Character** | Gorilla | 2D | **3D** | **Rigged** | **57445753** | **9 Loops** |
| **Animation Running Times** | | | | | **3 - 9 seconds** | |
| | | | | | | |
| Progressives | **Yes** | No | | | | |
| Pro Box Location | **7** | | | | | |
| Pro Box Style | **19** | | | | | |
| Pro Display on Topper | **Yes** | No | | | | |
| | | | | | | |
| If Yes, number of levels | **4** | Reset Value | Incrementation | Index to Wager | | Probability |
| Name | **Mega** | $1.000.00 | 0.10% | Yes | **No** | **0.00005** |
| | **Major** | $100.00 | 0.15% | Yes | **No** | **0.0001** |
| | **Minor** | $25.00 | 0.25% | Yes | **No** | **0.0004** |
| | **Mini** | $10.00 | 0.40% | Yes | **No** | **0.002** |
| | | | | | | |
| Free games added to progressives | | **Yes** | No | | | |
| Progressive Name | **Free Games** | **Fixed FG** | Progressive FG | | | |
| **Mega** | **50** | | | | | |
| **Major** | **20** | | | | | |
| **Minor** | **10** | | | | | |
| **Mini** | **5** | | | | | |

*Fig. 36E*

SYSTEMS AND METHODS FOR ARTIFICIAL INTELLIGENCE DRIVEN CASINO-STYLE GAME ANALYSIS USING MANUAL UPDATING OF MODEL PARAMETERS

CROSS REFERENCE

This application is a continuation of and claims priority to, U.S. patent application Ser. No. 19/068,989 filed Mar. 3, 2025, which is a continuation-in-part of, and claims priority to, U.S. patent application Ser. No. 18/354,505 filed Jul. 18, 2023, which claims priority to Provisional Patent Application No. 63/501,389 filed May 10, 2023, all of which are incorporated herein for all purposes.

FIELD OF THE INVENTION

The embodiments of the present invention relate to systems and methods for a game of chance for an electronic gaming machine including at least partially developed executable instructions or computer readable files related to the game of chance using a specialized artificial intelligence game design system or specialized artificial intelligence game design modules or components including supervised, unsupervised, and/or reinforcement learning based on past and/or current game performance data which may include one or more of comprehensive, minimal, non-conforming, incomplete, estimations, and/or human recollection data.

BACKGROUND

Casinos derive much of their gaming revenue from electronic gaming machines ("EGMs") such as slot machines. Unfortunately, even with the introduction of new technology (e.g., curved displays), slot machines and the like can become stale after even short game play sessions. Moreover, younger players do not tend to play traditional slot machines because they are not exciting or attractive to play. Therefore, as the player demographic continues to trend younger, new and exciting electronic games of chance are needed.

The slot machine bonus game is one of the seminal slot machine improvements in history. A bonus game is a secondary game triggered by the outcomes of the primary game. The most popular bonus game in history is the Wheel of Fortune slot machine. Wheel of Fortune includes a bonus wheel which is activated based on one or more pre-established primary game outcomes. Responsive to the bonus wheel being activated, the player is afforded the opportunity to spin the bonus wheel to win a bonus prize. The inclusion of the bonus wheel rendered the slot machine more exciting and entertaining. It is in this vein, that the industry must continue to advance.

Accordingly, the new system and method detailed herein involves driving secondary game prizes based on primary game outcomes. In one embodiment, a secondary game display depicts a video-based secondary game advancing dynamically responsive to pre-established primary game outcomes. In one embodiment, the primary game is a video-based slot game having multiple video reels wherein outcomes on certain of said reels drive associated sections of the video-based secondary game. In one such embodiment, the primary game includes one or more virtual dice, playing cards, icons, dominos, etc., which, when appearing on the primary game display, act to advance sections (e.g., prize blocks) of the secondary game toward a threshold point. Ultimately, when sections of the secondary game advance to a threshold point, a corresponding prize is awarded.

New game development for electronic gaming machines (EGMs) is a very labor intensive and time-consuming exercise as many disciplines are required to develop a game from game conception to a final or semifinal form ready for submission to a gaming laboratory for certification.

Traditionally, game development starts with engineering game mechanics, artists' concepts, game math developed generally undertaken by game mathematicians to determine the game payouts, hit frequencies, game volatility, etc., and/or game producers who may direct game development in many ways. Often, the various disciplines and personnel required fall under the term "game studios." Game studios generally include, platform engineers, mechanical engineers, electric and electronic engineers, software engineers, sound engineers, artists, animators, quality assurance and game testing personnel, compliance personnel, who may submit the game to a gaming laboratory, product management supervisors, etc.

SUMMARY

The embodiments of the present invention relate to systems and methods for generating prizes based on primary game outcomes driving a secondary game wherein associated prizes are awarded once the secondary game reaches a threshold point.

In one embodiment of the present invention, a gaming machine includes a primary game display and secondary game display with the secondary game display mapped with one or more prize blocks arranged in a grid that generally mimics a primary game reel grid. The prize blocks can be any depiction including characters, animation, numeral values and the like representing different prize values. Each prize block has a prize value and a health value. When the health value of a prize block is exhausted (or reaches a threshold value) based on primary game outcomes, the prize block is destroyed and removed awarding its corresponding prize value. New prize blocks may fill voids left by removed prize blocks or the voids may be left blank without any associated prize value. The prize block may award prizes selected from a group consisting of; monetary, prize multipliers, free plays, advancement to a bonus game, merchandise, no value or credits, and/or comps.

In one embodiment, dice appearing on the primary game display randomly resolve into a pip value (e.g., 1-6). Each pip 'attacks' the prize block directly above it in the secondary game display. A single prize block may reside over one or more primary game reels such that dice appearing on multiple reels may serve to attack the same prize block. Such attacks deplete the health value of the corresponding prize block until the health value is exhausted and the block is destroyed awarding its corresponding prize value. While dice are used in one embodiment, those skilled in the art will recognize that any type of reel symbol or indicia may be used to facilitate the attack on the prize blocks. In one alternative example, virtual dominoes may be used to generate the attack on the prize blocks whereby the number of spots on each domino corresponds to the attack value. In another example, a simple attack integer may be displayed on the primary game reels.

In one embodiment, when a prize block is destroyed, it is removed from the secondary game display, the one or more prize blocks above the removed prize block lower into the vacated space and one or more new prize blocks are positioned at the upper portion of the secondary game display thereby filing the secondary game display with a new arrangement of prize blocks.

As detailed below, the secondary game facilitated by the prize block grid is dynamic and exciting as the secondary game prize blocks are destroyed and new prize blocks, with new depictions, are used to fill in the vacated spaces.

Other variations, embodiments and features of the present invention will become evident from the following detailed description, drawings and claims.

BRIEF DESCRIPTION OF THE DRA WINGS

FIGS. 28A through 28E illustrate a typical performance report that may be generated by a casino operator;

FIG. 30 illustrates another type of instruction, decision or determination sheet or questionnaire according to the embodiments of the present invention;

FIG. 31 illustrates another type of instruction, decision or determination sheet or questionnaire according to the embodiments of the present invention;

FIGS. 32A through 32D illustrate exemplary portions of a spreadsheet for the details of game math for a game of chance;

Figure 37:
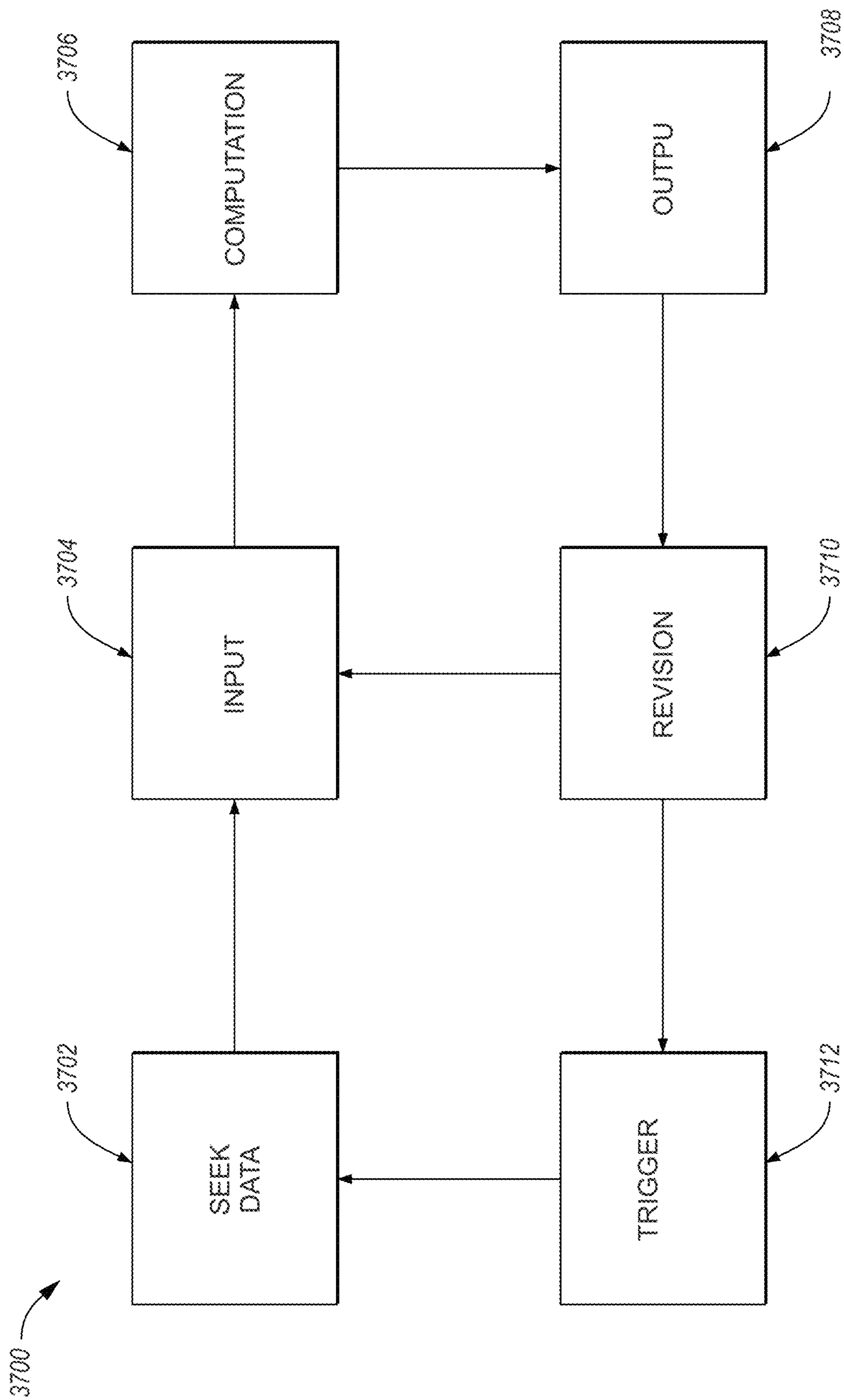
Figure 38:
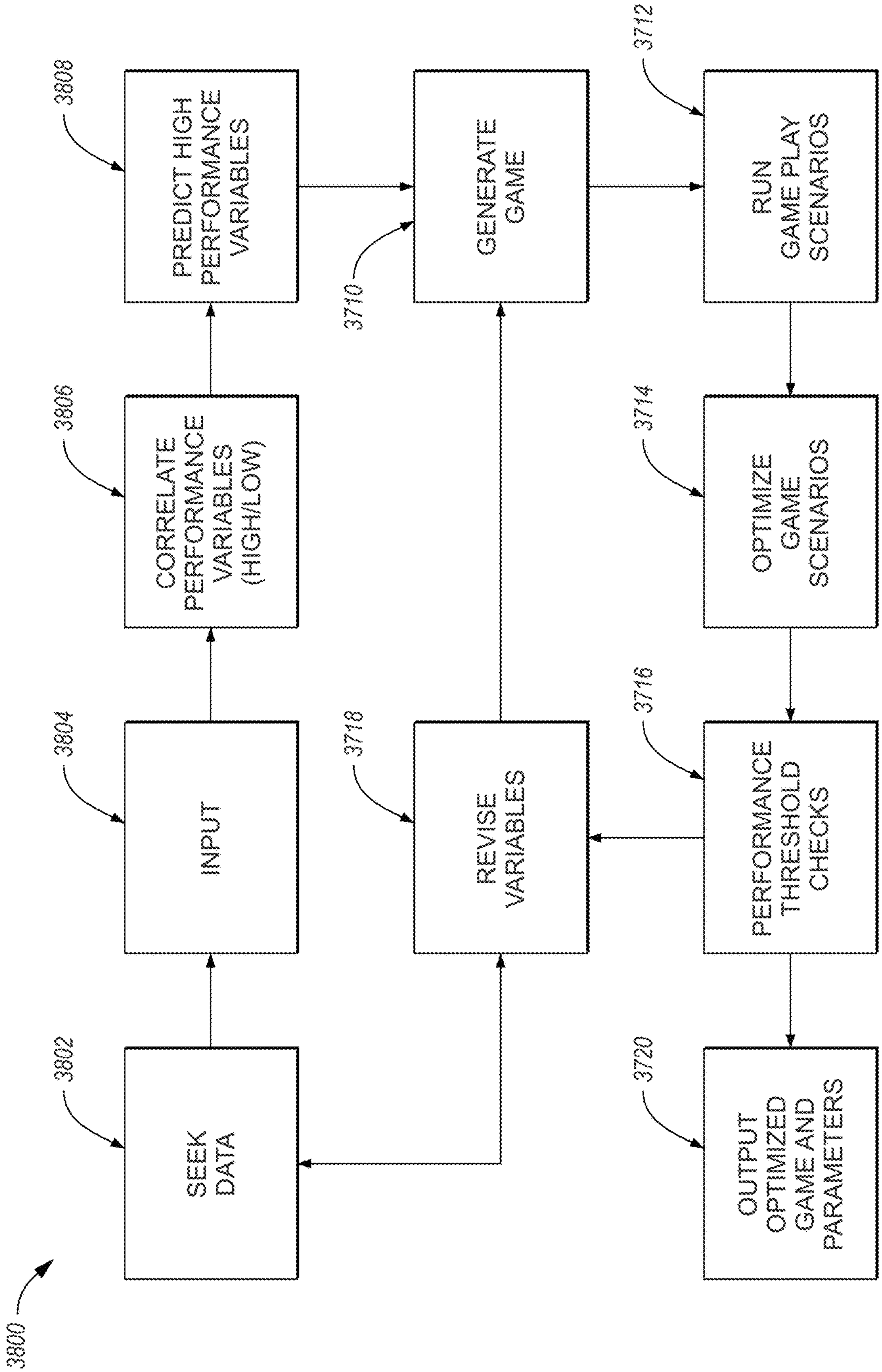
Figure 39:
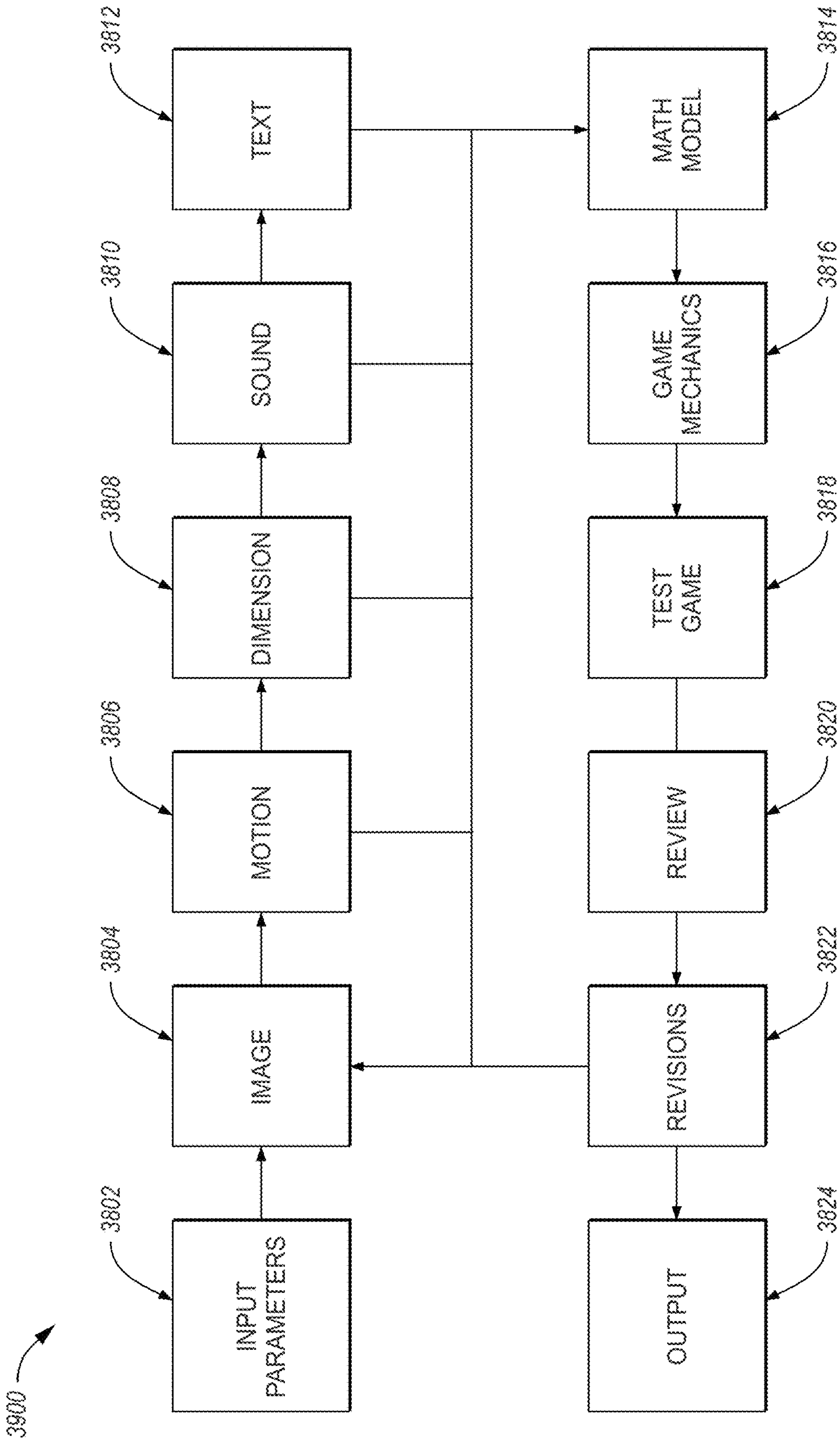
Figure 40:
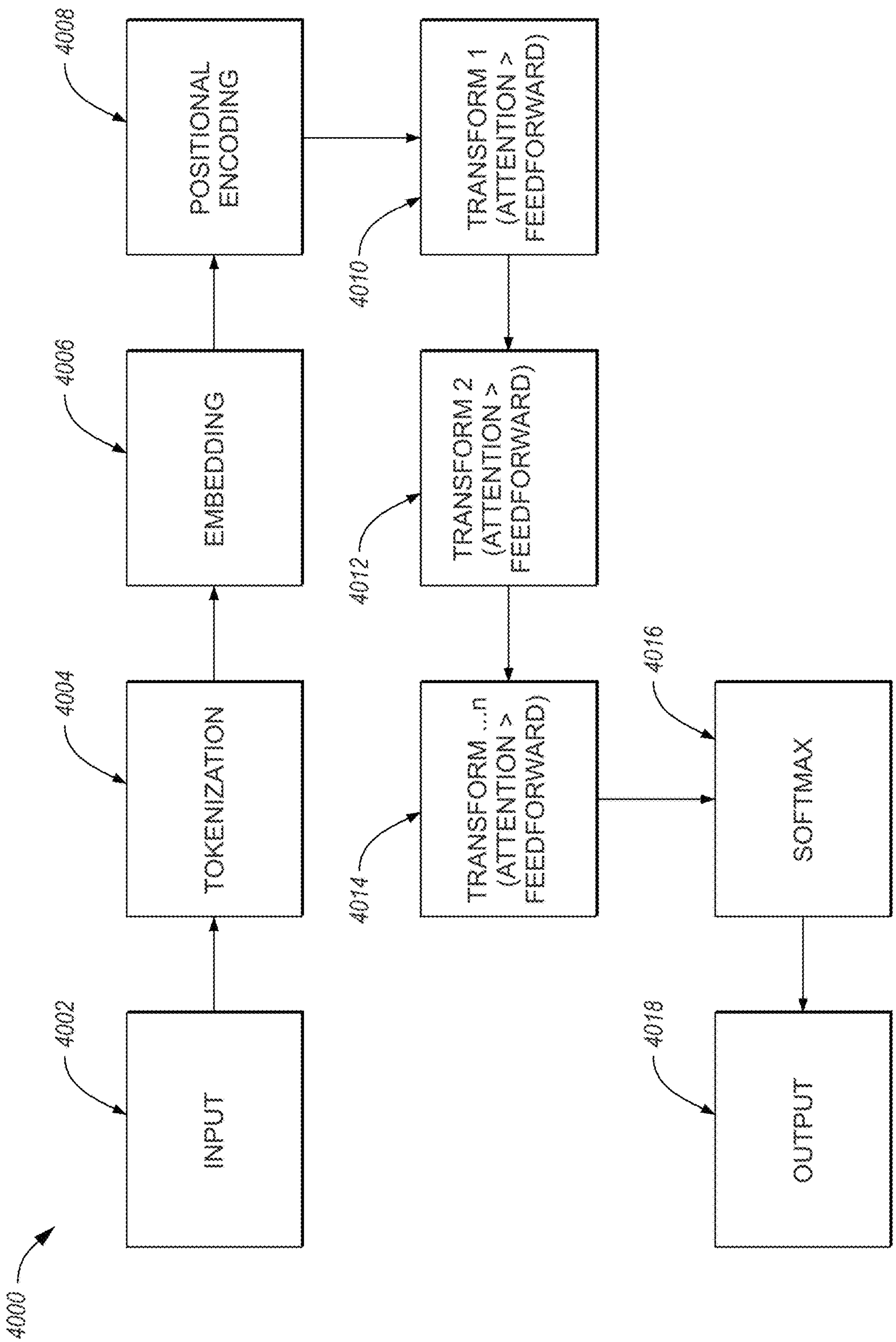
Figure 41:
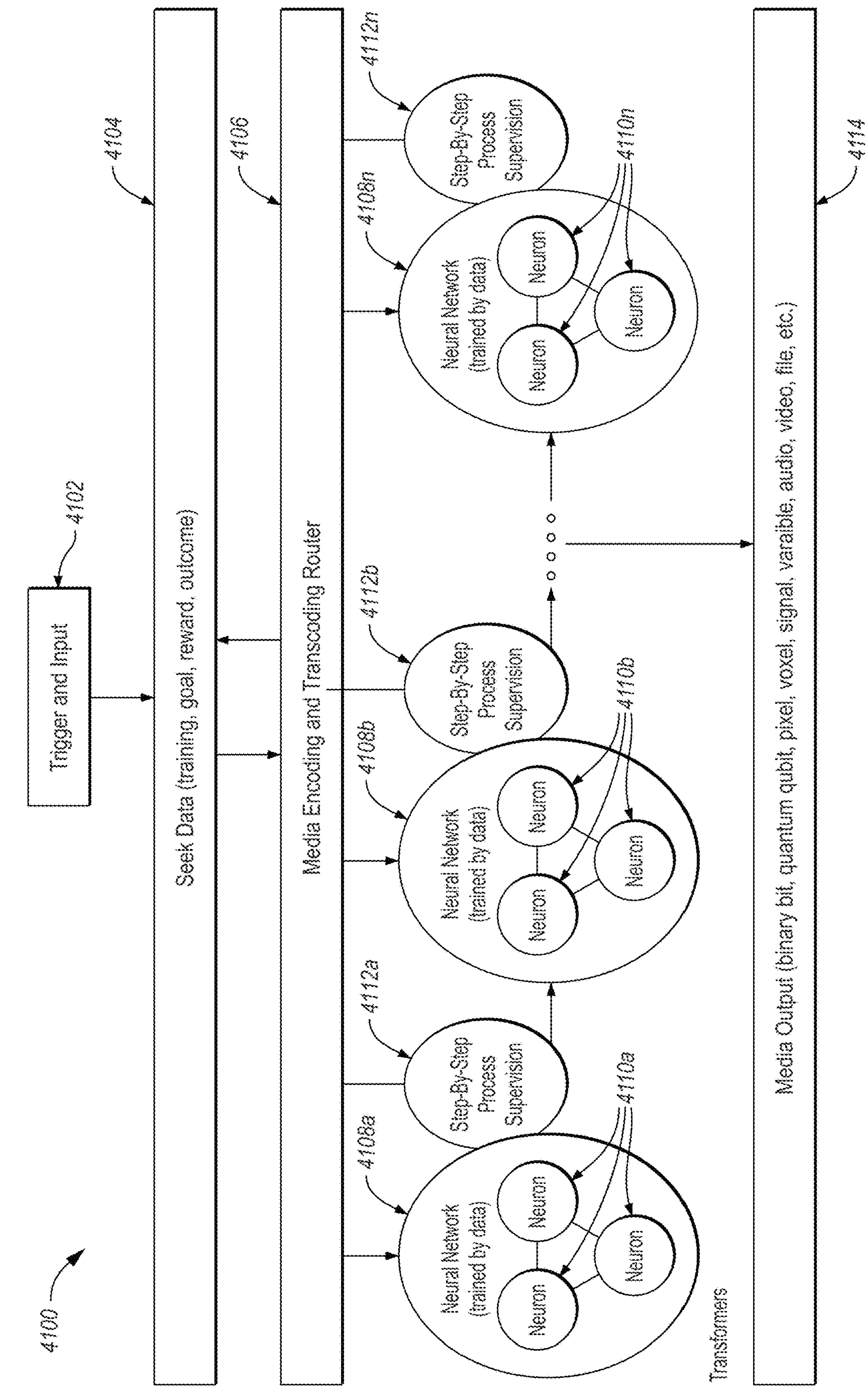
Figure 42A:
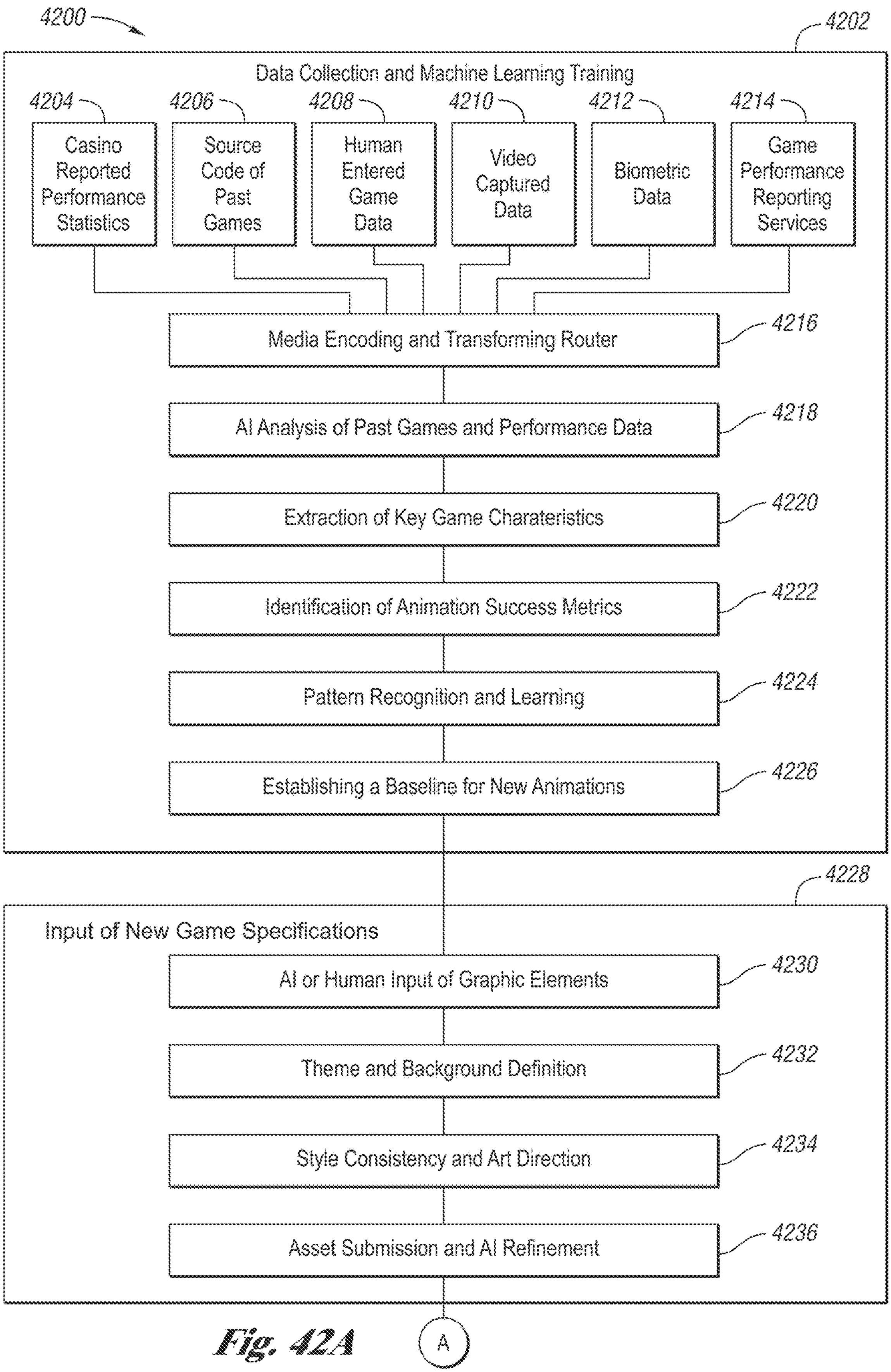
Figure 42B:
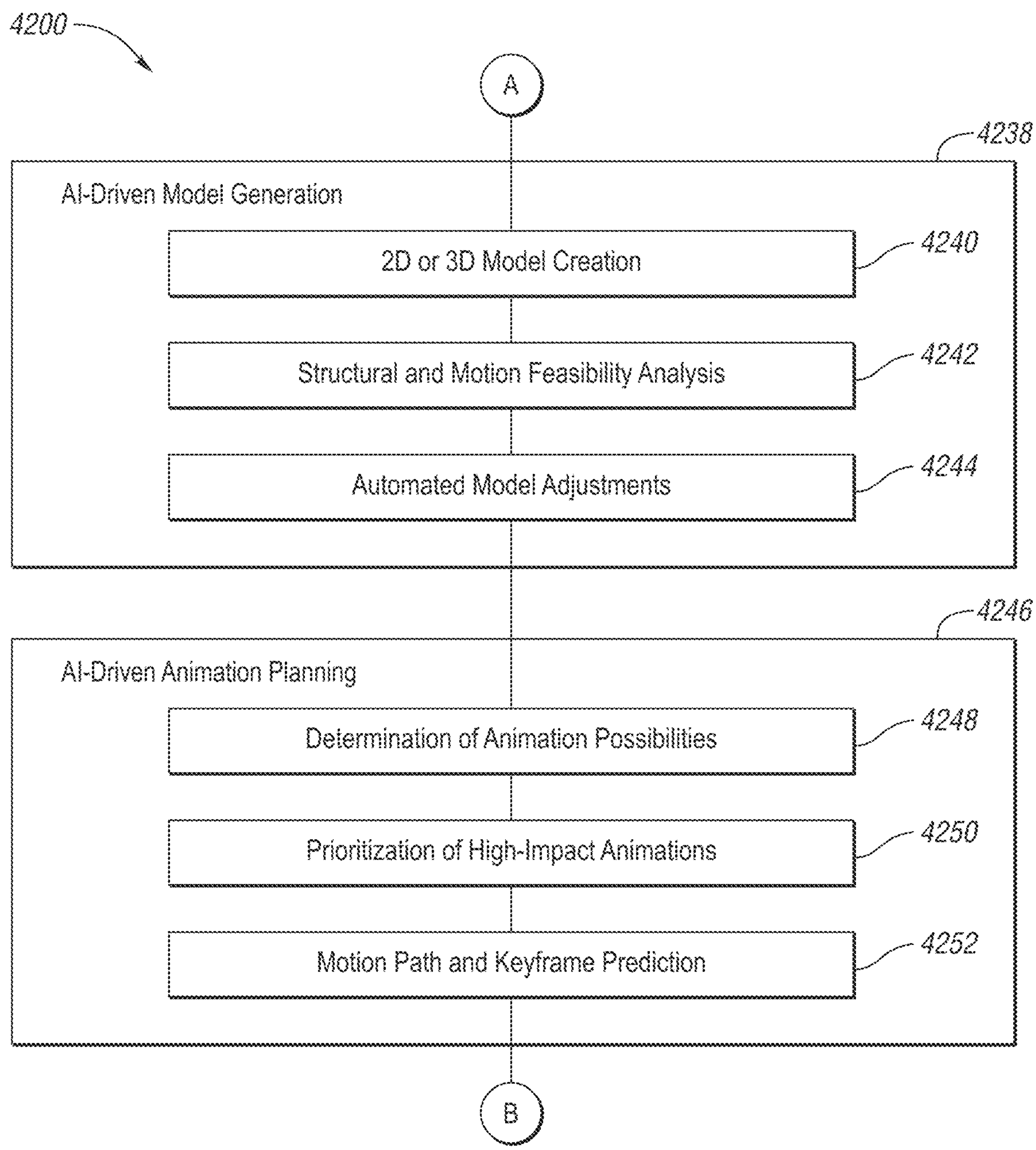
Figure 42C:
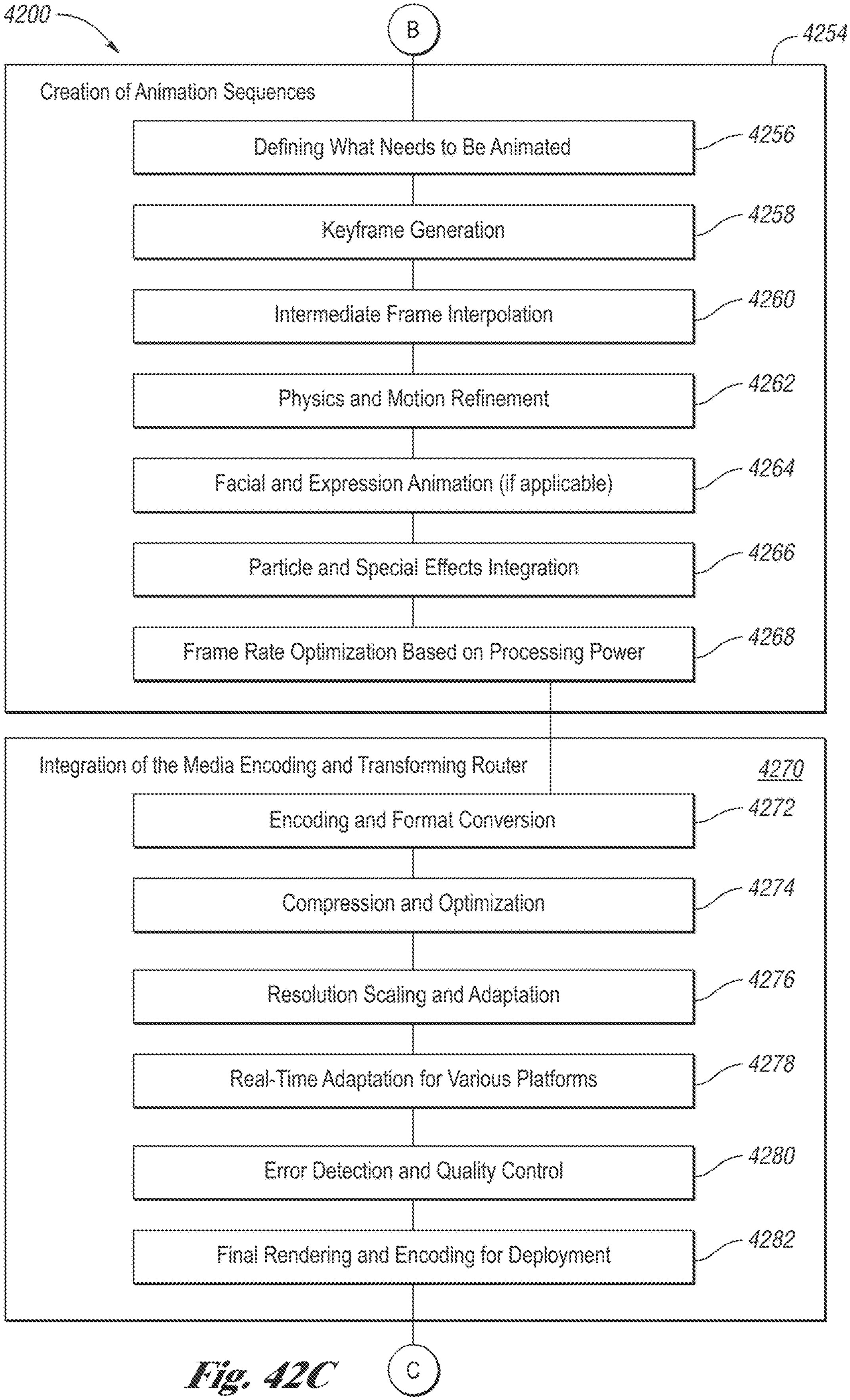
Figure 42D:
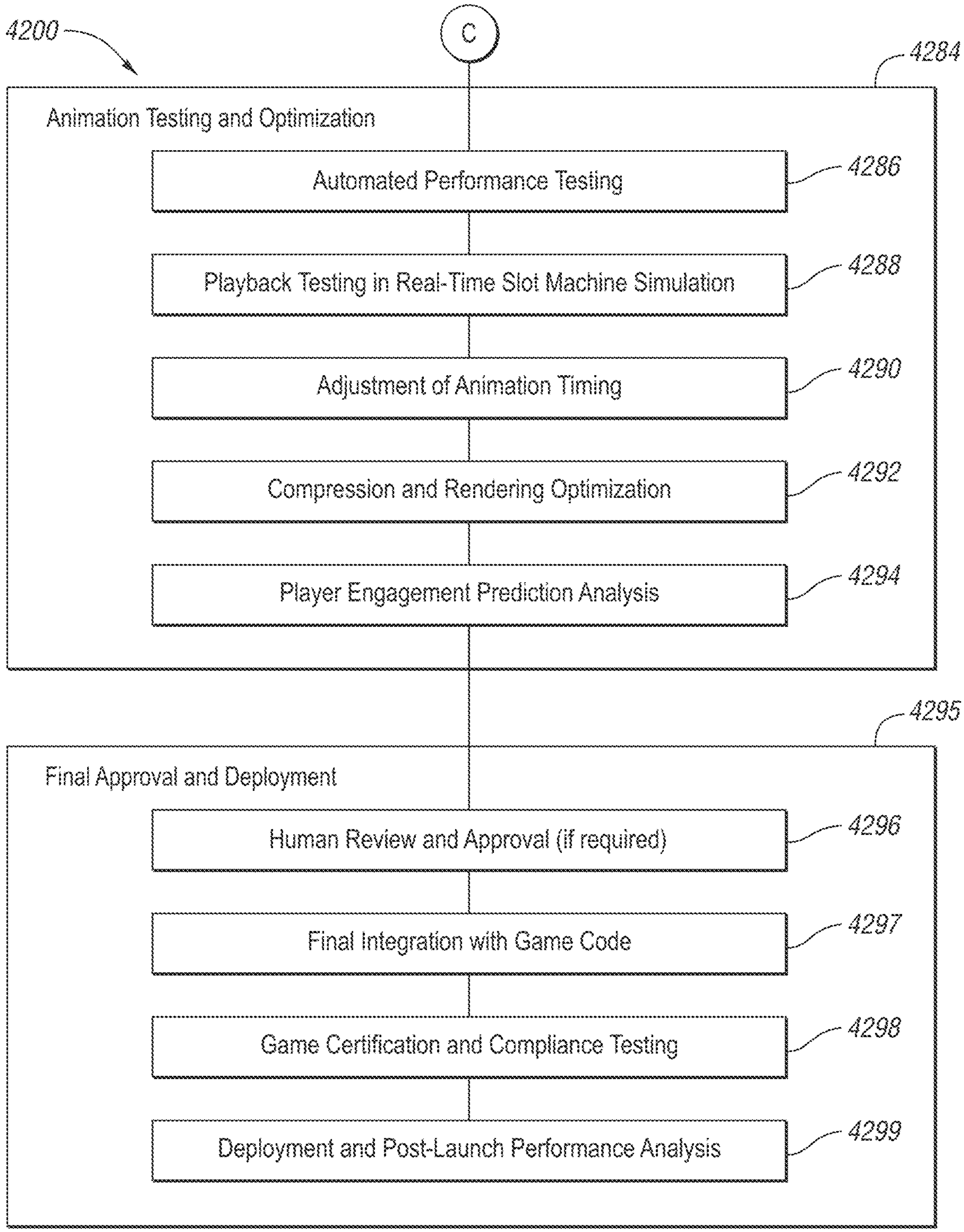
Figure 43:
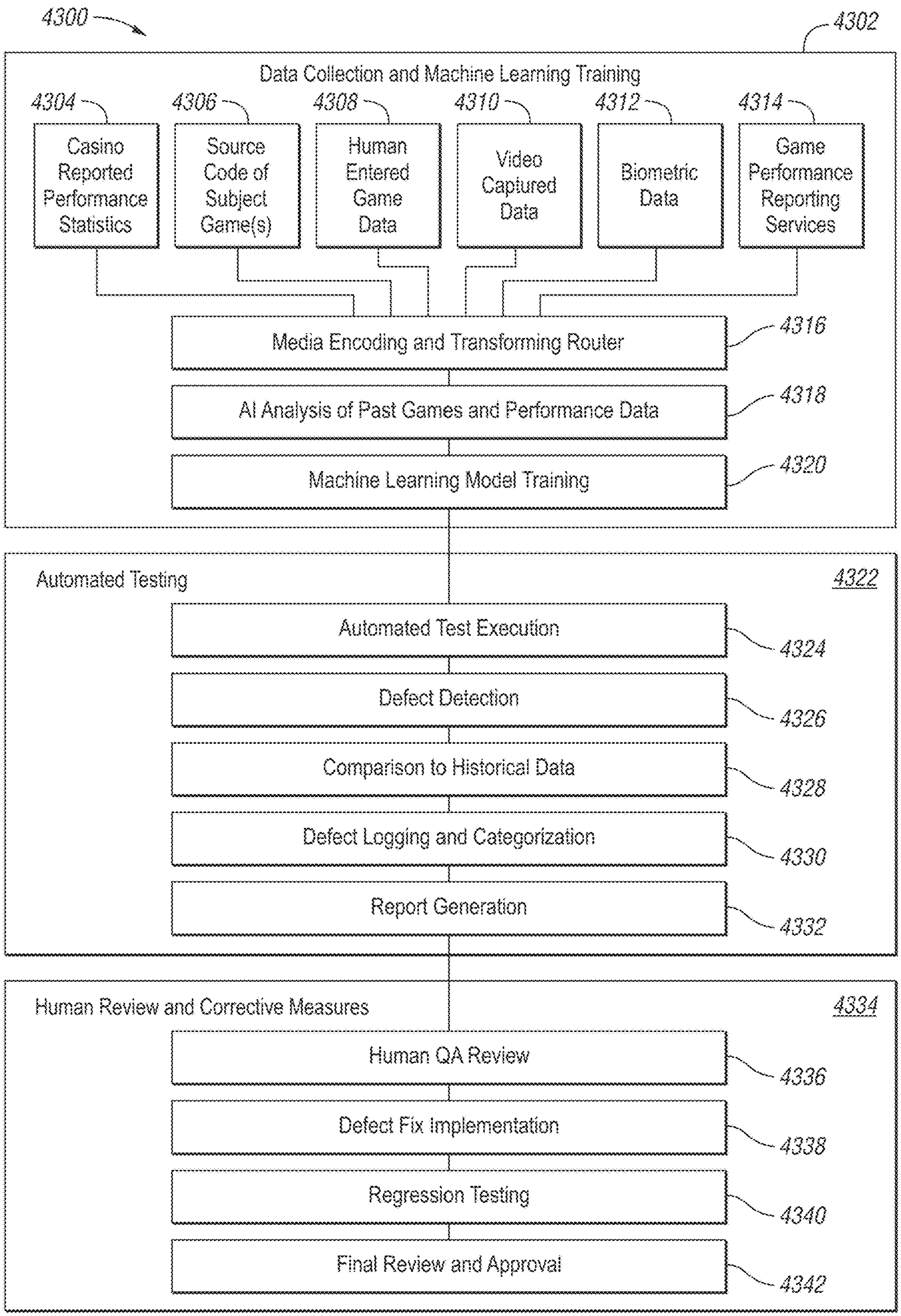
Figure 44:
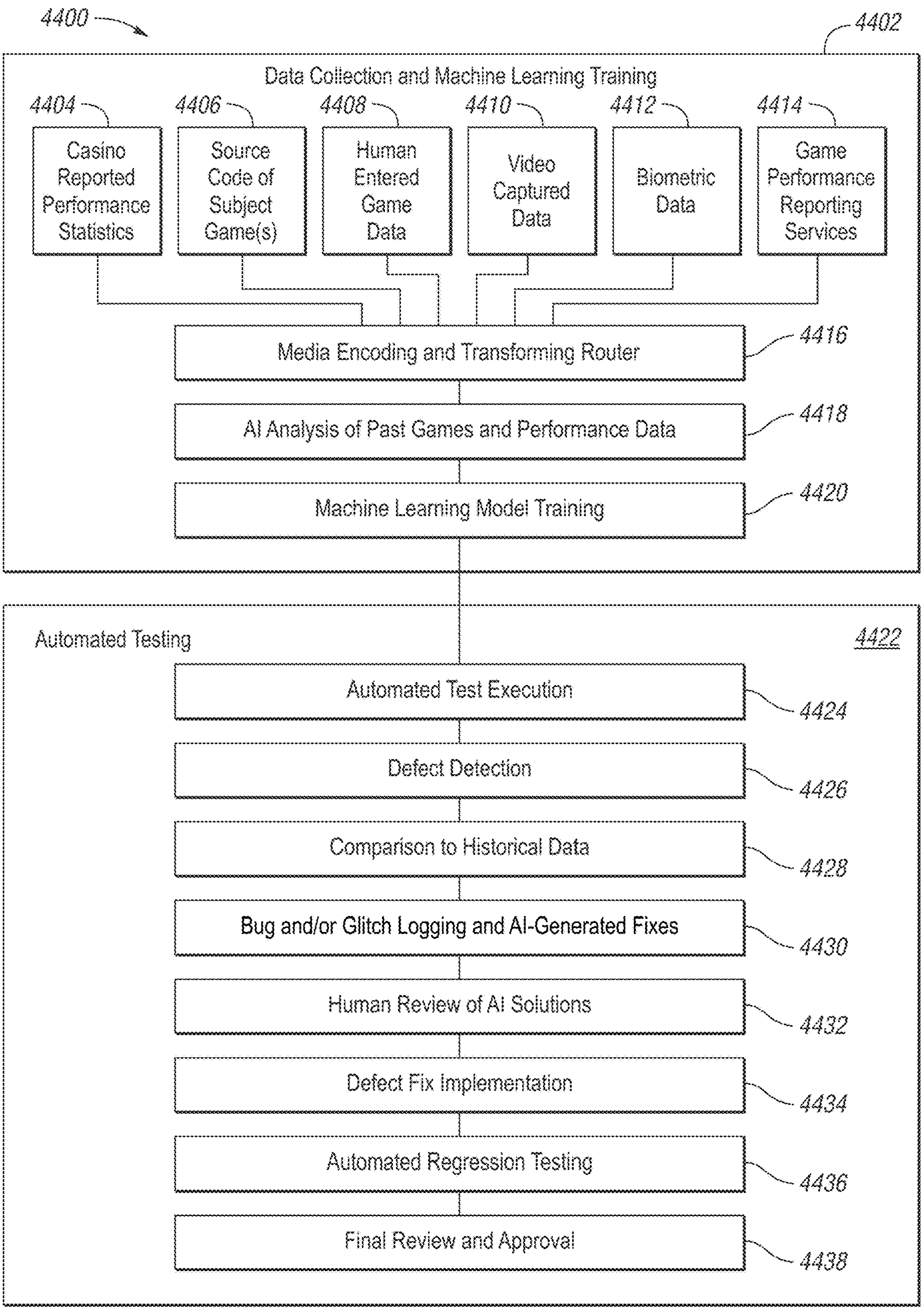
Figure 45A:
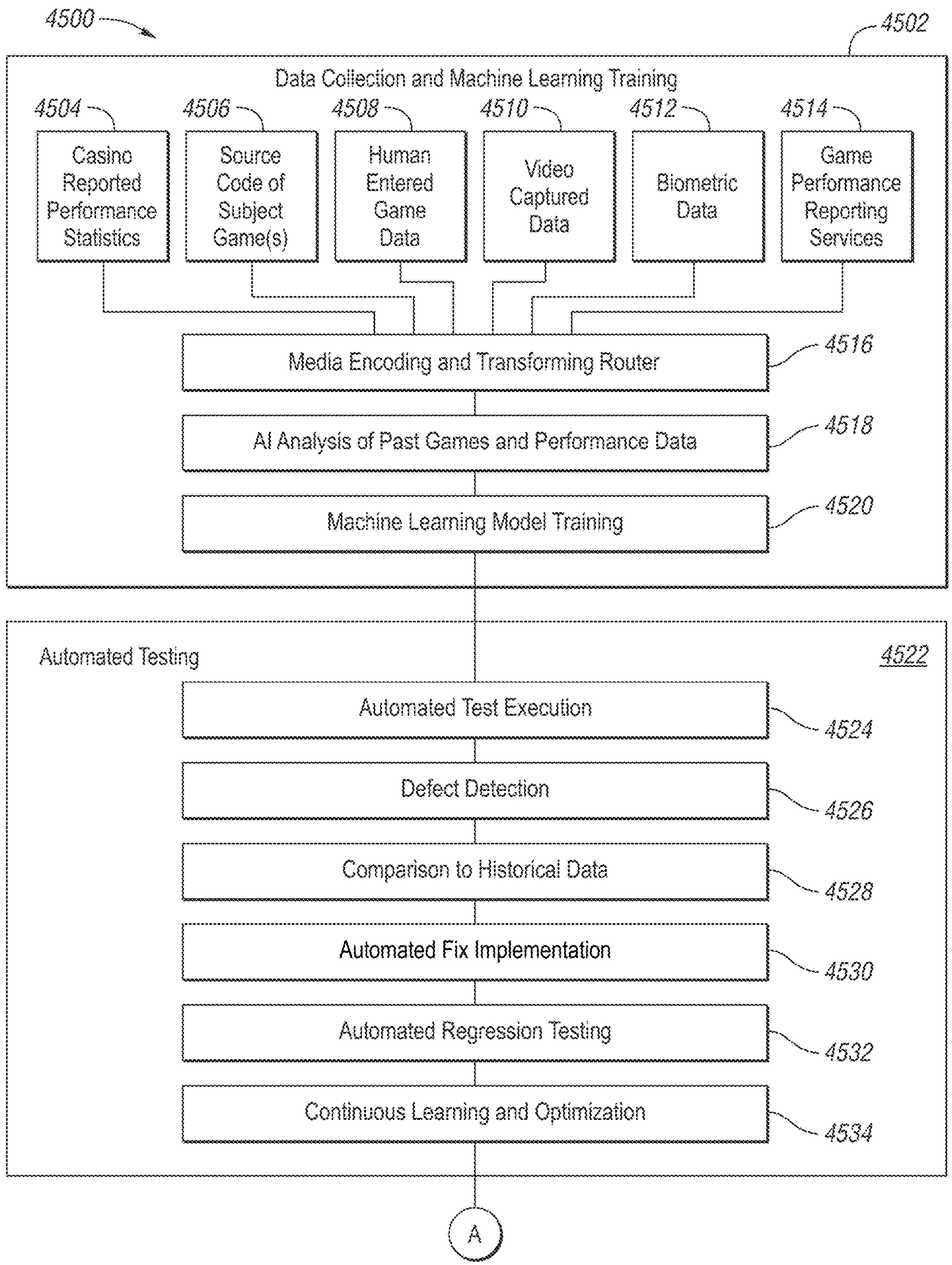
Figure 45B:
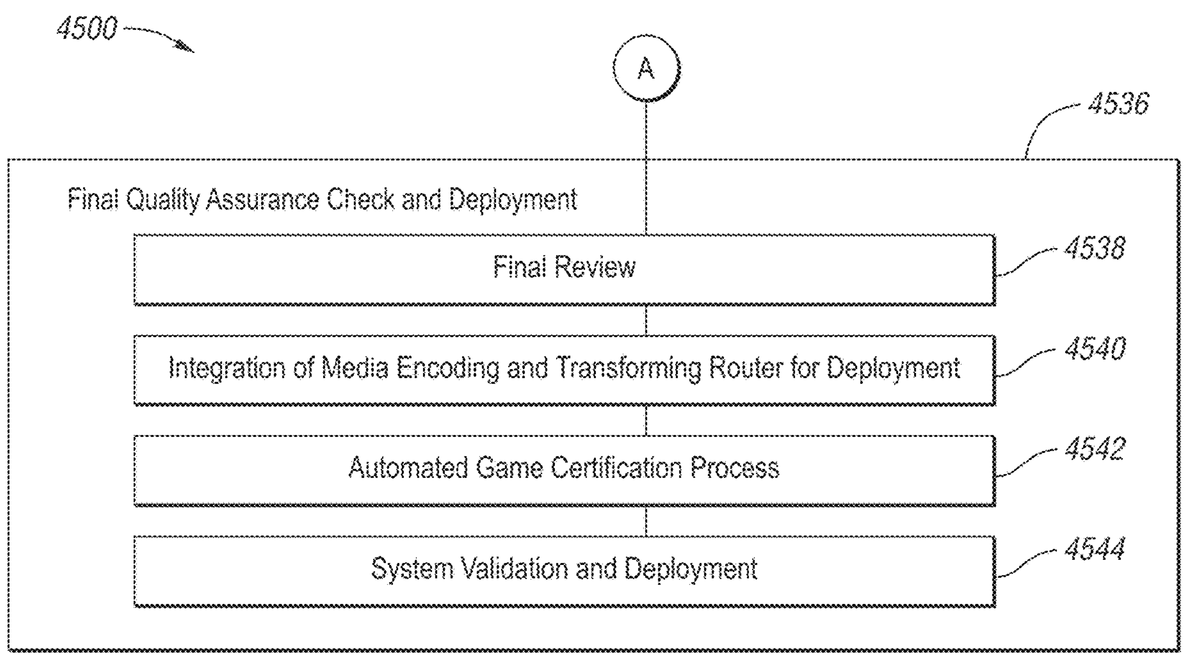

FIGS. 33A though 33J illustrate exemplary math game code used for the game illustrated in FIG. 13A through FIG. 13C;

FIG. 34 illustrates a simplified casino performance report;

FIGS. 35A though 35F illustrate portions of exemplary program code utilized to generate and present a game of chance on an electronic gaming machine;

FIGS. 36A through 36E illustrate exemplary portions of a spreadsheet for the details of game mechanics and/or math for a game of chance;

FIG. 37 illustrates an exemplary flow chart relating to the artificial intelligence iteration process according to the embodiments of the present invention;

FIG. 38 illustrates an exemplary flow chart relating to the artificial intelligence game performance prediction process according to the embodiments of the present invention;

FIG. 39 illustrates an exemplary flow chart relating to the artificial intelligence game generation process according to the embodiments of the present invention;

FIGS. 40 and 41 illustrate an exemplary flow chart relating to the artificial intelligence large language model human to machine to human translation process according to the embodiments of the present invention;

FIGS. 42A through 42D illustrate an exemplary flow chart relating to the artificial intelligence undertaking animation large language model human to machine to human translation process according to the embodiments of the present invention;

FIG. 43 illustrates an exemplary flow chart relating to a quality assurance process according to the embodiments of the present invention;

FIG. 44 illustrates an exemplary flow chart relating to a quality assurance process including defect corrective measures according to the embodiments of the present invention; and FIGS. 45A and 45B illustrate an exemplary flow chart relating to a quality assurance process including AI automated defect corrective measures according to the embodiments of the present invention.

DETAILED DESCRIPTION

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements, which portions are described below in such detail required to construct and operate a game method and system according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wired, wireless, wireline, optical fiber cable, RF, Bluetooth and the like, or any suitable combination of the foregoing.

Computer program code for carrying out operations for aspects of the present invention may be written in any combination of one or more programming languages, including an object-oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a stand-alone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagrams. As used herein, a "gaming machine" should be understood to be any one of a general purpose computer, as for example a personal computer, laptop computer, standalone machine, a client computer configured for interaction with a server, a special purpose computer such as a server, or a smart phone, soft phone, tablet computer, personal digital assistant or any other machine adapted for executing programmable instructions in accordance with the description thereof set forth above.

Those skilled in the art will recognize that certain types of EGMs, generally utilized in regulated casino environments, are still commonly referred to as "slot machines". Although the etymology of the term "slot machine" was originally derived from a coin slot in the gaming machines at the time, coin slots have long since generally been replaced by payment input devices or bill validators which only accept paper currency or ticket-in-ticket-out vouchers and/or electronic fund transfer means, such as card readers, mobile device payment means or account interfaces. As a result, the term EGM and slot machine are used interchangeably and are defined to mean something different than a laptop or desktop computer, cell phones, tablet computer gaming devices and the like.

Figure 1:
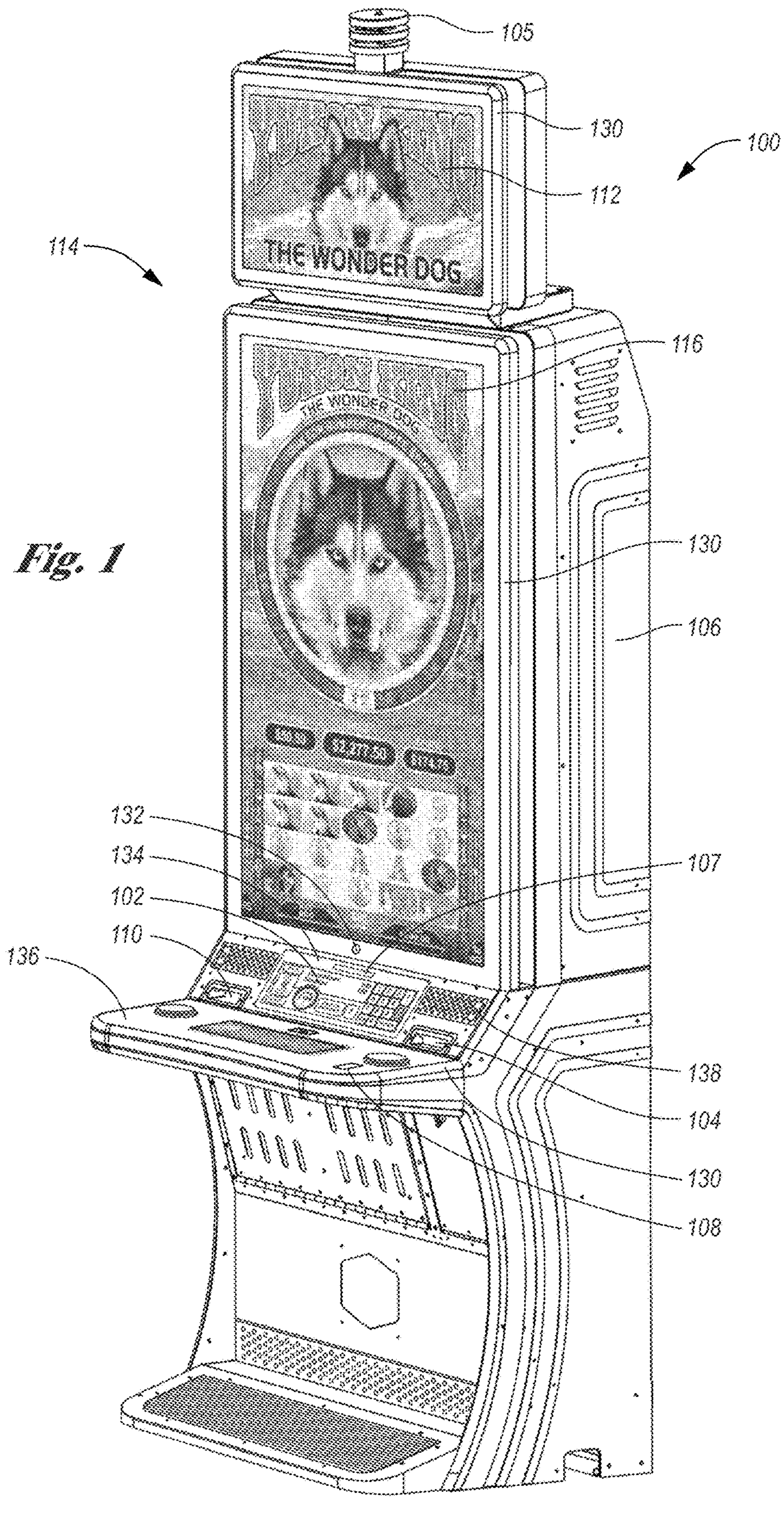
FIG. 1 illustrates an exemplary gaming machine of the type that may be used to facilitate the embodiments of the present invention.

FIG. 1 illustrates an exemplary electronic gaming machine (EGM) 100 that may be used with the systems described herein. In one embodiment, EGM 100 is a gaming device 114. EGM 100 may include one or more comp indicators 102, which may be incorporated into, or implemented by, a candle device 105 which may be mounted on top of the EGM 100 topper 112, lighting element 130, displayed on monitor 116, displayed on the player tracking module 134, displayed as an LED indicator on button panel 136, or another device or location. One or more cameras 132 are provided with or as part of the EGM 100 to capture images of the player or other aspects of game play.

The comp indicator 102 visually notifies or alerts the player or casino staff when the player is eligible to receive one or more comps from a gaming establishment. The comp indicator 102 may also display or otherwise notify the player of the progress towards attaining the comp or comps. Such comps may include, for example, one or more free beverages, free meals, free rooms, free credits for one or more games of chance, free prizes, free tickets to a performance, free services (e.g., spa services), and/or a discount or reduced price for one or more of the foregoing goods or services (e.g., with respect to a market price of the goods or services). In one embodiment, comp indicator 102 may include an audio notification or other sensory notification in addition to, or in place of, the visual notification. While comp indicator 102 is described as being used with EGM 100, it should be recognized that comp indicator may be used with any gaming device 114 and/or computing device.

The EGM 100 also includes cabinet 106 configured to support and secure the elements of the EGM 100. The EGM 100 includes one or more screens such as an upper display 116. Display 116 may be configured to display game content to the player or any other information regarding the game, the casino, rules, pay tables, promotions, advertisements, or any multimedia content. Any type of display screen may be used, such as a flat screen display, curved screen display, J-curve display, etc. Additional decorative lighting 130 may be incorporated into the EGM 100 to provide lighting for the player or ornamentation for the EGM 100.

A scanner 108 is provided to scan tickets which have bar or box codes, or for scanning money, cards, or any other media. In addition, scanner 108 may include other connectivity means such as blue tooth communications, near field communications or the like. Similarly, a card reader 107 is provided to read one or more aspects of cards, such as player tracker or rewards cards, personal identification cards, and/or credit cards. The EGM 100 may also include a printer 110. The printer may print on any type of media. Any type of content may be printed including but not limited to cash out tickets, coupons, gift certificates, comps, prizes, gaming codes, redemption codes, bar or box codes, receipts, or any other types of information. Also, part of this embodiment is a cash acceptor 104 configured to accept paper money, ticket-in-ticket-out vouchers, or any type of physical item associated with the EGM 100. The EGM 100 may also be enabled for cashless wagering using cell phone, credit cards, casino credit accounts, bank links, etc. A USB port 138 or other type charging or I/O port may be provided for phone charging or interfacing the user's phone to the EGM 100. Numerous other buttons and player interface elements are presented with the EGM 100 to accept player input. Display screen 140 may be configured as touch screen with a vertical portrait-oriented display or a horizontal landscape display. Those skilled in the art will recognize that cashless wagering is being and has been adapted to gaming machines and may be utilized together with a monetary input device configured to receive a physical item associated with a monetary value or gaming machines may only use cashless wagering, or only a monetary input device configured to receive a physical item associated with a monetary value. Accordingly, a gaming machine may include both a monetary input device configured to receive a physical item associated with a monetary value and cashless wagering, or only a monetary input device configured to receive a physical item associated with a monetary value or cashless wagering, meaning the gaming machine may include at least one of a monetary input device configured to receive a physical item associated with a monetary value and cashless wagering.

Figure 2A:
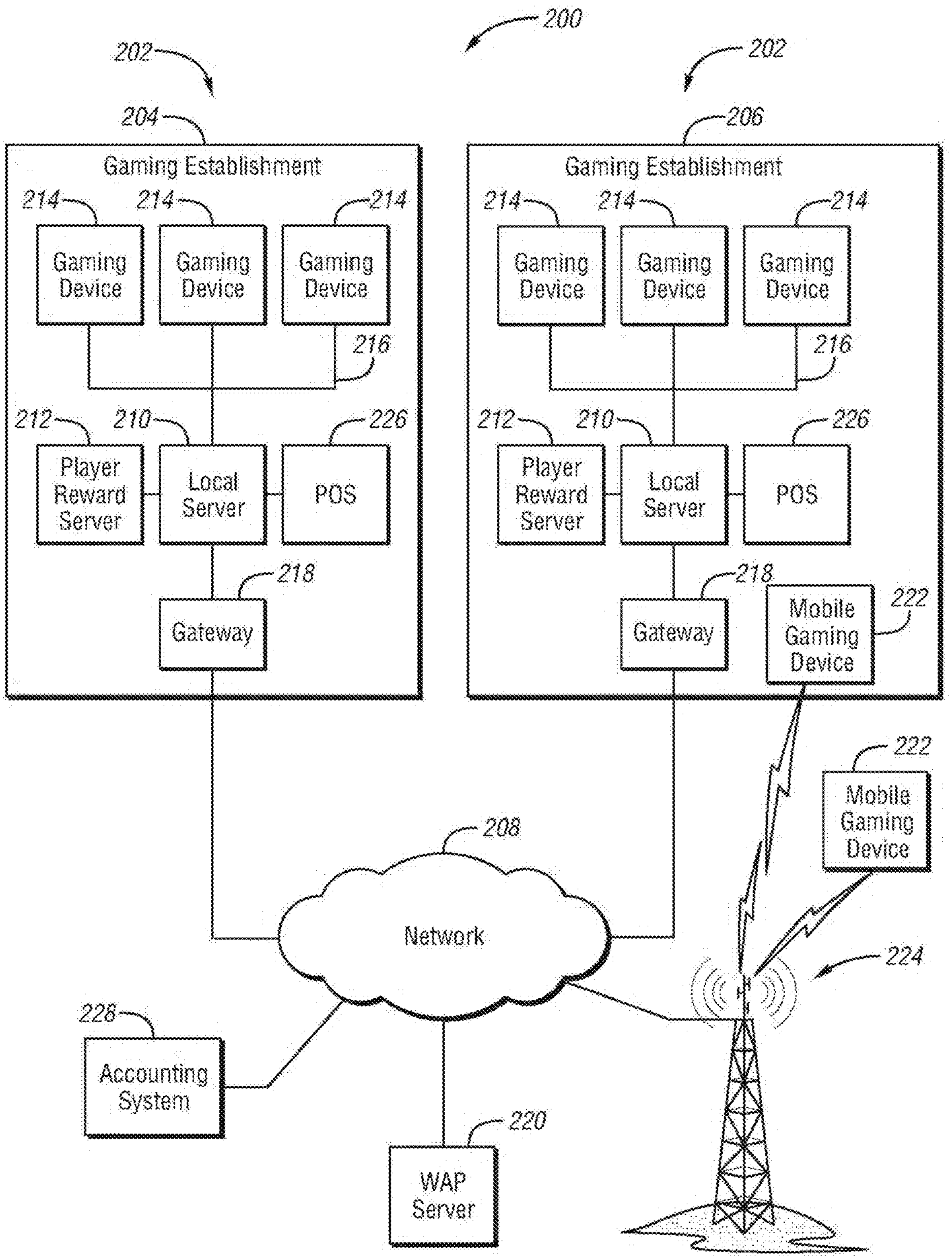
FIG. 2A illustrates a block diagram of a multiple casino property system of the type that may be used to facilitate the embodiments of the present invention.

FIG. 2A illustrates a block diagram of a multiple property system that may be used to play a game of chance. This figure provides a view of exemplary gaming systems in one or more casinos. In one embodiment, a plurality of gaming devices 214 are connected to one or more servers 210 over a network 208, such as a wide area network (WAN) and/or a local area network (LAN). In one embodiment, the gaming devices 214 are electronic gaming machines (EGMs), otherwise known as "slot machines." These may be classified as Class II, Class III, video lottery terminals (VLT), or the like. EGMs may present either one or a plurality of games to the player such as video reels, video poker, video keno, video bingo, electronic table games, and the like. In another embodiment, the gaming devices are gaming kiosks or terminals. Alternatively, the gaming devices may include remote gaming devices, for example, cellular phones, laptop or desktop computers, and/or any other suitable devices. The servers may include one or more local servers within a gaming establishment and/or one or more wide area progressive (WAP) servers connected to the local servers and/or to the gaming devices through the network.

In one embodiment, each gaming device presents either one or a plurality of games of chance to a player to enable the player to select and play the games of chance. In addition, each gaming device may include a randomization device, such as a random number generator (RNG) and/or a permutation generator, that is used to play a selected game on the gaming device. The randomization device may be used to randomly determine a game outcome for the game of chance. For example, if the player selects a game of bingo to be played on a gaming device, the gaming device uses the randomization device to select a plurality of house indicia from a pool of indicia to be used during the game. In another embodiment, at least some aspects of the game are provided by one or more servers, such as a local server 210, a wide area server, a local area progressive server (LAP), or a wide area progressive server (WAP) 220. The server or servers may include a randomization device for randomly selecting the house indicia in the bingo game or any other wagering event.

In the example of a video poker game, either one or a plurality of games are presented to the player. After game selection and wagering, a number of playing cards, generally selected from a 52-card deck, are distributed to the player. In the case of draw poker or its many variants, the player selectively chooses to retain one or more of the original cards dealt and to discard those cards not chosen to be retained. The discarded cards are then replaced by new cards. If the player obtains a predefined winning combination of cards, the player wins an amount associated with the particular combination of cards.

In the example of mechanical, electromechanical, or video reel machines, the games may include a number of mechanical or simulated rotating reels that are arranged in a horizontal configuration forming columns or vertical configurations forming rows. Alternatively, simulated rotating reels may be arranged in a vertical configuration forming columns or vertical configurations forming rows. One or a number of rows are presented to the player to allow for one or many different winning pay lines. Pay lines may be straight across or designed in any convenient fashion. A typical game many include five reels or columns and three or four rows or the like or a vertical configuration of five rows and three or four columns and the like.

In the example of the bingo game, the house indicia are compared to a plurality of player indicia that are included within a pattern selected for one or more player cards. If at least some of the player indicia within the pattern are matched by the house indicia, the player may win a prize based on the number of house indicia that have been matched and an associated pay table.

In the example of a keno game or a keno-related game of chance, the gaming device uses the randomization device to randomly select a plurality of house indicia in a similar manner as described with respect to the game of bingo. However, twenty house indicia are typically randomly selected or called from a pool of 80 house indicia, although other sizes of house indicia pools may be used. The called house indicia are compared to a plurality of player indicia to determine how many player indicia are matched by the house indicia and may be irrespective of a pattern of the player indicia. The embodiments described herein may include allowing the player to select the number of and specific player indicia to be utilized for a keno game or may include an automated or quick pick selection. For example, a player may select one player indicia or spot to play a 1 spot game, 2 player indicia or spots for a 2-spot game, 3 player indicia or spots for a 3-spot game, etc. Embodiments may also require a minimum number of player indicia or spots to match to win a game. For example, 10-player indicia or 10 spot game may require a minimum of 5-player indicia or spots to match the randomly selected player indicia. Embodiments may also include a maximum number of player indicia or spots that are playable. For example, in an 80-number game, the maximum number of house indicia or spots selectable by the player may be confined to 20 numbers or less or more. Accordingly, in an 80-number game, the minimum number of player indicia or spots may be 2 and the maximum player indicia or spots may be 20. The player may win one or more prizes based on the number of player indicia matched by the called house indicia.

In the example of sports wagering, a player may be seated in a player area that may include a betting terminal which includes a monitor and input means. A player may make or place periodic wagers on a variety of sporting events.

As the player plays the games, the gaming device and/or a server or another computing device tracks data representative of the gameplay of the player (referred to herein as "gameplay data"), such as a theoretical win or loss, a past history, wager amounts, a number of plays per hour, wager amounts relative to an amount of time spent playing games on the gaming device, a number of wins or losses of the player, a cumulative amount wagered by the player, an amount of money won or lost by the player, and/or any other suitable data. The gameplay data is used to determine whether the player is eligible to receive a comp. The comp may include, for example, one or more free beverages, free meals, free tickets, reduced price meals or tickets, and/or the like.

In one embodiment, a comp indicator is included within, attached to, or displayed on the gaming device. The comp indicator may be energized or activated in any conventional way to indicate status including displaying on the game monitor, player tracking module or the like. The comp indicator is used to display to the player and/or to gaming establishment employees whether the player is eligible to receive the comp. If the gameplay data indicates that the player has reached a predetermined threshold of play and/or wagering activity, for example, the player is determined to be eligible to receive the comp. The comp indicator may then be activated to notify the player and/or gaming establishment employees that the player is eligible to receive the comp. The comp indicator activation may include any suitable means for displaying comp status, comp eligibility, change in comp status, incremental progress toward comps, continual progress toward comps, reduction in comp status after awarding of comps, etc., and may include any visual or sensory indicator or indication. Gaming establishment employees may then take action in response to the notification, such as by awarding the comp to the player. While the comp indicator is sometimes described as being a visual indicator, it should be recognized that the comp indicator may notify the player and/or gaming establishment employees using any suitable sensory perception, via printed comp tickets or the like.

A technical effect of the systems and methods described herein includes one or more of: (a) presenting a game of chance to a player on a gaming device; (b) enabling the player to input money or credits or physical items representing money or credits for use in the game of chance using a payment input device of the gaming device; (c) enabling the player to withdraw money or credits from the gaming device using a payment output device of the gaming device; (d) providing a comp indicator attached to or integrated within the gaming device, wherein the comp indicator is configured to provide an indication if the player is determined to be eligible for a comp; (e) generating gameplay data associated with the game of chance or skill-based game of chance for the player using the gaming device; (f) receiving input from the player at the gaming device to enable the player to play the game of chance; (g) randomly determining a game outcome for the game of chance using a randomization device; (h) transmitting the gameplay data from the gaming device to a computing device; (i) determining, by the computing device, whether the player is eligible for the comp based on the gameplay data; and (j) transmitting data representative of whether the player is determined to be eligible for the comp from the computing device to the gaming device.

Comp monitoring or accounting may also be monitored locally or remotely by management to insure proper compliance. Systems and methods described herein may be self-contained within a gaming device or may reside in a server-based system such as a slot accounting system (SAS).

As used herein, a "game of chance" or "game" refers to a manual or an electronic game that is played by a player in which an outcome of the game of chance is at least partially based on chance or a random selection of game components or skill-based game components. A game may be categorized by a game variety and/or a game size, for example. It should be recognized by those of ordinary skill in the art that the term "random" is not limited to true randomness, such as truly random numbers. Rather, pseudorandom numbers and pseudorandom algorithms are included within the meaning of "random." In addition, those of ordinary skill in the art will recognize that permutation generators may additionally or alternatively be used to generate player card indicia or other game components.

Gaming devices described herein may use real money for play or may utilize a credit-based system in which the credits used for the games may or may not have a cash value. Similarly, prizes for the games may be in the form of credits, cash, and/or physical prizes such as televisions, automobiles, or the like.

A "local game" is a game that is played by players within a predetermined location, such as within a single gaming establishment, or players playing the game across a local area network. A "local prize" or a "local payout" (including a local progressive prize or a local progressive payout) is a prize that may be won during a local game.

As used herein, the terms "connect" and "couple" are not limited to only including direct connections. Rather, unless otherwise specified, indirect connections are included within the definitions of "connect" and "couple." For example, two devices may be considered to be connected together even if there are other devices or components connected between the two devices. Any suitable means to connect or couple devices or components together may be used.

A player reward card refers to a physical or electronic card, token, or other device or data that enables a system to identify a player in connection with, among other things, a reward program or campaign. Accordingly, the player reward card may serve to identify the player and may enable gameplay, credits, funds, or other data to be associated with the player. In addition, player card tier levels may be established to denote the level of player play or relative worth to the casino operator.

FIG. 2A is a block diagram of a system 200 that may be used to play one or more games of chance, such as video poker, video slots, sports betting, bingo, keno or any the wagering game. The games of chance may be played by a player against other players or may be played by the player against the house.

System 200 is operated using components and devices within one or more gaming establishments 202, such as a first gaming establishment 204, a second gaming establishment 206, and a third gaming establishment 209. It should be recognized that any suitable number of gaming establishments 202 may be provided within system 200. Accordingly, system 200 is not limited to including two gaming establishments 202 as illustrated. In one embodiment, gaming establishments 202 are locations in which devices (e.g., gaming devices) that play or operate at least a portion of the game of chance are located. For example, gaming establishments 202 may be casinos, racetracks, bingo halls, keno parlors, or any other establishments. In another example, gaming establishments 102 may be residences or businesses in which one or more devices are located for playing or operating the game of chance. Gaming establishments 202 may additionally or alternatively include any combination of the examples described herein.

In one embodiment, gaming establishments 202 are physically remote from each other and are communicatively connected to at least one network 208, such as a wide area network (WAN), a metropolitan area network (MAN), and/or the Internet, for example. Alternatively, the gaming establishments 202 may be separate rooms or sections of a casino or another facility that are communicatively connected by network 208. It should be recognized that network 208 may be a wired Ethernet network, a wireless Ethernet network, a combination of wired and wireless Ethernet networks, or any other suitable wired and/or wireless network.

In one embodiment, each gaming establishment 202 includes a local game server 210 (referred to herein as a "local server") and a player reward server 212. Local server 210 and player reward server 212 may alternatively be implemented as or within a single server. The local server 210 is coupled to a plurality of the gaming devices 214 through an internal network 216, such as a private local area network (LAN) within the gaming establishment 102, for example. The gaming devices 214 may be located in separate gaming establishments 202, or within the same gaming establishment 202. In one embodiment, a gateway 218 is provided to enable the local server 210 of each gaming establishment 202 to securely connect to network 208.

In one embodiment, the local server 210 is a server computer (or "server") that monitors and controls the games played on gaming devices 214, including local games. In one embodiment, the local games include games that are played against the house and/or that are played against other players within gaming establishment 202.

In addition, the local server 210 may administer other background tasks that enable games to be played on the gaming devices 214. For example, the local server 210 may facilitate authenticating gaming devices 214 and the players using the gaming devices 214 and may facilitate allocating payments or credits between players and the house. The local server 210 may include payment processing capabilities to enable players to receive electronic funds from a bank or another financial institution or to deposit electronic funds to the bank or financial institution. Alternatively, the payment processing capabilities may be included in a separate server or another device that is communicatively connected to the local server 210. In addition, the local server 210 may interface with the player reward server 212 to facilitate tracking and administering player rewards. Each gaming device 214, group of gaming devices 214, local servers 210, player reward servers 212, or the like may collect and/or generate data desired for accounting purposes, such as for use in slot accounting systems.

In one embodiment, the local server 210 may enable the gaming devices 214 within the gaming establishment 202 to participate in one or more games that share one or more progressive or pari-mutuel prizes with other gaming establishments 202 and/or gaming devices 214. While progressive prizes are described in embodiments herein, it should be recognized that pari-mutual prizes may be substituted as desired, and vice versa. In such an embodiment, each local server 210 may be coupled to a wide area progressive (WAP) server 220 that administers the prizes. For example, the WAP server 220 receives data from each local server 210 and/or from gaming devices 214 regarding an amount wagered by each player playing the game. WAP server 220 may allocate a portion of each wager to the prizes and may communicate the current prize amounts to local servers 210 and/or to the gaming devices 214.

The gaming devices 214 may include one or more kiosks or electronic gaming machines (EGMs) (also known as "slot machines"). The gaming devices 214 may additionally or alternatively include one or more desktop computers or one or more mobile gaming devices 222, such as, without limitation, cellular phones, tablet computing devices, and/or laptops. Mobile gaming devices 222 may connect to local server 210, WAP server 220, and network 208 via a wireless data network represented by cell tower 224. For example, mobile gaming devices 222 may connect to any suitable network 108 (and thereby to local servers 210 and/or WAP server 120) via a "3G", "4G" or a "5G" wireless data network. It should be recognized that mobile gaming devices 222 may additionally or alternatively connect to network 208 using another suitable wireless network, such as a wireless Ethernet network. For convenience, gaming devices 214 described herein may also include mobile gaming devices 222.

One or more point-of-sale ("POS") terminals 226 or redemption kiosks may also be included within each gaming establishment 202 to enable players to "cash out" winnings from one or more gaming devices 214 and/or to perform other account management activities related to player accounts. The POS terminals 226 may be connected to the local server 210, for example, and/or to the WAP server 220 as desired.

In addition, system 200 may include an auditing system 128 coupled to WAP server 220, the local server 210, and/or a gaming device 214, for example, through network 208. Accounting (auditing) system 228 may be used to audit and/or track components of system 200 to ensure compliance with applicable regulations.

In one embodiment, a plurality of gaming devices 214 having different operating systems and/or system architectures may connect to the local server 210 or to another suitable server to play one or more games of chance. In such an embodiment, the gaming devices 214 may be used to play a session bingo game, for example, or any other game of chance.

During operation, the player utilizes or selects a gaming device 214 and initiates a gaming session for playing one or more games of chance ("Games"). Optionally, the player inserts a player reward card or enters a player reward number or other identification information into gaming device 214. If the identification information is entered, the gaming device 214 may transmit the identification information to local server 210 for authentication, or authentication may be accomplished locally within the gaming device 214. The local server 210 communicates with player reward server 212 to establish the player's identity and to associate the gameplay with the player account. The local server 210 authenticates the player and gaming device 214 and authorizes the player to play the game or games on gaming device 214 if desired or required.

When game play is initiated, during selection of the game, or during play of the game, the player may be required to purchase or generate credits. The player may purchase or generate credits by inserting cash or a ticket-in-ticket-out voucher into gaming device 214 or another device. Cash, ticket-in-ticket-out vouchers, credit cards or debit cards are examples of physical items associated with the gaming device. Alternatively, or additionally, the player may transfer credits or cash to the gaming device 214 from banking accounts, credit accounts, gaming establishment accounts, and/or gaming company accounts. In one embodiment, computer-generated credits may be used with gaming device 214, for example, as part of a free-to-play game.

The player selects a game to play and enters a wager on the gaming device 214. The gaming device 214 transmits data representative of the selected game and the wager to the local server 210. If the player selects a game that is at least partially operated by the WAP server 220 or that includes one or more progressive prizes administered by WAP server 220, local server 210 transmits the wager and game information and/or selection to WAP server 220. The WAP server 220 may increment the progressive prizes based on the wager received from the player and may communicate the updated prize amounts via the network 208 to all other players (via associated gaming devices 214) playing to win the progressive prizes.

The player plays the game on the gaming device 214. The following gameplay is described as being administered by the WAP server 120. However, it should be recognized that the gameplay (i.e., the play of the game of chance) may be alternatively or additionally administered by the local server 210 and/or the gaming device 214. For example, if the gaming device 214 is a cellular phone or a tablet computing device, the gameplay may be administered through an application installed on the gaming device 214.

In one embodiment, the player may play a game of bingo by selecting a game or game type, one or more player cards, selecting one or more winning patterns for the player cards, and/or selecting one or more numbers or other player indicia for the player cards using the gaming device 214. The selected player cards, winning patterns, and player indicia are transmitted to WAP server 220. The player cards are included within one or more game tickets issued by WAP server 220, and the game tickets are communicated to the gaming device 214 via the network 208 and the local server 210. The WAP server 220 selects or receives randomly generated house indicia and compares the house indicia to the player indicia and the pattern or patterns selected for the player cards. Alternatively, the functions described herein (e.g., comparing the house indicia to the player indicia and the pattern or patterns selected for the player card) may be performed in the gaming device 214. It should be recognized that the house indicia may be randomly generated using a randomization device, such as hardware, firmware, and/or software-based random number generator (RNG), a ball blower or console, a ball cage, and/or any other suitable device or machine that enables numbers or other house indicia to be randomly generated. In an alternative embodiment, the WAP server 220 (or another device) may designate a server, computer, or another device to provide randomly selected house indicia during the game and may receive the house indicia from the designated device.

WAP server 120 determines whether the player wins a prize based on the comparison of the house indicia to the player indicia. For example, WAP server 120 determines whether the player indicia within the pattern or patterns selected for each card match the house indicia that were randomly determined (sometimes also referred to as the house indicia that were "called"). If the player indicia within a pattern match the called house indicia, the player may win a prize based on a pay table associated with the game. The prize may be one of the progressive prizes or the prize may be a fixed prize identified in the pay table. WAP server 120 determines the appropriate payout to be paid to the player based on the pay table and transmits data representative of the payout to local server 110.

Local server 110 receives the payout data and credits the player account accordingly. In addition, local server 110 may transmit the gameplay data and/or payout data to player reward server 112 to enable player reward server 112 to update the player history and other gameplay data for the player. When the player is done playing, the player may "cash out" some or all of the credits in the player account or may deposit the credits into the player account using POS terminal or kiosk 126, for example. The player account may be stored on gaming device 114, local server 110, or player reward server 112, for example.

In one embodiment, the player may enter the wager and/or may initiate play of the game on a first gaming device 214 and may complete the gameplay on a second gaming device 214. Alternatively, the player plays the game on the first gaming device 214 and receives the results of the gameplay (e.g., whether the player won and how much the winnings are) on the second gaming device 214. For example, the player may begin playing the game on a kiosk or electronic gaming machine and may complete the game or view the results of the game on a cell phone. In such an embodiment, the WAP server 220 and/or local server 210 may transmit the player's gameplay data from the first gaming device 214 to the second gaming device 214.

Figure 2B:
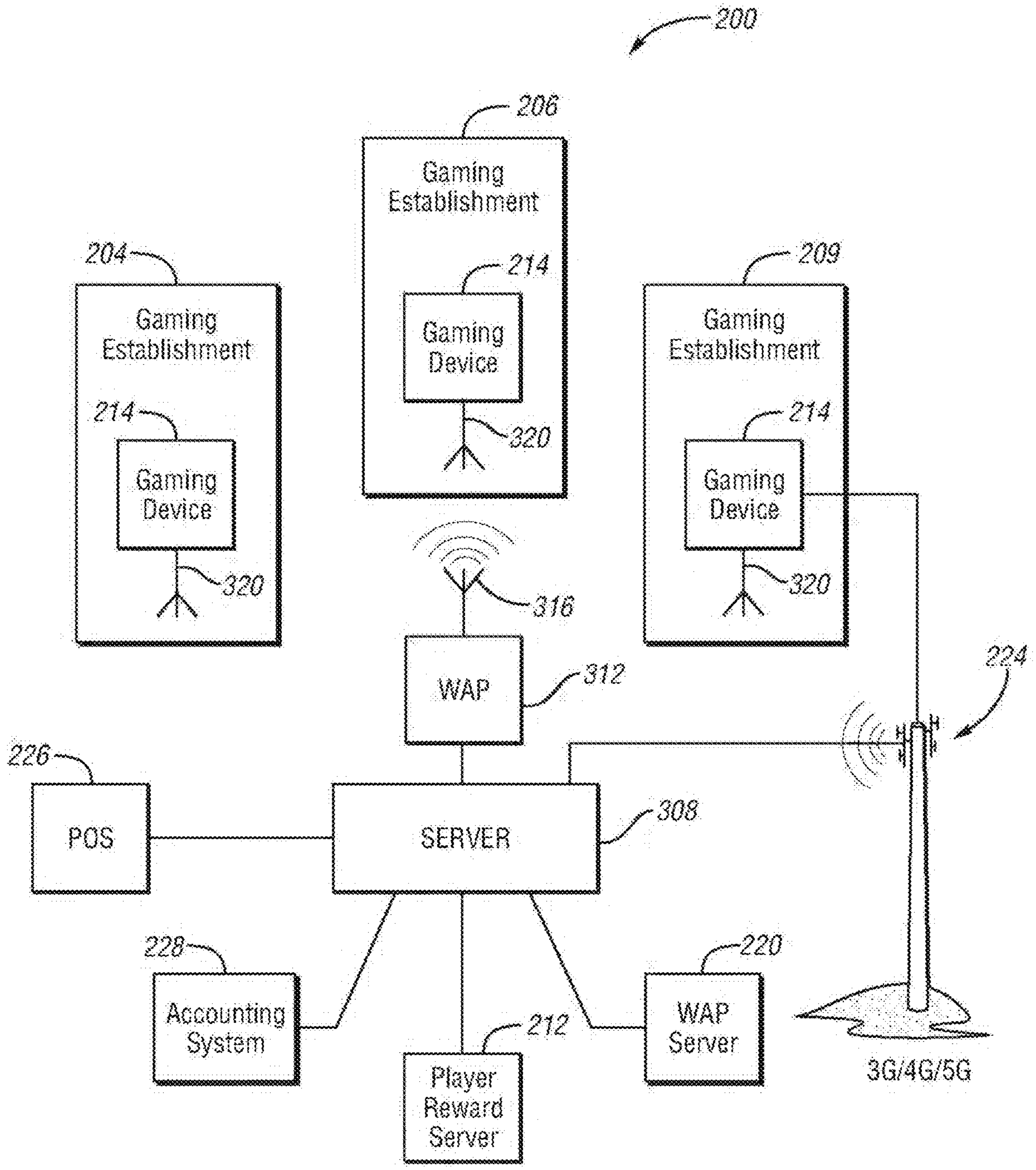
FIG. 2B illustrates a block diagram of a wireless network system of the type that may be used to facilitate the embodiments of the present invention.

FIG. 2B is a block diagram of another system 200 that may be used to play one or more games of chance, such as a slot, bingo, keno, or any game of chance. Unless otherwise specified, the system 200 is similar to system 200 (shown in FIG. 2A) and similar components are labeled in FIG. 2B with the same reference numerals used in FIG. 2A. It should be understood that more or less components may be included within the various embodiments described herein.

In the embodiment, shown in FIG. 2B, the system 200 includes a plurality of gaming devices 214 that are positioned in a plurality of gaming establishments 202. Gaming devices 214 may connect to a server 308 through a wireless access point 312. The wireless access points 308 includes an antenna 316 configured to wirelessly transmit to and receive signals from antennas 320 associated with the gaming devices 214. Wireless communications systems and methods are understood by one of ordinary skill in the art and as such are not described in detail here. For example, the gaming devices 214 may be playing one or more stand alone or Internet-based games that connect to the WAP server 220 through a server 308. In some embodiments, one or more gaming devices 214 may connect to the WAP server 220 and/or to the player reward server 212 through a wireless data network as described above. Accordingly, the gaming devices 214 interact with WAP server 220 to play the game, and WAP server 220 performs the game administration and other tasks handled by local server 210 as described above in FIG. 2A. In a similar manner, a POS terminal 226 may connect to a gaming device 214 and/or WAP server 220 via network 208. In other respects, system 200 performs in a similar manner as described above.

During operation, the player utilizes or selects a gaming device 214 and initiates a gaming session to play one or more games on the gaming device 214. The player inserts a player reward card or enters a player reward number or other identification information into the gaming device 214. The gaming device 214 transmits the identification information to player reward server 212 to establish the player's identity and to associate the gameplay with the player account. The player reward server 212 authenticates the player and the gaming device 214 and may authorize the player to play the game on the gaming device 214. In one embodiment, the gaming device 214 also transmits the identification information to the WAP server 220 to enable the WAP server 220 to associate the player with the game to be played. As previously described, player identification or authentication may be optional.

In another embodiment, the WAP server 220 authenticates the player using the player identification information in addition to, or instead of, the authentication performed by the player reward server 212. In some embodiments, the player reward server 212 is omitted and the functions of player reward server 212 are incorporated within WAP server 220.

The player selects a game to play and enters a wager using gaming device 214. If the player selects a game that is operated by the WAP server 220 or that includes one or more progressive prizes administered by the WAP server 220, the gaming device 214 transmits the wager and game selection to the WAP server 220. The WAP server 220 may increment the progressive prizes based on the wager received from the player and may communicate the updated prize amounts over the wireless channel via the server 308 to all other players (via associated gaming devices 214) playing to win the progressive prizes.

Although shown as a wireless network, it is contemplated that the same functionality may be implemented in a wired system, or a combination of both.

The player plays the game on gaming device 214. The following gameplay is described as being administered by the WAP server 220. However, it should be recognized that the gameplay may be alternatively or additionally administered by the gaming device 214. For example, if the gaming device 214 is a cellular phone or a tablet computing device, the gameplay may be administered through an application installed on gaming device 214.

Figure 3:
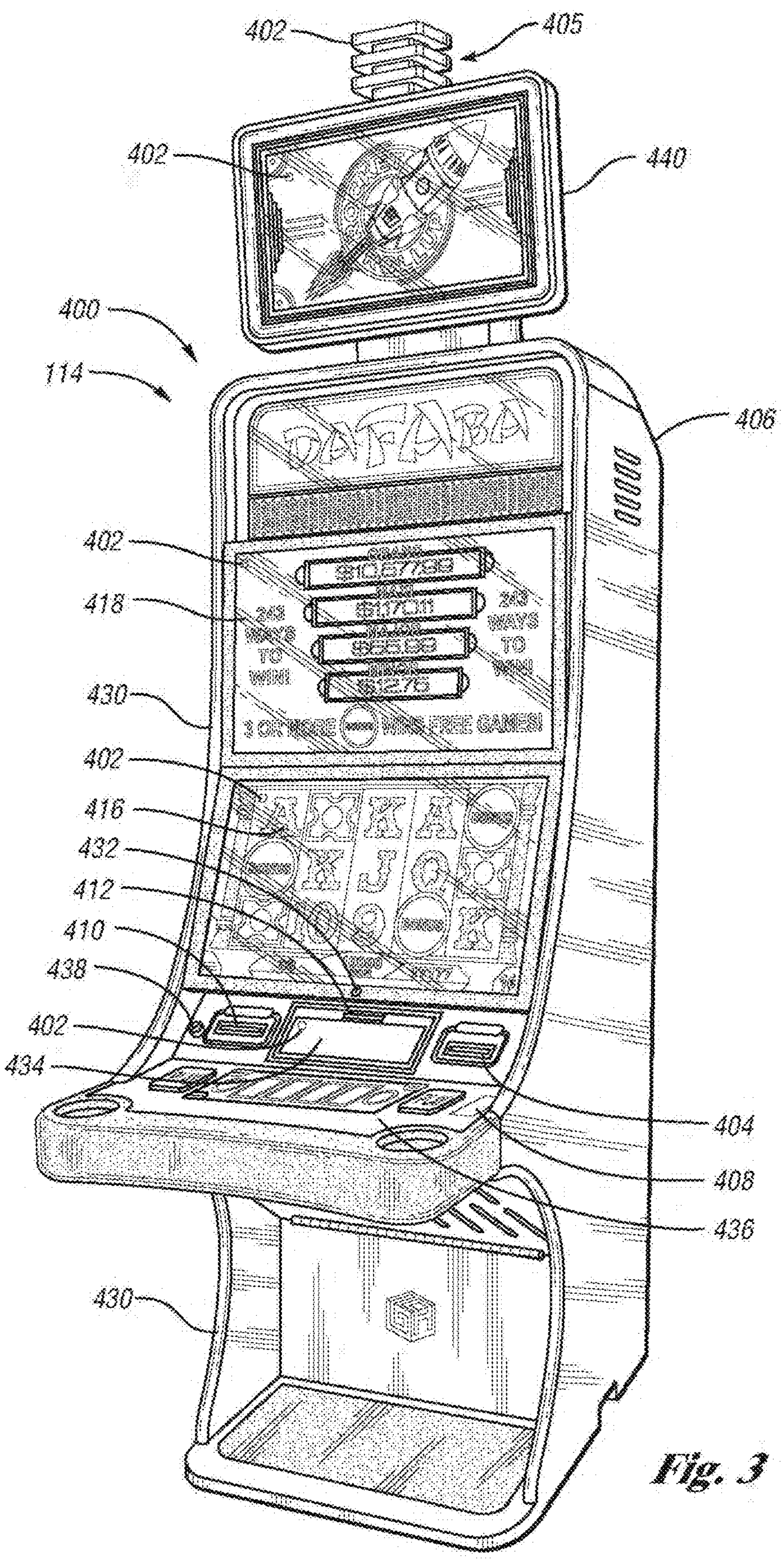
FIG. 3 illustrates an exemplary gaming machine of the type that may be used to facilitate the embodiments of the present invention.

FIG. 3 is an illustration of an exemplary electronic gaming machine (EGM) 400 that may be used with the systems described herein. In one embodiment, EGM 400 is a gaming device 114. EGM 400 may include one or more comp indicators 402, which may be incorporated into, or implemented by, a candle device 405, lighting element 430, displayed on monitor 416 or 418 displayed on the player tracking module 434, displayed as an LED indicator on button panel 436, or another device. One or more cameras 432 are provided with or as part of the EGM 400 to capture images of the player or other aspects of game play.

The comp indicator 402 visually notifies or alerts the player or casino staff when the player is determined to be eligible to receive one or more comps from a gaming establishment, for example. The comp indicator 402 may also display or otherwise notify the player of the progress towards attaining the comp or comps. Such comps may include, for example, one or more free beverages, free meals, free rooms, free credits for one or more games of chance, free prizes, free tickets to a performance, free services (e.g., spa services), and/or a discount or reduced price for one or more of the foregoing goods or services (e.g., with respect to a market price of the goods or services). In one embodiment, comp indicator 402 may include an audio notification or other sensory notification in addition to, or in place of, the visual notification. While comp indicator 402 is described as being used with EGM 400, it should be recognized that comp indicator may be used with any gaming device 114 and/or computing device.

The EGM 400 also includes a cabinet 406 configured to support and secure the elements of the EGM. The EGM 400 includes one or more screens such as an upper screen 418 and a lower screen 416. The screens 416, 418 may be configured to display game content to the player or any other information regarding the game, the casino, rules, pay tables, promotions, advertisements, or any multimedia content. Any type screen may be used, such as a flat screen or curved screen display. Additional lights 430 may be incorporated into the gaming machine to providing lighting for the player or ornamentation for the EGM 400.

A scanner 408 is provided to scan tickets which have bar or box codes, or for scanning money, cards, or any other media. In addition, scanner 408 may include other connectivity means such as blue tooth communications, near field communications or similar. Similar, a card reader 406 is provided to read one or more aspects of cards, such as player tracker or rewards cards, personal identification cards, and/or credit cards. The EGM 400 may also include a printer 410. The printer may print on any type media. Any type content may be printed including but not limited to cash out tickets, coupons, gift certificates, comps, prizes, gaming codes, redemption codes, bar or box codes, receipt, or any other type of information. Also, part of this embodiment is a cash acceptor 404 configured to accept paper money, ticket-in-ticket-out vouchers, or any type physical item associated with the gaming machine 400. The EGM 400 may also be enabled for cashless wagering using cell phones, credit cards, casino credit accounts, bank links, etc., and may be necessary when and if governments shift to digital currency in the future. Numerous other buttons and player interface elements are presented with the gaming machine to accept player input. Display screens 434 and 440 may be configured as touch screens with a vertical portrait-oriented display or a horizontal landscape display. Those skilled in the art will recognize that cashless wagering is being and has been adapted to gaming machines and may be utilized together with a monetary input device configured to receive a physical item associated with a monetary value or gaming machines may only use cashless wagering, or only a monetary input device configured to receive a physical item associated with a monetary value. Accordingly, a gaming machine may include both a monetary input device configured to receive a physical item associated with a monetary value and cashless wagering, or only a monetary input device configured to receive a physical item associated with a monetary value or cashless wagering, meaning the gaming machine may include at least one of a monetary input device configured to receive a physical item associated with a monetary value and cashless wagering. A USB port 438 or other type charging or I/O port is provided for phone charging or interfacing the user's phone to the gaming machine. Numerous other buttons and player interface elements are presented with the gaming machine to accept player input. The screens 416, 418 may be configured as touch screens.

Figure 4:
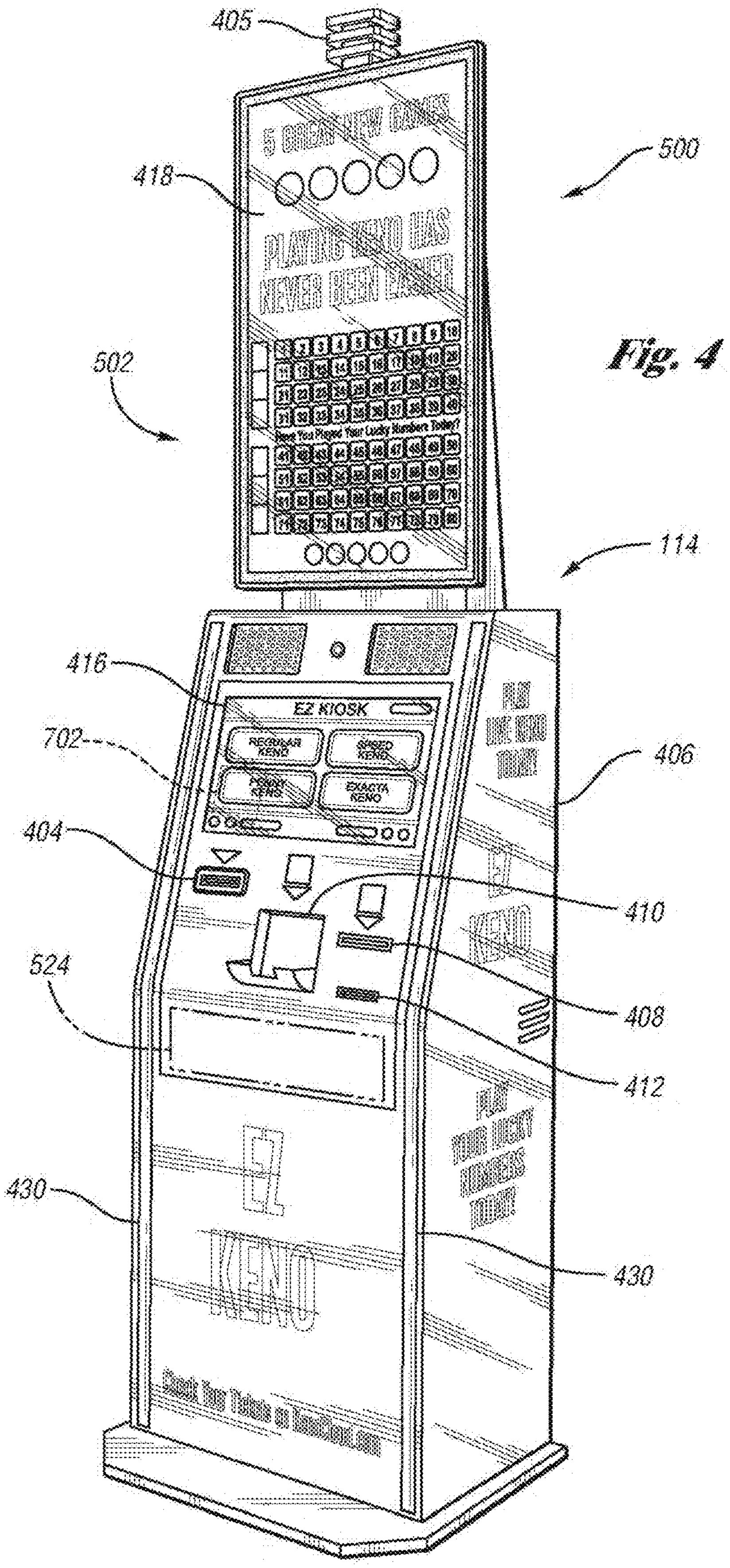
FIG. 4 illustrates an exemplary kiosk of the type that may be used to facilitate the embodiments of the present invention.

FIG. 4 is an illustration of an exemplary kiosk 500 that may be used with the systems described herein. In one embodiment, kiosk 500 is an electronic device provided for user to obtain information, conduct business, enter information, or any other use for which is computing device with communication capability is useful. The kiosk 500 may also be used for gaming for such games as keno, bingo, sports betting, etc. Unless otherwise specified, kiosk 500 shares some components and functionality with an EGM 400 (shown in FIG. 3) and similar components are labeled in FIG. 5 with the same reference numerals as used in FIG. 3.

Kiosk 500 may include one or more informational displays 502, which may be incorporated into, or implemented by, a display 418, such as first display 416 and/or second display 418. Also shown in association with the kiosk 500 is a keyboard 524 which may be fixed or fold down from the front of the kiosk to provide a user input device. The screen may be configured as a touch screen thereby allowing user input.

In use, a user may use the kiosk 500 for any use now known or developed in the future. Such uses include but are not limited to, check in or check out for a hotel, spa, restaurant, gaming area, pool, or any other location or service. The kiosk 500 may also be used to sign up for an event or program, such as but not limited to a player reward program, tournament, or event. The kiosk 500 may also be used to purchase tickets, goods or services. One of ordinary skill in the art will arrive at other uses for a kiosk 500.

Figure 5:
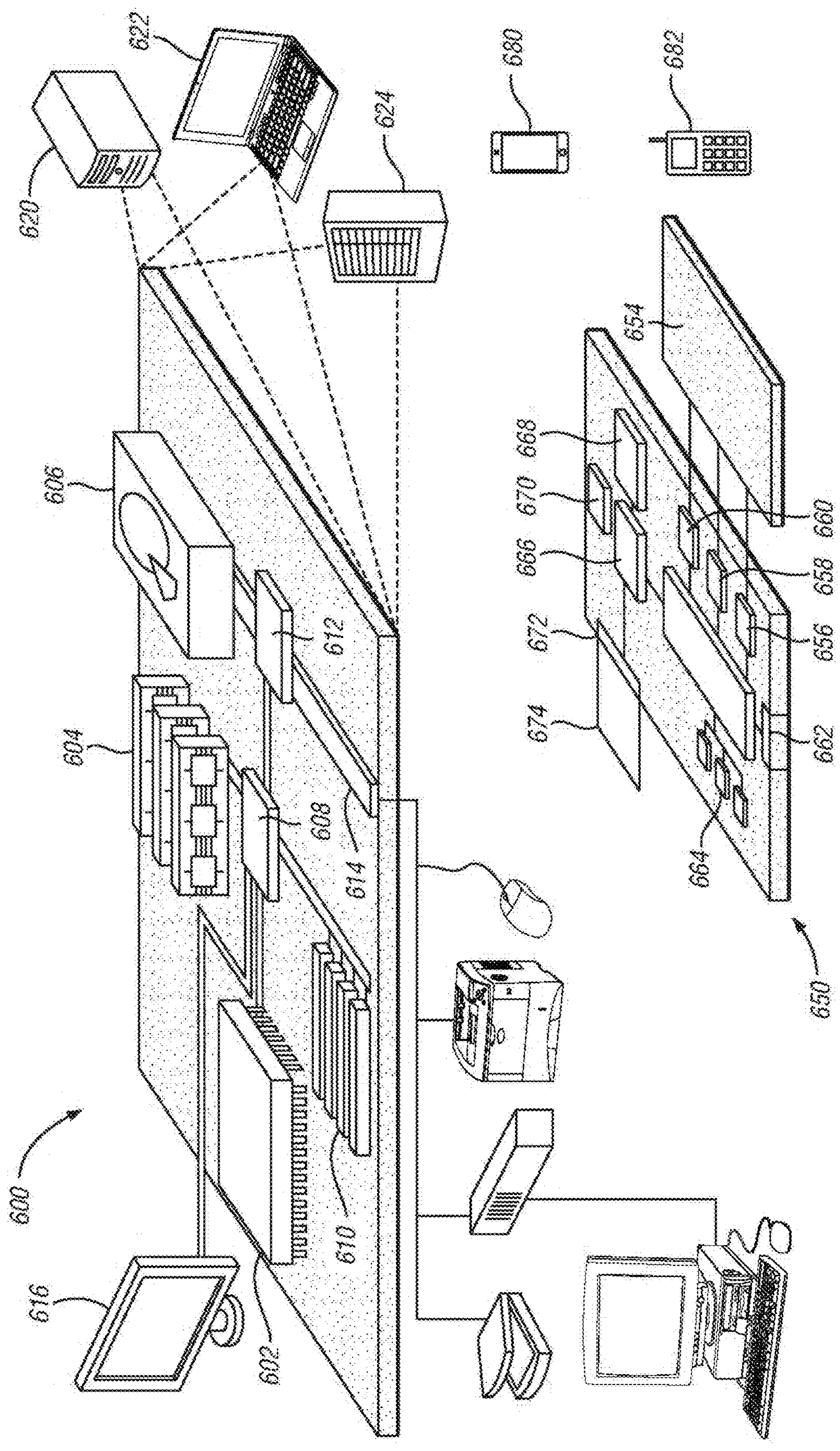
FIG. 5 illustrates a diagram of exemplary components of a computing device of the type that may be used to facilitate the embodiments of the present invention.

FIG. 5 is a schematic of a computing or mobile device, or server, such as one of the devices described above, according to one exemplary embodiment. Computing device 600 is intended to represent various forms of digital computers, such as smartphones, tablets, kiosks, laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit the implementations described and/or claimed in this document.

Computing device 600 includes a processor 602, memory 604, a storage device 606, a high-speed interface or controller 608 connecting to memory 604 and high-speed expansion ports 610, and a low-speed interface or controller 612 connecting to low-speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed controller 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a hard disk device, an optical disk device, or a tape device, a flash memory or other similar solid-state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low-speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed bus 614. The low-speed bus 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a micro-drive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above and may include secure information also. Thus, for example, expansion memory 674 may be provide as a security module for device 650 and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wifi, or other such transceiver (not shown). In addition, GPS (Global Positioning system) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 660. It may also be implemented as part of a smart phone 682, personal digital assistant, a computer tablet, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices ("PLDs") used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse, joy stick, trackball, or similar device) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system (e.g., computing device 600 and/or 650) that includes a back end component (e.g., as a data server, slot accounting system, player tracking system, or similar), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Figure 6:
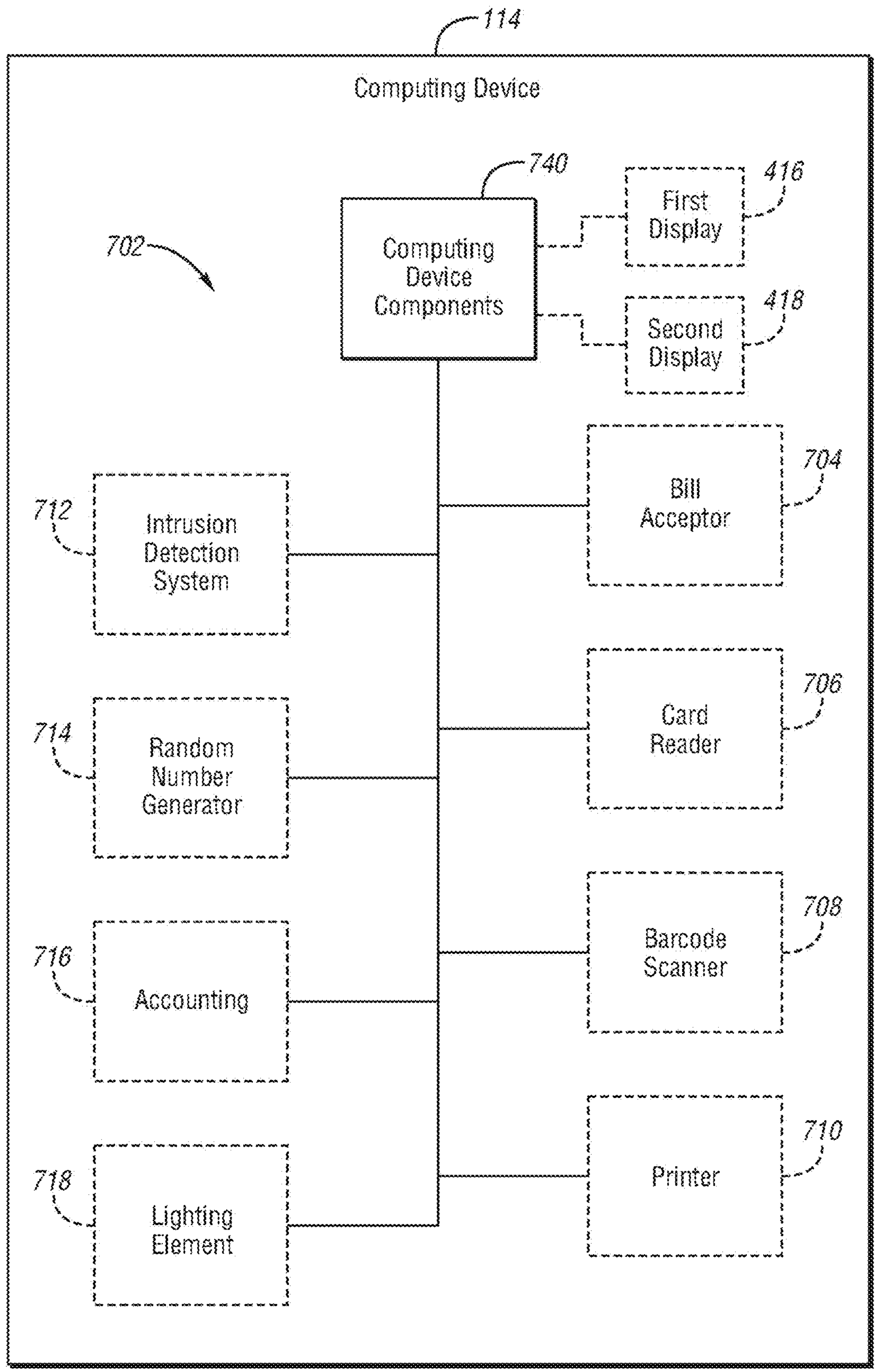
FIG. 6 illustrates a diagram of exemplary gaming device hardware of the type that may be used to facilitate the embodiments of the present invention.

FIG. 6 is a block diagram of a gaming device 114 that may be used with system 100 (shown in FIG. 1) or system 200 (shown in FIG. 2). As described above, the gaming device 114 is a computing device 300 (such as an EGM) that includes a plurality of computing device components 702 positioned within a cabinet or other housing. In one embodiment, computing device component manager or processor 740 include first display 416 and second display 418. In addition, gaming device 114 may include a plurality of gaming device components 702 including a bill acceptor or bill validator 704, a card reader 706, a barcode scanner 708, a printer 710, an intrusion detection system 712, a randomization device 414 (such as an RNG), and an accounting interface 716 that are positioned within, or coupled to, the cabinet or housing of the gaming device. In one embodiment, gaming device 114 may also include at least one lighting element 418 coupled to the cabinet or housing.

Figure 7:
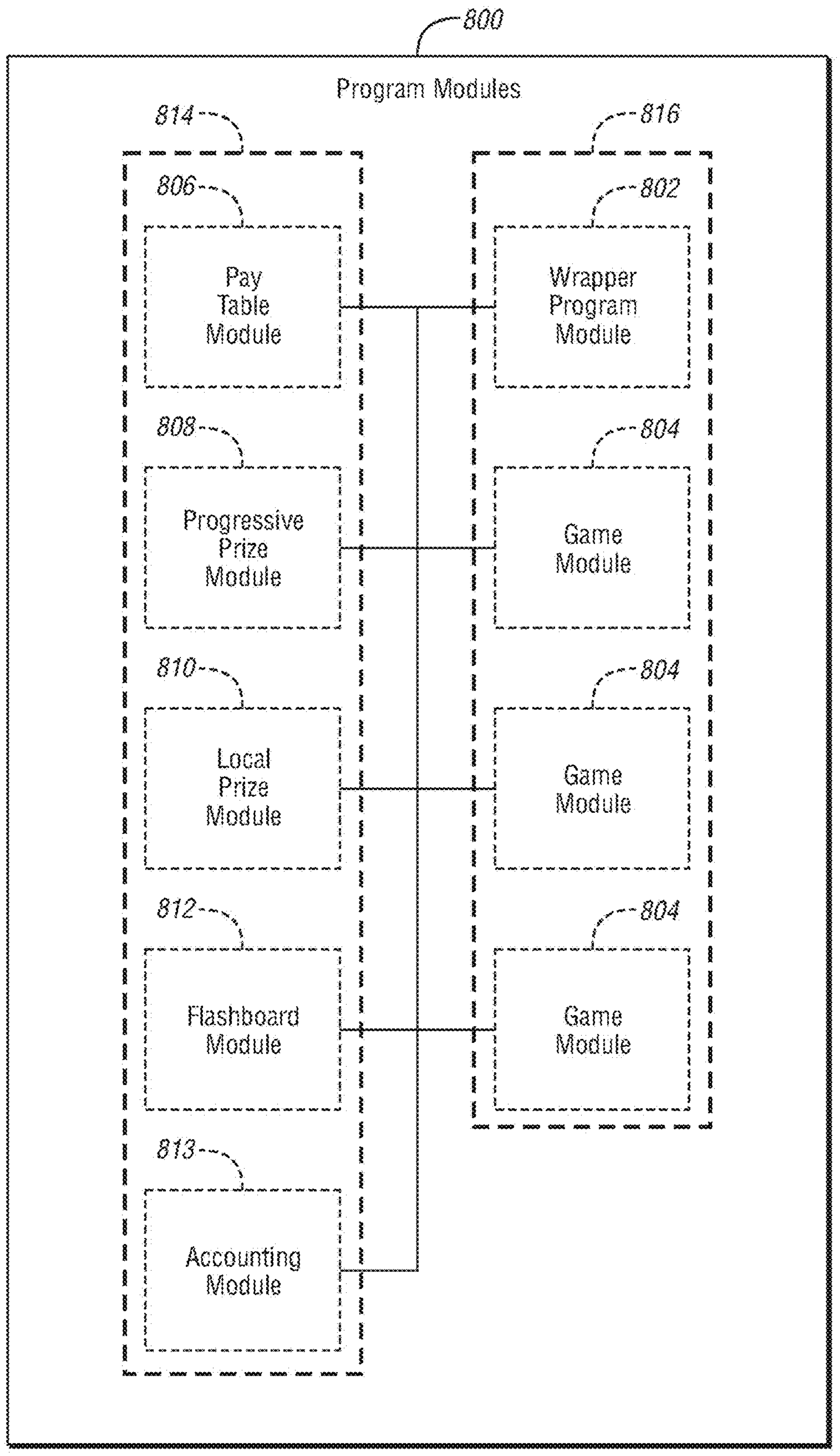
FIG. 7 illustrates a diagram of gaming device program modules of the type that may be used to facilitate the embodiments of the present invention.

It should be recognized that in some embodiments, a gaming device 114 may not include each gaming device component 702 illustrated in FIG. 7. For example, if the gaming device 114 is a cellular phone or a tablet, the gaming device may not include bill acceptor 704, card reader 706, barcode scanner 708, and/or printer 710. Rather, in some embodiments, the functions of each omitted gaming device component may be replaced by equivalent software, hardware, and/or firmware if desired. Optional components may be designated using dashed lines in the figures.

The bill acceptor 704 is a payment input device that enables gaming device 114 to receive and identify paper currency, ticket-in-ticket-out vouchers, or other physical items representing a monetary value. For example, bill acceptor 704 may receive and identify dollar bills or other currency that are inserted into bill acceptor 704. In one embodiment, bill acceptor 704 includes a scanner that scans paper currency inserted therein. The bill acceptor 704 may also include optical character recognition (OCR) capabilities that enable bill acceptor 704 to identify the amount of currency inserted into bill acceptor 704 from a scanned image of the currency. The bill acceptor 704 may transmit data representative of the amount of currency inserted into gaming device 114 to controller or processor 740, for example. The controller or processor 740 may cause the amount of currency to be converted into credits usable with the game and may add the credits to the player's account.

The card reader 706 is a device that "reads," or obtains data encoded in, player reward cards or other cards or media that are inserted into reader. In one embodiment, the card reader 706 is a magnetic or optical card reader that reads barcodes or magnetic strips included within a player reward card. In another embodiment, the card reader 706 wirelessly reads data encoded within the player reward card by accessing a chip, such as a radio frequency identification ("RFID") chip, embedded within the card or other similar authentication means. The card reader 706 reads the data obtained from the cards and transmits the data to the processor 740. In one embodiment, the card reader 706 is used to read player identification information encoded within player reward cards. The controller or processor 740 may transmit the player identification information to player reward server or other external component to identify the player, track past or present player activity, to allow for the transfer of funds or credits, to facilitate authenticating the player, and/or to authorize the player to play a game on gaming device 114. In one embodiment, the player may "log in" to the gaming device 114 by swiping the player reward card or otherwise passing the player reward card through or inserting the player reward card into the card reader 706. In another embodiment, the player may enter a number or other identifier associated with the player reward card into the gaming device 114, through the user interface devices for example, instead of using the card reader 706. In another embodiment, the insertion of the player reward card and player entering the identifier into user interface device may be combined. In yet another embodiment, the player may use a near field communication ("NFC") device to read the player reward card or data representative of the player card. Alternatively, the player reward card may be associated with an application on a cell phone or tablet which wirelessly communicates with the card reader or similar system.

In one embodiment, the barcode scanner 708 is an optical or a magnetic scanner that is optimized to read barcodes on media positioned proximate to the scanner and may also include RFID sensors, blue tooth connectivity, near field communications devices, etc. For example, the barcode scanner 708 may be optimized to read barcodes printed on paper receipts (sometimes referred to as "tickets" or vouchers, not to be confused with game or player tickets that may include player selected patterns, player indicia, and the like) and/or barcodes displayed electronically on a cell phone or tablet computing device. It should be recognized that the barcodes read by the barcode scanner 708 may be linear or one-dimensional barcodes, two-dimensional barcodes, or may even include data represented in a form other than a barcode. For example, the barcode scanner 708 may read images and/or text indicative of data, such as currency or credits, usable with gaming device 114. The barcode scanner 708 extracts the data from the barcode and transmits the data to controller/processor 740. For example, the barcode scanner 708 may scan a paper receipt or voucher that includes an amount of currency or credits usable by the player with a gaming device 114 and may transmit the amount of credits to the controller/processor 740. In such an example, the barcode scanner 708 may act as a payment input device. The controller/processor 740 may cause the amount of currency or credits to be displayed to the player on first display 716 (or on any display) to inform the player how many credits or currency is available to be used in playing a game.

The printer 710 may be used to print paper receipts (also known as tickets as described above), ticket-in-ticket-out vouchers, or other physical items representing a monetary value that indicate an amount of currency or credits available to the player. In many locations, the tickets or receipts may alternatively be referred to as vouchers. The printer 710 may act as a payment output device that enables a player to cash out or withdraw money or credits from the gaming device 114 by printing a voucher representative of the money or credits. In one embodiment, the printer 710 is a thermal printer that is fed by a roll of paper or any suitable paper stock. In a further embodiment, the roll of paper includes one or more watermarks that are visible when the printer 710 has printed the receipt on the paper. Alternatively, the printer 710 may print the watermark on the receipt, or may include another security mechanism to facilitate preventing counterfeit receipts from being made. For example, the printer 710 may include an image or a code on the receipt that identifies the gaming device 114, the printer 710, or another component of the gaming device along with a time that the receipt was printed, serial number, date, location, or other desired information. Other suitable security mechanisms may be used as well. It should be recognized that the barcode scanner 708 and the printer 710 may cooperate such that a security mechanism printed on the receipt may be received and validated by the barcode scanner, in conjunction with controller/processor 740, for example. The barcode scanner 708 may be located remotely from the gaming device 114, such as within a redemption kiosk, a casino cage, or the like.

The intrusion detection system 712 notifies the controller/processor 740 if a case, cabinet, or other housing enclosing components of the gaming device 114 is opened or modified without authorization. In one embodiment, the intrusion detection system 712 includes a pair of contacts that may be physical, magnetic, optical, or similar that transmit an electronic signal to the controller/processor 740 if the housing of the gaming device 114 is opened (e.g., if the opening of the housing separates the contacts). In another embodiment, the intrusion detection system 712 may include a light sensor that detects a change in the light within the housing of the gaming device 114. The intrusion detection system 712 may also include a key or another mechanism for disabling the operation of the game or transmission of the signal to the controller/processor 740 in the event that maintenance or other authorized or unauthorized access to the gaming device 114 components is desired or occurs.

In one embodiment, the intrusion detection system 712 includes a software program (a "monitoring program") that monitors one or more applications installed on the gaming device 114. For example, if the gaming device 114 is a cell phone that includes an application for playing the game thereon, the monitoring program may monitor the application to determine whether the application is modified without authorization. In one embodiment, the monitoring program stores a hash value or a digital fingerprint of the application when the application is installed and/or when the application undergoes authorized modification (e.g., if the application is updated or patched). However, if the monitoring program determines that the application has been modified without authorization, the monitoring program may cause a signal or another notification to be transmitted to the controller/processor 740. For example, the monitoring program may periodically calculate a new hash value of the application and/or create a new digital fingerprint of the application. The monitoring program then compares the new hash value and/or digital fingerprint to the stored hash value and/or digital fingerprint. If the hash values or fingerprints are different, the monitoring program may determine that the application has been modified without authorization. It should be understood that the hash value, the monitoring program, and/or the digital fingerprint may be generated by any suitable means and may be encrypted for additional security.

In response to the signal or notification from the intrusion detection system 712 and/or the modification program, the controller/processor 740 may perform one or more actions. For example, the controller/processor 740 may alert an administrator within gaming establishment by transmitting a message via communication device, may cause audio output device to emit an alarm or another audible alert, may cause a display 416, 418 to display an error or a warning, message, and/or may disable the application and/or the gaming device 114 such that the game is unable to be played on the gaming device.

In one embodiment, the randomization device is an electronic random number generator ("RNG") or pseudo random number generator ("PRNG") 714 or a permutation generator that may be implemented by a dedicated hardware device with associated embedded software. Electronic random number generators or pseudo random number generators are used interchangeably herein.

Alternatively, the RNG 714 or the permutation generator may be implemented entirely in software executing on gaming device 114. The RNG 714 may be used to randomly determine a game outcome for the game of chance. In one embodiment, the RNG 714 or the permutation generator provides house or game draws of between 1 and n numbers, where n may be a suitable number based on the game type selected to be played by the player. The RNG 714 or the permutation generator may be programmed via hardware, software, or firmware to provide a particular range of numbers (or other indicia) and numbers of draws for a particular application. For example, in one embodiment of bingo according to the present disclosure, the RNG 714 or the permutation generator initially provides 24 randomly generated numbers having values between 1 and 75 for each game. In other embodiment other methods or numeric values may be used. Additional draws or numbers may be provided to play the game to conclusion depending on the particular implementation as described in greater detail herein. In addition, the RNG 714 or the permutation generator may be used to randomly select a plurality of player indicia to be used with one or more player cards. In embodiments in which a processor, such as controller/processor 740, is described as randomly selecting indicia, it should be recognized that controller/processor may interface with randomization device 714 or the permutation generator to select the indicia. In other embodiments, controller/processor 740 may include randomization device 714 or the permutation generator, or may execute instructions to perform the functions of randomization device 714 or the permutation generator.

The accounting interface 716 is used to interface with an accounting system, such as a slot accounting system, at or operated by a gaming establishment. Accounting interface 716 may include or be connected to a network interface, such as the communication device 308 for use in communicating gameplay data, player identification information, and/or other data to the accounting system for accounting and/or auditing purposes.

The lighting element 718 may include, for example, one or more LEDs, slot machine candles, fluorescent tubes, and/or any other element that emits light as controlled or directed by the controller/processor 740. In one embodiment, the lighting element 718 is activated to display light, or one or more lighting patterns, when the controller/processor 740 determines that a winning ticket was scanned via the card reader 706 or when the controller/processor otherwise determines that a ticket is a winning ticket. The lighting elements 718 may also be activated upon receipt of a signal from the intrusion detection system 712 (e.g., upon the determination that the gaming device 114 has been opened and/or modified without authorization) and/or upon any other suitable determination.

In one embodiment in which the gaming device 114 or kiosk may interface with another gaming device operated by or otherwise associated with the player, such as a cell phone, tablet, or another mobile device. For example, the gaming machine or kiosk may be configured to transmit a result of one or more games of chance to the player's mobile device to notify the player whether one or more player cards or game tickets are winning cards or tickets.

FIG. 7 is a block diagram of a plurality of program modules 800 that may be used with the systems shown and described herein to administer one or more games of chance. In one embodiment, one or more program modules 800 are installed and/or stored within local server, WAP server, and/or gaming devices. For example, program modules 800 may be stored in memory device of local server, WAP server, and/or gaming devices.

The program modules 800 are hardware, firmware, or software programs or applications that, when executed by a processor, cause the processor to perform the functions described herein. In one embodiment, the program modules 800 include a wrapper program module 802, a plurality of game modules 804, a pay table module 806, a progressive prize module 808, a local prize module 810, a slot module 812, and/or an accounting module 813. A first plurality 814 of the program modules 800 may be installed within each local server and/or WAP server and a second plurality 816 of the program modules 800 may be installed within each gaming device. It should be recognized that in embodiments in which the game of chance is administered by gaming device (e.g., when a cell phone or a tablet computing device is used as gaming device), some or all of the first plurality 814 of program modules 800 may be incorporated within gaming device and executed by a processor of a gaming device. Alternatively, some or all of the second plurality 816 of the program modules 800 may be incorporated within a local server and/or WAP server. Together, the wrapper program module 802, the game modules 804, and the other program modules 800 that present and/or administer one or more games may be referred to herein as a game application, or an application.

In one embodiment, the wrapper program module 802 is used at least in part to provide a graphical user interface ("GUI") on a first display of the gaming device. The wrapper program module 802 operates to provide an entry point or a game entry interface for a player to access the gaming device, and to enable the player to select a game of chance to be played on the gaming device. For example, the games of chance may be categorized into a plurality of game sizes and a plurality of game variations. The wrapper program module 802 may present the game sizes and the game variations to the player, using a display, and may enable the player to select a game to play by selecting a game size and game variation through user interface device.

In one embodiment, the wrapper program module 802 may present a list of games or game variations to the player for selection on a display. If the player selects a size and variation, wrapper program module 802 calls or branches to a game module 804 that provides the selected game and variation.

In one embodiment, the game modules 804 each provide a game associated with the selected game size and/or game variation to the player using gaming device, local server, and/or WAP server. Accordingly, in one embodiment, each game is provided by a separate game module 804. Alternatively, each game module 804 may provide more than one game to the player.

The pay table module 806 provides a pay table associated with each game such that one or more pay tables may be associated with each game module 804. In one embodiment, the pay table module 806 provides a pay table associated with a game when the game module 804 requests the pay table and/or when a predetermined event occurs during the game. The pay tables associated with a game may be changed as desired by a game operator by any suitable means. The predetermined event may include, for example, the player selecting a "See Pays" or another icon displayed on the display that represents a request to view the pay table for the game. The predetermined event may also include reaching a point in the game in which the house indicia are matched to the player indicia within a selected pattern to determine whether the player wins a prize.

The progressive prize module 808 may be used to administer aspects of one or more progressive prizes, such as one or more progressive prizes offered to players playing across network. For example, the progressive prize module 808 may receive information regarding an amount wagered by each player playing a game that has a chance to win the progressive prize. The progressive prize module 808 may allocate a first portion of each wager to a first progressive prize to increase the size of the progressive prize. The progressive prize module 808 may allocate a second portion of each wager to a second progressive prize, and may continue in a similar manner for any additional progressive prizes, if desired or applicable. Accordingly, a plurality of progressive prizes may be provided for each game and may be at least partially funded by each or selected wagers.

The local prize module 810 may be used to administer aspects of one or more local prizes, such as one or more prizes that may be won by players playing against each other within a gaming establishment. In addition, the local prize module 810 may administer aspects of one or more fixed prizes, such as prizes that may be won only by individual players playing on respective gaming device. Accordingly, fixed or individual prizes may be awarded to a player based on the gameplay of the player relative to a randomization device of gaming device, rather than based on winning against other players.

In one embodiment, the slot module 812 may be used to control and conduct slot games in the manner and for the purposes detailed below.

The accounting module 813 may be used to interface with an accounting system, such as a slot accounting system or auditing system, at or operated by a gaming establishment. In one embodiment, the accounting module 813 is incorporated within, or executed by, accounting interface. Any suitable data, such as gameplay data, player identification information, prizes won by a player, and/or any other suitable data may be collected and transmitted by the accounting module 813.

It should be recognized that two or more program modules 800 may be combined together such that the functionality of each program module 800 is incorporated into the combined module. Likewise, each program module 800 may be split into two or more sub-modules that each perform a portion of the functionality of the program module 800 being split. Accordingly, while the above-described program modules 800 are described individually, each may be combined or split into other sub-modules as desired.

Figure 8:
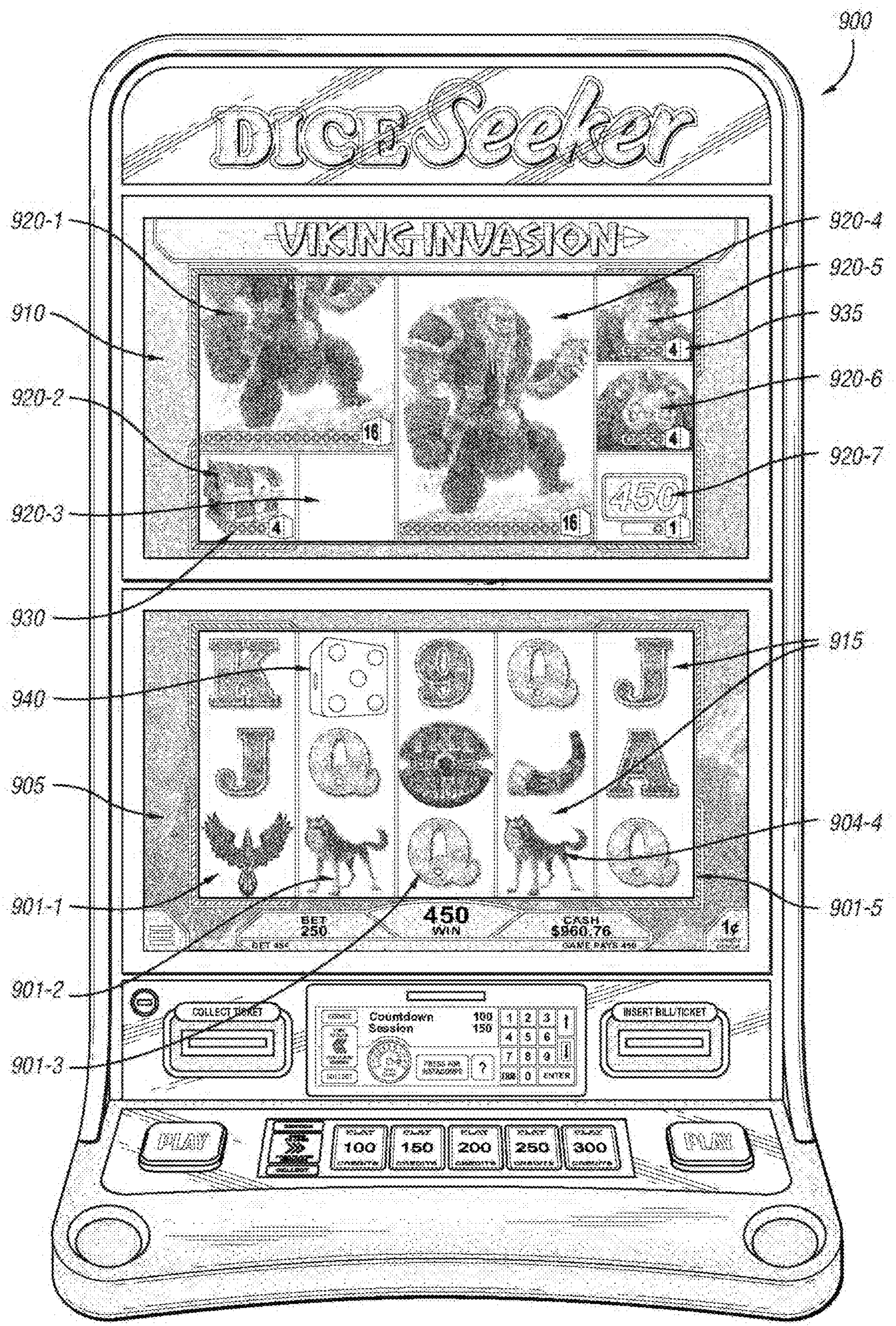
FIG. 8 illustrates a gaming machine depicting exemplary primary and secondary game displays and layouts of the type that may be used to facilitate the embodiments of the present invention.

FIG. 8 illustrates a gaming machine 900 depicting an exemplary game according to the embodiments of the present invention. The game facilitated by the gaming machine 900 is depicted with a Viking Invasion theme manufactured by Gaming Arts, LLC. Those skilled in the art will recognize that the game played on the gaming machine 900 may take on any desirable theme and form. The gaming machine 900 includes a primary video-based slot game 905 on a primary game display and a secondary video-based game 910 on a secondary game display. While a slot-based primary game is shown, any type of primary game may be utilized including video poker, keno, bingo, etc. The primary game display and secondary game display may be separate, individual units or a single unit segmented into two display sections. The primary slot game 905 includes conventionally a 3×5 grid or matrix populated with game symbols 915. The arrangement of the game symbols 915 on the primary game display after a spin of the reels, determines the payout for the primary slot game 905. In this respect, the primary slot game 905 is conventional in nature. It will become apparent from the detailed description below that prizes may be awarded based on primary game outcomes only, secondary outcomes only as triggered by primary game outcomes and both. In one embodiment, the pattern of gaming symbols on the primary game may trigger a primary game prize while one or more dice forming part of the same winning pattern of gaming symbols or unrelated to the winning pattern or gaming symbols may trigger a secondary game attack and potential prize on the same primary game play.

In line with the embodiment that multiple prizes may be awarded for primary game outcomes as well as secondary outcomes on the same play, a primary game outcome may result in a win of credits, dollars, free plays and/or bonus games in conjunction with one or more dice generating lightning strikes on the secondary game display. Any combination of primary game awards and secondary game awards is possible on the same game play.

The secondary game 910 comprises a series of prize blocks 920-1 through 920-7 arranged in a grid that generally mimics the 3×5 primary game reel grid. The prize blocks 920, however, may take on various dimensions as shown. Prize blocks 920-2, 920-3, 920-5, 920-6 and 920-7 are each 1×1; prize block 920-1 is 2×2 and prize block 920-4 is 3×2. As set forth below, and as known to one skilled in the art, the prize blocks may take on any suitable dimensions that the subject secondary game display accommodates. Each prize block 920-1 through 920-7 has an associated prize value and health value. Typically, the larger the prize block 920, the larger the associated prize value, although this need not be true. In one embodiment, the prize values of each prize block are concealed until such time as the health value of the prize block 920 is exhausted. Prize block 920-7 shows a prize value of 450 units or credits being displayed after its associated heath value has been exhausted. A "prize" as used herein may be any type of benefit received by the player including a monetary prize (e.g., 500 credits), free plays (e.g., 10 free plays), prize multipliers, advancement to a bonus game integrating monetary prizes, and/or free plays, merchandise, comps, etc.

The health value of each prize block 920-1 through 920-7 is represented by a series of illuminated dots 930 and a numeric value 935. In other embodiments, the health values may be represented by dynamic column graphs, dynamic pie charts, hour glasses, numbers, etc., with or without a corresponding displayed numeric value.

As shown in FIG. 8, the prize blocks 920 are represented by unique Viking-based characters and related articles. Those skilled in the art will recognize that the prize blocks may be represented using any depictions including character types, symbols, numerals, etc. The prize blocks may also be blank or represented by a space as with prize block 920-3. In one embodiment, a blank or space has no associated prize value. The prize values and heath values are a function of the math model corresponding to the game such that the payouts are in line with those desired by players and the house.

In a first embodiment of the present invention, pre-established primary game outcomes serve to reduce the health values of the prize blocks 920. In one embodiment, specific game symbols or arrangements thereof appearing on a primary game display during play of the primary game serve to reduce the health value of the prize blocks 920. In one exemplary version, the specific game symbols are conventional six-sided dice 940. In this version, each die pip corresponds to one unit of health value for a corresponding prize block 920.

In one embodiment, the correspondence between the primary game outcomes and secondary game prize blocks 920 is positional. In such an embodiment, each primary game reel 901-1 through 901-5 has a corresponding prize block 920 based on relative position. Referring to FIG. 8, primary game reel 901-1 corresponds to prize block 920-2 (i.e., the prize block immediately above the reel—in the same extended column between the primary game display and secondary game display); primary game reel 901-2 corresponds to prize block 920-3; primary game reel 901-3 corresponds to prize block 920-4; primary game reel 901-4 corresponds to prize block 920-4; and primary game reel 901-5 corresponds to prize block 920-7. Accordingly, if a die 940 lands on reel 901-2, the health value of prize block 920-3 is diminished while a die 940 appearing on reels 901-3 and 901-4 diminishes the health value of prize block 920-4 and so on.

Figure 9A:
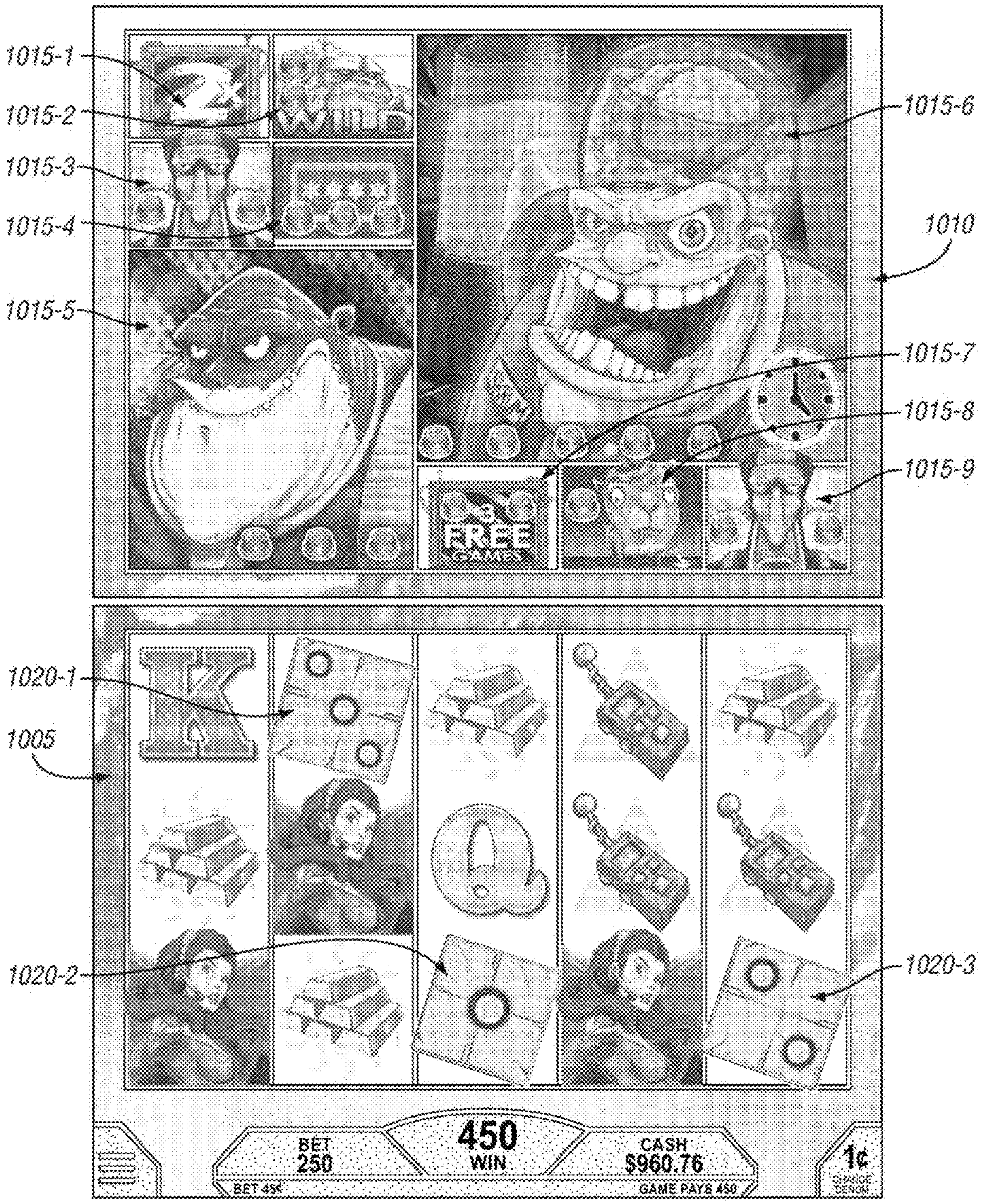
FIGS. 9A-9G illustrate play on a gaming machine of an exemplary game according to the embodiments of the present invention.

FIGS. 9A through 9G show operation of an exemplary game according to the embodiments of the present invention. In this embodiment, the game takes on a sci-fi theme. FIG. 9A shows, as with FIG. 8, the game comprises a video-based primary game 1005 and a video-based secondary game 1010 depicted on a primary game display and secondary game display, respectively. In this instance, the secondary game comprises a 5×5 matrix of nine prize blocks 1015-1 through 1015-9 mapped on the secondary game display.

Figure 9B:
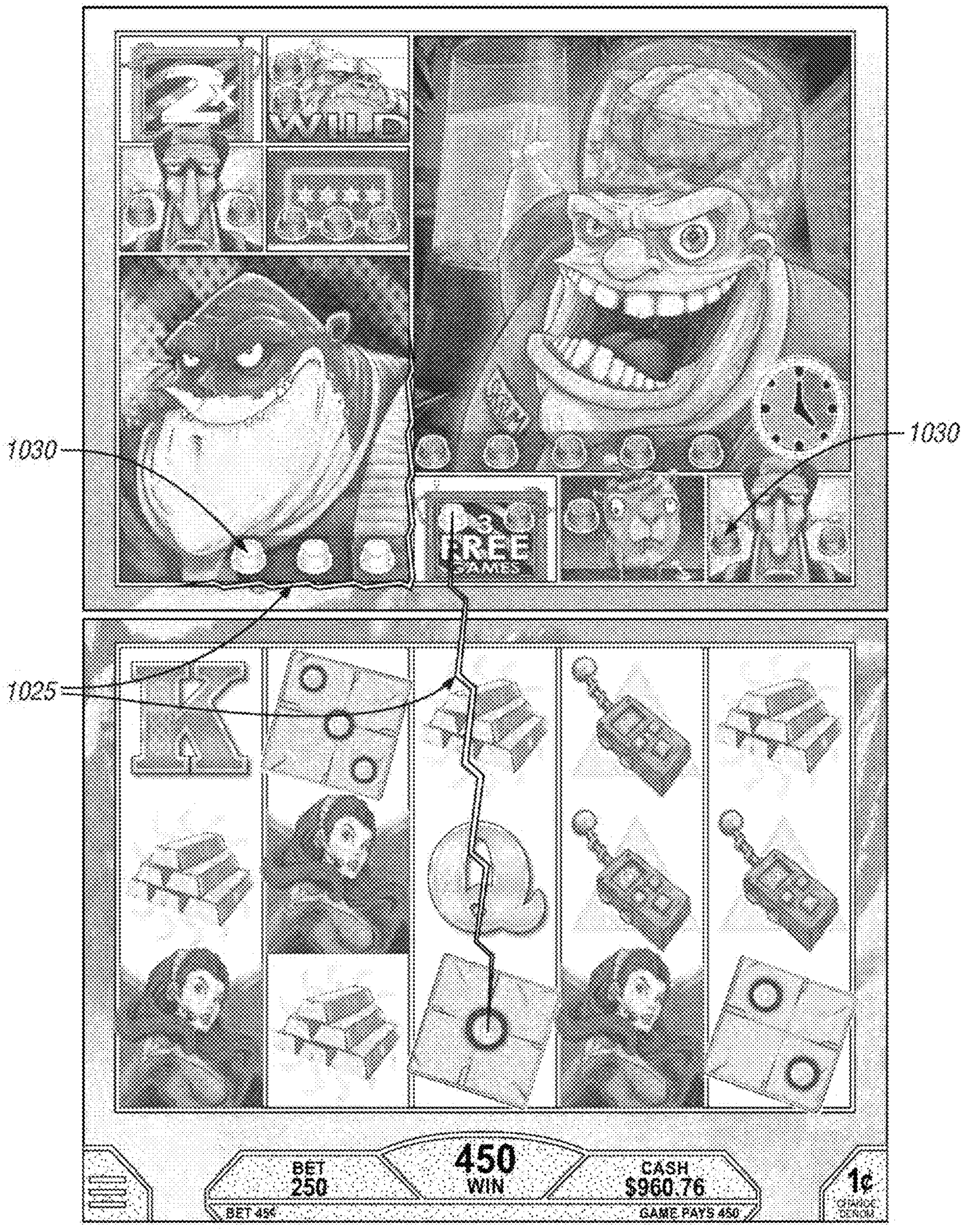
Figure 9C:
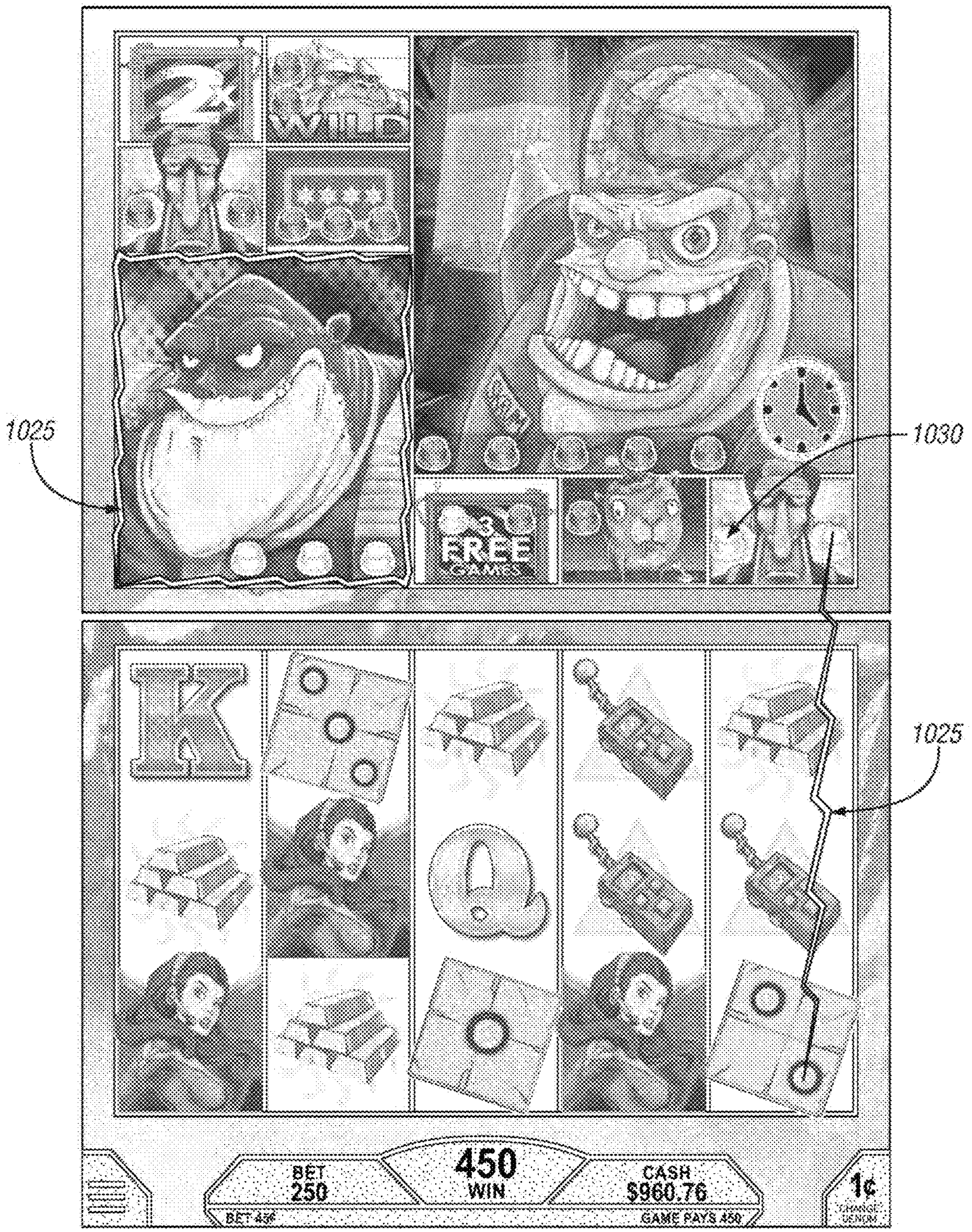
Figure 9D:
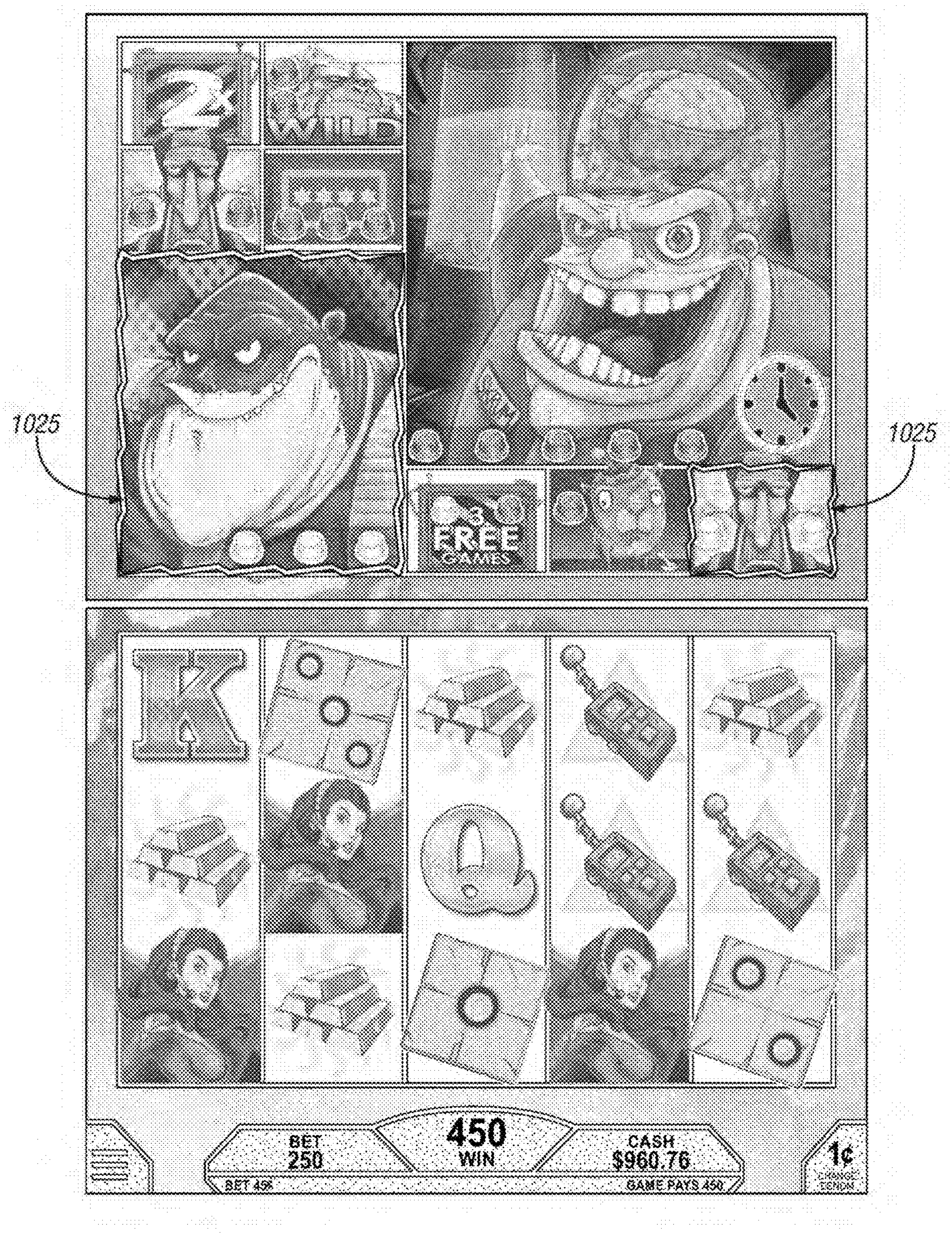

In FIG. 9A, the primary game 1005 shows three dice 1020-1 through 1020-3 appearing on the primary game reels. As detailed above, die 1020-1 corresponds to prize block 1015-5; die 1020-2 corresponds to prize block 1015-7 and die 1020-3 corresponds to prize block 1015-9. In another embodiment, best shown in FIG. 16, neighboring prize blocks may lock together forming larger associated prizes. Now referring to FIG. 9B, the game may incorporate animation or other visual effects to indicate the correspondence between each die and corresponding prize block(s). As shown in FIGS. 9B and 9C, a lightning strike feature 1025 highlights the correspondence by sequentially flashing between the pip of each die 1020-2 and 1020-3 and prize blocks 1015-7 and 1015-9, respectively. The lightning strike is also a visualization of an "attack" on the health value of the prize blocks as each pip on the die 1020-2 and 1020-3 triggers a lightning strike. The lightning strike feature may further surround a prize block to indicate that the health value of the subject prize block has been exhausted. FIG. 9B shows the lightning strike beginning to surround prize block 1015-5 indicating the lightning strike feature between the pips of die 1020-1 and prize block 1015-5 has already occurred and the health value of prize block 1015-5 is exhausted. Similarly, FIG. 9D shows the health value of prize block 1015-9 being exhausted. While FIGS. 9B and 9C indicate that the lightning strike feature may be staggered or delayed from the pips of each die in succession, in an alternative embodiment, the lightning strike feature may be triggered from each pip on each die or all pips on all die simultaneously or semi randomly.

In another embodiment, the lightning strikes may alternate between die. In another embodiment, the die from the primary game or a replica thereof may be moved to the corresponding prize block and shown to diminish the health value of the prize block. Those skilled in the art will recognize that other animation-style features may be used in lieu of lightning strikes. For example, in a Viking-themed game, swords may be shown flying from the die to its corresponding prize block to signify an attack whereas in a sports-themed game, sports balls may fly from die to their corresponding prize blocks to signify an attack. Indeed, any dynamic feature, including any suitable visualization means may be used and displayed such as lightning strikes, laser beams, gun shots, spears, tomahawks, knives, etc., signifying a relationship between the die (or other pre-established primary game symbol) and the corresponding prize blocks without departing from the spirit and scope of the embodiments of the present invention.

In one embodiment, the dice on the primary game display are treated as non-paying symbols relative to the primary game (i.e., the dice do not have any pay table values and are not evaluated for symbol pattern wins). When dice do appear on the primary game display, they are randomly provided a pip value of between 1 and 6 (assuming the die is six sided). In one embodiment, the outcome is truly random (i.e., there is exactly a 1 in 6 chance that any pip amount between 1 and 6 will be selected). Alternatively, the outcome can be weighted such that certain pip outcomes are more, or less, likely to occur. It is also understood that dice with more or less than six sides may be used. In another embodiment, the one or more dice appearing on the primary game display may trigger a primary game prize in addition to serving to attack the prize blocks mapped on the secondary game display.

Figure 9E:
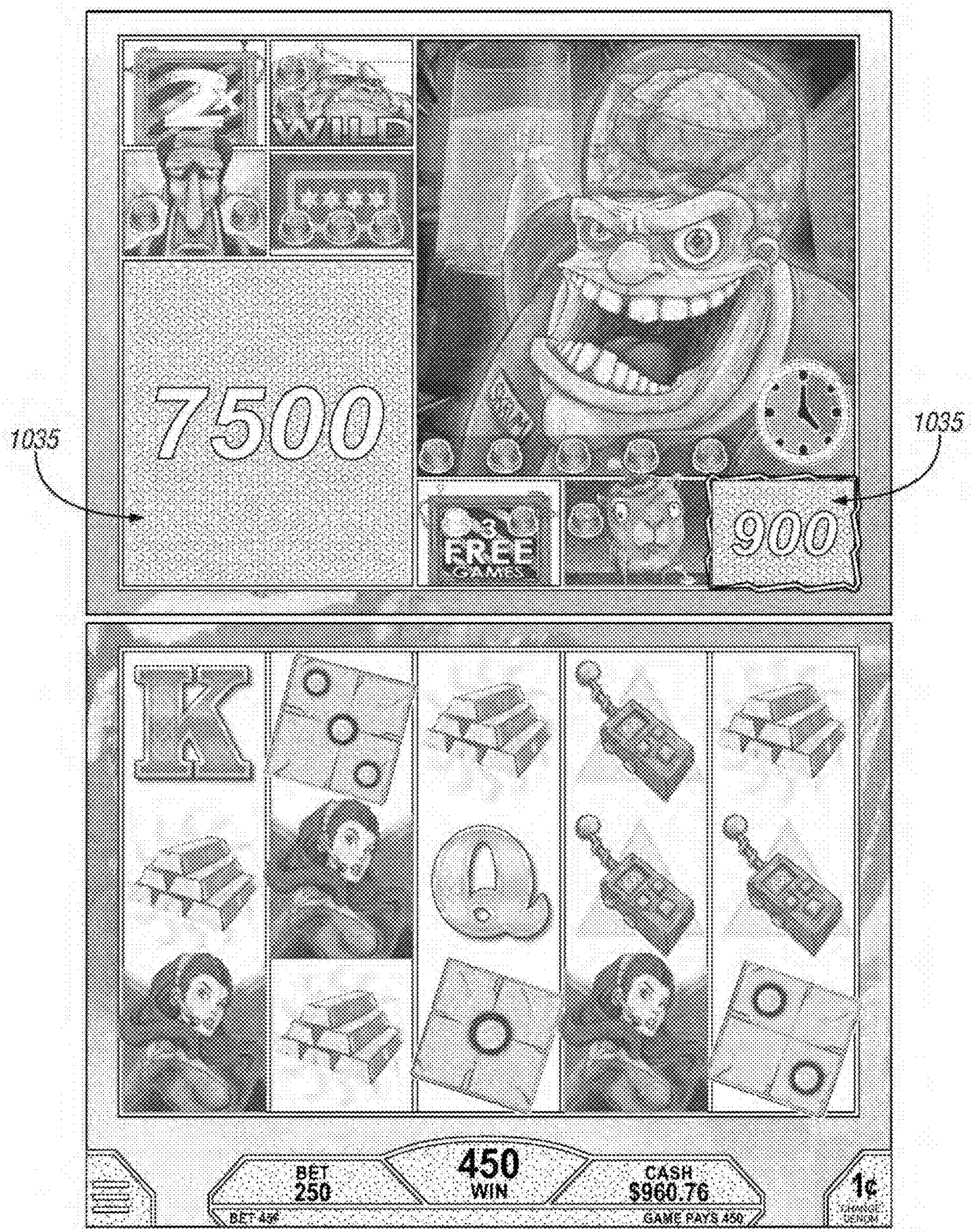

In one embodiment, as shown in FIGS. 9A and 9B, the status of the health value is shown by altering the color of the illuminated dots 1030. In one embodiment, the illuminated dots 1030 are originally red denoting good health and change to green to reflect a diminished state. Extending game play sessions is one advantage of using the visual cues indicative of the health values of the prize blocks. Players will tend to continue playing the game until such time as any near-zero health values are exhausted and the associated prizes awarded rather than walking away. When all illuminated dots 1030 are green, the health value of the corresponding prize block is exhausted. When the health value associated with a prize block is exhausted, the prize block is removed from the secondary game display and initially replaced with a prize value 1035 as shown in FIG. 9E. The prize values for each prize block are pre-determined as detailed in more detail below. In this instance, prize blocks 1015-5 and 1015-9 have prize values 1035 of 7500 units and 900 units, respectively. It is also conceivable that each reduction in the health value of the prize block may trigger a prize. For example, a prize block having a health value of 3 units may deliver a prize with each diminished health value unit with a largest prize being awarded when the health value of the prize block is exhausted.

Figure 9F:
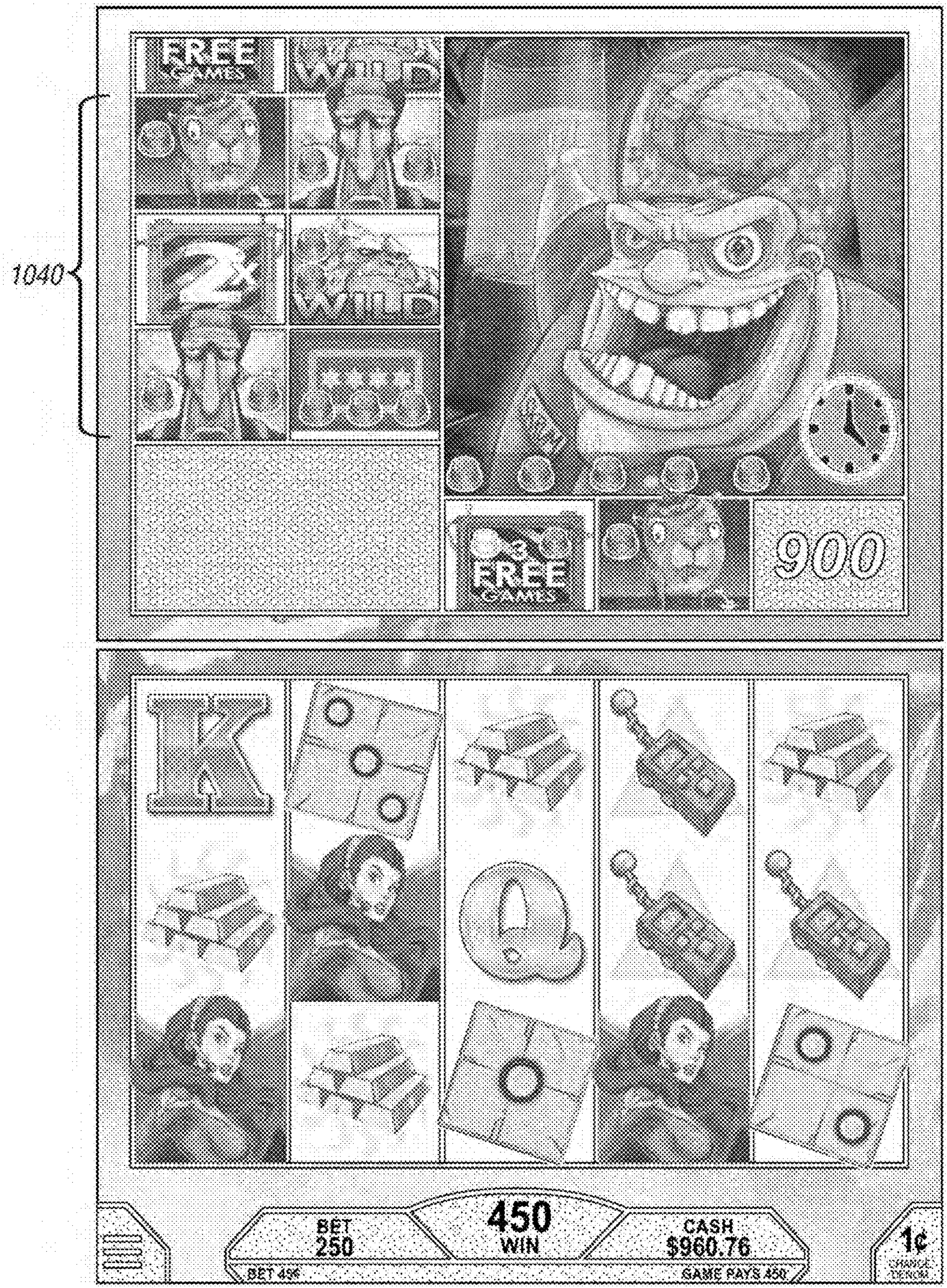
Figure 9G:
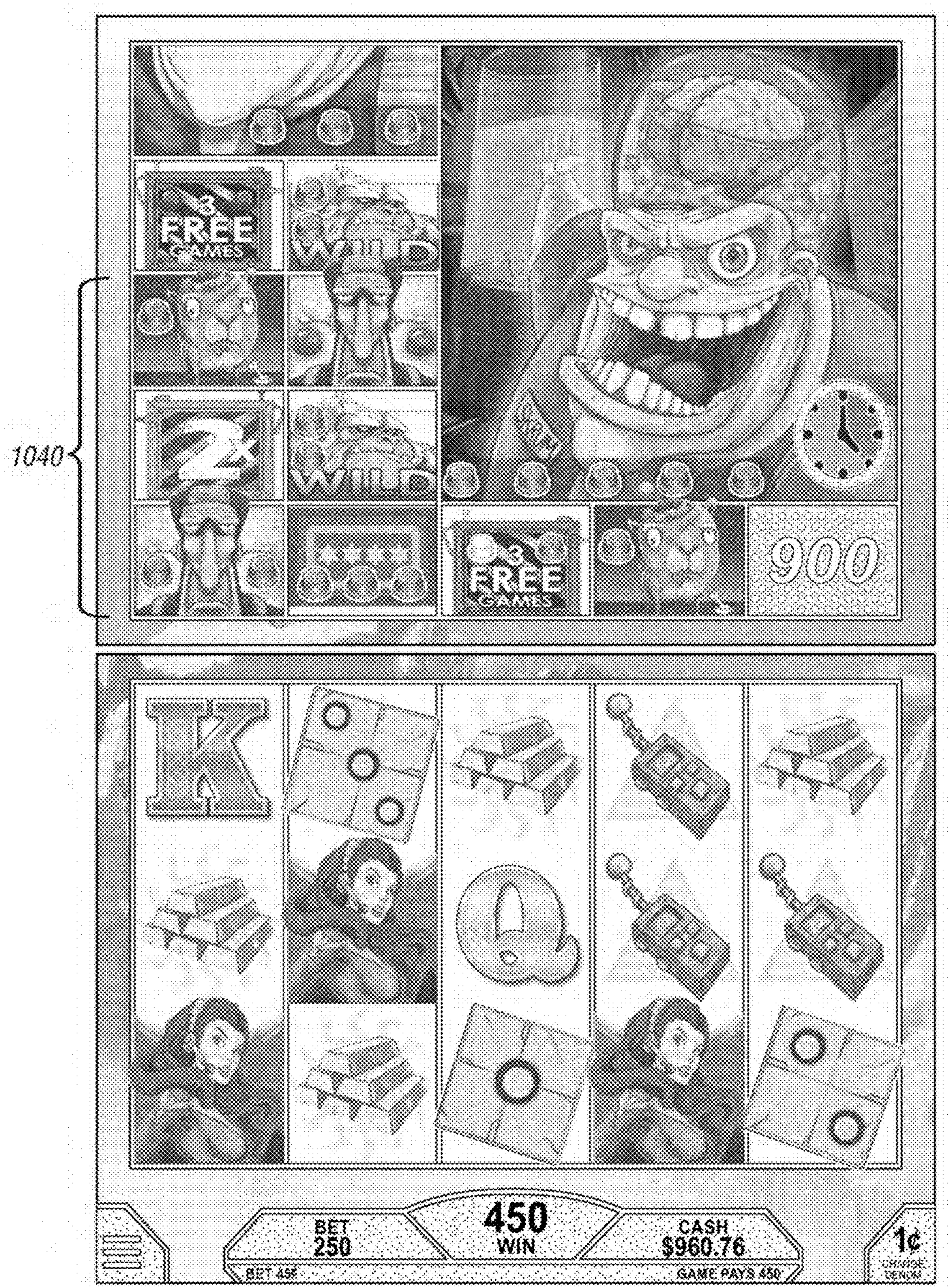

Once a prize is awarded relative to a removed prize block, a plurality of things can occur depending on the game mechanics and/or math model driving the game. For example, the area or void occupied by the removed prize block may remain empty with no corresponding assigned prize value or be filled with one or more new prize blocks with new health values. FIGS. 9F and 9G show new prize blocks (previously above prize block 1015-5) dropping or cascading into the area previously occupied by the prize block 1015-5. In this instance, the 3×2 prize block 1015-5 has been replaced with six 1×1 prize blocks 1040. Additional prize blocks or spaces fill in the upper portion of the secondary game display keeping the secondary game display fully occupied. FIG. 9G shows that the void left by removed prize block 1015-9 is left unfilled.

In one embodiment, if the pips on a die exceed the health value of a corresponding prize block, the extra pips are forfeited. Alternatively, the extra pips may be used to attack any new prize block that replaces the void left by the removed prize block.

Figure 10A:
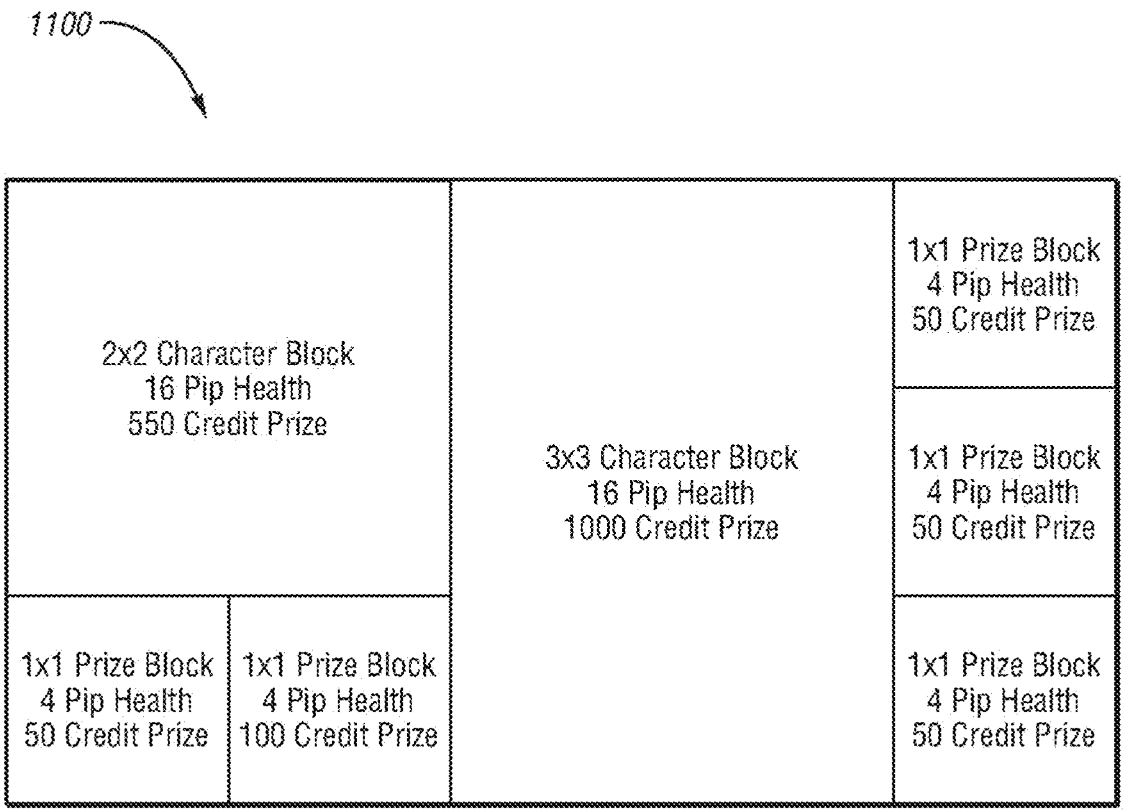
FIGS. 10A-10G illustrate operation of prize blocks of the secondary game display in conjunction with primary game outcomes according to the embodiments of the present invention.
Figure 10B:
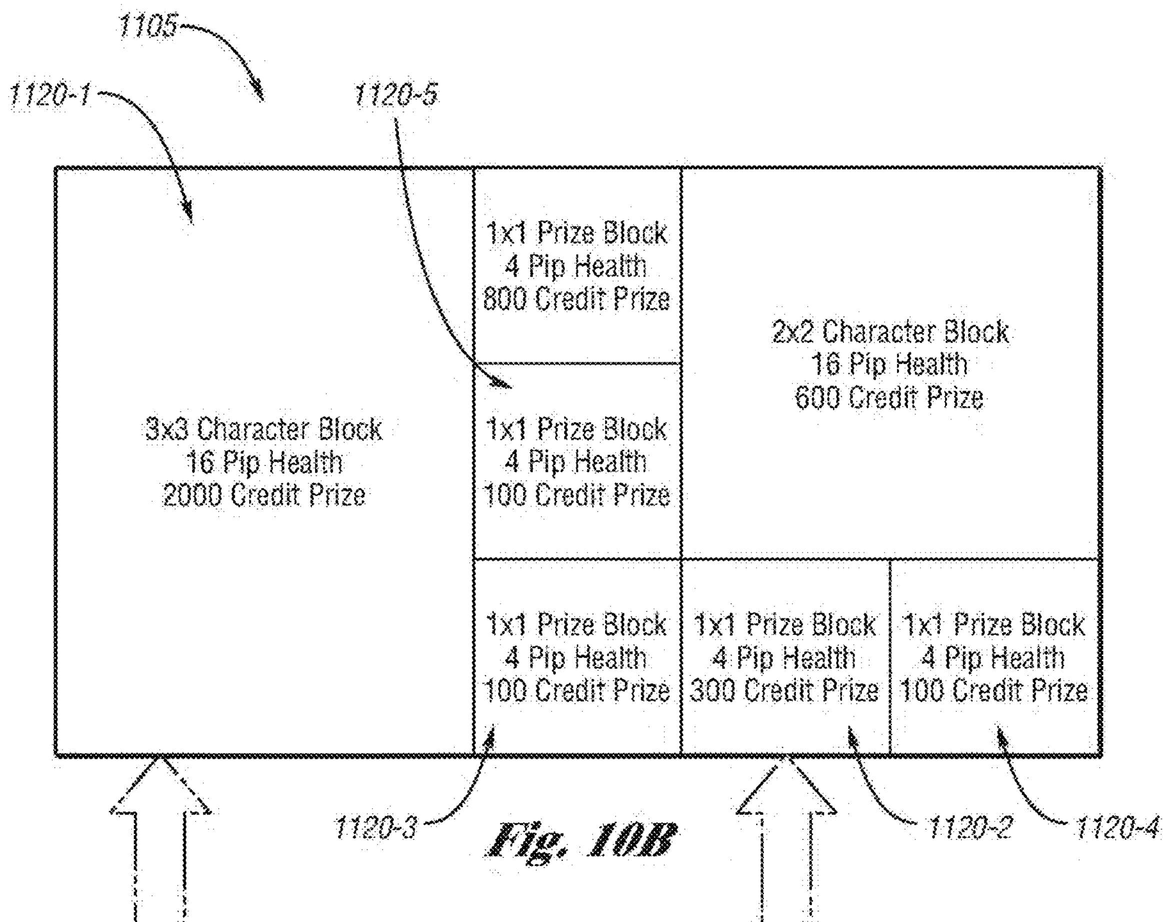

FIGS. 10A-10G show operation of the prize blocks of the secondary game display in conjunction with primary game outcomes according to embodiments of the present invention. FIG. 11A shows an arrangement of prize blocks 1100 for a 50-wager secondary game display comprising a 2×3 prize block with a prize value of 550 credits, a 2×3 prize block with a prize value of 1000 credits, four 1×1 prize blocks with prize values of 50 credits each and a 1×1 prize block with a prize value of 100 credits. Those familiar with the art will recognize that no separate wager may be required to play the secondary games as it is included within the primary wager or in the alternative, may require a separate wager from the primary game. FIG. 10B shows an arrangement of prize blocks 1105 for a 100-wager secondary game display comprising a 2×3 prize block with a prize value of 2000 credits, a 2×3 prize block with a prize value of 600 credits, three 1×1 prize blocks with prize values of 100 credits each and a 1×1 prize block with a prize value of 300 credits. The 50-wager and 100-wager prize block arrangements are created when the game is initialized, and each is specific to the wager placed during the primary game. Other prize block arrangements may be utilized for other wager amounts or types.

Figure 10C:
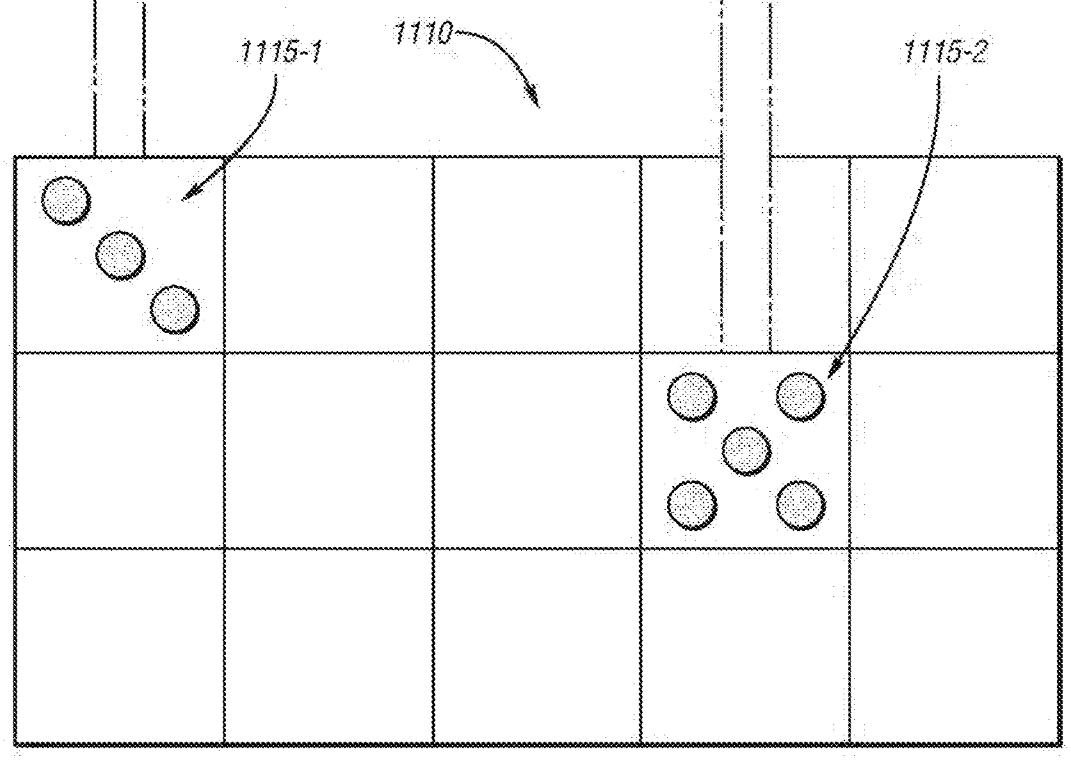
Figure 11A:
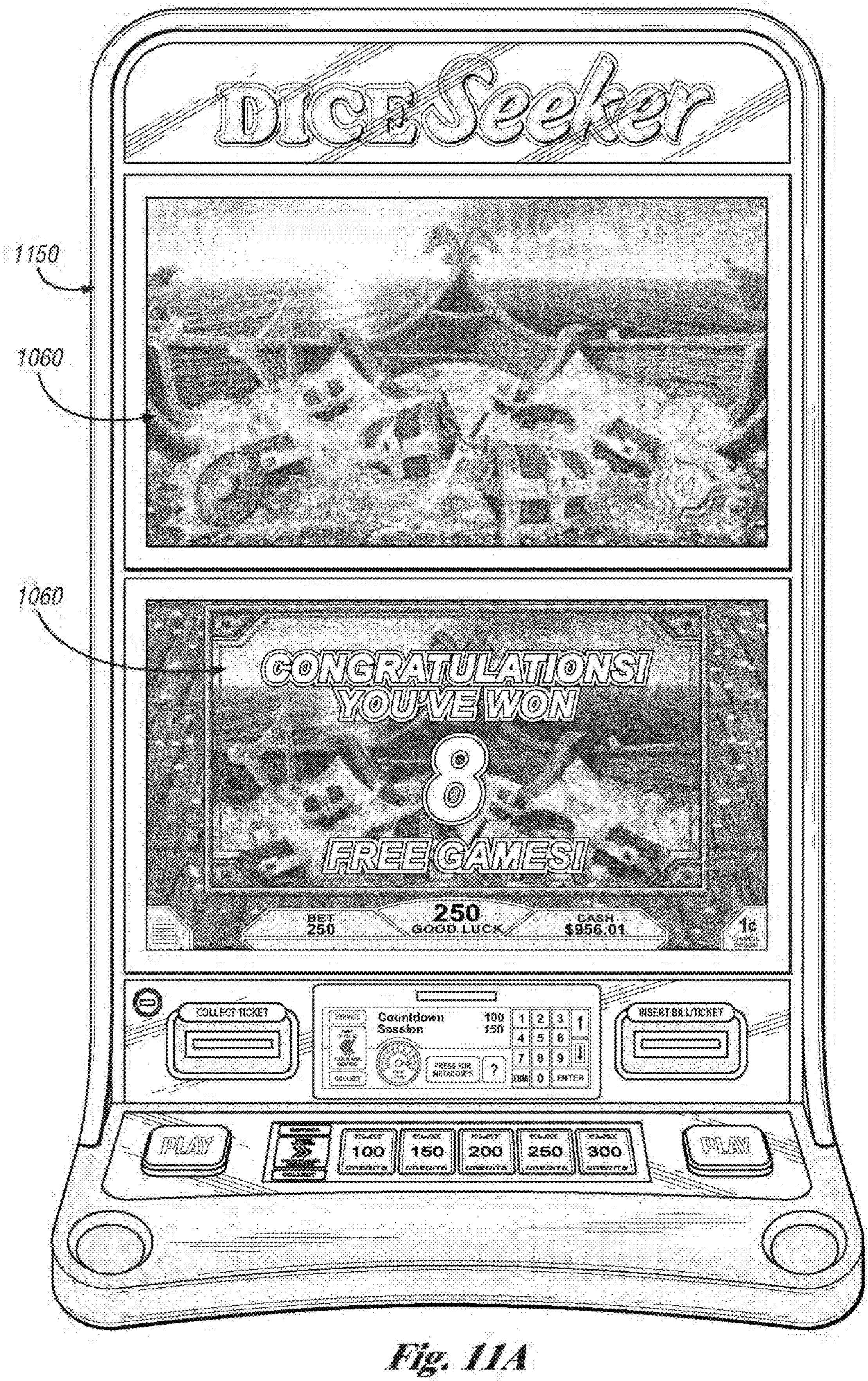
FIGS. 11A-11D illustrate play on a gaming machine of free games awarded during play of an exemplary game according to the embodiments of the present invention.

FIG. 10C shows a primary game outcome 1110 for a 100-wager game comprising a pair of dice 1115-1, 1115-2 appearing on the 3×5 matrix of primary game reels. The pair of dice 1115-1, 1115-2 have landed on row 1, column 1 and row 2, column 4, of the primary game matrix, respectively. Consequently, die 1115-1 decreases the health value of prize block 1120-1 of the arrangement of prize blocks 1105 while die 1115-2 decreases the health value of the of prize block 1120-2 of the arrangement of prize blocks 1105. In one embodiment, the decrease in health value has a linear relationship with the number of pips such that one pip diminishes the health value by one unit. Other math models are conceivable such that the relationship between the pips and health value units need not be linear (e.g., one pip diminishes the health value by two units).

Using FIGS. 10B and 10C as reference, in this linear positional relationship embodiment, a dice symbol appearing in any row of columns 1 and 2 impacts the health value of prize block 1120-1; a dice symbol appearing in any row of column 3 impacts the health value of prize block 1120-3; a dice symbol appearing in any row of column 4 impacts the health value of prize block 1120-2; and a dice symbol appearing in any row of column 5 impacts the health value of prize block 1120-4. As detailed herein, the positional relationship need not be linear. Moreover, while the figures show only the health values of the bottommost prize blocks being impacted, in other embodiments, the health value of any displayed prize block may be impacted by a primary game outcome.

Figure 10D:
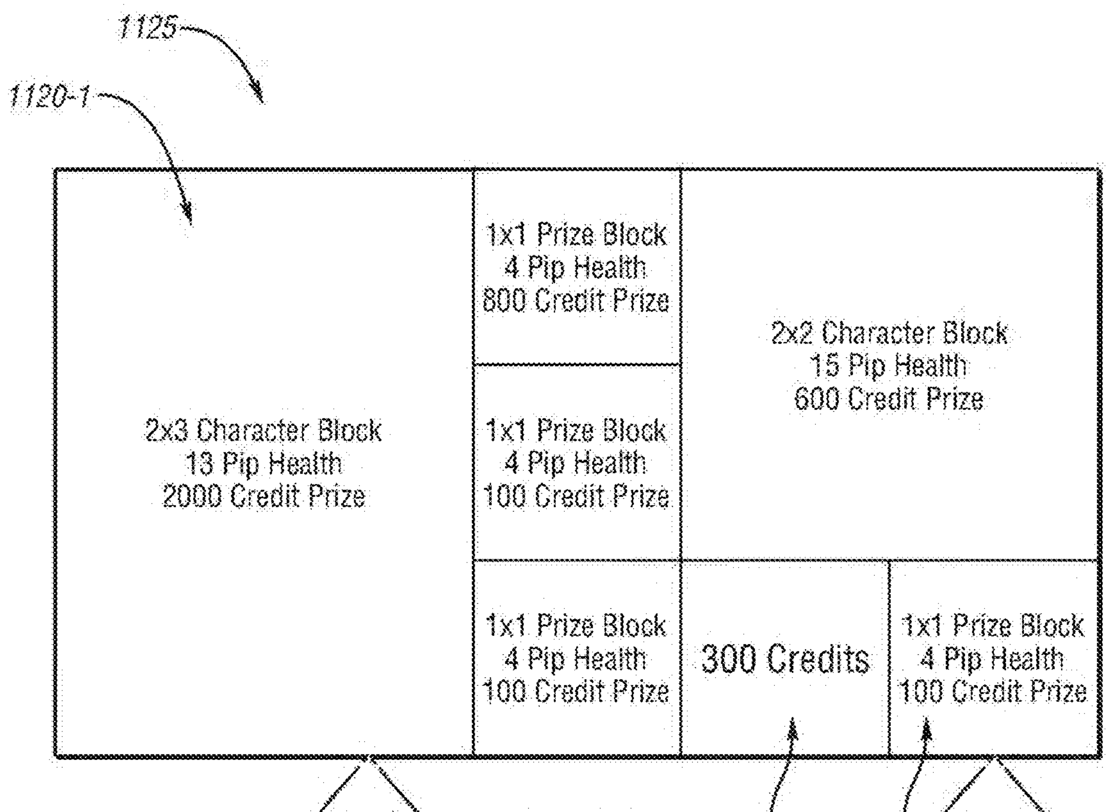

FIG. 10D shows the arrangement of prize blocks 1125 responsive to the primary game outcome 1110 acting on the arrangement of prize blocks 1105. The health value of the prize block 1120-1 has diminished 3 units from 16 units to 13 units based on the 3 pips. The health value of the prize block 1120-2 has diminished 5 units to zero. As shown in FIG. 10D, the prize value of 300 units has been revealed in accordance with the exhaustion of the health value of prize block 1120-2.

Figure 10E:
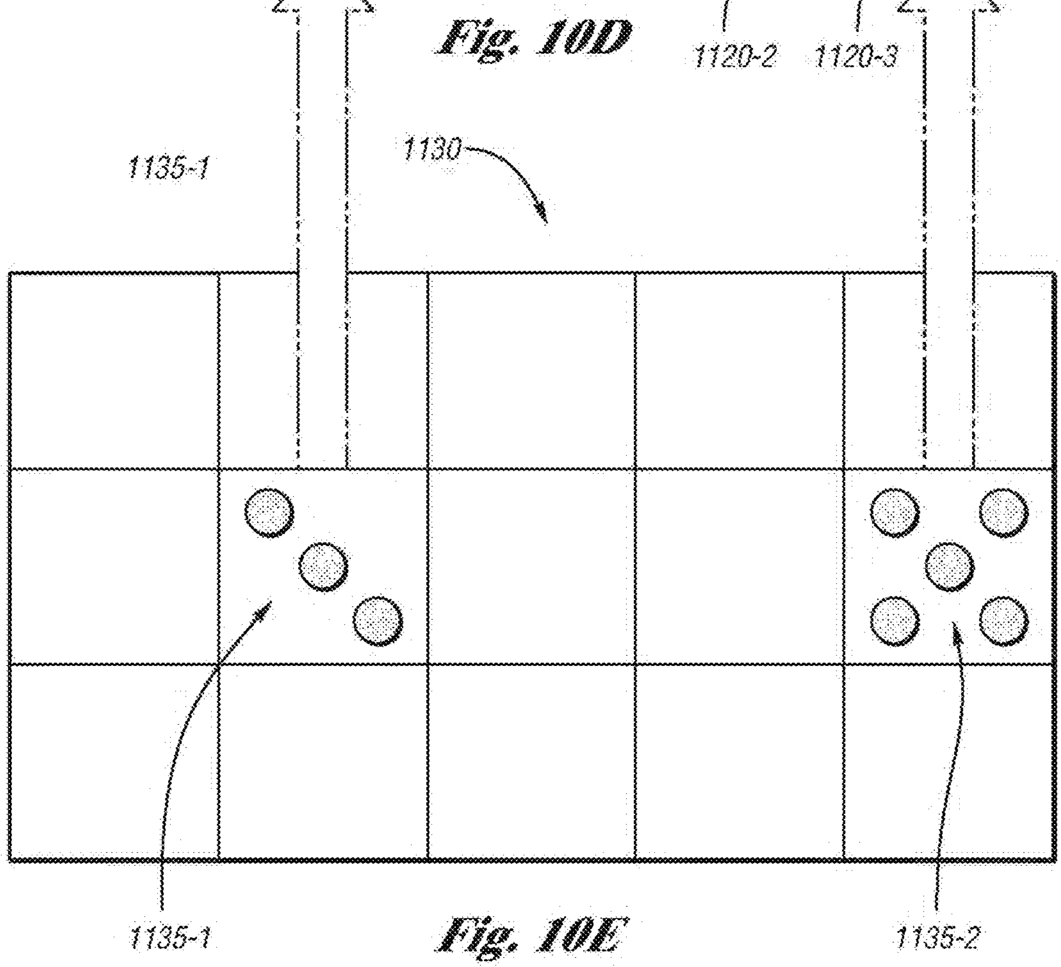

FIG. 10E shows a primary game outcome 1130 for a 100-wager game comprising a pair of dice 1135-1, 1135-2 appearing on the 3×5 matrix of primary game reels. The pair of dice 1135-1, 1135-2 have landed on row 2, column 2 and row 2, column 5, respectively. Consequently, die 1135-1 diminishes the health value of prize block 1120-1 while die 1135-2 diminishes the health value of prize block 1120-3.

Figure 10F:
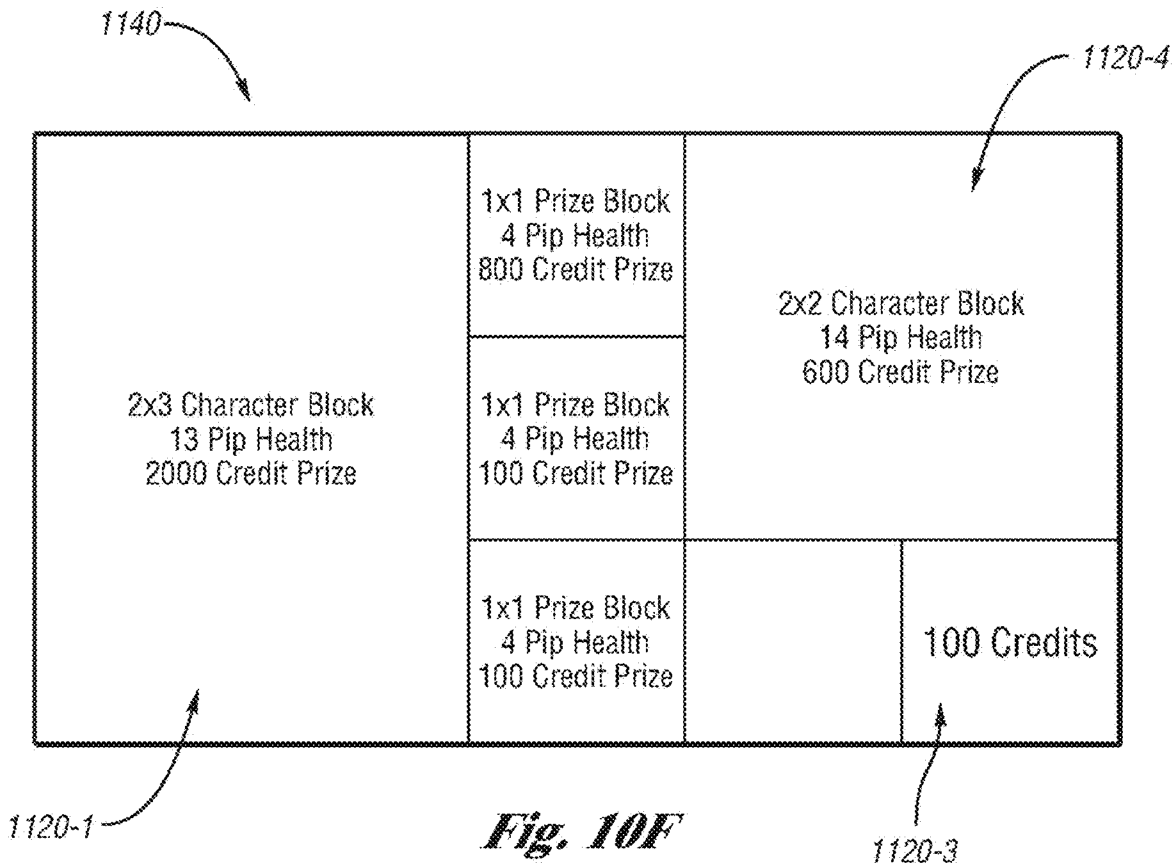
Figure 10G:
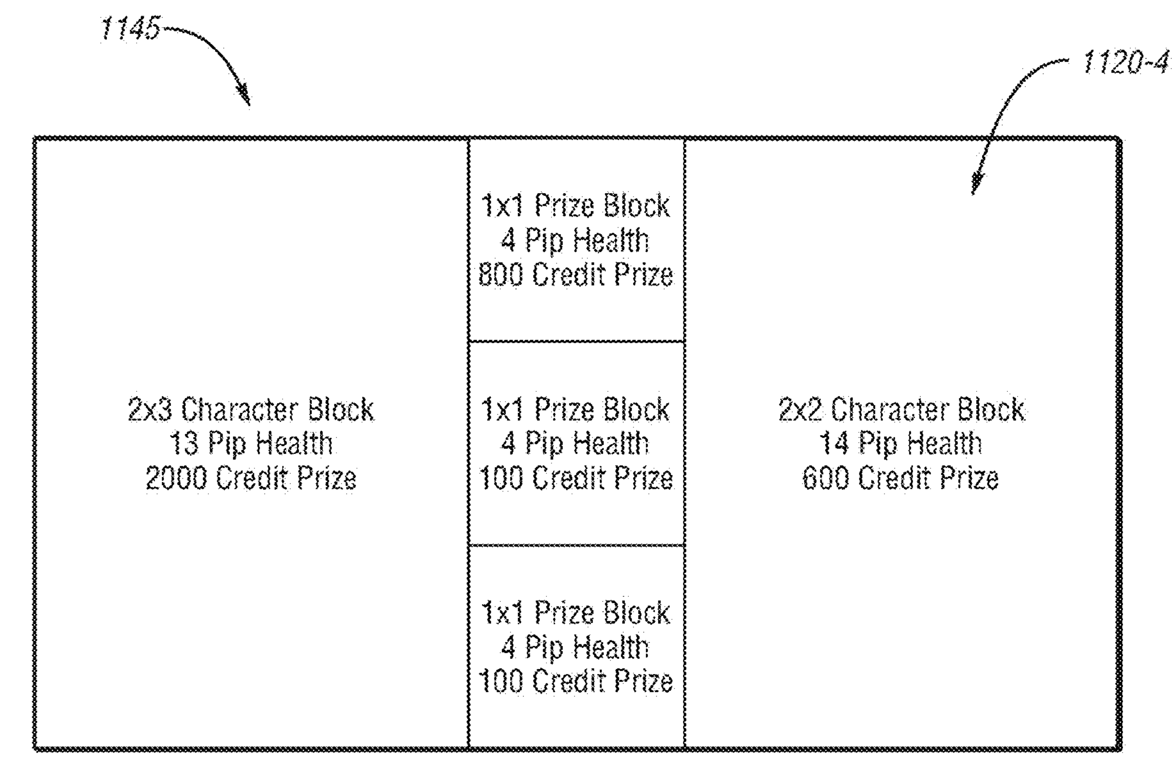

FIG. 10F shows the arrangement of prize blocks 1140 responsive to the primary game outcome 1130 acting on the arrangement of prize blocks 1125. The health value of the prize block 1120-1 has diminished another 3 units from 13 units to 10 units based on the 3 pips. The health value of the prize block 1120-3 has diminished 5 units such that the 4-unit health value is exhausted. In the event the die total exceeds the remaining health value of the associated prize block, the excess units may either be applied to the next prize block above or may be discarded. As shown in FIG. 10G, the prize value of 100 units has been revealed in accordance with the exhaustion of the health value.

FIG. 10G shows the arrangement of prize blocks 1145 once the health values of prize blocks 1120-2 and 1120-3 have been exhausted. Once the prize blocks 1120-2 and 1120-3 are removed, the 2×3 prize block 1120-4 drops down to fill in the 4$^{th}$ and 5$^{th}$ columns of the 3×5 arrangement of prize blocks represented on the secondary game display.

In one embodiment, one or more subject dice may be deemed super dice such that when they land on any primary game reel, they decrease the health value of multiple prize blocks or possibly all of the prize blocks represented on the secondary game display. Such super dice may also be configured to diminish the health value to zero regardless of the current health value.

Figure 11B:
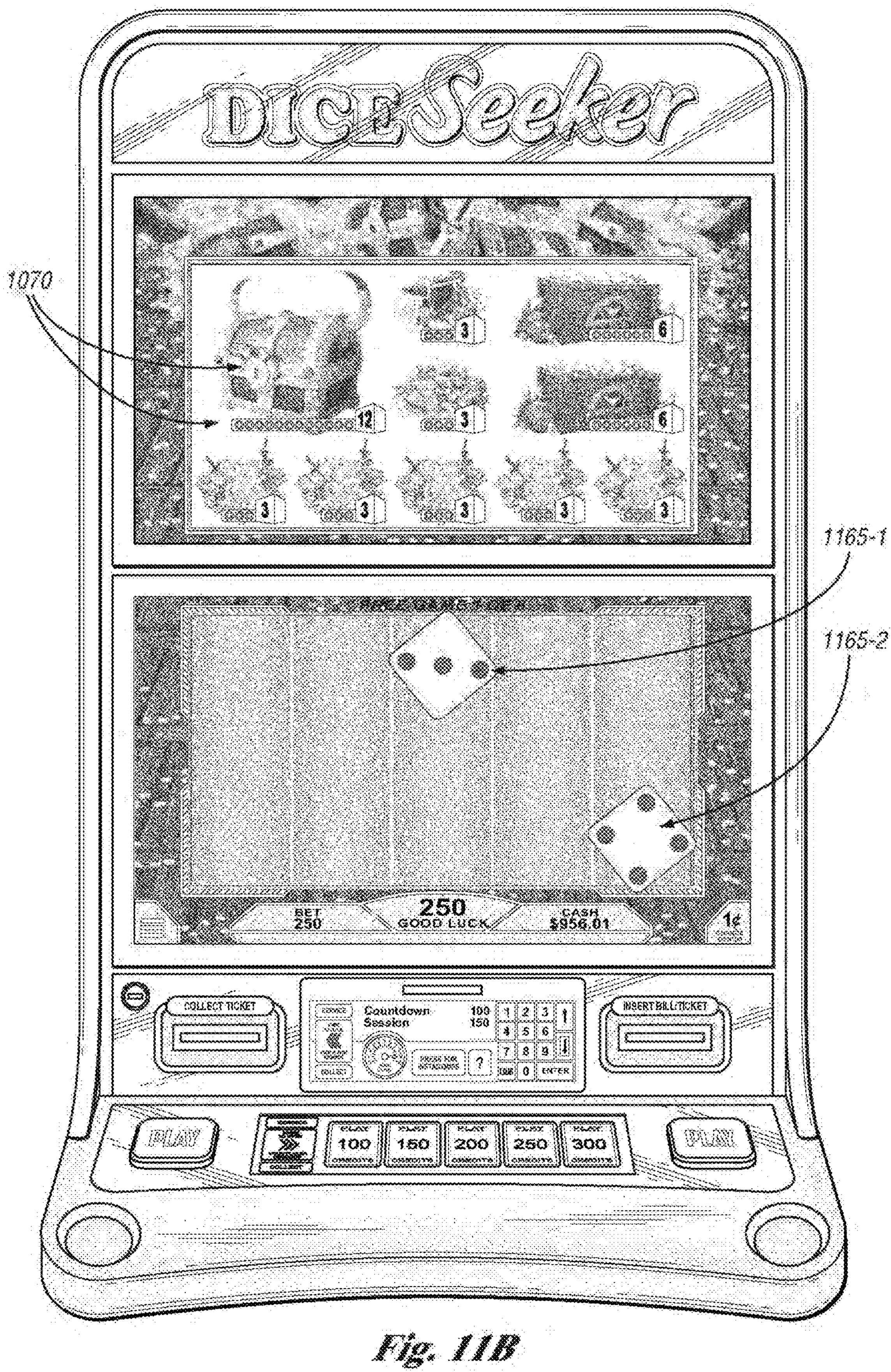
Figure 11C:
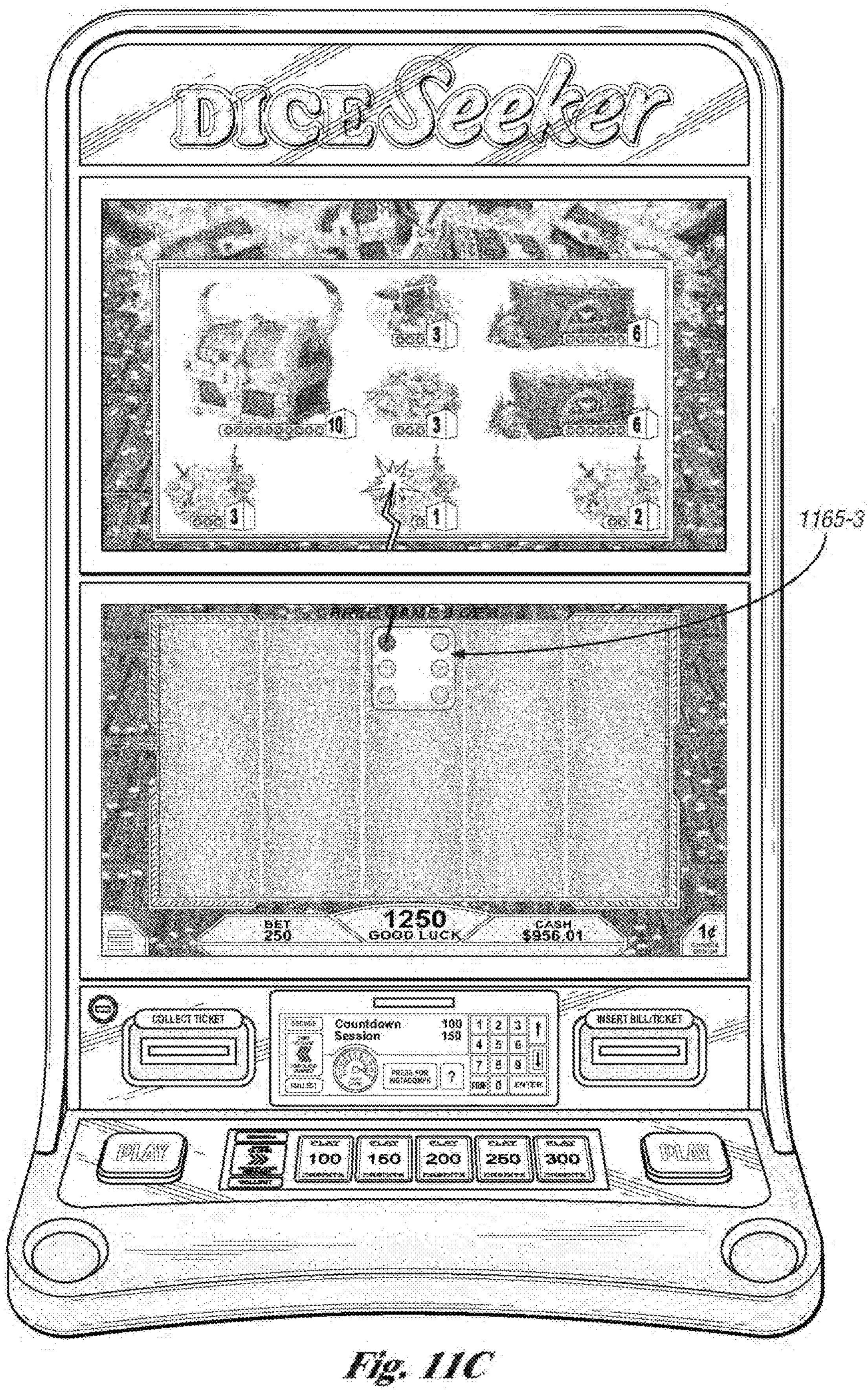
Figure 11D:
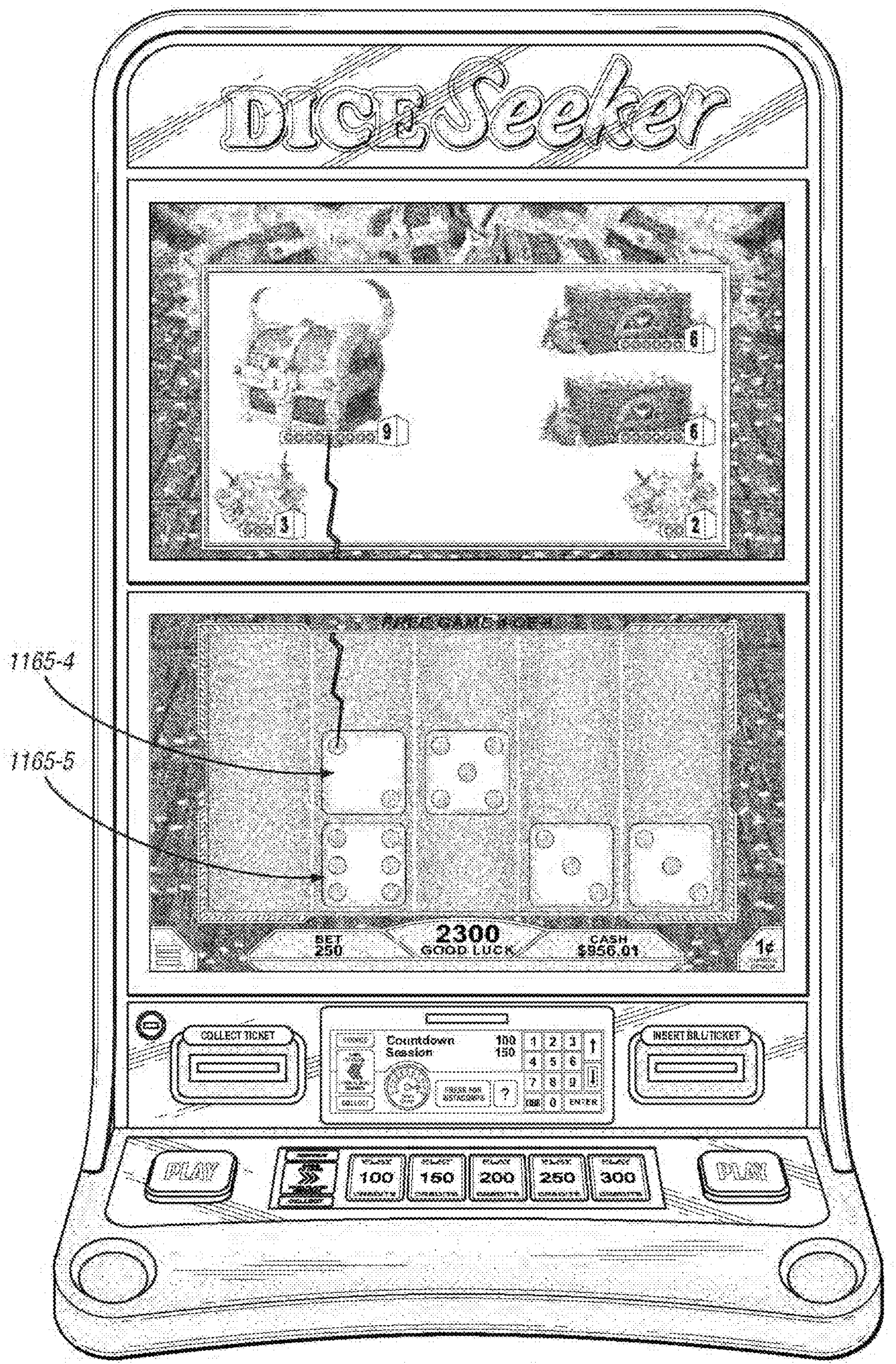

FIGS. 11A-11D show play on a gaming machine of free bonus games awarded during play of an exemplary game according to embodiments of the present invention. FIG. 11A shows a gaming machine 1150 with a primary game display 1155 depicting the award of 8 free games while the secondary game display 1160 depicts the home page of a bonus game. FIG. 11B shows a bonus game utilized to facilitate the free plays. In one embodiment, the bonus game comprises levels or tiers through which players seek to advance with higher levels offering more significant prizes. As shown in FIGS. 11B and 11C, in one embodiment, the bonus game comprises a primary game involving the removal of all game symbols except the dice. In a manner like the primary wagering game, the free games utilize dice 1165-1 through 1165-3 to decrease the health value associated with prizes 1170 depicted on the secondary game display based on position. As shown in FIG. 11D, with the free bonus games, multiple dice 1165-4 and 1165-5 may appear on the same reel. Once a health value associated with a subject bonus prize is exhausted, the corresponding prize is won. Additional free spins/games may be won during the bonus game.

Figure 12A:
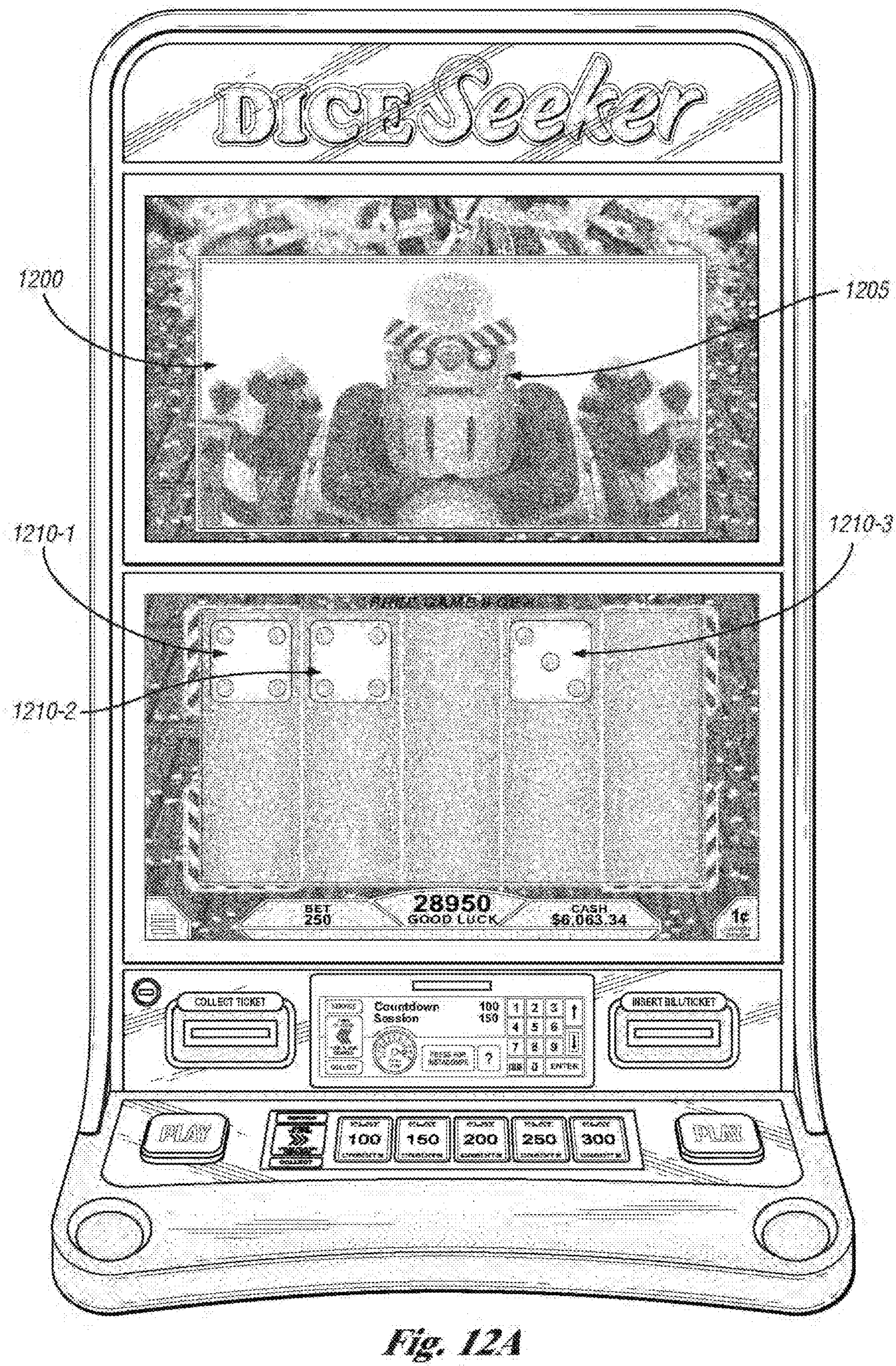
FIGS. 12A-12C illustrate operation of an exemplary bonus game according to the embodiments of the present invention.
Figure 12B:
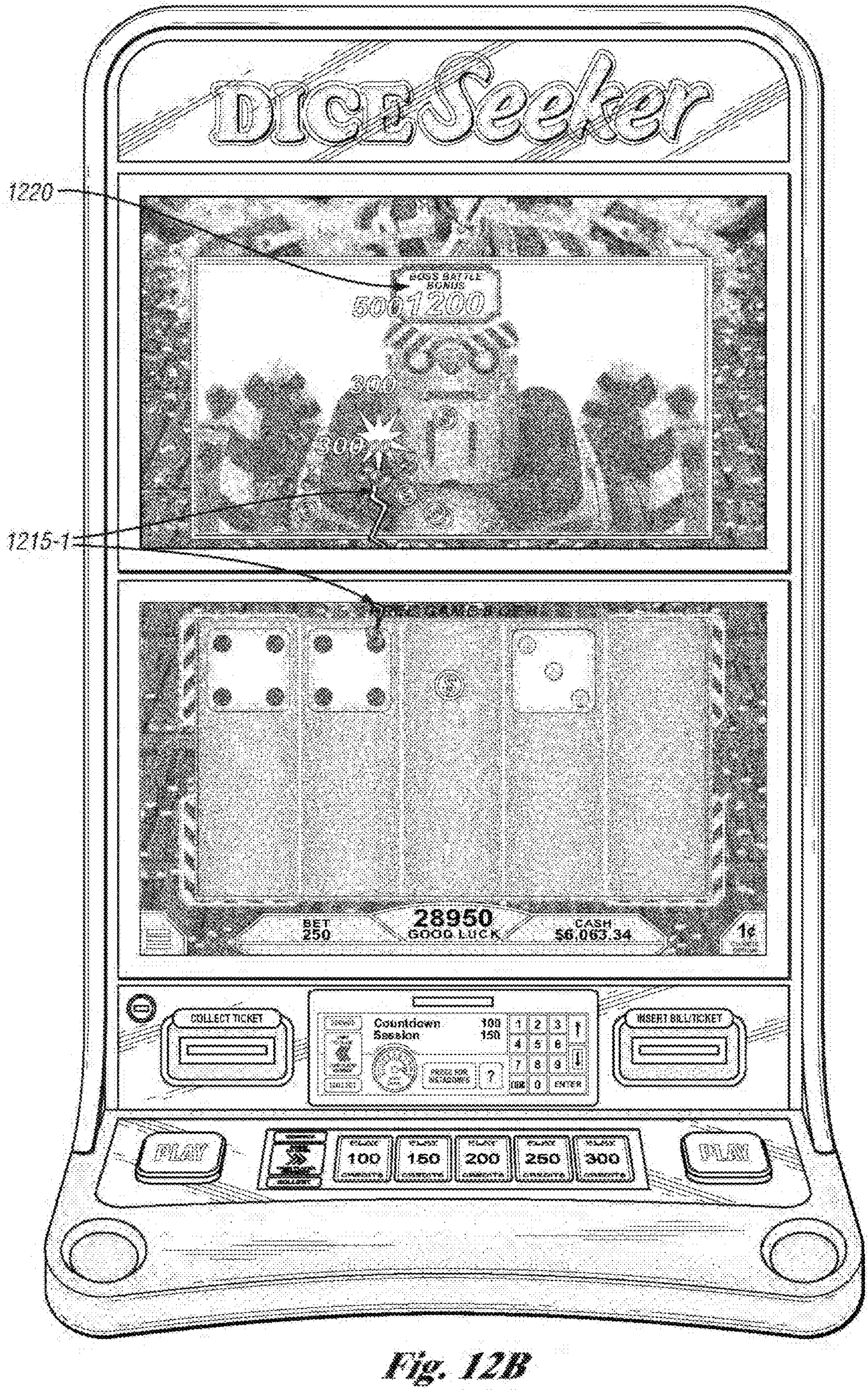
Figure 12C:
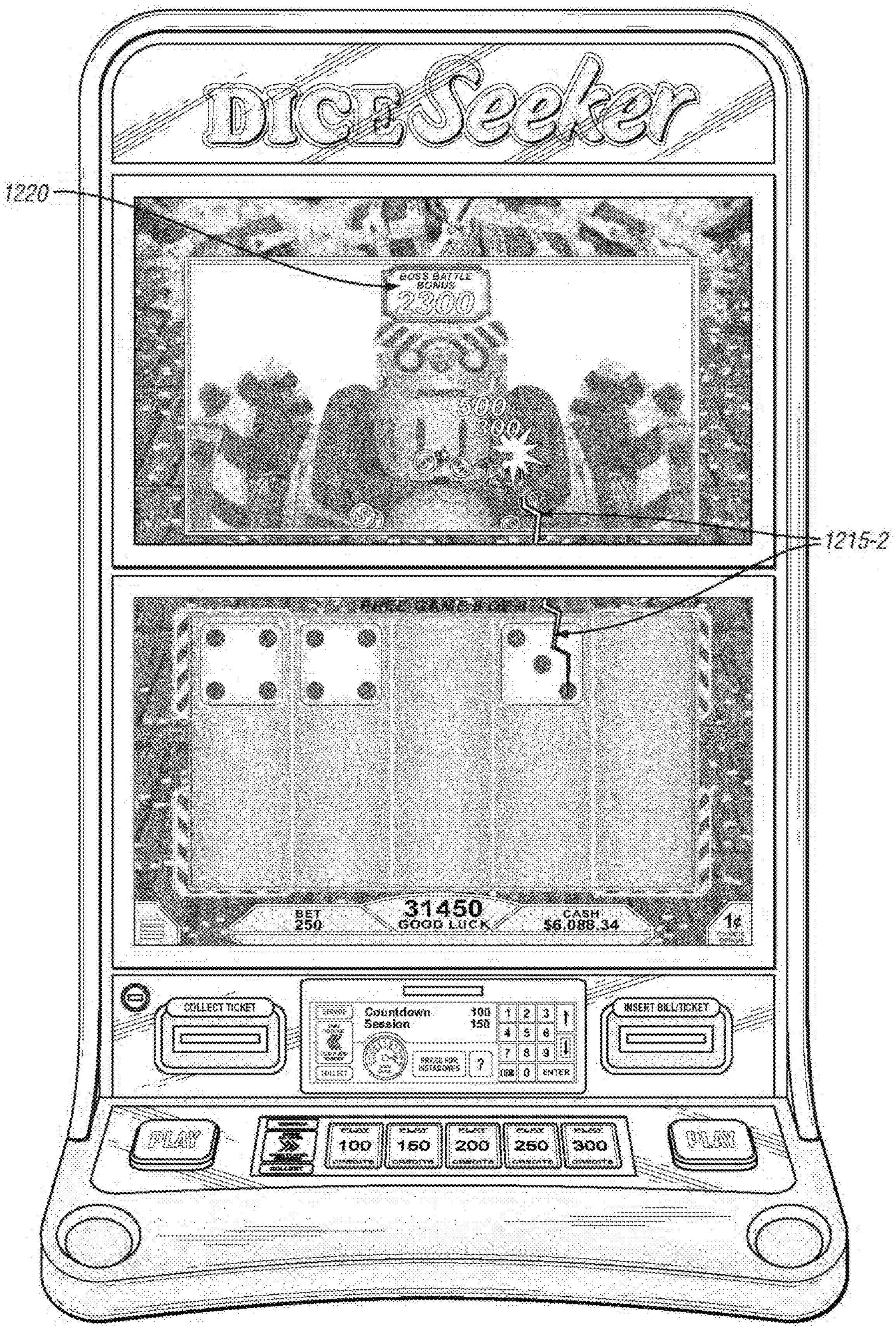

FIGS. 12A-12C show an exemplary final level associated with bonus/free games. In this embodiment, the secondary game display depicts a single prize block 1200 comprising a sci-fi character 1205. As dice 1210-1 through 1210-3 appear on the primary game display, the dice serve to trigger prizes relative to each die pip. In this instance, instead of each lightning strike 1215-1 and 1215-2 diminishing the health value of the prize block 1200, each lightning strike 1215-1 and 1215-2 triggers a prize 1220 which may be revealed and/or recorded within the head of the character 1205.

Figure 13:
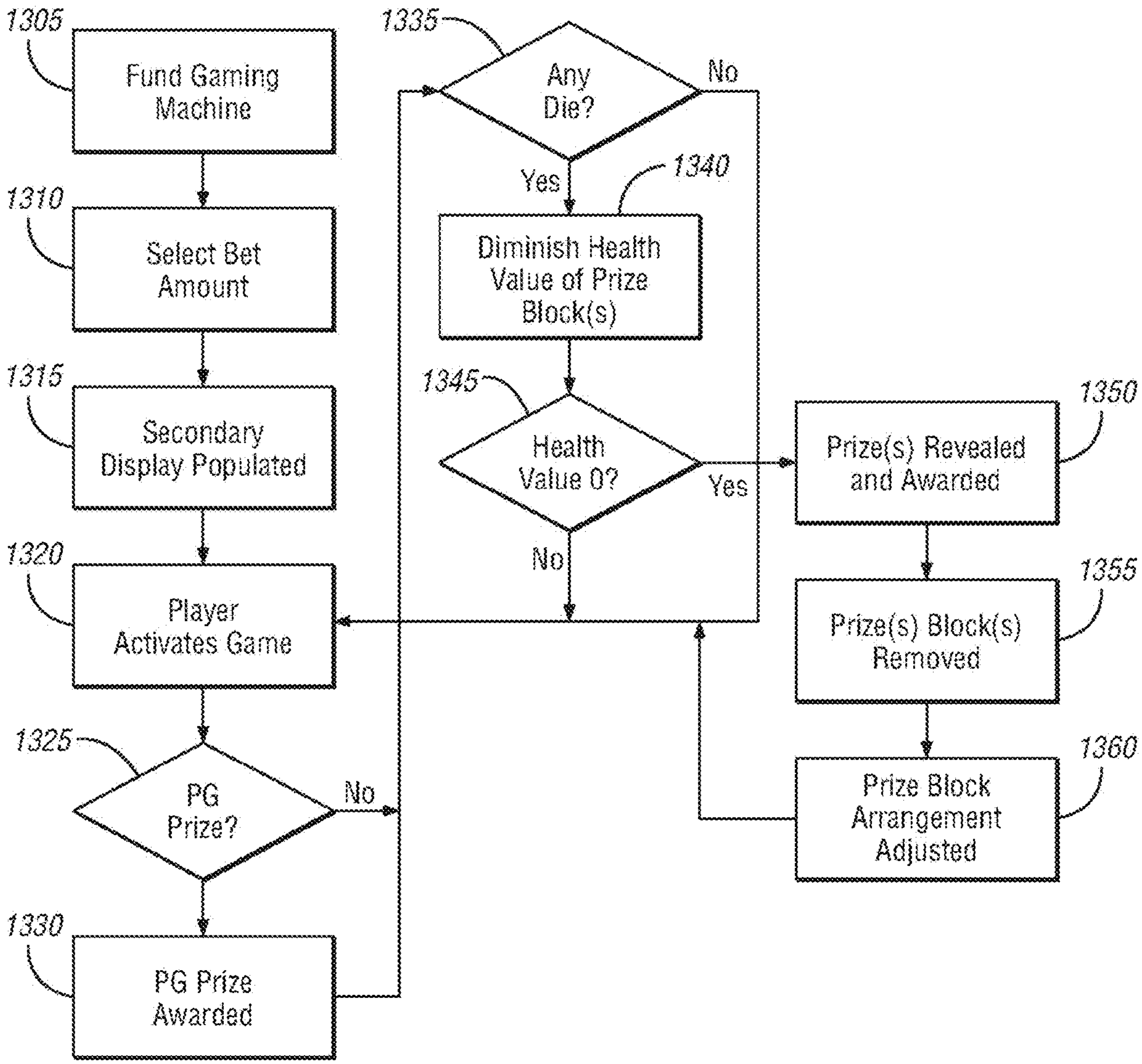
FIG. 13 illustrates a flow chart detailing play of an exemplary game according to the embodiments of the present invention.

FIG. 13 shows a flow chart 1300 detailing the embodiments of the present invention. At step 1305, a player funds the gaming machine. Such funding may be accomplished by inserting currency, tickets, vouchers, coupons, credit card information, electronic funds transfer, etc., into the gaming machine. At step 1310, the player selects a bet amount. Step 1310 may be optional in the case of the wager being a preset and nonadjustable amount. At step 1315, the secondary game display is populated with an arrangement of prize blocks corresponding to the bet threshold or range (e.g., for a bet less than or equal to 50 units, a first arrangement of prize blocks is selected while for a bet greater than 50 units, a second arrangement of prize blocks is selected). At step 1320, the player activates (e.g., causes the primary game reels to spin) the primary game using the gaming machine interface. At step, 1325, it is determined if the primary game (PG) has resulted in a prize. If so, at step 1330, the prize is awarded. At step 1335, it is determined if one or more die (or other pre-established symbols or arrangements thereof) have landed on the primary game display. If so, at step 1340, the health value of prize blocks corresponding to the one or more dice are diminished accordingly. At step 1345, it is determined if any prize blocks have zero health value. If so, at step 1350, the prize value associated with the prize block is revealed and awarded. At step 1355, the prize block having zero health value is removed. At step 1360, the arrangement of prize blocks is adjusted to account for the removal of the prize block having zero health value. The adjustment may comprise leaving the void blank or dropping a new prize block into the vacated area.

Figure 14:
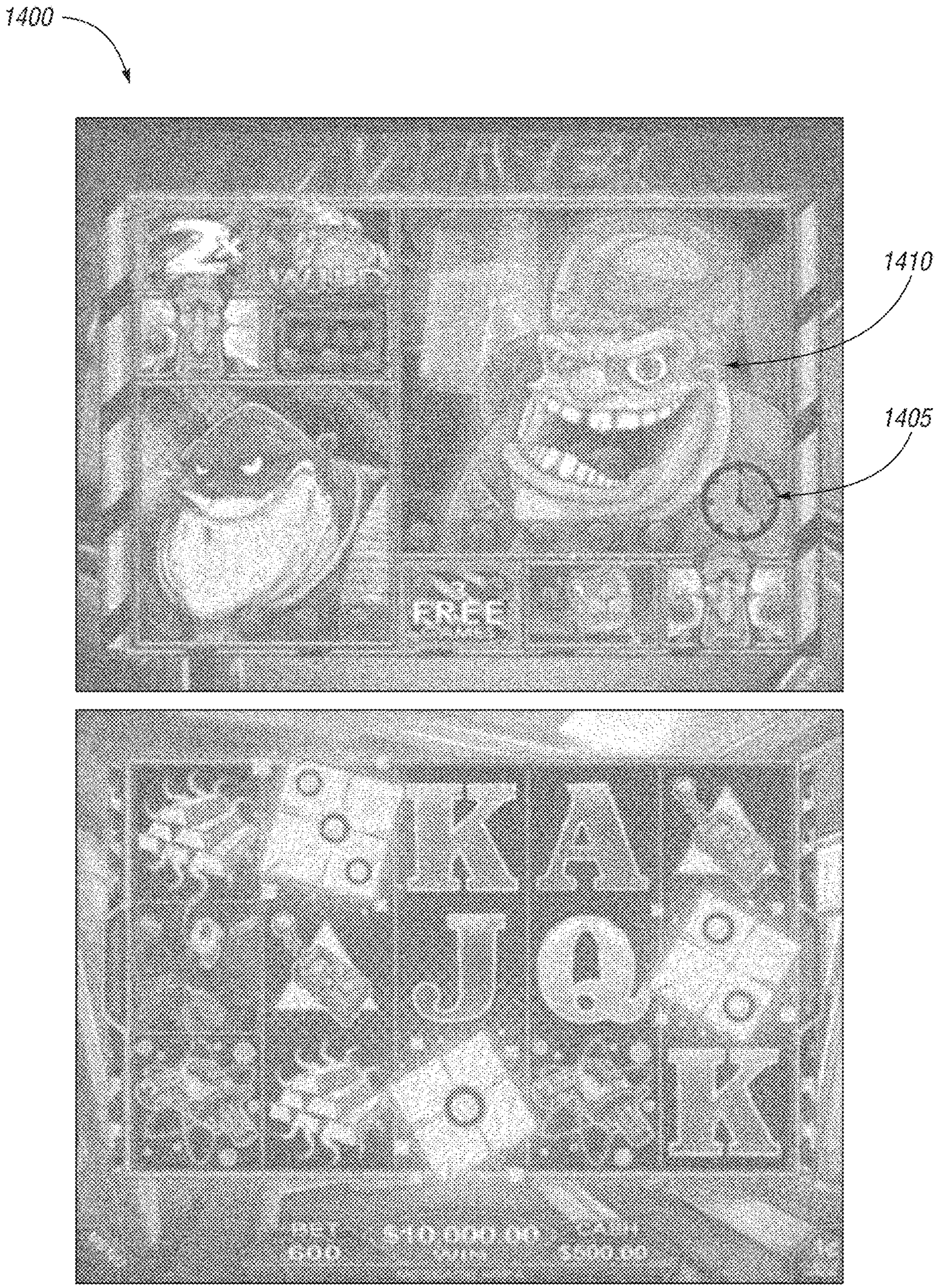
FIG. 14 illustrates a gaming machine screen shot with the addition of a timer according to the embodiments of the present invention.

FIG. 14 shows a gaming machine screen shot 1400 with the addition of a timer 1405 according to the embodiments of the present invention. While the feature is deemed a timer, those skilled in the art will recognize that the timer is not limited to counting down or tracking "time" in units of time (e.g., minutes or hours) but may also count down or track "time" in actions (e.g., number of game plays or spins). The timer 1405, as shown, is positioned in one of the prize blocks 1410. The timer 1405 is configured to count down as the game is played. While the timer is said to count down, it may be configured to count up to a threshold value. In one embodiment, the timer 1405 ticks down (or up) one unit for every spin or play of the game. Those skilled in the art will recognize that the timer 1405 may tick down faster or slower than one unit per game, continuously tick down (or up) as the game is being played, take different forms (e.g., digital, hourglass, etc.) and/or may be present in more than one prize block. Regardless of the form of the timer 1405, once the timer reaches 0, is otherwise exhausted or reaches a non-zero threshold value and the award block has not yet been awarded (e.g., the player has yet to collect the required number of PIPs (i.e., the health value is not yet maximized), the award block is removed from the display without awarding the associated prize. The next time the award block or type of award block appears on the display, the PIPs, depending on the embodiment, may or may not be replenished to their former level or may be set at a predetermined level. In one embodiment, additional time may be added to a timer as a prize based on certain primary game outcomes thereby allowing the player more chances to win an associated prize. Players may also buy additional time if desired. Those skilled in the art will recognize that screens, screenshots or displays of any game or games described herein are only representative of one possible presentation of a game as the same or similar games can be played or presented on a single display in a vertical or portrait mode or horizontal or landscape mode where the screens, screenshots or display occupy differing sections of a single display, a dual display in a stacked arrangement where some game features exist on an upper display while other game features exist on a lower display or even a triple display where the game screens, screenshots or displays may be shared by up to all three stacked monitors.

In one embodiment, when the award block is removed, the associated PIPs may be stored in a pot. The pot provides a mechanism for the game to pay out more than the conventional PIP average as desired.

Figure 15:
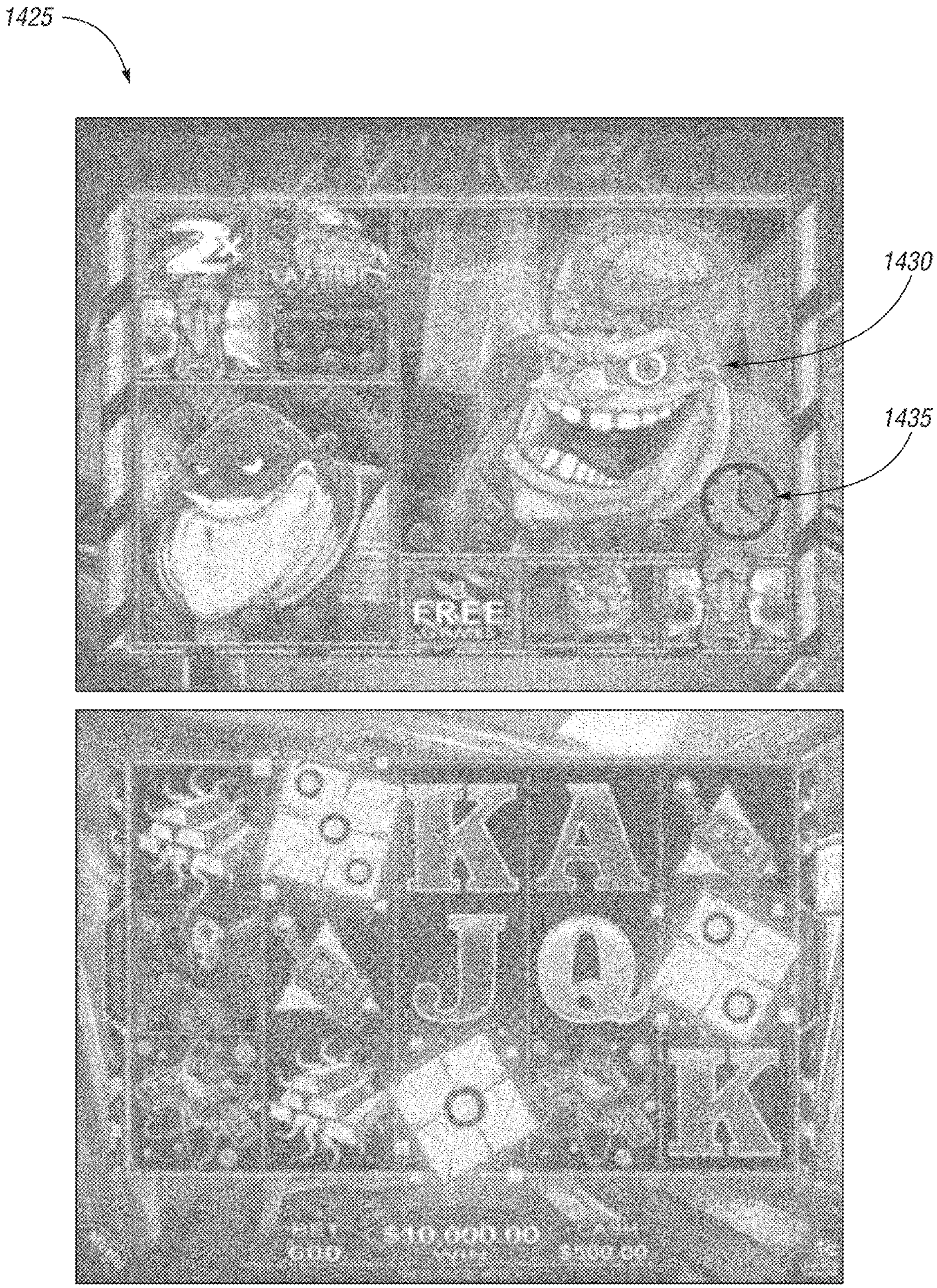
FIG. 15 illustrates a gaming machine screen shot with a mystery prize block according to the embodiments of the present invention.

FIG. 15 shows a gaming machine screen shot 1425 with a mystery prize block 1430 according to the embodiments of the present invention. The mystery prize block 1430 conceals or simply does not display the number of PIPs required to win the associated prize. In this manner, the player does not know how many PIPs are required to win the prize thereby enhancing the anticipation and excitement. Such prize blocks may also tend to keep players playing the gaming machine longer in an effort to reveal the PIPs and award the associated prize. While a timer 1435 is shown in prize block 1435, a timer is optional as detailed above.

Figure 16:
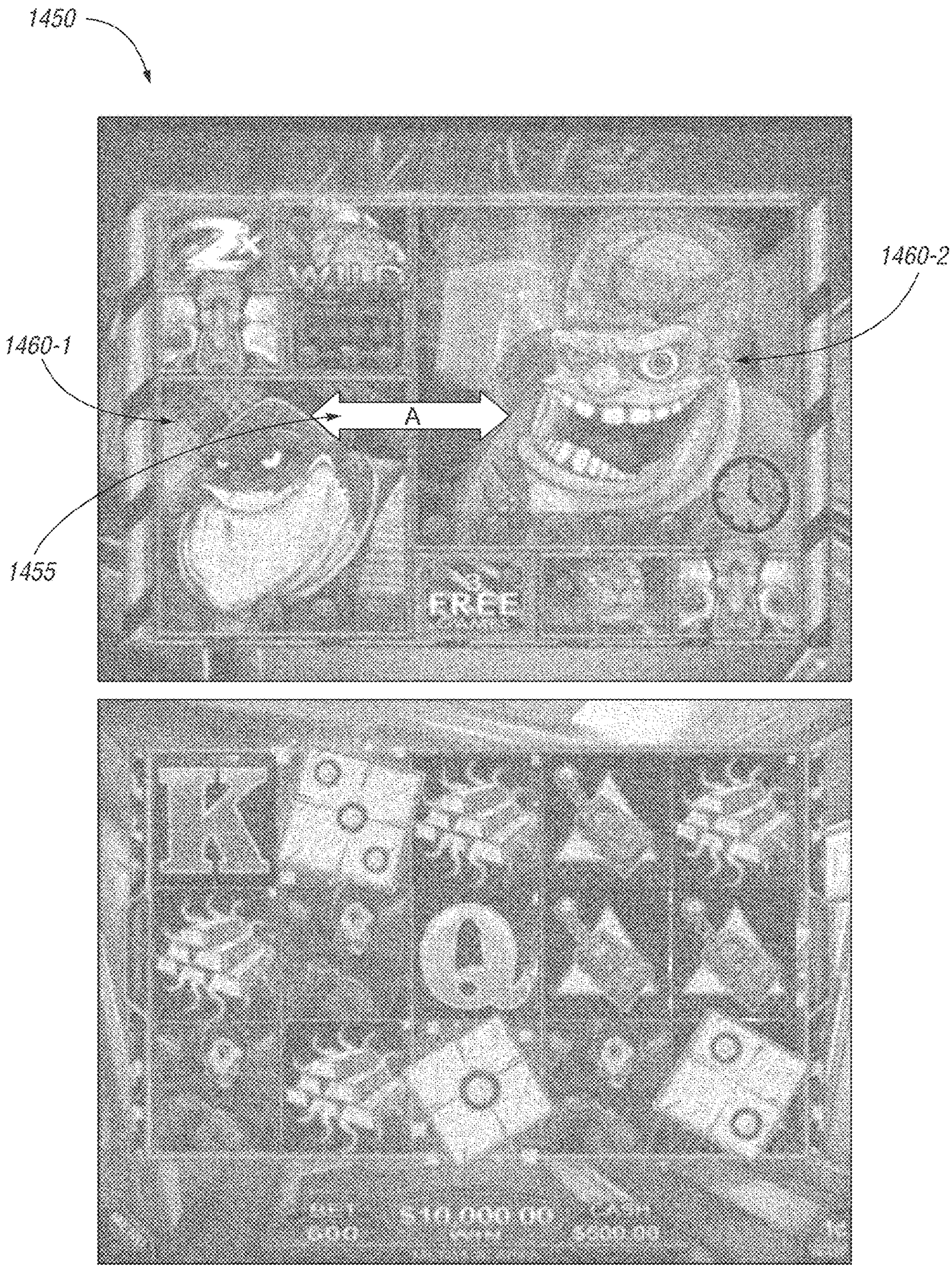
FIG. 16 illustrates a gaming machine screen shot with a prize block locking feature according to the embodiments of the present invention.

FIG. 16 shows a gaming machine screen shot 1450 with a prize block locking feature 1455 according to the embodiments of the present invention. The prize block locking feature 1455 serves to lock two or more neighboring prize blocks 1460-1 and 1460-2. Since prize blocks 1460-1 and 1460-2 have been locked, the total PIP count is 8. Thus, if the player collects all of the 8 PIPs, the total associated prize is awarded as well as a bonus or other enhanced award. In one embodiment, when activated, the prize block locking feature 1455 includes one or more PIPs being collected in one or each of the locked prize blocks. In another embodiment, the locking of the prize blocks results in an immediate player award. In another embodiment, certain patterns (e.g., extending across all 5 columns) of locked prize blocks result in a player award. In one embodiment, only like prize blocks may lock together whereas in other embodiments any prize blocks may lock together. In another embodiment, when blocks lock, the associated aggregated prizes are immediately awarded even without the required PIPs being collected based on primary reel outcomes.

Figure 17A:
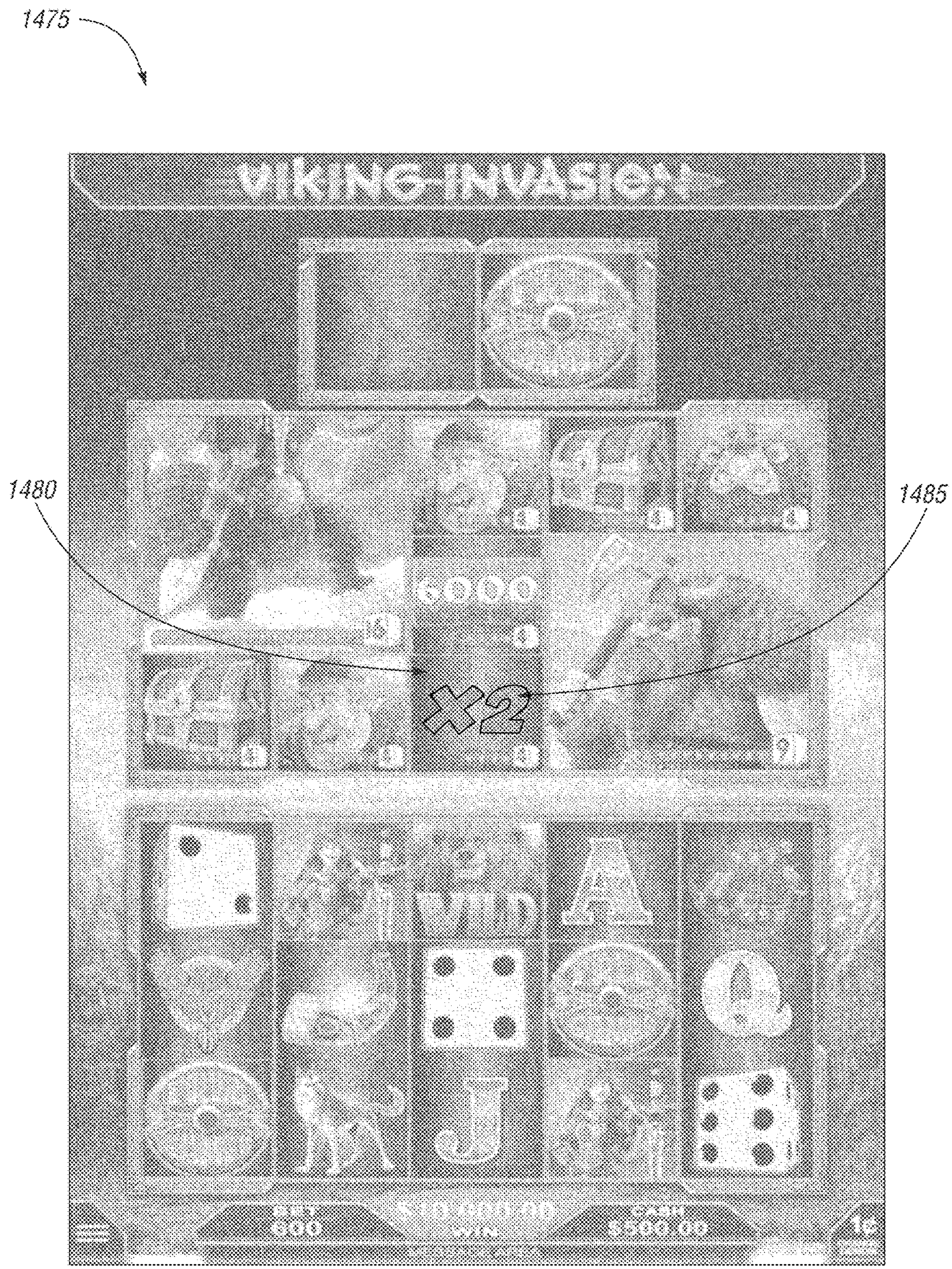
FIGS. 17A and 17B illustrate a gaming machine screen shot with the addition of a multiplier according to the embodiments of the present invention.
Figure 17B:
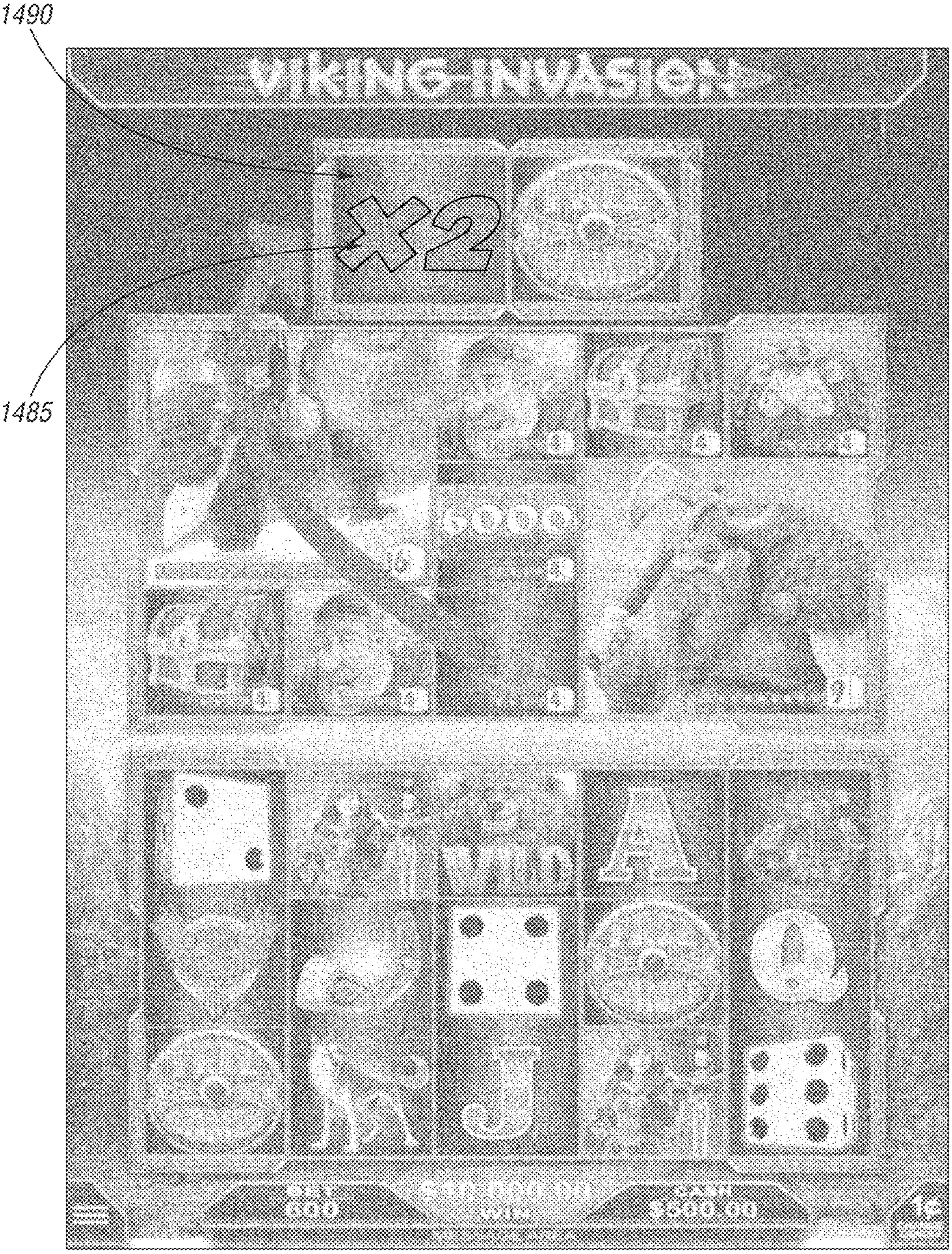

FIGS. 17A and 17B show a gaming machine screen shot 1475 with a multiplier feature according to the embodiments of the present invention. Those skilled in the art will recognize that the multiplier may be more or less than 2×. As shown in FIG. 17A, prize block 1480 displays a 2× multiplier 1485. In one embodiment, once the required PIPs are collected, as shown in FIG. 17A, the 2× multiplier is transposed to a non-prize block portion 1490 of the secondary game. In this embodiment, once the player collects enough PIPs to win a prize associated with a certain prize block, the prize amount is doubled based on the 2× multiplier in the non-prize block portion 1490 of the secondary game.

In another embodiment, characters (or any symbol) associated with the secondary game have associated prize awards. That is, a first character may always have large associated prizes while a different character may have small awards and yet another character may have random award sizes. Such an embodiment adds a level or excitement and player involvement as players will root for the appearance of one or more high award characters in the prize blocks.

Figure 18:
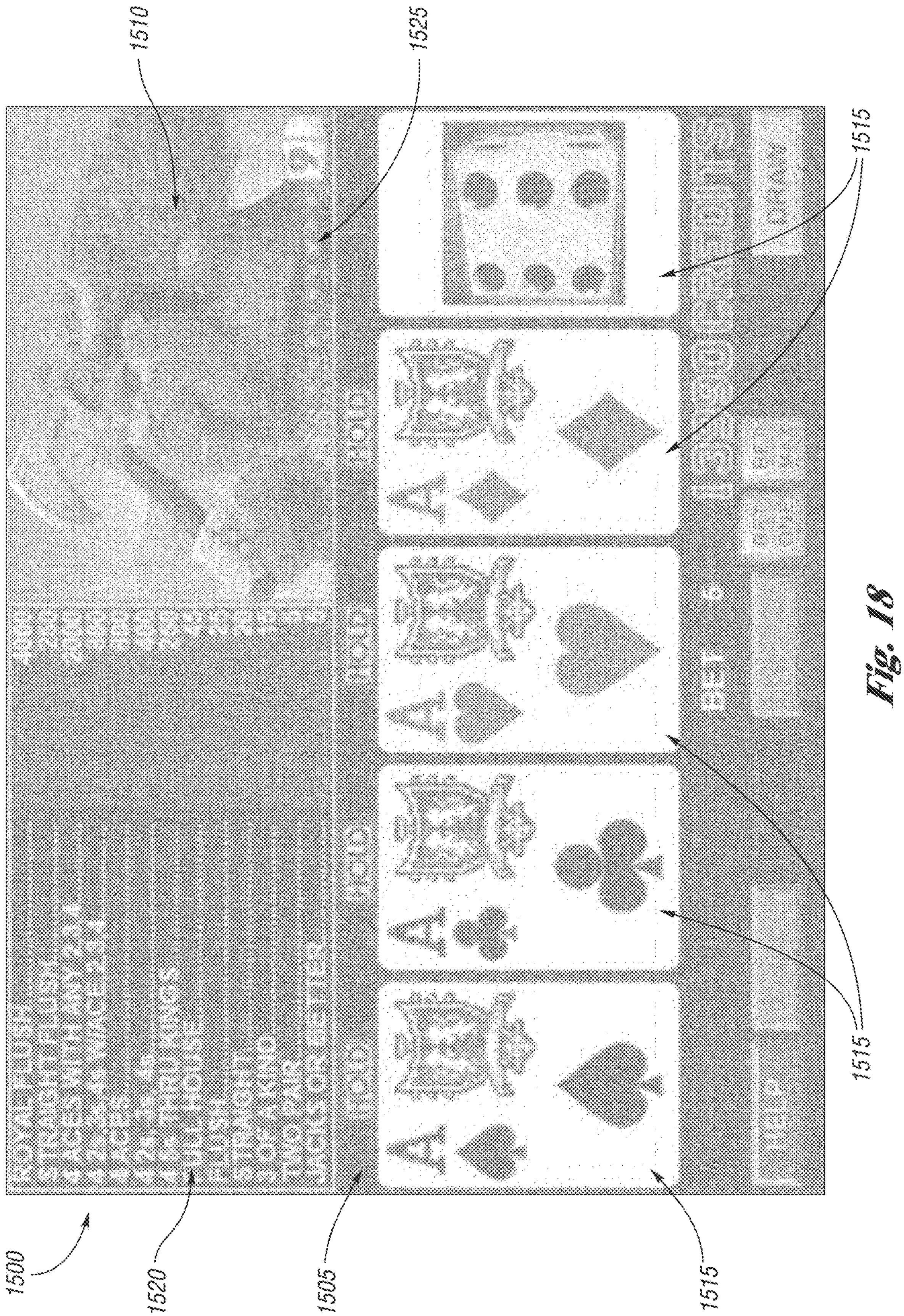
FIG. 18 illustrates a video poker game according to the embodiments of the present invention.

FIG. 18 shows a screen shot 1500 of an embodiment of the present invention with a video poker primary game 1505 instead of a slot game. As shown, the prize block 1510 sits above the video poker cards 1515 adjacent to the pay table 1520. Other arrangements are conceivable. As certain pre-established video poker hands (e.g., four of a kinds) are obtained, PIPs 1525 are collected. As detailed above, once the required number of PIPs are collected, an associated prize is awarded.

One of the benefits of the embodiments of the present invention is the ease of understanding the manner in which prizes are won. The primary game prizes are of the type players are accustom to EGMs where the secondary game prizes are easily observable based on the correspondence between the pre-established primary game symbols (e.g., dice) and the prize blocks. Whether lightning strikes or other visual features are used, players will quickly understand how the primary game outcomes impact the secondary game health values of the prize blocks.

While the detailed disclosure above focuses on the position of the dice on the primary game reels relative to the prize blocks, those skilled in the art will recognize that the relationship between the appearance of the dice and the health value of the prize blocks need not be based on position. By way of example, each die may be specifically targeted to one or more prize blocks without concern to relative position. Alternatively, each die may decrease the health value of a prize block in a randomly generated sequence.

While the detailed disclosure above focuses on a series of prize blocks, it is apparent that the embodiments of the present invention may utilize a single prize block with a single health value with all dice appearing on the primary game display serving to diminish the single health value. The single prize block may be combined with a series of prize blocks such that once the single prize block is removed, a series of prize blocks replace it.

While the detailed disclosure above focuses on an immediate award of a prize based on a prize block having zero health value, in other embodiments, the destruction of a prize block may open a new screen on which the player may win prizes based on random or skill-based activities. That is, the prize block may have a corresponding range of prizes which the player may win during play of the activity in the new screen.

While the detailed disclosure above focuses on health values being diminished, in another embodiment the health values may increase until a threshold is reached at which point a prize is awarded. Similarly, regardless of whether the health value diminishes or increases, in one embodiment, the health values may diminish or increase during a same game. That is, certain primary game outcomes may cause the health value to diminish while others cause an increase.

While the detailed disclosure above focuses on primary game outcomes impacting the health values of the bottom-most prize blocks, in other embodiments the primary game outcomes may impact any of the prize blocks present on the secondary game display. In conjunction with this embodiment, while the detailed disclosure above focuses on new prize blocks dropping or cascading into voids left by removed prize blocks, in this embodiment the prize blocks may be static such that when a prize block is removed (not having to be any of the bottommost prize blocks) a new prize block appears, taking its place without any of the other prize blocks moving. By way of example, referring to FIG. 11A, the removal of prize block 1120-5 for exhausted health value would trigger a new prize block of the same size taking its place. The new prize block may have the same or different prize value and/or health value as the prize block it replaces.

While the detailed disclosure above focuses on removed prize blocks being replaced immediately upon being removed, in another embodiment, the arrangement of prize blocks is static. In this embodiment, once all prize blocks are destroyed and removed, a completely new arrangement of prize blocks is mapped on the secondary game display. In this manner, the player must destroy all prize blocks before a new arrangement of prize blocks is presented to the player. In this embodiment, the destruction of all prize blocks may trigger an additional award to the player.

Figure 19A:
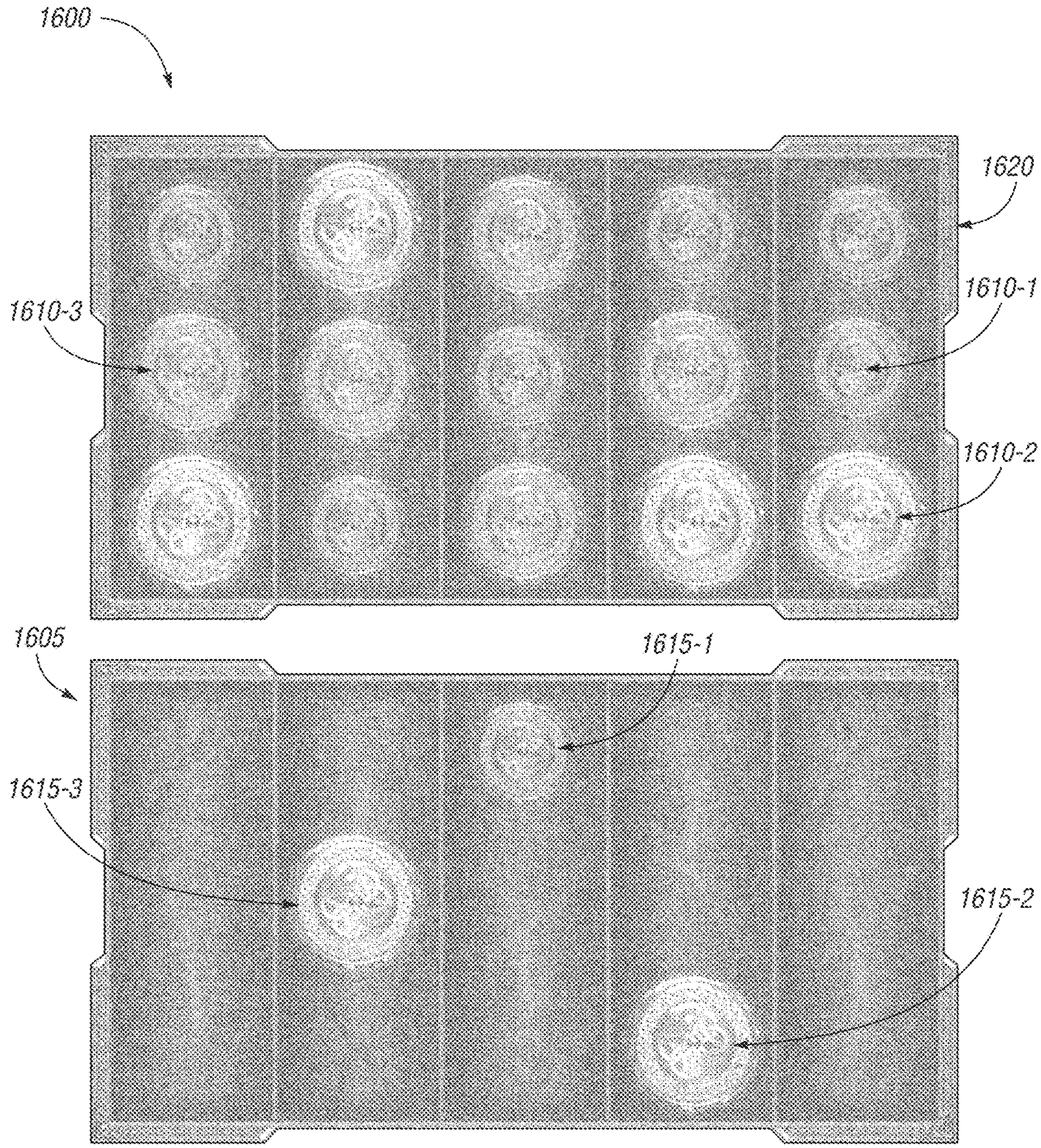
FIGS. 19A through 19G illustrate another embodiment utilizing indicia in the form of coins according to the embodiments of the present invention.
Figure 19B:
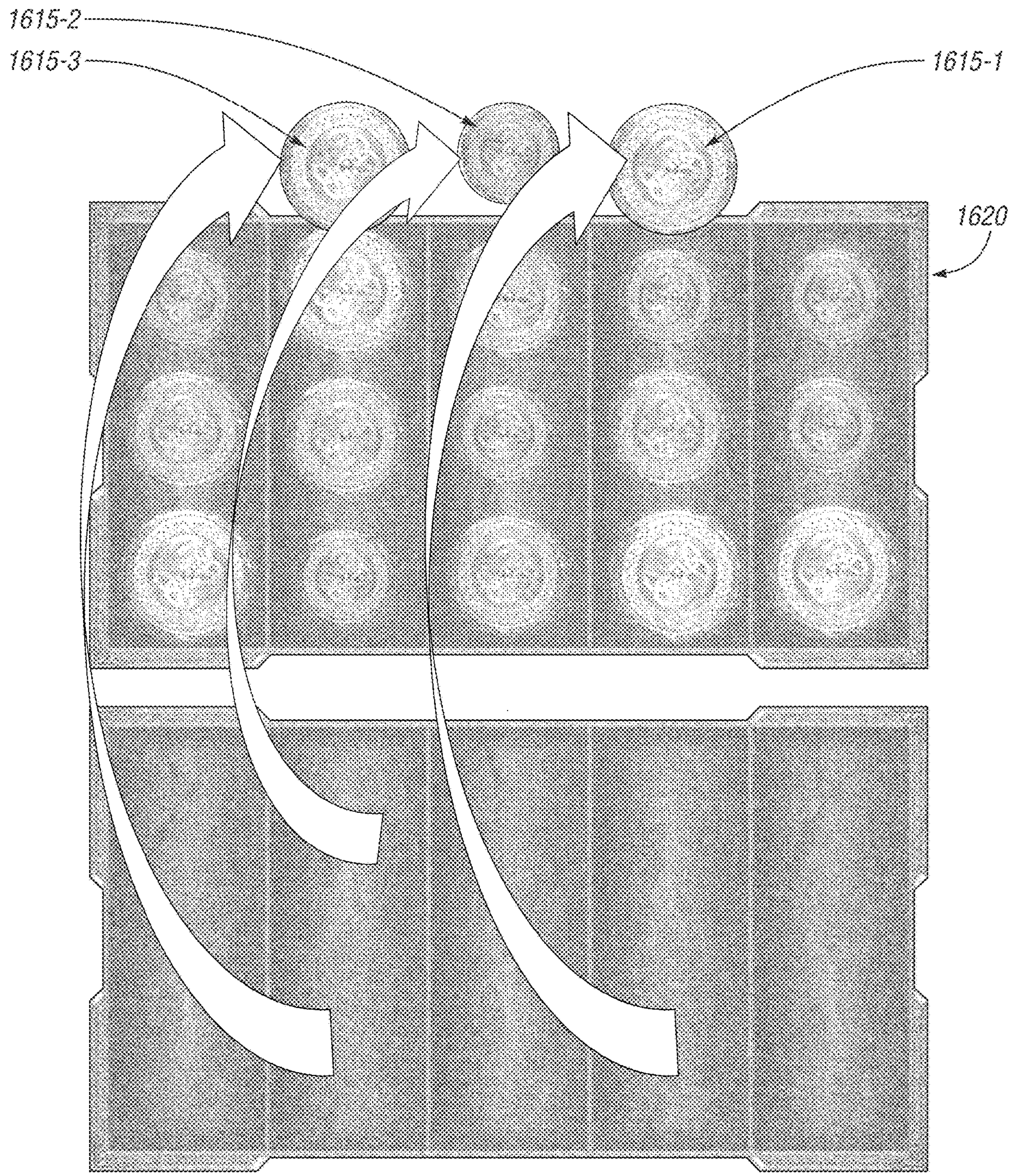
Figure 19C:
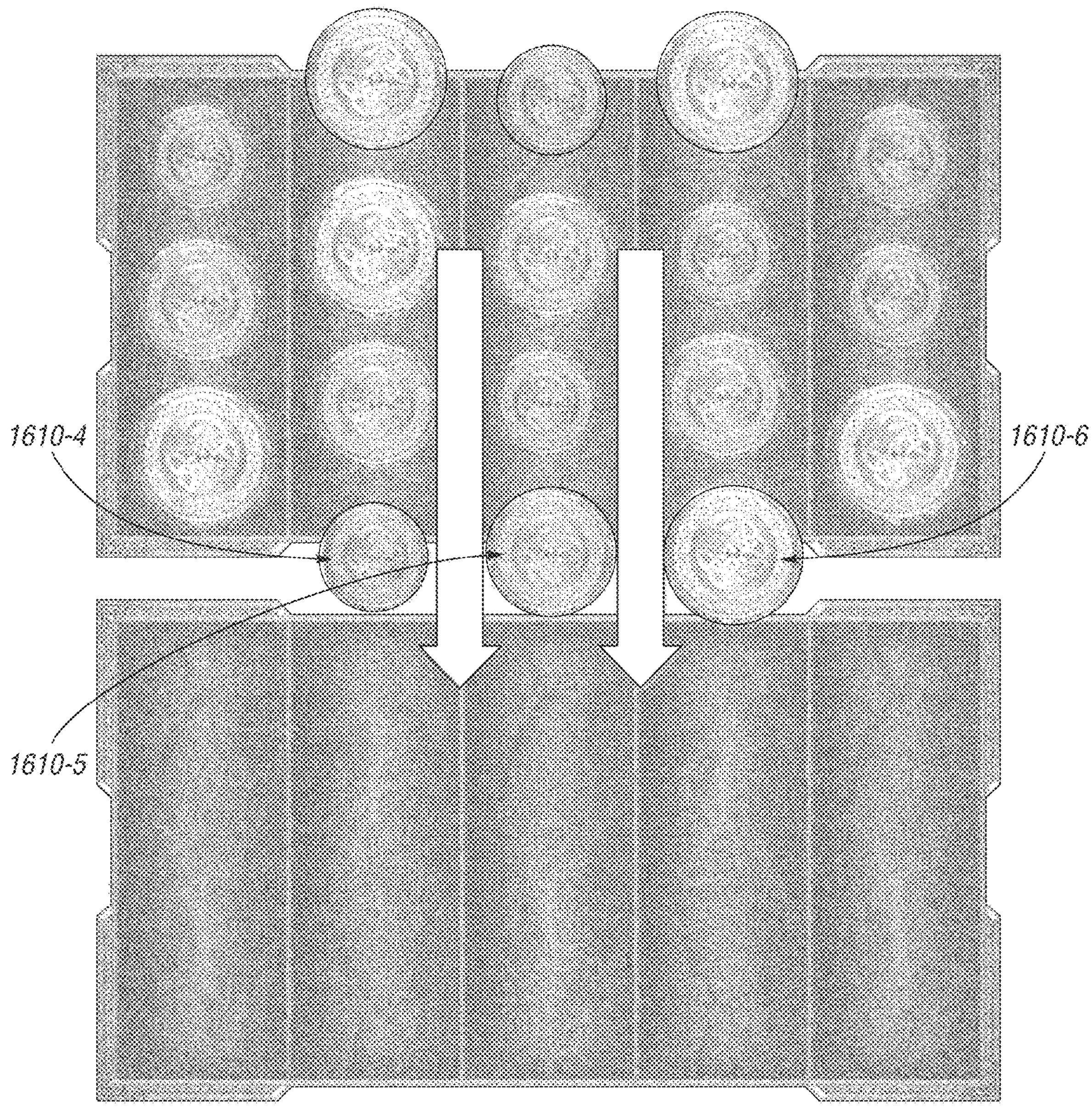

FIGS. 19A through 19C illustrate another embodiment of the present invention utilizing indicia in the form of coins. In broadest terms, as coins are added to a secondary game display, existing coins are forced downward until falling off a virtual platform. Once the coins fall from the platform, associated prizes are awarded.

Figure 19D:
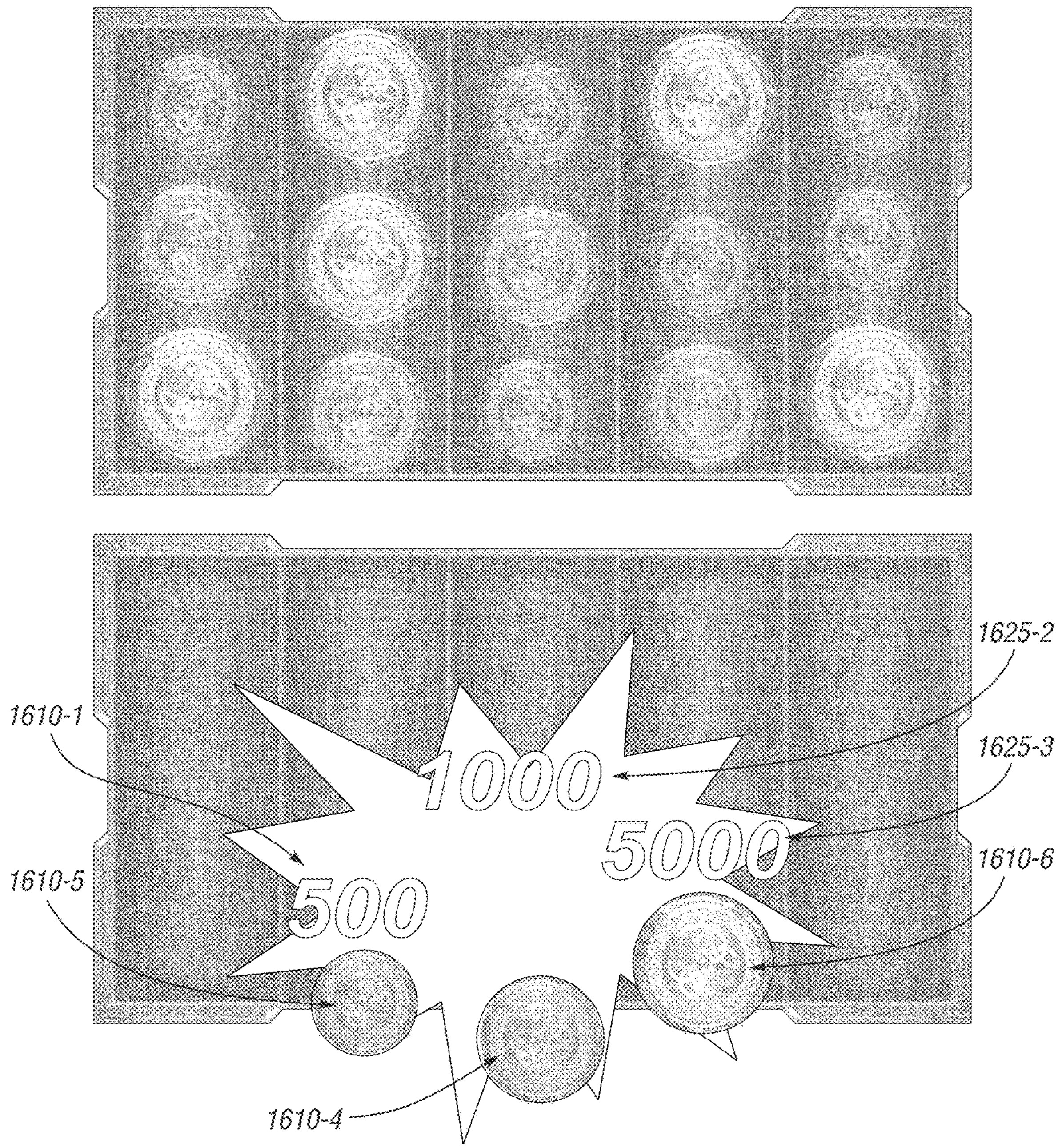

FIG. 19A shows a primary display 1600 and secondary display 1605 with various unique coins 1610-1 through 1610-3 populating the secondary display 1605. As coins 1615-1 through 1615-3 randomly appear on primary game reels, the coins, as shown in FIG. 19B, are transposed to the secondary display 1605 near the top of the platform 1620. In one embodiment, the coins 1615-1 through 1615-3 may be shown moving upward through the primary display 1600 and re-appearing as shown in FIG. 19B. Alternatively, the coins 1615-1 through 1615-3 may simply appear at the top of the platform 1620 as shown in FIG. 19B. In either instance, the addition of the coins 1615-1 through 1615-3 to the platform 1620 of the secondary display 1605 causes all existing coins, including coins 1610-4 through 1610-6, to shift downward. Since coins 1610-4 through 1610-6 were on the lowest level of the platform 1620, coins 1610-4 through 1610-6 are forced off the platform 1620 resulting in awards 1625-1 through 1625-3 associated with each coin 1610-4 through 1610-6 as shown in FIG. 19D. In one embodiment, the coins 1610-4 through 1610-6 may be shown dropping onto the primary display 1600 in conjunction with the awards being depicted.

Figure 19E:
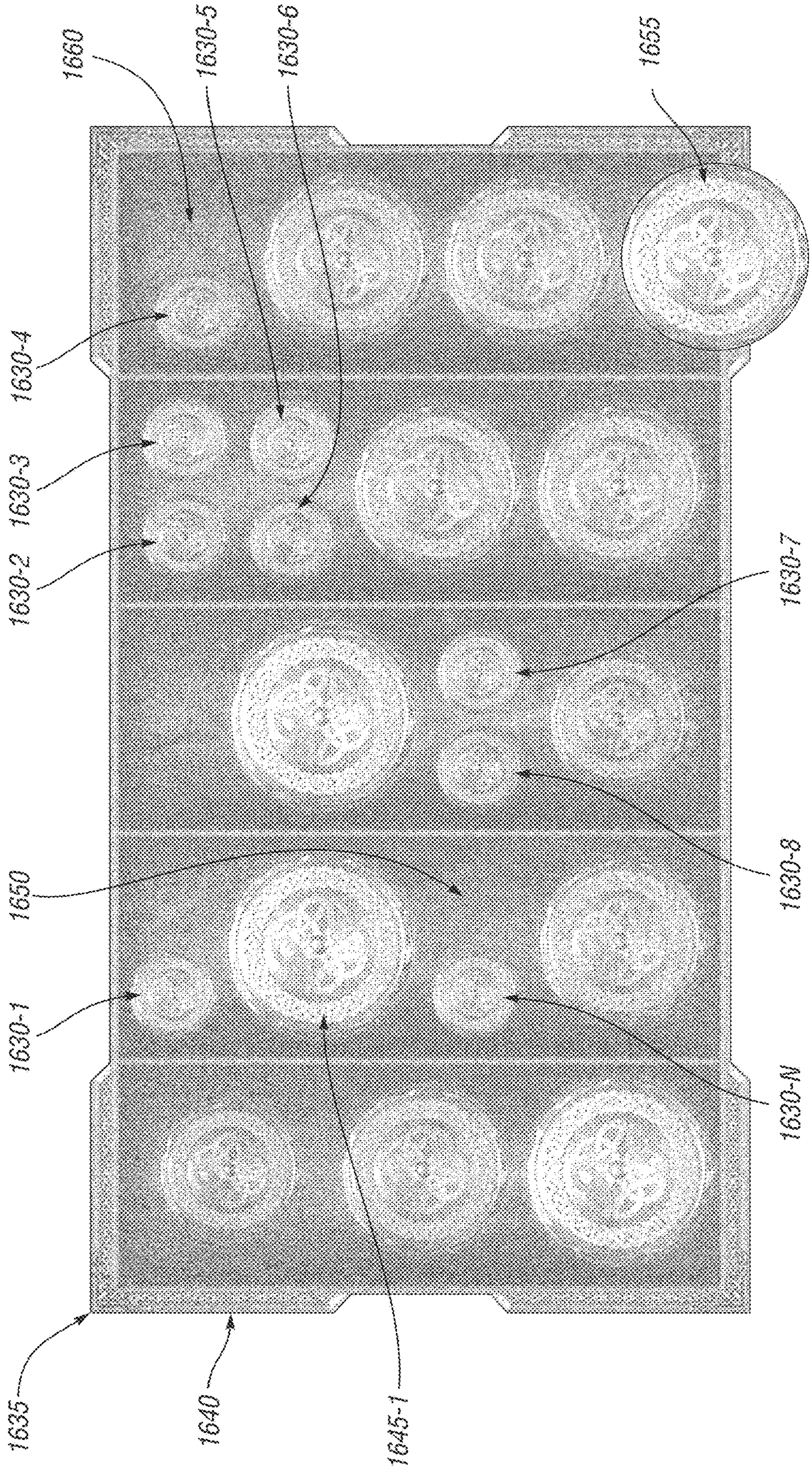
Figure 19F:
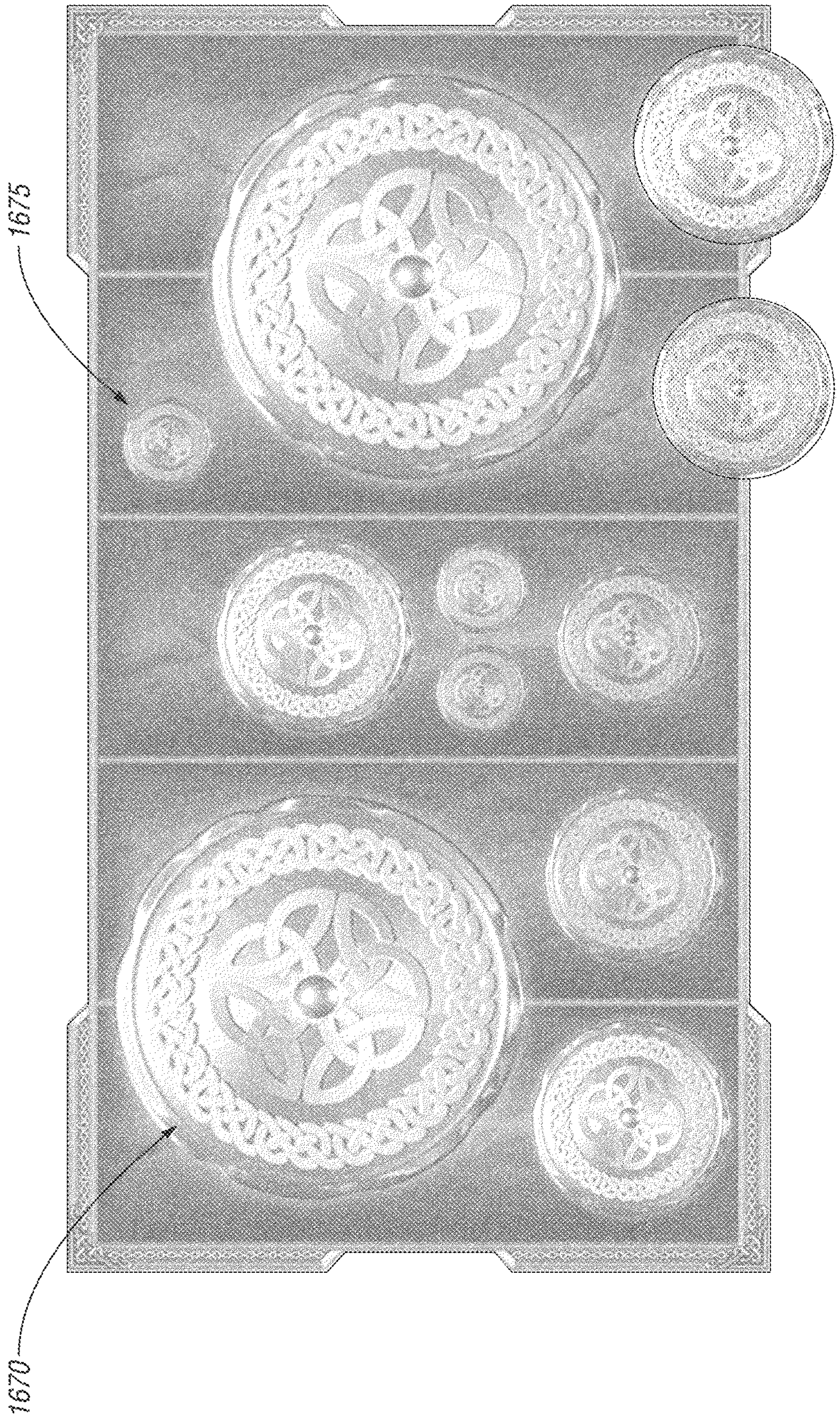
Figure 19G:
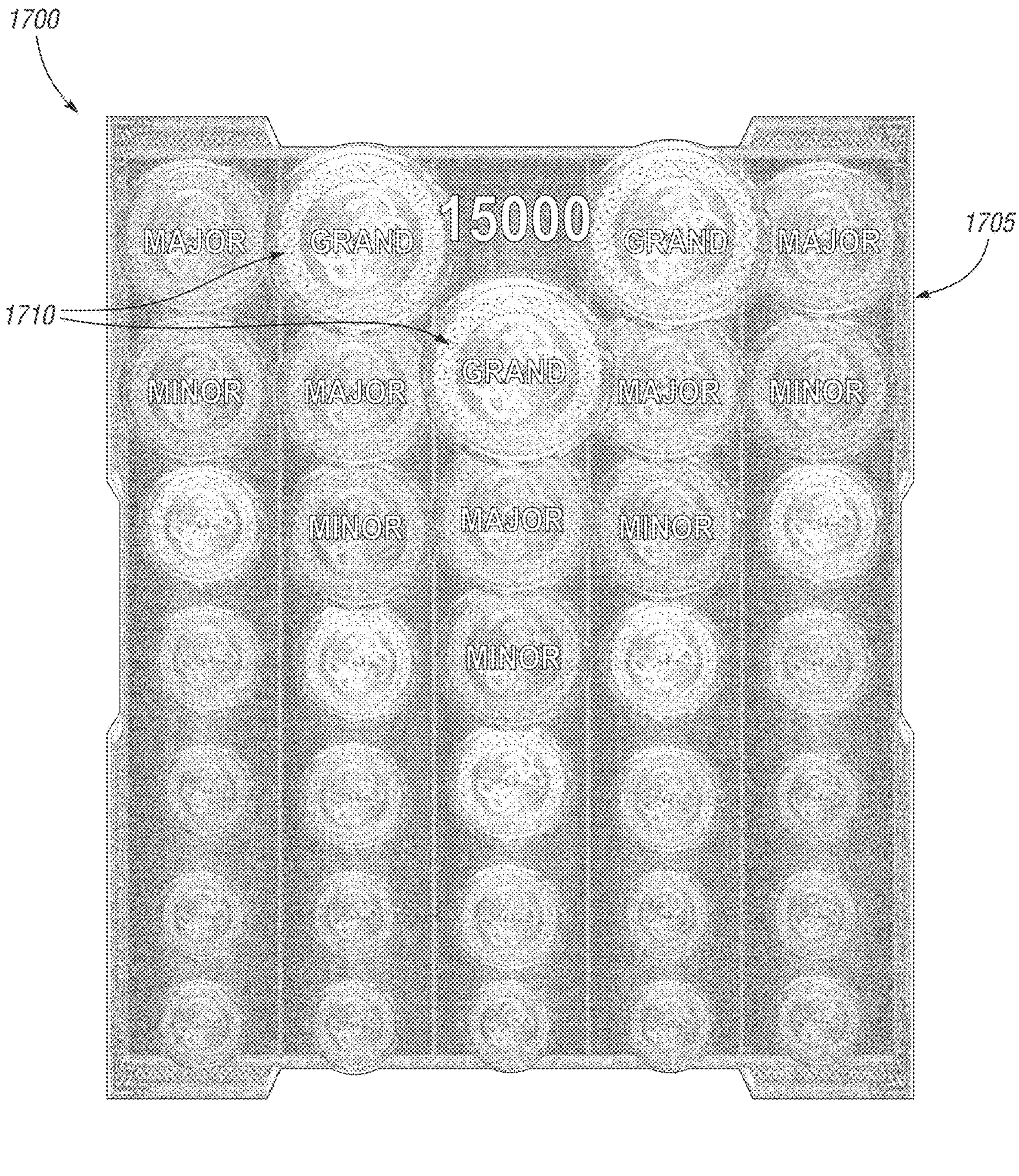

FIGS. 19E through 19G show variations of the coin embodiment of the present invention. In FIG. 19E, smaller coins 1630-1 through 1630-N are depicted whereby multiple coins sit side-by-side in the same column of the platform 1635 of secondary display 1640. Where one coin (e.g., coin 1630-4) resides at the top of platform 1635, a new small coin being transposed to the top of the same column of the secondary display 1640 fills in the open space such that no coins are forced downward. If a large coin (e.g., coin 1645-1) is transposed to the top of the same column of the secondary display 1640 as a small coin (e.g., coin 1630-N) the small coin is forced downward such that an open space 1650 exists.

FIG. 19E also shows that coins (e.g., coin 1655) may hand off the platform 1635 rather than be immediately forced off. This provides an additional layer of excitement and anticipation. Coin 1655 will only be forced off the platform 1635 if a large coin is transposed into the same column since a small coin will fill in space 1660 without forcing any coins downward.

FIG. 19F shows that larger coins covering multiple columns may be incorporated into the game. The large coins may be used to provide larger awards such as progressive awards or jackpots. Smaller coins (e.g., coin 1675) are able to fill in open spaces without forcing any coins downward.

FIG. 19G shows a secondary display 1700, platform 1705 and a high volume of coins 1710 with more valuable coins near the top of the platform 1705. In such an arrangement, the more valuable coins will take time to reach the bottom and thus will typically represent larger awards.

While coins are shown in FIGS. 19A-19G, those skilled in the art will recognize that other indicia, symbols and/or representations may be used. For example, depictions of automobiles, airplanes, zombies, playing cards, etc. may be used instead of coins. Moreover, different indicia may be combined into one game. While the coins are shown in columns on the secondary display, those skilled in the art will recognize that the coins (or other indicia) may be arranged in any random configuration conceivable. For example, the indicia may be randomly arranged on a circular tabletop such that the addition of each new indicia forces existing indicia towards the edge thereof. Once an indicia falls from the tabletop, a prize is awarded. For clarity, each new indicia need not move any existing indicia but may rather occupy an open space (e.g., a space on the tabletop not occupied by any existing indicia).

Figure 20:
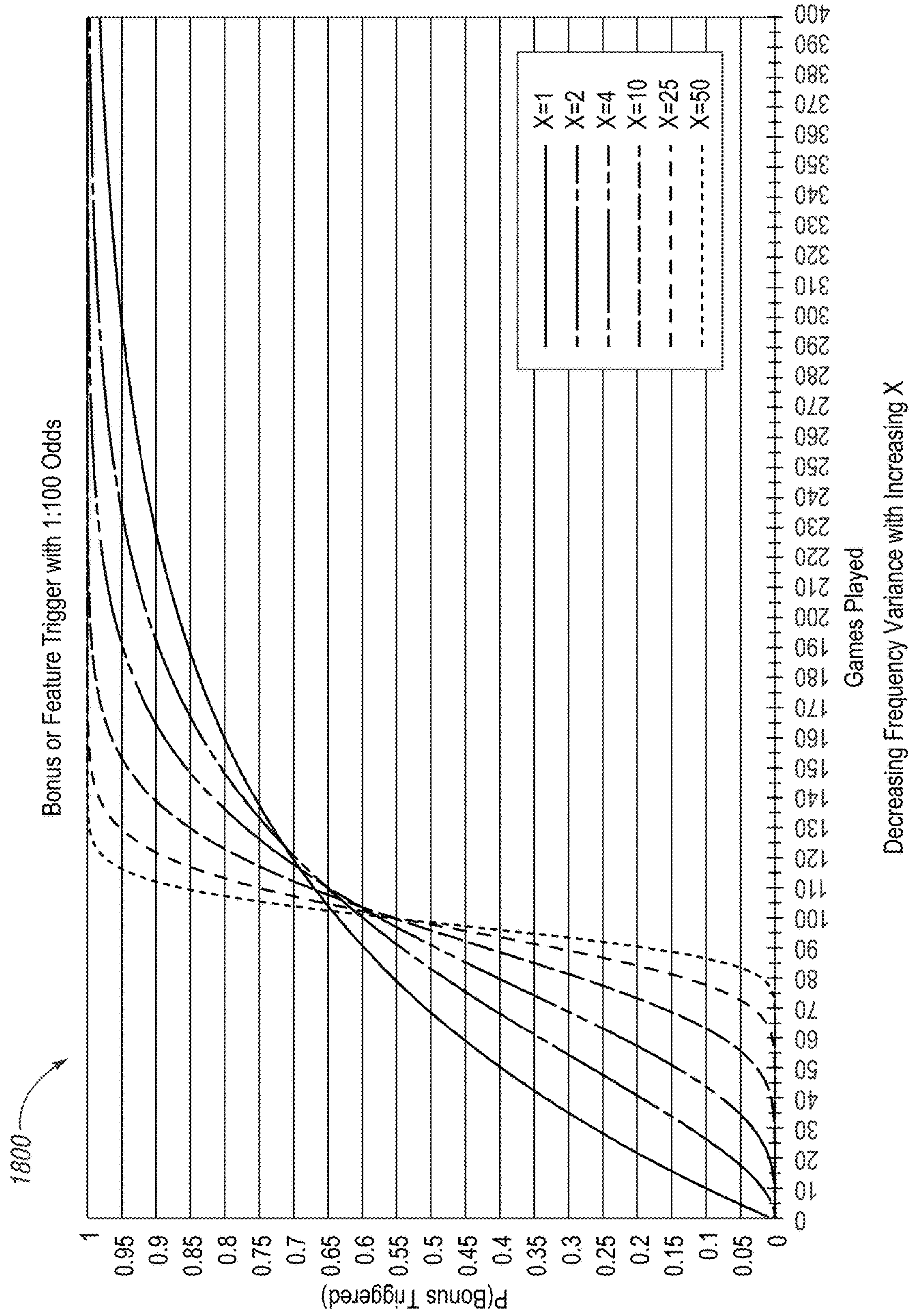
FIG. 20 illustrates a graphical representation of a mathematical payout model according to the embodiments of the present invention.

FIG. 20 illustrates a graphical representation of a mathematical variant of the present invention which divides the traditional single discrete event RNG model into a significant number of smaller discrete RNG sub-events of the present invention which greatly reduces the frequency of "cold streaks".

One threshold consideration of EGM manufacturers, game designers and mathematicians are the effects game math has on a game and its performance over time. Generally, positively performing games, e.g., those that have an average win higher than the house average game win, may remain on the casino floor over time while those underperforming games, e.g., those that have an average win lower than the house average game win, may be removed from the casino floor or need to be converted to a better performing game theme as dictated by a particular casino.

Persistent style slot games are often initially accepted by players only to be rejected later-buy why? For many games, part of the analysis resides on the volatility of a particular game. Often volatility is determined by what percentage of RTP is generated by the base game as opposed to the bonus or feature RTP. Low volatility games may have a base return of 85% and a bonus or feature RTP of 15%. These games, on average, will be quite predictable for players with limited large scale positive or negative swings that may encourage or discourage players but do provide a better chance for reaching the player's anticipated play session time before they have used up their bankroll. However, these games are often considered very dull to players and thus may have a low or unacceptable player acceptance rate.

On the other end of the spectrum are higher volatility games, such as persistent style games according to the embodiments of the present invention, which may have, for example, a base return of 50% and a bonus or feature RTP of 50% or a net base return of 45% and a bonus or feature RTP of 45%, for games where the house RTP is 90%. These games, on average, will be very unpredictable for players with a high level of large scale positive or negative swings that may encourage or discourage players. Due to the nature of the math of high volatility games, players may have a much higher chance of a "hot streak" than low volatility games but conversely, they also have a much higher chance of hitting a "cold streak" or a streak that can have a devastating effect on a player's bankroll. While many players certainly like the "big win" aspects, what they often remember most are games that have encountered a protracted "cold streak" than have effectively broken the player's bankroll for the play session. This effect from high volatility games may take a game from a player's "favorite game" to a player's "most hated game" which may mean the end of play for that game for a particular player. The overall effect of this from a manufacturer's standpoint may be the game will need to be removed from a casino or the need to be converted to a different game theme. The volatility stabilizing math payout models according to the present invention, coupled with the persistent play aspect, greatly reduces the probability of a player encountering these devastating "cold streaks".

Typical math payout models award bonuses based on a probability table such as 150:1 or 0.00666667% based on one discrete event as determined by the random number generator (RNG). For these cases, it is commonplace for the player to "miss" these discrete events. In other words, for a play session of 900 games and a probability of awarding a bonus every 150 plays, a player will be awarded, on average, a bonus 6 times during a play session. However, very often and as dictated by the laws of probability, a player will encounter sessions which may often award 7 or more bonuses in the same pool of 900 plays or conversely, award less than 6 bonuses per play session. Even the probability of hitting no bonuses during an entire 900 play session are not remote in the least.

Dividing the traditional single discrete event RNG model into a significant number of smaller discrete RNG sub-events according to the embodiments of the present invention greatly reduces the frequency of such devastating "cold streaks" and makes such games far more predictable but like previously discussed, too much predictability may not be a good thing relative to a player's expectations. By providing a combination of unpredictable standard single discrete RNG events and higher predictability increased number of smaller discrete RNG sub-events according to the embodiments of the present invention, the player may still enjoy the "hot streaks" while significantly reducing the probability of the devastating "cold streaks," which may lead to the conclusion that the game is not their "most hated game." Accordingly, the hybrid game may continue as a favorite game of the player for a much longer period. The ratio of standard single discrete RNG events and higher predictability increased number of smaller discrete RNG sub-events may vary between games and somewhat dependent of a particular game's volatility model.

In practice, dividing the traditional single discrete event RNG model into a significant number of smaller discrete RNG sub-events according to the present invention greatly reduces the frequency of such devastating "cold streaks." This is better understood by analyzing the effects for a typical player. Listed below in table 1 are exemplary starting game parameters and player wagering statistics of a typical player.

TABLE 1

| | |
|---|---|
| Number of plays per hour | 900 |
| Return to player percentage (RTP) | 90.0% |
| Bonus or feature probability | .006667 |
| Average number of bonuses per hour | 6 |
| Volatility base return/bonus return | 50%/50% |
| Volatility net base return percentage | 45.0% |
| Volatility net bonus return percentage | 45.0% |
| Average Wager | $1.00 |
| Player starting bankroll | $300 |
| Player anticipated play session time | 4 hours |

Under hypothetical conditions and simplified mathematical analysis for illustration purposes, where the bonus or feature is awarded exactly every 150 plays on a 90% RTP game, the player may expect to lose 10% of each wager made or spin of the game or $0.10 per spin or play. Accordingly, a player with a $300 bankroll would expect to go through their entire bankroll in just less than 4 hours or 3,000 total number of plays. Totals very close to the player's anticipated play session time of 4 hours.

Under these hypothetical conditions and simplified mathematical analysis for illustration purposes only, adjusting for the probability of a bonus or feature occurrence, if a player were to miss the first 3 trigger points of 150, 300, and 450, the player would have exhausted their initial bankroll of $300 in about 37 minutes. Far from their anticipated play session time. Such an occurrence could be considered an example of moving that particular game from a "favorite game" to the "most hated game" category, potentially leading to that player never or seldom playing that game again. Under the conditions above, this "cold streak" occurrence will happen every 8 playing sessions.

However, when the increased number of smaller discrete RNG sub-events are implemented by dividing it into 4 smaller discrete sub-events, the probability of the player hitting the "cold streak" described above is greatly reduced from 8:1 to 32:1.

Referring to the graph 1800 of FIG. 20, a more precise examination may be shown. The examination relates to a bonus trigger within a game wherein the bonus trigger occurs with 1:100 odds. FIG. 20 shows the probability of having achieved the bonus after n games for various X values. The X=1 (see legend) case represents the typical case of triggering with 1 successful event with a probability of success of 1 in 100. For X=1, a 95% probability of having triggered the bonus at least once is not achieved until after 298 games. For X=50, however, we achieve a 95% probability of having triggered the bonus after only 117 games. This represents a dramatically lower amount of variance in the frequency of triggering the bonus, virtually eliminating the possibility of a significant "cold streak" in between trigger events. Conversely, the X=1 case achieves a 5% probability of having triggered the bonus after only 6 games, while for X=50 the probability of having achieved the bonus is 0% until the $50^{th}$ game and does not reach 5% until 84 games. So, while X=50 does virtually eliminate the "cold streaks," it also limits the possibility of any "hot streaks." Smaller values of X represent a more balanced approach. X=4, for example, achieves a 5% probability of the bonus after 35 games and a 95% probability of the bonus after 192 games.

For a random event with a probability p of occurring, the number of expected occurrences of the event over n trials is:

$$\boxed{\mu = np}$$

7 and the variance in the number of expected occurrences is:

$$\boxed{v = np(1-p)}.$$

For an event with odds of 1:100 over 100 trials, one event occurrence with a standard deviation of ~0.995 over the 100 trials is expected. The large standard deviation relative to the expectation value can lead to excessively long "cold streaks" for the event, as well as occasional "hot streaks" where the event may occur multiple times more than expected over a short interval. Alternatively, the same number of expected event occurrences can be achieved over an interval n whilst also reducing the variance on the number of occurrences over the interval by modeling an event with probability p as being the accumulation of X successful sub-events, each with probability $$\boxed{p_{sub} = Xp}.$$

The variance, $$\boxed{v_{sub} = np(X - pX^2)},$$

gains a dependence on X and approaches 0 as $$X \to \frac{1}{p}.$$

A drawback of this approach is that a minimum gains a dependence on X and approaches 0 as of X trials must occur before it is possible for the event to occur.

Using the embodiments of the present invention detailed herein, bonus triggers and low probability awards can be designed to be awarded at much more regular intervals whilst still maintaining an entirely random selection process and as previously discussed, when this system is used in conjunction with the standard single event trigger in a balanced manner, player expectations can more easily be met.

Figure 21A:
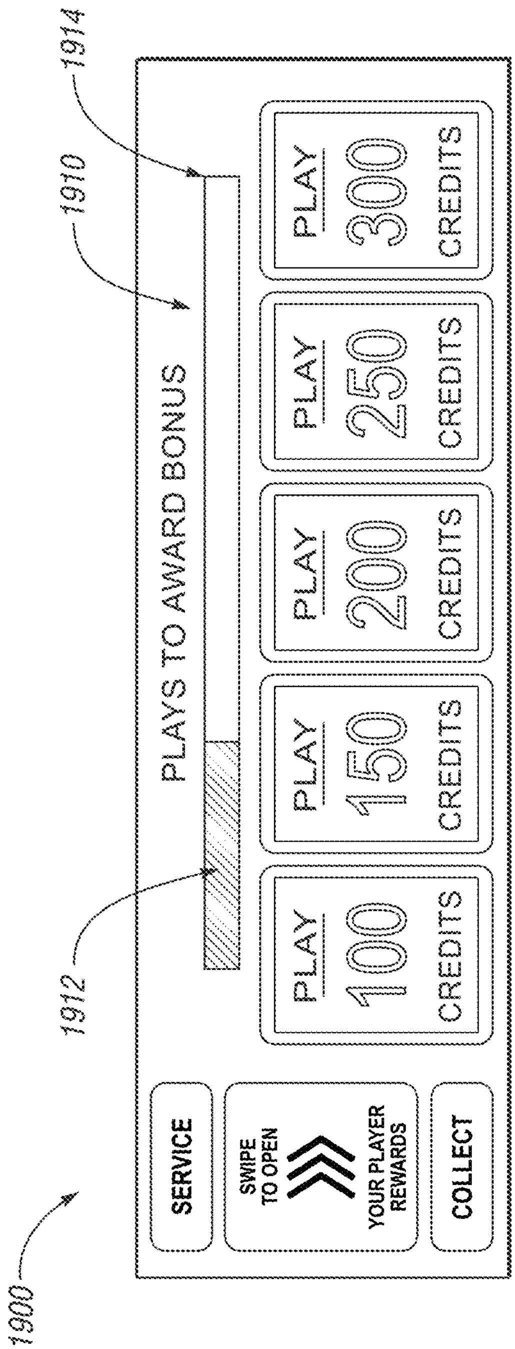
FIGS. 21A through 21D illustrate screen shots of an exemplary button deck having a countdown based on the unique bonus trigger model according to one embodiment of the present invention.
Figure 21B:
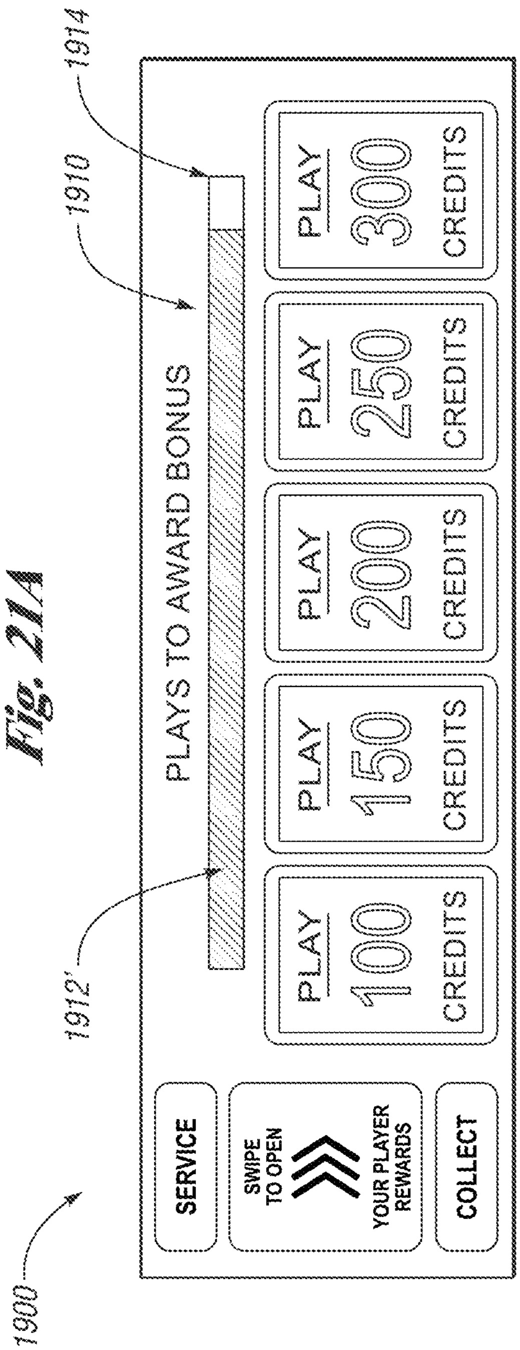
Figure 21C:
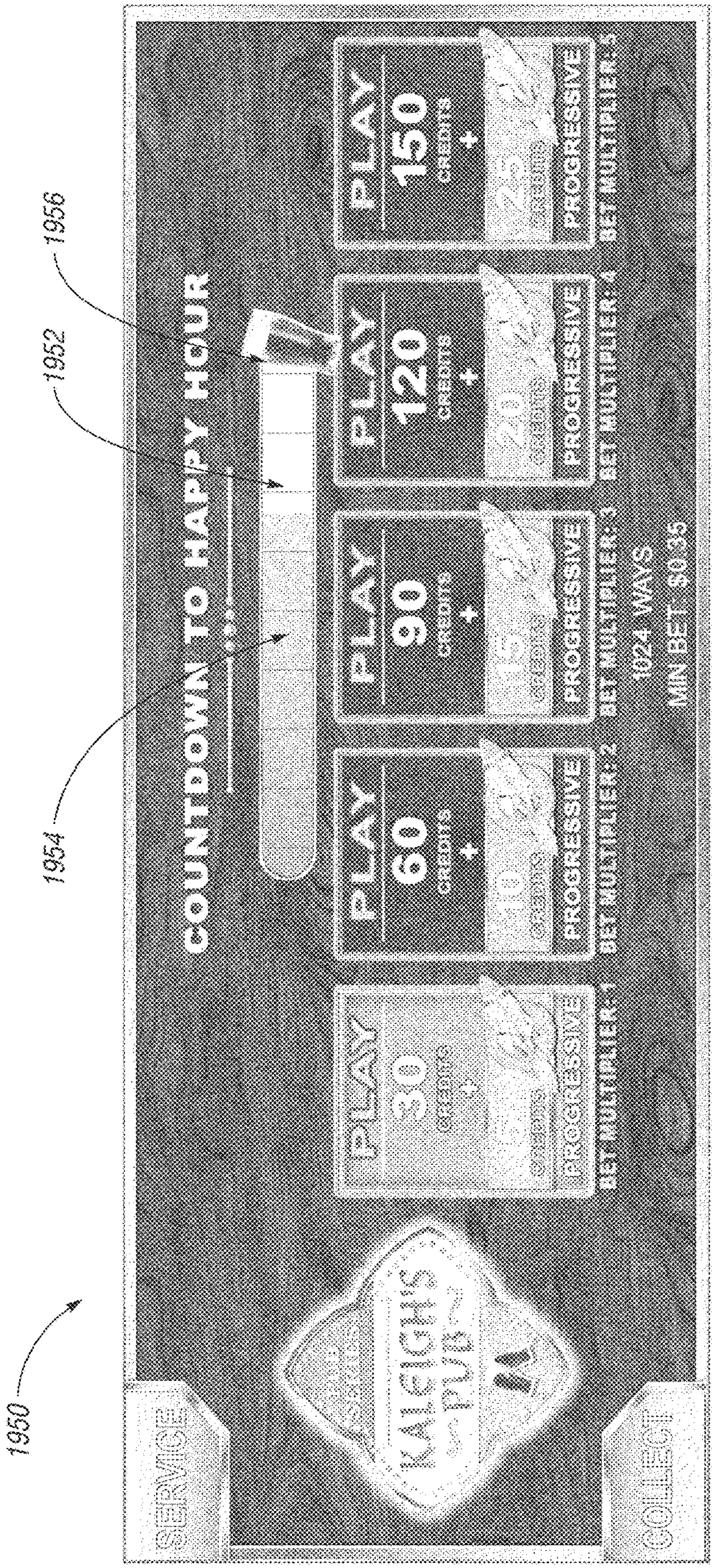
Figure 21D:
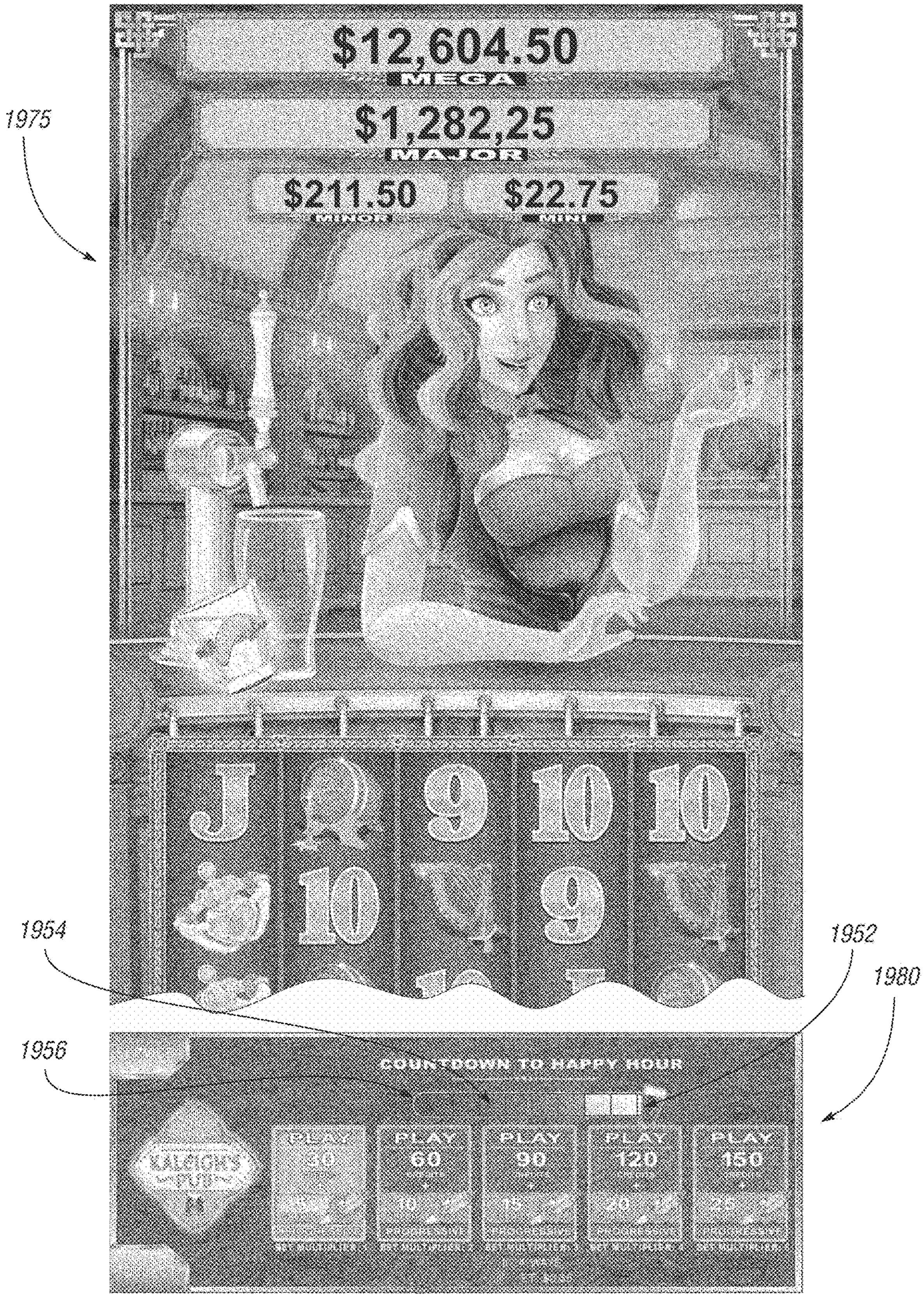

FIGS. 21A through 21C illustrate representative metering systems located on a touch screen LED button deck 1900 utilizing the embodiments of the present invention. When the higher predictability increased number of smaller discrete RNG sub-events is implemented, a meter 1910 of some type, as well known in the art, such as circular meters, bar graphs, pie style meters, etc., may be employed which may provide the player an indication of how many smaller discrete RNG sub-events have occurred 1912 and therefore, how many additional smaller discrete RNG sub-events need to occur to trigger the bonus or feature. For example, if the number smaller discrete RNG sub-events to trigger a bonus or feature is 10, the meter shows, either exactly or illustratively only, the meter progressing to the trigger point 1914. FIG. 21A shows the meter 1910 about 25% of the way 1912 to a bonus award while in FIG. 21B the meter 1910 has progressed to about 95% of the way 1912' to a bonus award. Accordingly, a player is alerted that a bonus or feature is closer to being awarded. If the number smaller discrete RNG sub-events to trigger a bonus or feature is 10 and 1 event has already occurred, the probability of hitting that bonus or feature is 135:1 for the last 9 sub-events for a game with math designed to award a bonus or feature every 150 plays. In such cases, the player visibly understands that the game is far from awarding a bonus or feature in which case they may leave or bypass the particular game. Accordingly, it may be preferable to start a meter, without any indicia or precise accuracy, at a non-zero point so not to alarm a player that a feature or bonus occurrence may be harder to reach. Conversely, if the number of smaller discrete RNG sub-events to trigger a bonus or feature is 10 and 9 sub-events have already occurred, the probability of hitting that feature or bonus is 15:1 for the last event. In such cases, the player visibly understands that the game is close to awarding a bonus or feature. FIGS. 21C and 21D show an exemplary button deck 1950 using a pub theme 1975. In this instance the meter 1952 is identified as countdown to Happy Hour about 75% of the way 1954 to a bonus award or feature shown as a glass of beer 1956. Those skilled in the art will recognize that the terms "bonus" and "feature" may be used interchangeably.

One advantage of providing sub-event wins (i.e., ticket accumulation) on losing primary game outcomes is that it causes players to feel like they have won something rather than simply lost the wager. That is, while not winning a monetary award related to the primary game outcome, the player has collected one or more tickets thus improving chances of reaching the threshold number of tickets associated with a prize award. Players are thereby encouraged and therefore tend to play longer. When players win one more tickets along with a monetary award related to the primary game outcome, players are once again encouraged and therefore tend to play longer.

FIGS. 22A through 22L show screen shots of the operation of one embodiment of the bonus game responsive to a primary game outcome triggering the bonus game. In this embodiment, players collect tickets whereby an accumulated threshold number of tickets causes a prize to be awarded.

Figure 22A:
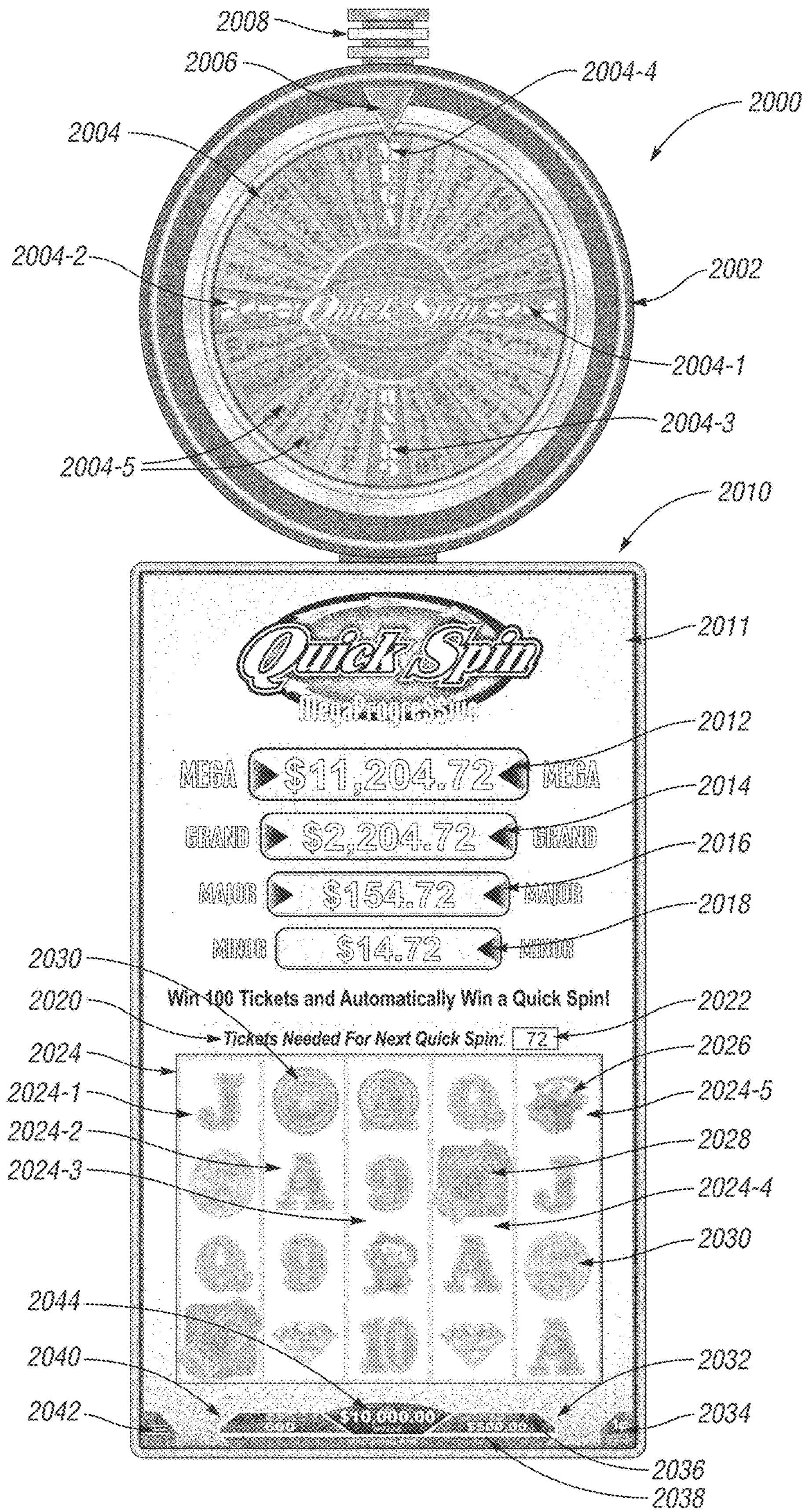
FIGS. 22A through 22K illustrate screen shots of an exemplary game utilizing the unique bonus trigger model according to one embodiment of the present invention.

FIG. 22A illustrates an electronic gaming machine with a game dividing the traditional single discrete event RNG model into a significant number of smaller discrete RNG sub-events to reduce the frequency of "cold streaks" and make such games far more predictable. While smaller discrete RNG sub-events may effectively be a binary outcome, either awarded sub-events or non-awarded sub-events, they may also award random or pre-assigned outcomes to increase randomness while continuing to reduce "cold streaks."

Electronic gaming machine 2000 includes a cabinet portion 2010 and a wheel topper 2002 which is mounted above the cabinet portion 2010. Further, the wheel topper 2002 may include a "candle" 2008 which when lit alerts the casino staff of various events that pertain to that particular electronic gaming machine such as the top LED ring being energized, signaling a machine malfunction, the center LED ring being energized to signal the electronic gaming machine needs service or the bottom LED indicating that a hand-pay is required as the player has won an amount either above the casino limit or an amount above the Internal Revenue Service limit, requiring the casino to provide a Form W2-G to the player prior to paying the player. While three LED rings are illustrated, they may take various similar forms to accomplish the same functions and may further be color-coded to assist the casino staff of what service may be required.

As shown, the wheel topper 2002 includes an inner portion that digitally or mechanically represents differing slices of the wheel 2004 and indicia 2004-1, 2004-2, 2004-3 and 2004-4, which represent a minor award, a major award, a grand award or a mega award, respectively, indicating what the player has won when the slice aligns with the illuminated indicator 2006. Wheel 2004 also includes a number of other awards a player may receive. Those skilled in the art will recognize that any type wheel configuration or indicia may be utilized and the wheel topper may be configured to provide many other game play options for the game play such as appearing to be a bubble gum machine, a large flipping coin, independent prize icons, an hour glass, etc.

Electronic gaming machine 2000 may be controlled by mechanical buttons, electromechanical buttons, electronic buttons, LED touch screens or similar as well known in the art (not shown). Such controls may include but not limited to play buttons, denomination buttons, sound adjust buttons, help buttons, speed buttons, etc.

Electronic gaming machine cabinet 2010 includes a portrait-oriented display 2011. Although a single portrait display is illustrated, other display configurations are possible such as dual landscape-oriented displays, triple landscape-oriented displays, single landscape-oriented displays, etc. and may include flat screens, curved screens, j-curve screens, wave shaped screens, etc.

The persistent game illustrated includes dividing the traditional single discrete event RNG model into a significant number of smaller discrete RNG sub-events to reduce the frequency of "cold streaks" making such games more predictable. The embodiments of the present invention also award random or pre-assigned outcomes to at least one or more sub-events to increase randomness while continuing to reduce "cold streaks." In the case of the embodiments of the present invention, the random outcomes to the sub-events are achieved by awarding tickets to the player based on predetermined criteria. The number of tickets awarded may be determined by the random number generator and may provide ranges of awards such as 1 to 10 tickets, 1 to 25 tickets, 10 to 50 tickets, etc. Once a predetermined number of tickets have been awarded to a player, the player is awarded a bonus game which in this case is a wheel-based game where the player initiates a wheel spin to determine the award once the digital wheel comes to a stop. Those skilled in the art will recognize that wheel spins are only one of many bonus types that may be awarded to a player. Other bonus types may include free games, multipliers, a different secondary bonus game, etc. or any combination thereof.

The wheel spin bonus according to the embodiments of the present invention provide a plurality of different player awards as illustrated by wheel 2004. If the wheel lands with the wheel slice 2004-1 in the 12 o'clock position, the player is awarded the minor progressive amount 2018, if the wheel lands with the wheel slice 2004-2 in the 12 o'clock position, the player is awarded the major progressive amount 2016, if the wheel lands with the wheel slice 2004-3 in the 12 o'clock position, the player is awarded the grand progressive amount 2014, and if the wheel lands with the wheel slice 2004-4 in the 12 o'clock position, the player is awarded the mega progressive amount 2012. Generally, the progressive amounts are incremented to a higher amount based on coin-in or other similar criteria. Alternatively, other awards may be made such as a number of "punches" to be used in the final stages of the bonus game as illustrated by wheel slices 2004-5.

Located on the display 2011 is a digital representation of a plurality of video reels 2024. As illustrated, video reels 2024 may include a number of individual video reels 2024-1, 2024-2, 2024-3, 2024-4 and 2024-5. The video reels may also include a number of symbols that when arranged in a predetermined pattern or sequence, provide the player with an award. For example, video reels 2024 may include a character symbol 2026, a free spin symbol 2030, a free ticket symbol 2028 or a free game symbol 2030. Many other symbols, such as "royal symbols" (9, 10, jack, queen, king or ace) may also exist along with other symbols such as jewels, dollar bills, coins with monetary or credit values, etc.

The display 2011 may also include a game status information area 2032 which provides information such as bet amount 2040, win amount 2044, if any, credit of monetary balance 2036 and messaging area 2038. In addition, other function buttons may be included such as an information and function button 2042 that may switch to alternative screens such as help area screens, sound adjust, speed adjust, etc., and/or a denomination change button 2034 which allows the player to change the standard denomination of bet, i.e., 1¢, 5¢, 25¢, 50¢, $1, $2 or $5.

The display 2011 may also include a counter information area 2020 that provides the player information on how close they are to being awarded a bonus spin, as shown in window 2022. The bonus or "Quick" spin is conducted via wheel 2002. As illustrated, a bonus, or in this case a "Quick" spin, is awarded when the player has accumulated a total of 100 tickets or more. If a player is awarded a number of tickets in excess to that required, the game may be programmed to delete the number of tickets in excess of 100 or may roll over the excess ticket to another game. Although this embodiment provides the player with an exact number of tickets remaining to accumulate for a bonus spin to be awarded, those skilled in the art will recognize that the player need not be provided with exacting information but instead could be provided with a graphical representation such as a bar graph, circular graph, etc. that only provides an estimation of tickets remaining to accumulate. Moreover, it may be advantageous to start such a representation at a non-zero position so not to overly concern a player that the bonus if far away. In such cases, the graphical representation could start at a one-third or one-half position, for example.

Figure 22C:
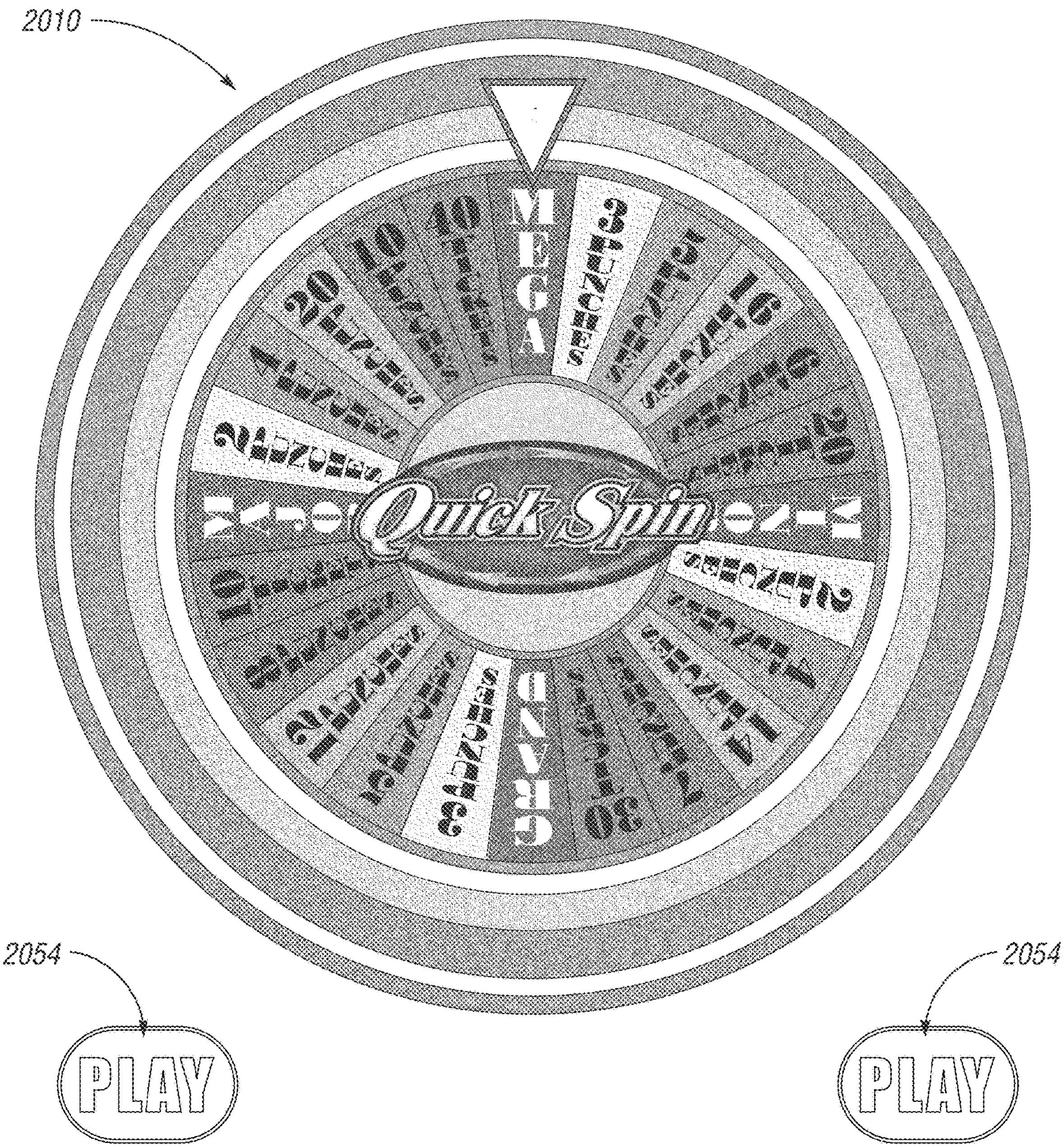
Figure 22B:
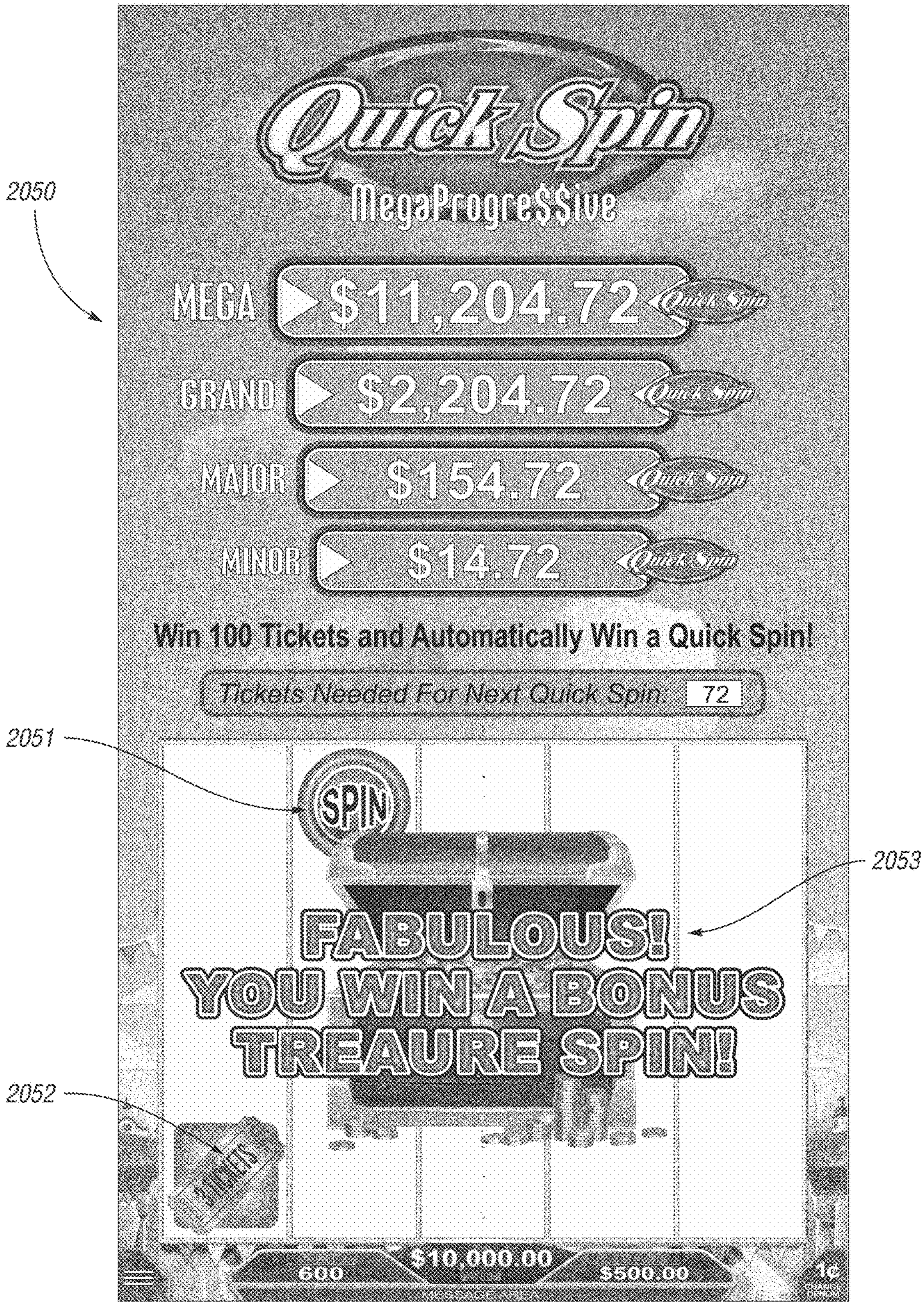

FIG. 22B shows a screen shot 2050 of a primary slot game outcome triggering the bonus game. In one embodiment, the bonus game is triggered about 1% of the primary game spins. Those skilled in the art will understand that the percentage may be less than or greater than 1%. In this instance, the slot game outcome is Spin Icon 2051 aligning along an active payline. As shown, the player also wins 3 tickets based on the Ticket Icon 2052 aligning along an active payline. Optionally, the primary game screen may display a notice 2053 of the bonus game being triggered.

Figure 22D:
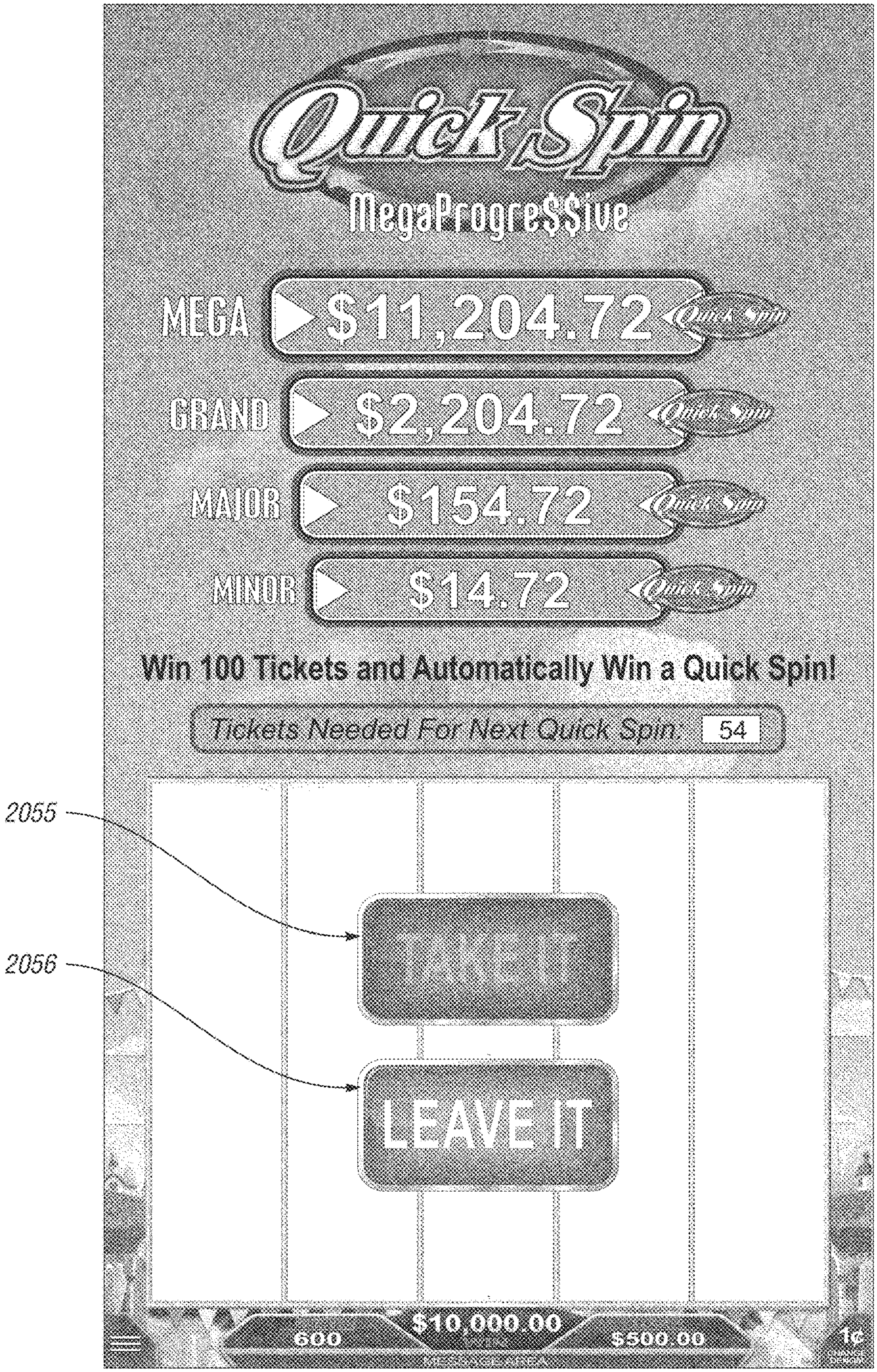
Figure 22E:
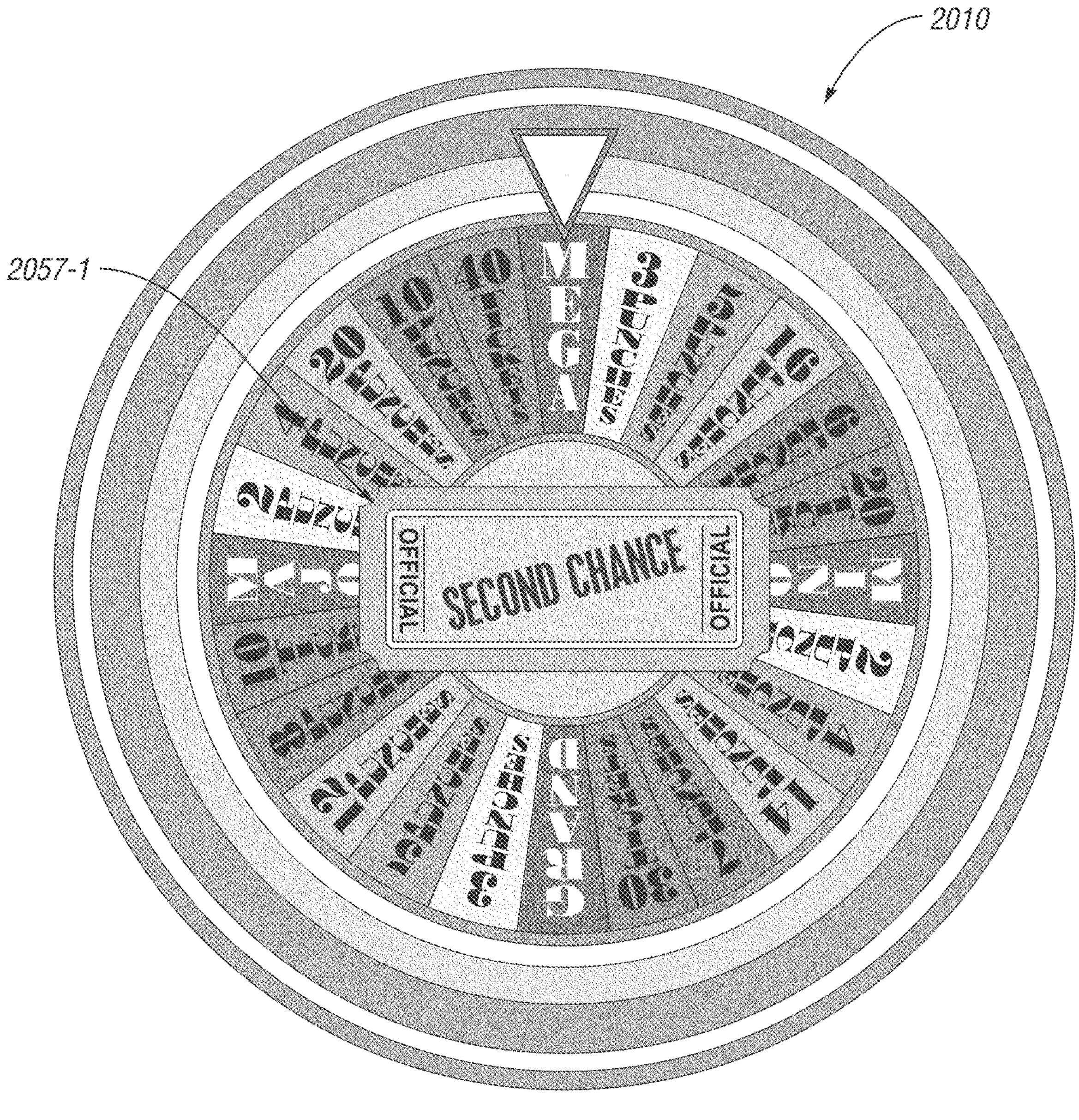
Figure 22F:
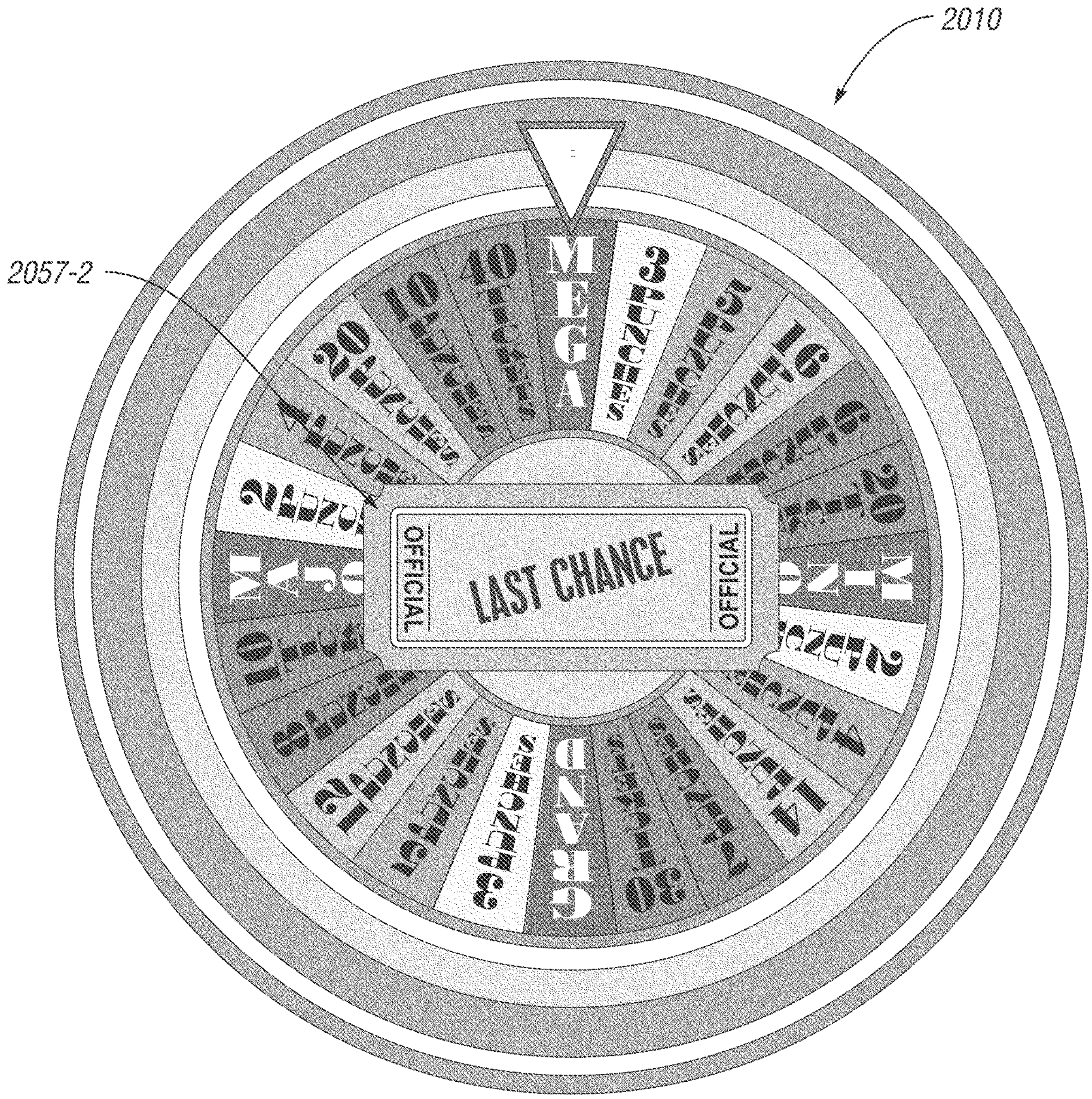

FIG. 22C shows the bonus wheel 2010 ready for player activation via one or more play icons 2054. FIG. 22D shows an optional take it or leave feature whereby the player may either keep a bonus wheel prize via a Take It icon 2055 or elect to try again for a better prize via a Leave It icon 2056. In one embodiment, the player has three chances to spin the bonus wheel 2010. Those skilled in the art will understand that the player may be permitted to spin the bonus wheel 2010 more of less than three times. FIGS. 22E and 22F show the bonus wheel 2010 with indications of the spin number 2057-1 (second chance) and 2057-2 (last chance).

Figure 22G:
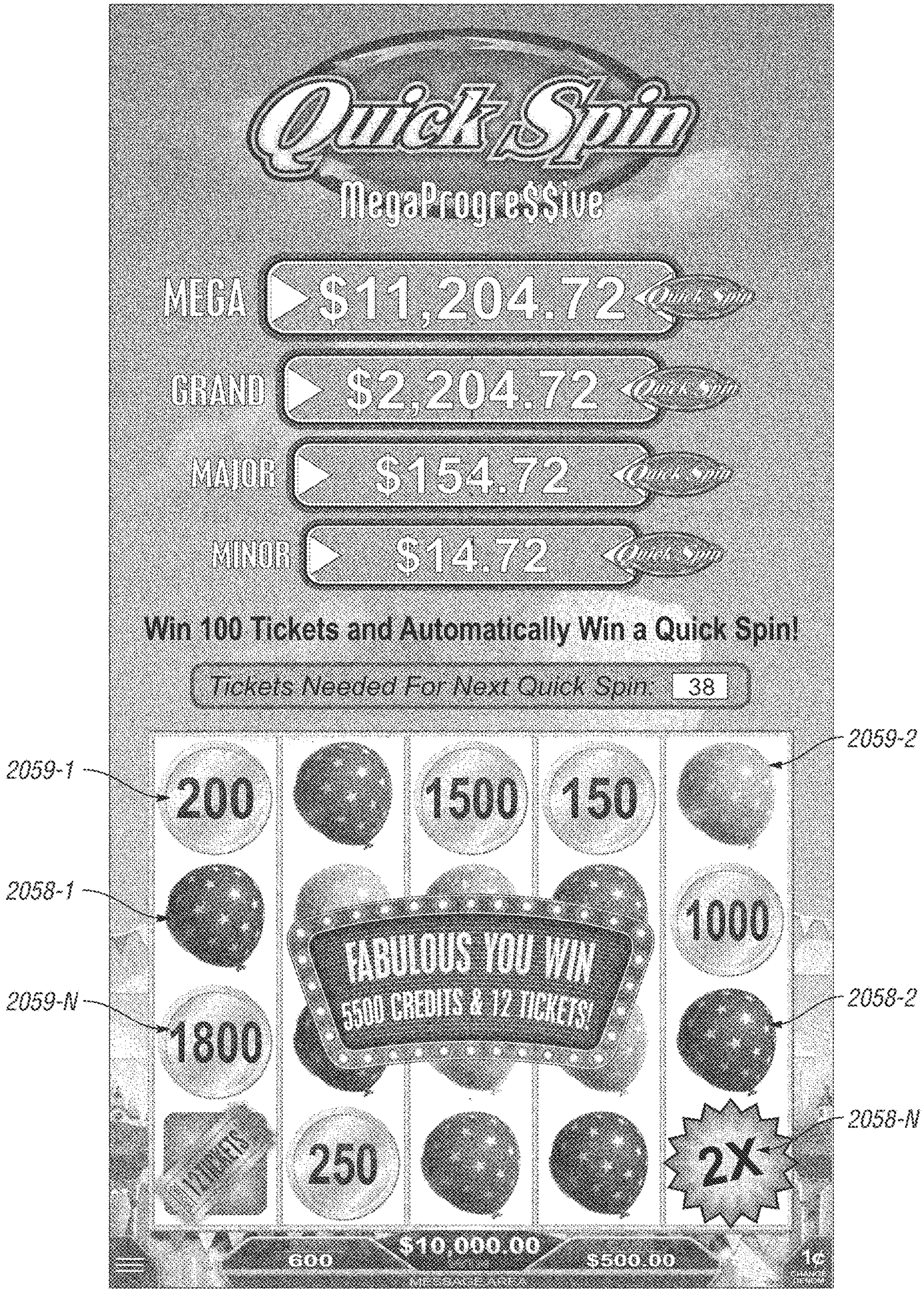
Figure 22H:
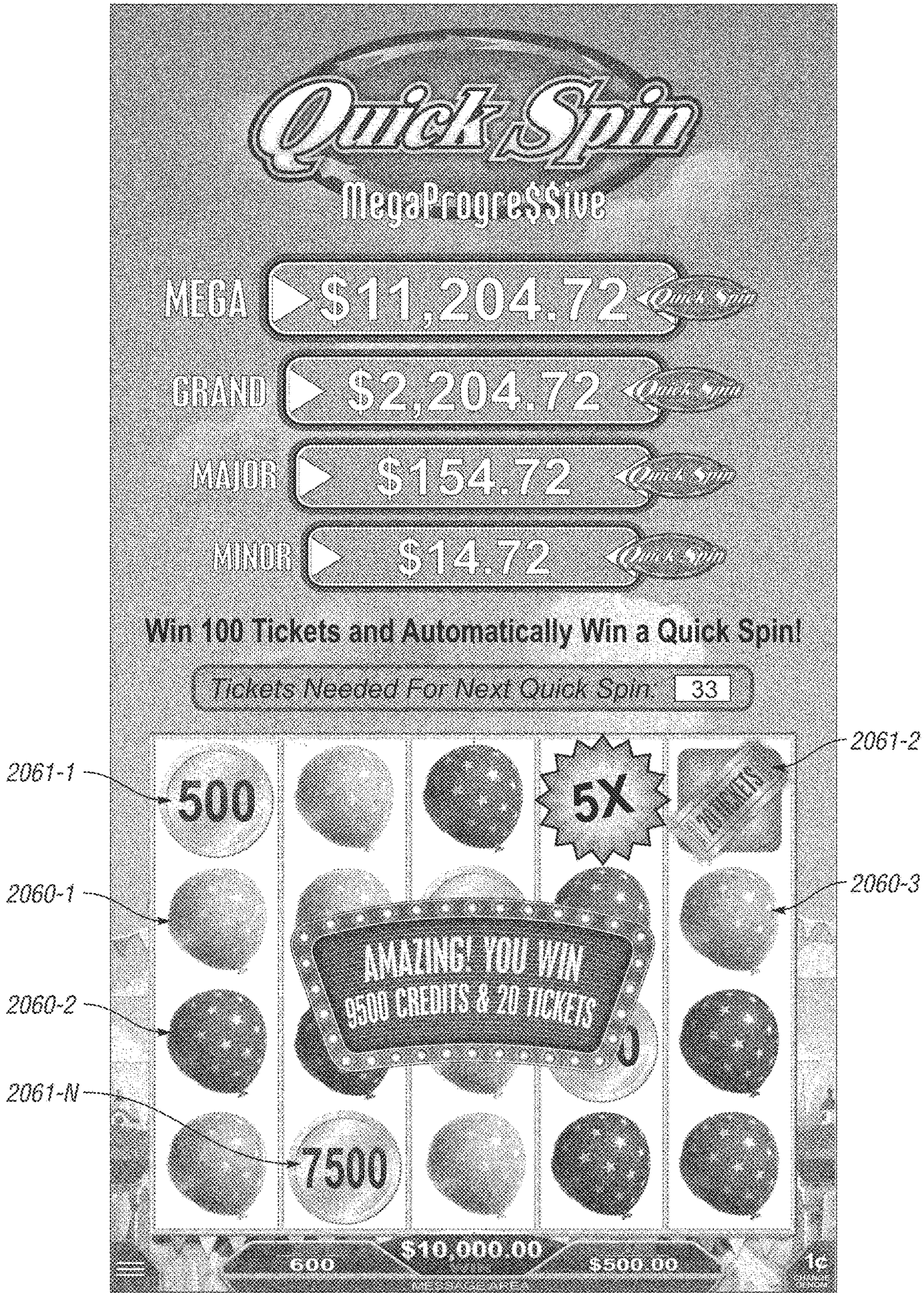

FIGS. 22G and 22H show an optional punchboard feature. In one embodiment, the player may opt to exchange tickets for a chance to interact with a punchboard. FIGS. 22G and 22H show the punchboard with virtual balloons 2058-1 through 2058-N concealing prizes 2059-1 through 2059-N. During play, as the player touches a virtual balloon the virtual balloon pops to reveal the concealed prize 2059-1 through 2059-N. The prize amounts and number of tickets required to play the punchboard is a function of the math and return to player associated with the machine.

Figure 22I:
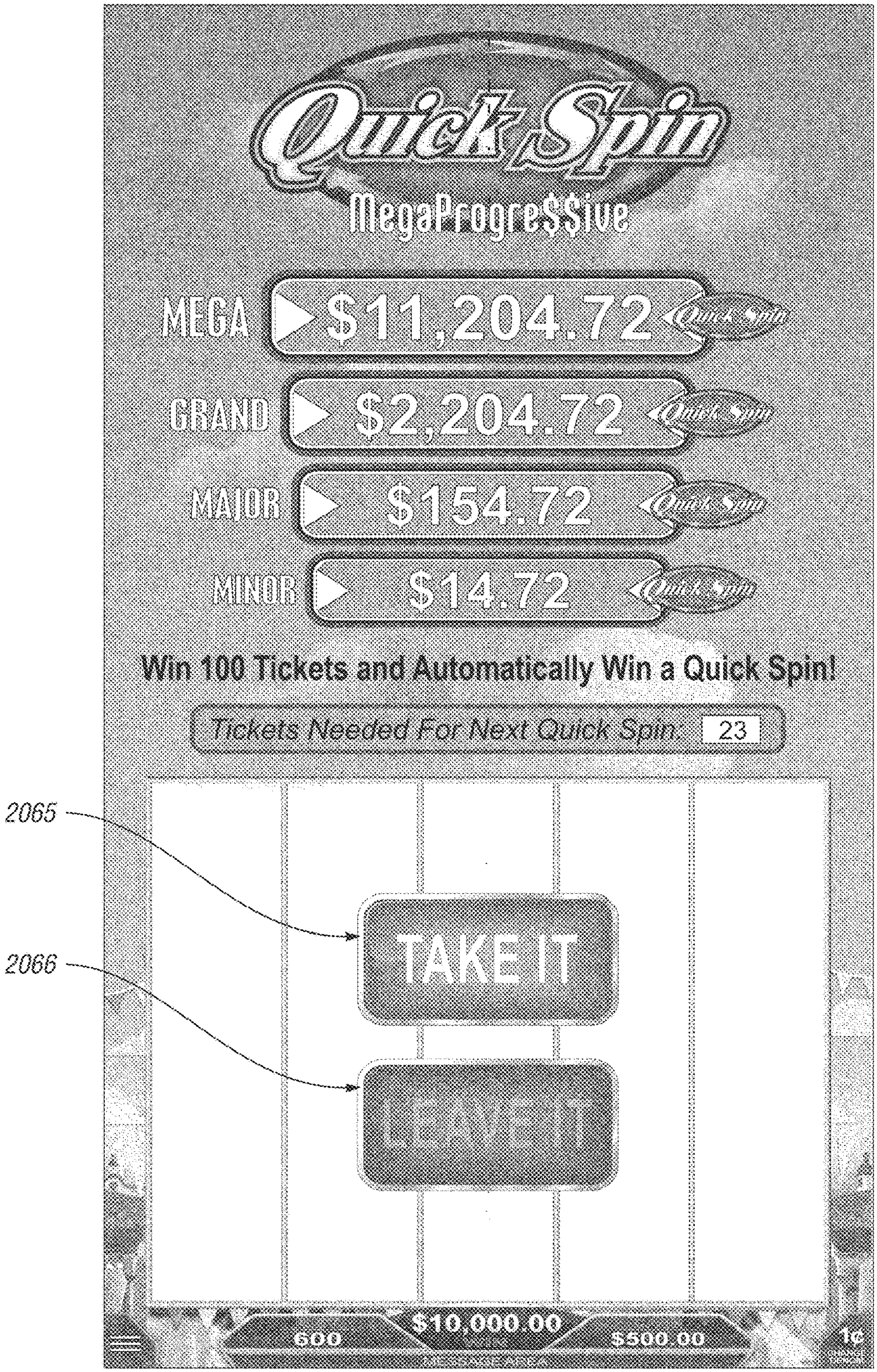

FIG. 22G shows an optional punchboard feature. In one embodiment, the player may opt to exchange tickets for a chance to interact with a punchboard. FIG. 22G shows the punchboard with virtual balloons 2058-1 through 2058-N concealing prizes 2059-1 through 2059-N. During play, as the player touches a virtual balloon the virtual balloon pops to reveal the concealed prize 2059-1 through 2059-N. The prize amounts and number of tickets required to play the punchboard is a function of the math and return to player associated with the machine. FIG. 22H shows another punchboard with virtual balloons 2060-1 through 2060-N concealing prizes 2061-1 through 2061-N. Like the bonus wheel 2010, as shown in FIG. 22I, the punchboard feature may utilize a Take It icon 2065 or elect to try again for a better prize via a Leave It icon 2066.

Figure 22J:
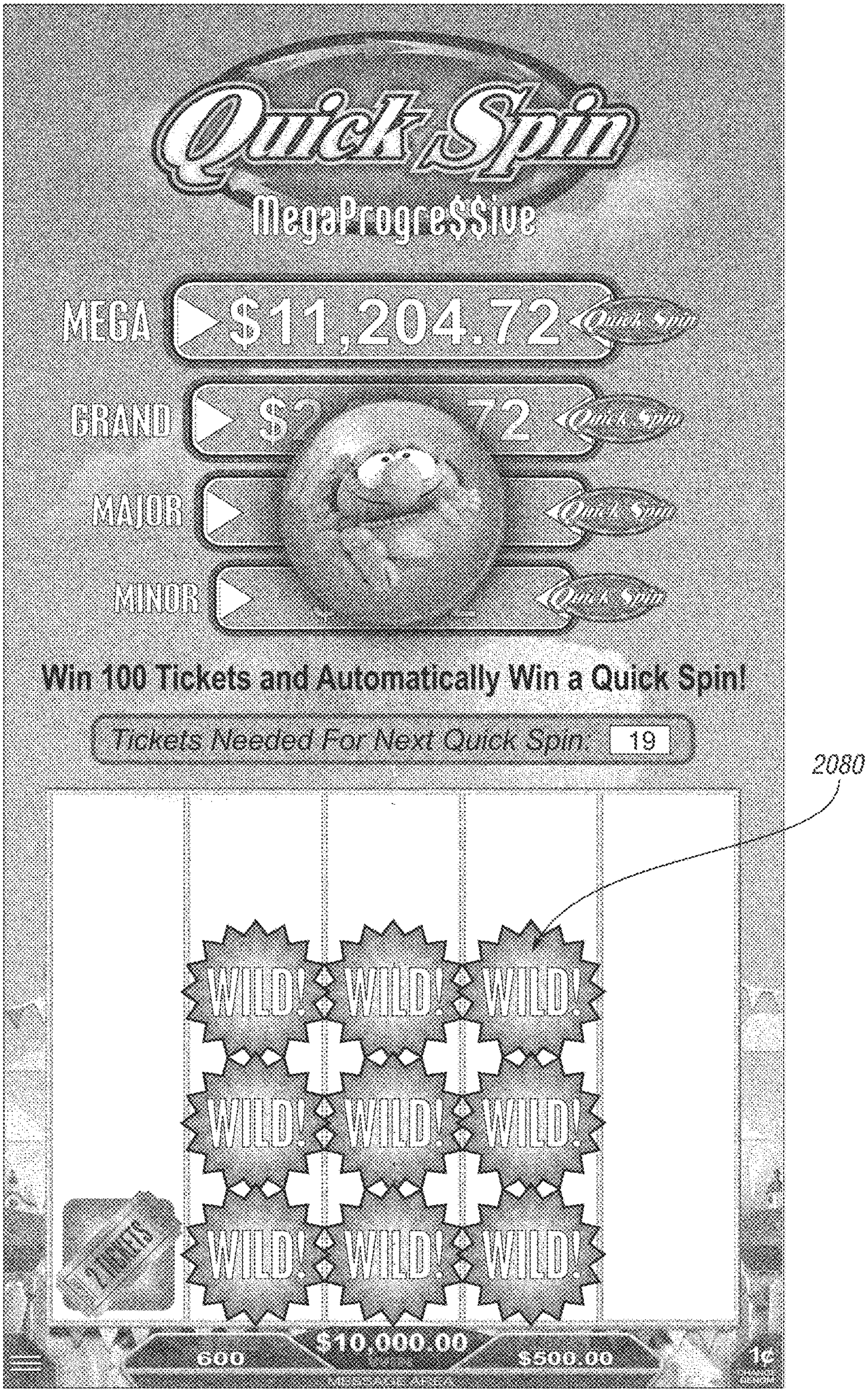

FIG. 22J shows an optional expanding wild feature. In one embodiment, the expanding wild feature 2080 is triggered by one or more primary game outcomes (e.g., three special symbols appearing on the primary game screen or aligning along an active payline).

Figure 22K:
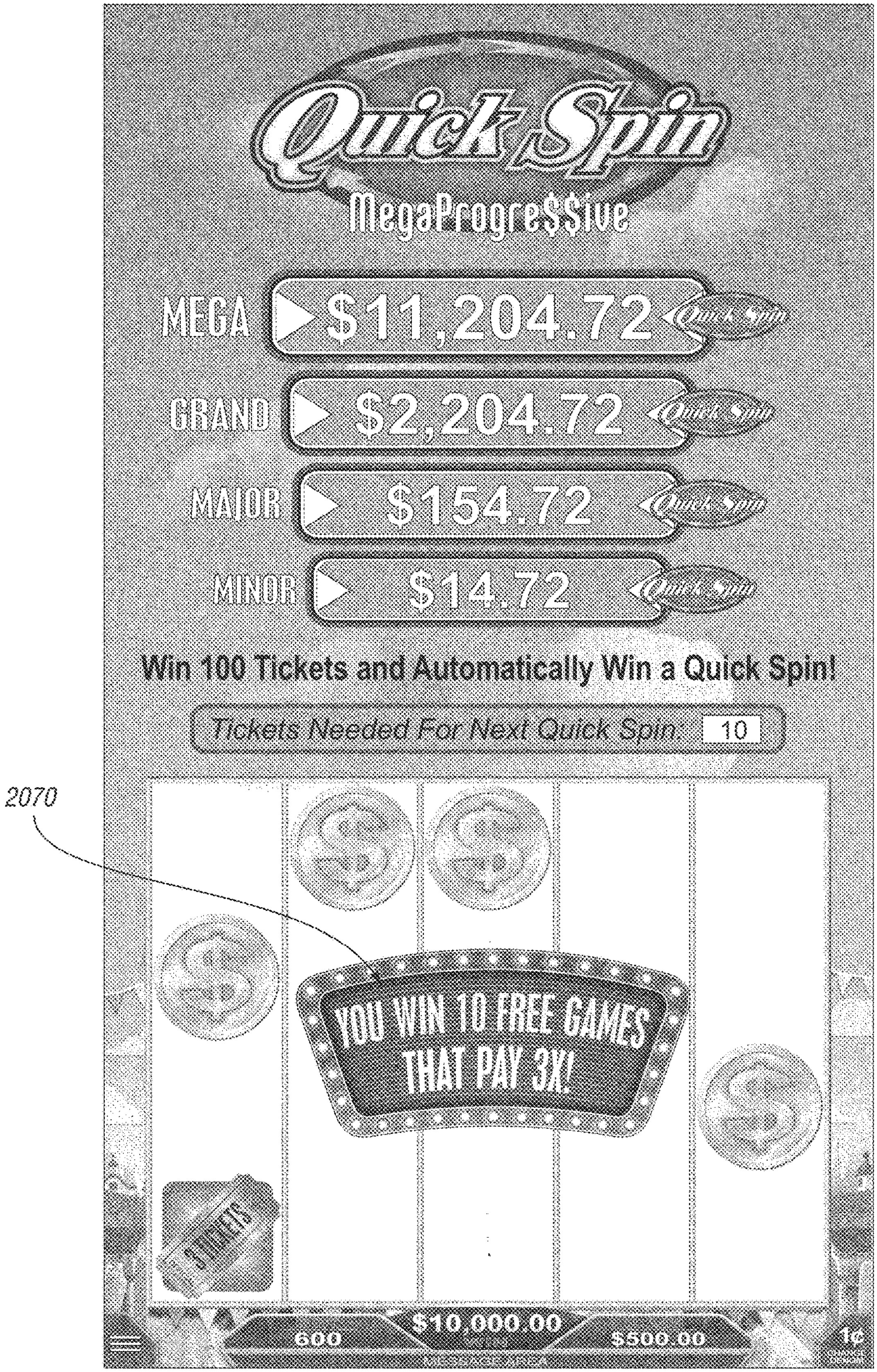

FIG. 22K shows an optional free spins multiplier feature. In one embodiment, pre-established primary game outcomes trigger the free spins and multiplier feature. For example, 3 like primary game symbols trigger 10 free spins and a 2× multiplier; 4 like primary game symbols trigger 10 free spins and a 3× multiplier; and 5 like primary game symbols trigger 10 free spins and a 4× multiplier.

Figure 23A:
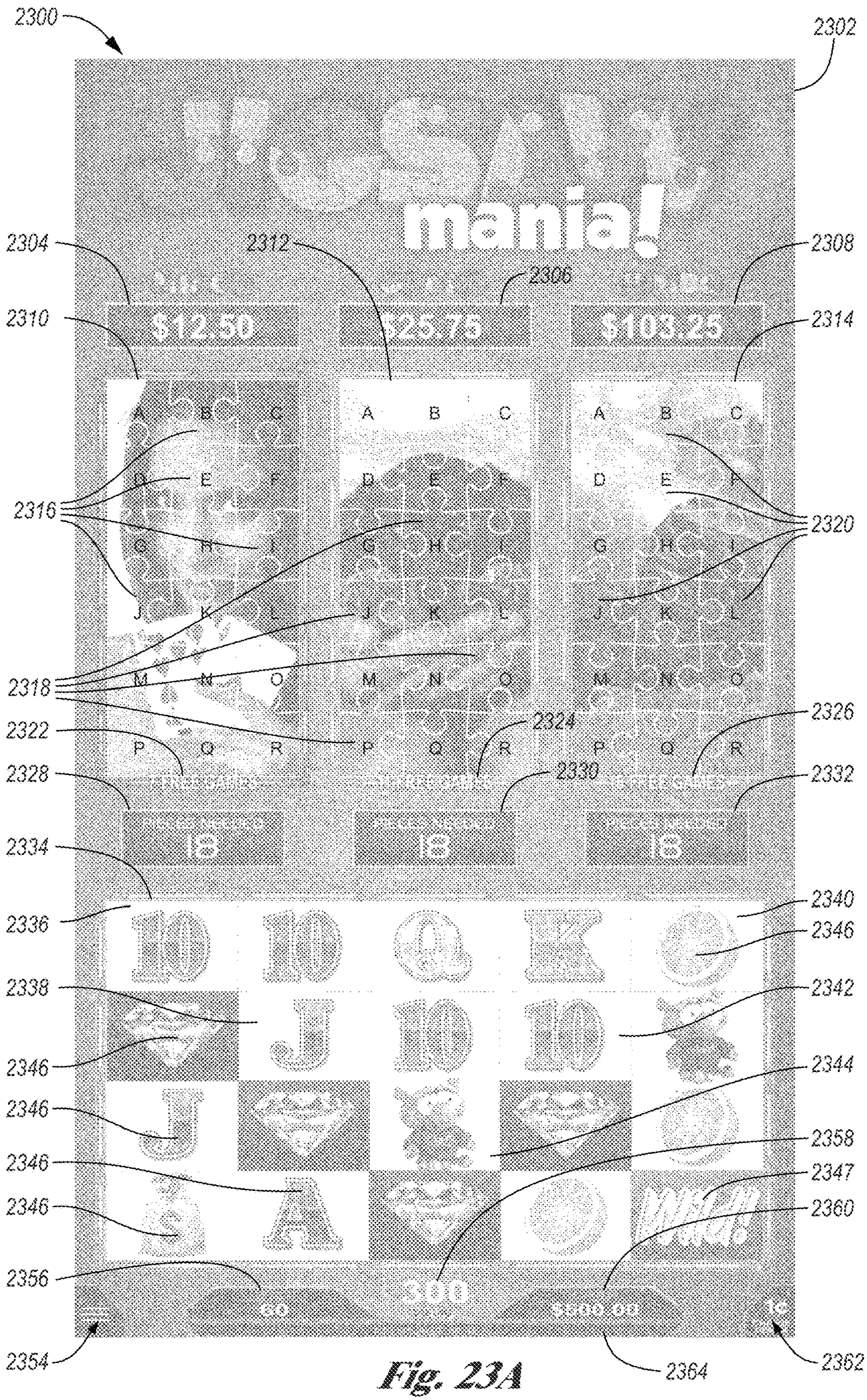
FIGS. 23A through 23L illustrate screen shots of a jigsaw puzzle game utilizing volatility stabilizing sub-events (VSS)

FIG. 23A illustrates the primary game display of an electronic gaming machine wherein one or more primary or secondary games or associated bonuses or features are won or triggered when a player successfully completes all or part of a jigsaw style puzzle. Those skilled in the art will recognize that the game may be provided on a single display EGM, a dual display EGM or an EGM with three or more displays.

A jigsaw puzzle is a puzzle comprising a number of generally regular or irregularly shaped pieces that fit together to form a picture, photograph, or any suitable graphic. While the embodiment shown in FIG. 23A includes a jigsaw style puzzle which may be completed based upon awarding the player a number of sub-events associated with the present invention, other similar puzzles and/or games may produce similar sub-event scenarios such as Tic-Tac-Toe themed Gaming Arts® Tic-Tac-GO!™ games, building blocks, dominos, Gaming Arts® Vault Cracker™ game, Gaming Arts® ATM Cracker™ game, Hasbro's Battleship game, Dr. Mario from Nintendo, Candy Crush from Activision Blizzard style games, keno, video poker, mahjong, etc. In addition, many casino table games such as roulette, craps, big 6 wheel, video poker, blackjack, pai gow poker, etc., may be adapted to similar sub-event scenarios. These games represent only a partial list of games as many games may be designed with similar volatility stabilizing sub-events (VSS) characteristics. The term games and puzzles are used interchangeably herein as both may utilize discrete sub-events which lead to a conclusion of the game or puzzle.

These style video reel slot machine games, which include games and puzzles as previously described, may be described as a series of individual video reel style slot machine games that are part of a larger two-part slot machine game in which the return to player (RTP) percentage may be divided as the game designer chooses depending on the volatility level desired and the acceptance of the playing public. Recent slot machine game designs have pushed the envelope of volatility higher in an effort to appease players with some success, albeit at times short-lived due to catastrophic cold spells for the player. In other words, feast or famine for the player, often leading to a player seldom, if ever, playing the particular game again.

The video reel style slot machine games disclosed are part of a larger two-part video reel slot machine game wherein the first part of game includes individual games of the video reel game where credits are won or lost in the first phase or part of the two-part overall volatility stabilizing sub-events (VSS) game. During this phase or part of the two-part game, a volatility stabilizing sub-events (VSS) puzzle or game is included where when finished or concluded, allows the player to enter the second phase or part of the game. The second phase or part of the two-part game may also include a volatility stabilizing sub-events (VSS) puzzle or game. The probability of winning during the first phase or part of the game is always low, although a player may have a positive return on occasion. Of course, a player may choose to only play a single game or a portion of the first phase or part of the larger two-part game. However, it is often desirable to allow the next player of that game to pick up where the previous player left off so the two-part slot machine game continues even with different players, if desired. Generally, the first phase or part of the overall two-part game includes far more plays or spins than the second phase or part of the two-part games, in one embodiment 10 to 20 times more spins. However, the opposite may be true for the payouts of the second phase or part of the two-part game whereas payouts per spin or play may be many multiples higher than the first phase or part of the two-part game and where no or fewer credits may be expended in the play of the second phase or part of the two-part game. In addition, other awards may be included in the second phase or part of the two-part game that may not be available during the first phase or part of the two-part game such as progressive awards and the like. Similar or other awards may be associated with finishing or concluding a volatility stabilizing sub-events (VSS) puzzle or game with the same, similar or differing play characteristics during the second phase or part of the two-part game.

In the embodiment comprising the jigsaw style puzzle game, as illustrated, one or more jigsaw puzzles may be included. Within the one or more jigsaw puzzles, a plurality of individual jigsaw pieces fit together to form a picture, photograph, or any suitable graphic. As illustrated in FIG. 23A, each of the three jigsaw puzzles comprise eighteen separate pieces. Those skilled in the art will recognize that any number of individual pieces may be utilized and the number of individual pieces may not be equal for all or any of a plurality of separate jigsaw puzzles. For instance, if each of a plurality of jigsaw puzzles produce differing awards, lesser value awards may require fewer individual puzzle pieces while higher awards may require a larger number of individual puzzle pieces. Regardless of how the individual jigsaw pieces are introduced into the game, the pieces may be automatically placed in their proper location or may require player input to properly place in the jigsaw puzzle or may be randomly placed. Similar placement methods for other puzzle and/or games may employ similar placement methods. In the embodiment illustrated, the individual jigsaw pieces are first introduced on the primary video reels of a video reel slot game and then simultaneously or later appear in the jigsaw puzzles.

It is not necessary that the probability of awarding a sub-event is the same for each sub-event. For instance, the probability of awarding a sub-event at the beginning of a game may be higher than the probability for later awards. In the case of a jigsaw puzzle, sub-event puzzle pieces in the beginning of the puzzle may have a higher probability of occurrence as opposed to puzzle pieces toward the end of the puzzle completion or vice versa.

When the volatility stabilizing sub-events (VSS) are implemented, a meter of some type, as well known in the art, such as circular meters, bar graphs, pie style meters, etc., may be employed which provide the player an indication of how many discrete sub-events have occurred and therefore, how many additional sub-events remain or need to occur to trigger the bonus, feature, or secondary game. Such metering may be an exact representation or may be approximate or even skewed to further entice a player. For puzzles and/or games, the number of remaining sub-events to complete the puzzle and/or games may be visible and may serve the purpose of providing a visual indication of how close the player may be to a bonus, feature or secondary game. Such indication of progress toward a bonus, feature, or secondary game may be required in certain gaming jurisdictions in the United States (commercial or tribal casinos) or other countries.

FIG. 23A illustrates a game interface 2300 for a jigsaw style game including a primary game display 2302. Some embodiments of the jigsaw style game may include one or more static or progressive awards which may be equal or unequal depending on design goals. As illustrated, the game includes a Minor progressive 2304, a Grand progressive 2306 and a Jumbo progressive 2308.

As previously described, one or more jigsaw puzzles may be included which, as shown, include a left jigsaw puzzle 2310, a middle jigsaw puzzle 2312 and a right jigsaw puzzle 2314. For position reference, each jigsaw puzzle includes individual jigsaw puzzle piece location descriptors A-Q which are normally not included in the jigsaw puzzle. Although the jigsaw puzzles are vertically aligned other orientations are also possible and may differ, puzzle to puzzle. Each of the three jigsaw puzzles contain different irregularly shaped pieces that when fitted together form a picture, photograph or graphic. The left jigsaw puzzle 2310 contains irregularly shaped pieces 2316, the middle jigsaw puzzle 2312 contains irregularly shaped pieces 2318 and the right jigsaw puzzle 2314 contains irregularly shaped pieces 2320. Each of the jigsaw puzzles illustrated comprise 18 pieces but as previously disclosed, the number of individual regularly or irregularly shaped pieces do not need to be the same for all of the jigsaw puzzles.

Although not necessary in all cases, the award for completion of each of the jigsaw puzzles may be noted at the bottom or some other location proximate to each of the jigsaw puzzles. For instance, 7 Free Games 2322 for the jigsaw puzzle 2310, 11 Free Games 2324 for the jigsaw puzzle 2312 and 15 Free Games 2326 for the jigsaw puzzle 2314. Although free games are noted as illustrated, any prize or award may be implemented such as specific amounts, random amounts, multipliers, etc.

As play progressives, it may be advantageous for the player to understand how close or how far a puzzle may be from completion. As illustrated, such player alerts are indicated with a "pieces needed" message under each of the plurality of jigsaw puzzles. For instance, the number of pieces for completion of jigsaw puzzle 2310 is noted in box 2328, the number of pieces for completion of jigsaw puzzle 2312 is noted in box 2330 and the number of pieces for completion of jigsaw puzzle 2312 is noted in box 2330. The game state illustrated in FIG. 23A is the beginning of a two-part game where the jigsaw puzzles appear, including all pieces, so the player understands the look of the completed jigsaw puzzles and how many pieces are required to complete any of the plurality of puzzles. In the embodiments illustrated, the game may include a large library of different jigsaw puzzles providing variety so players do not lose interest in the game. The library of different jigsaw puzzles may randomly appear, may be selected by a player, offered sequentially, easy pick, etc.

The jigsaw puzzle style games also include a primary or secondary video reel game that provides individual awards either through line games, ways game or some other winning criteria. As illustrated, the video reel game display 2334 includes four lines and five vertically oriented reels 2336, 2338, 2340, 2342 and 2344. Thus, the game includes 24 discrete areas for a variety of differing symbols 2346, wild symbols 2347 or other symbols to appear. Those skilled in the art will recognize that many primary or secondary game types may be included within the jigsaw puzzle style game and not just video reel games. These may include video poker, bingo, keno or any other game suitable for the purpose.

Figure 23B:
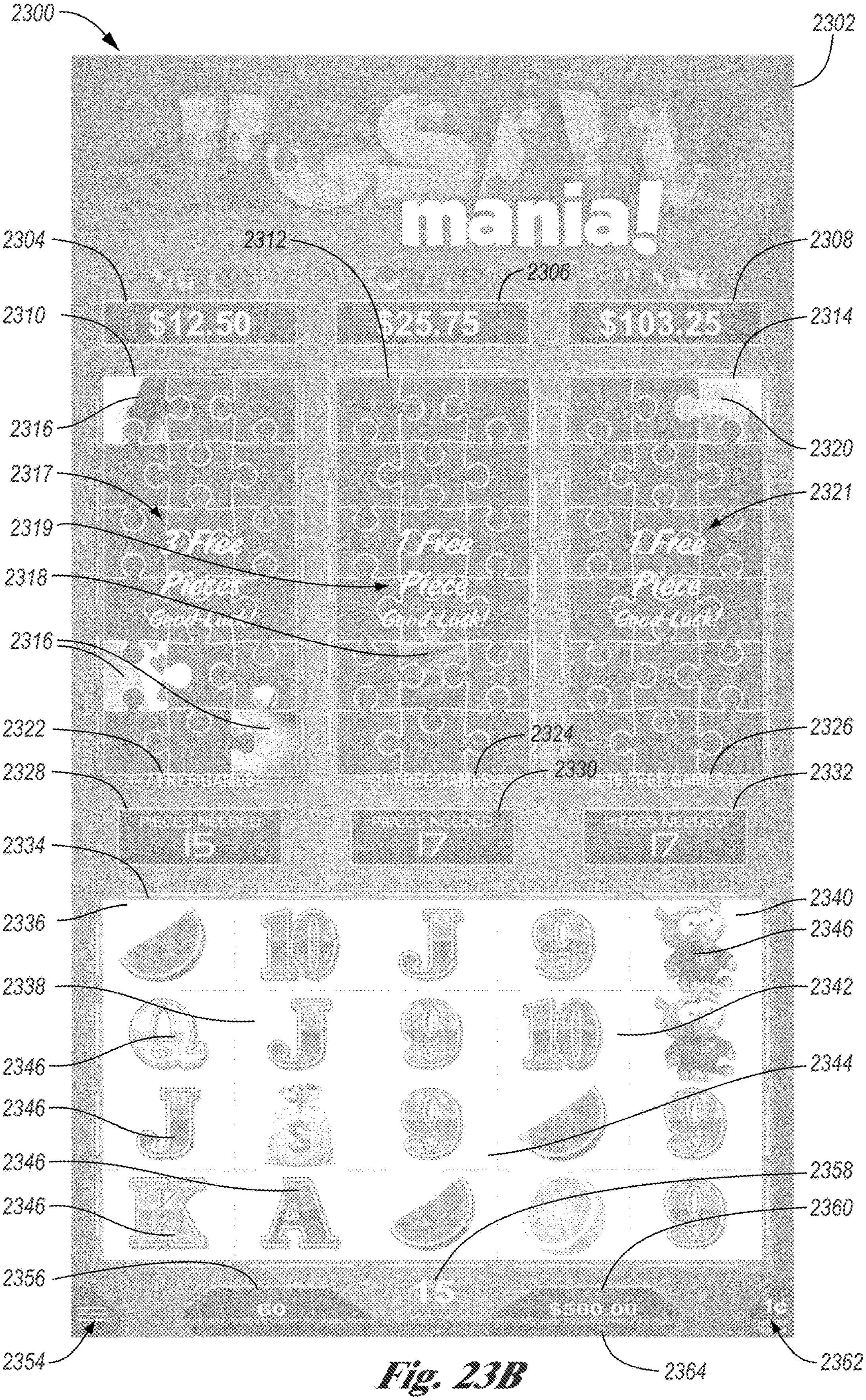
Figure 23C:
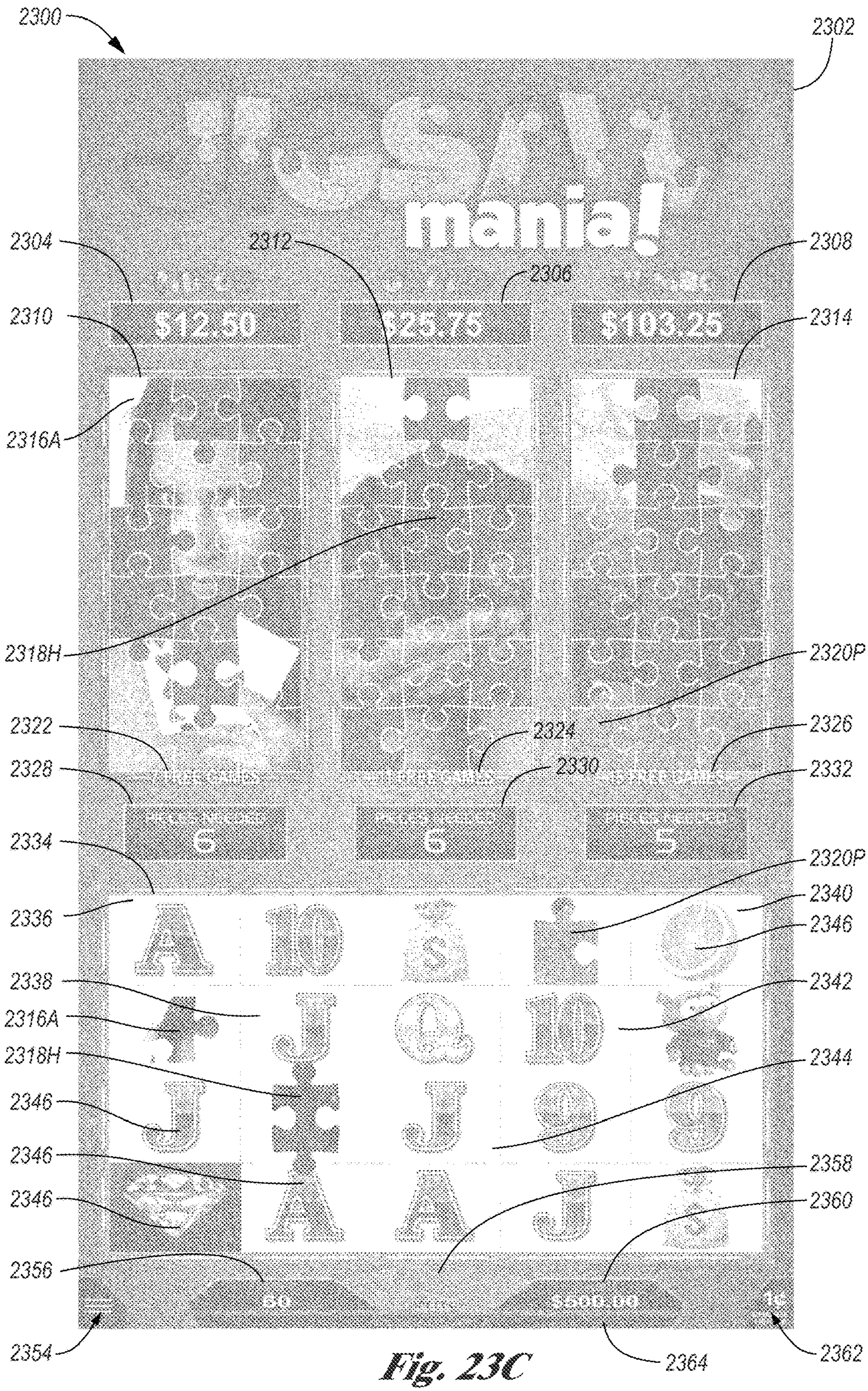
Figure 23D:
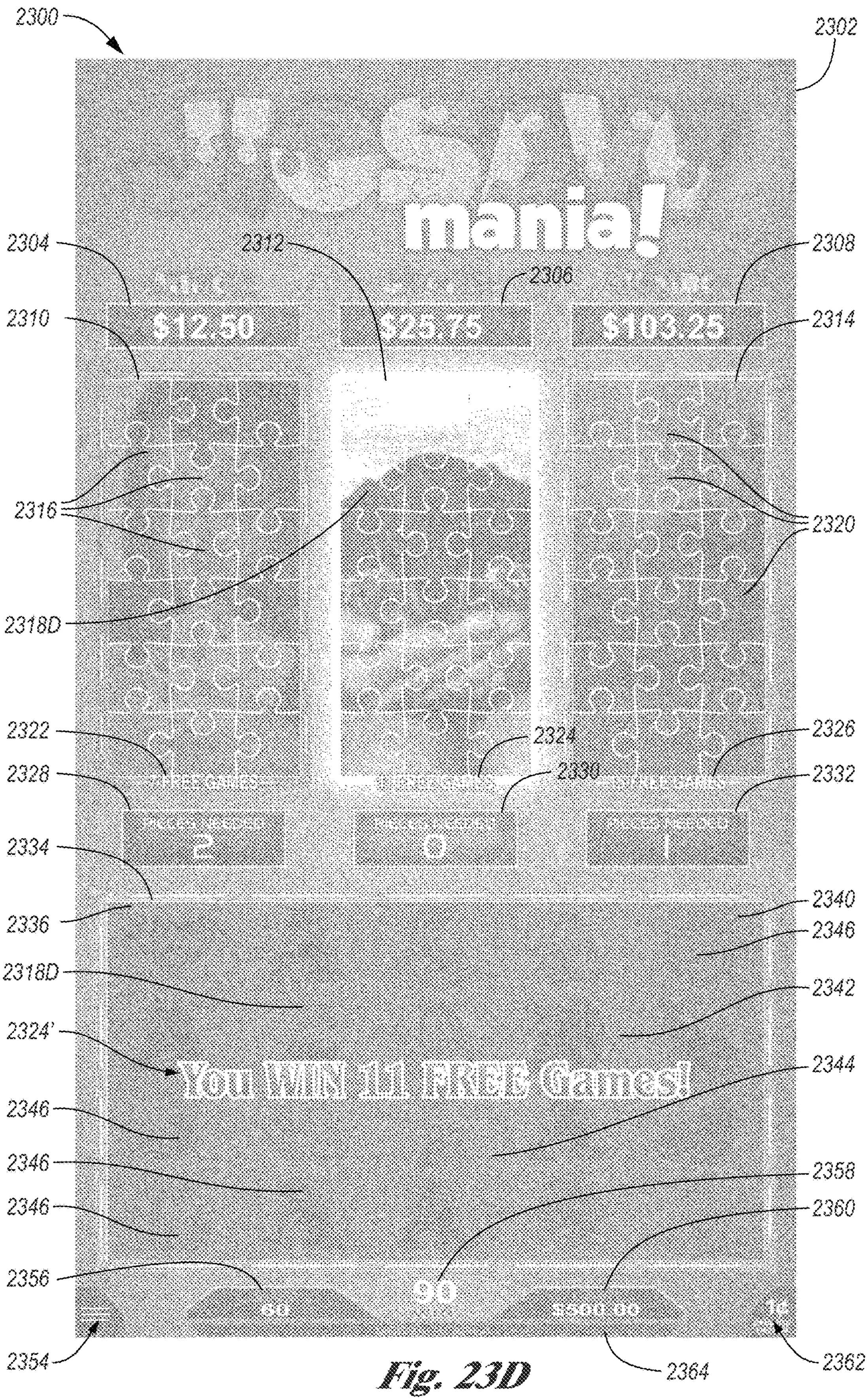
Figure 23E:
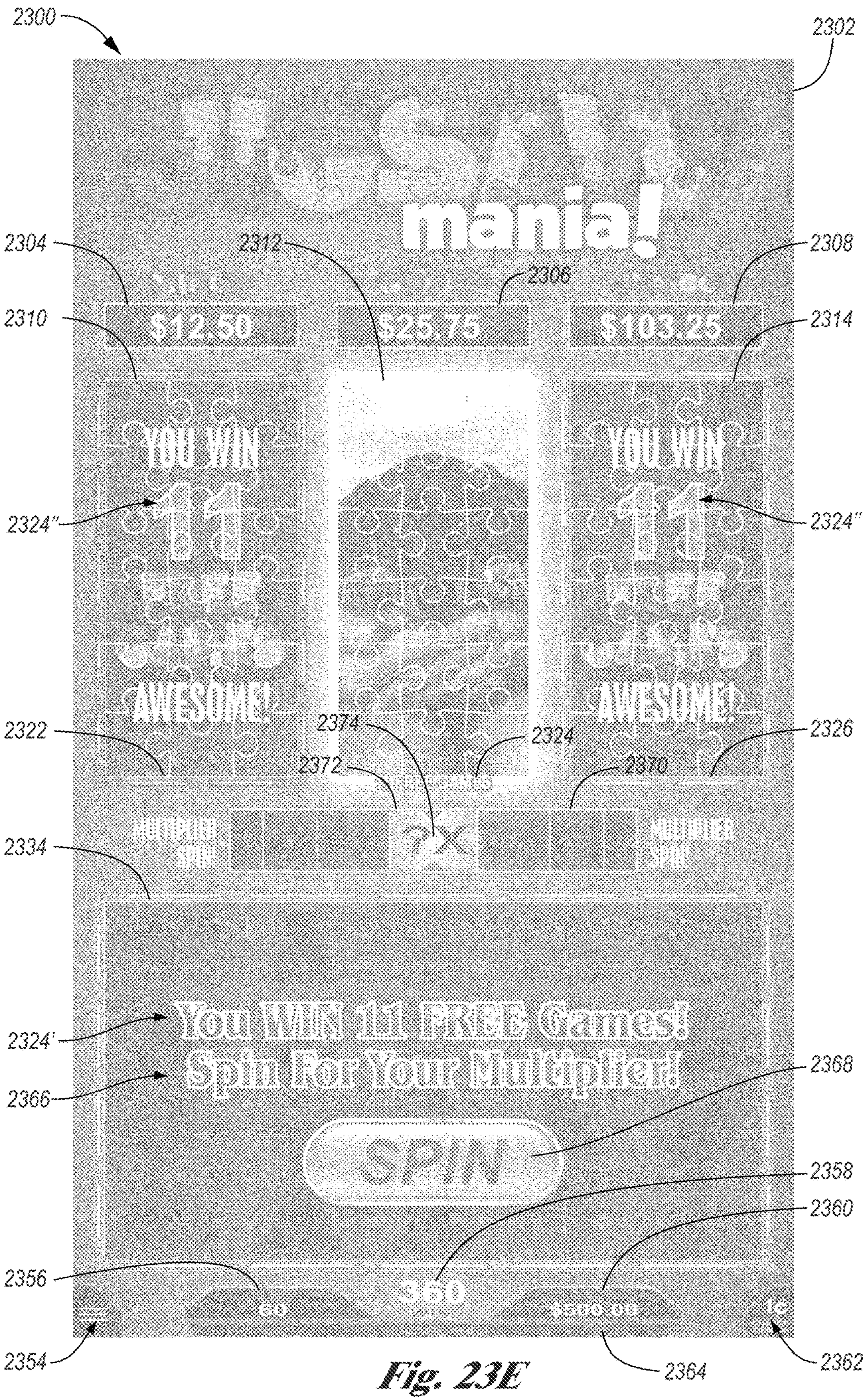
Figure 23F:
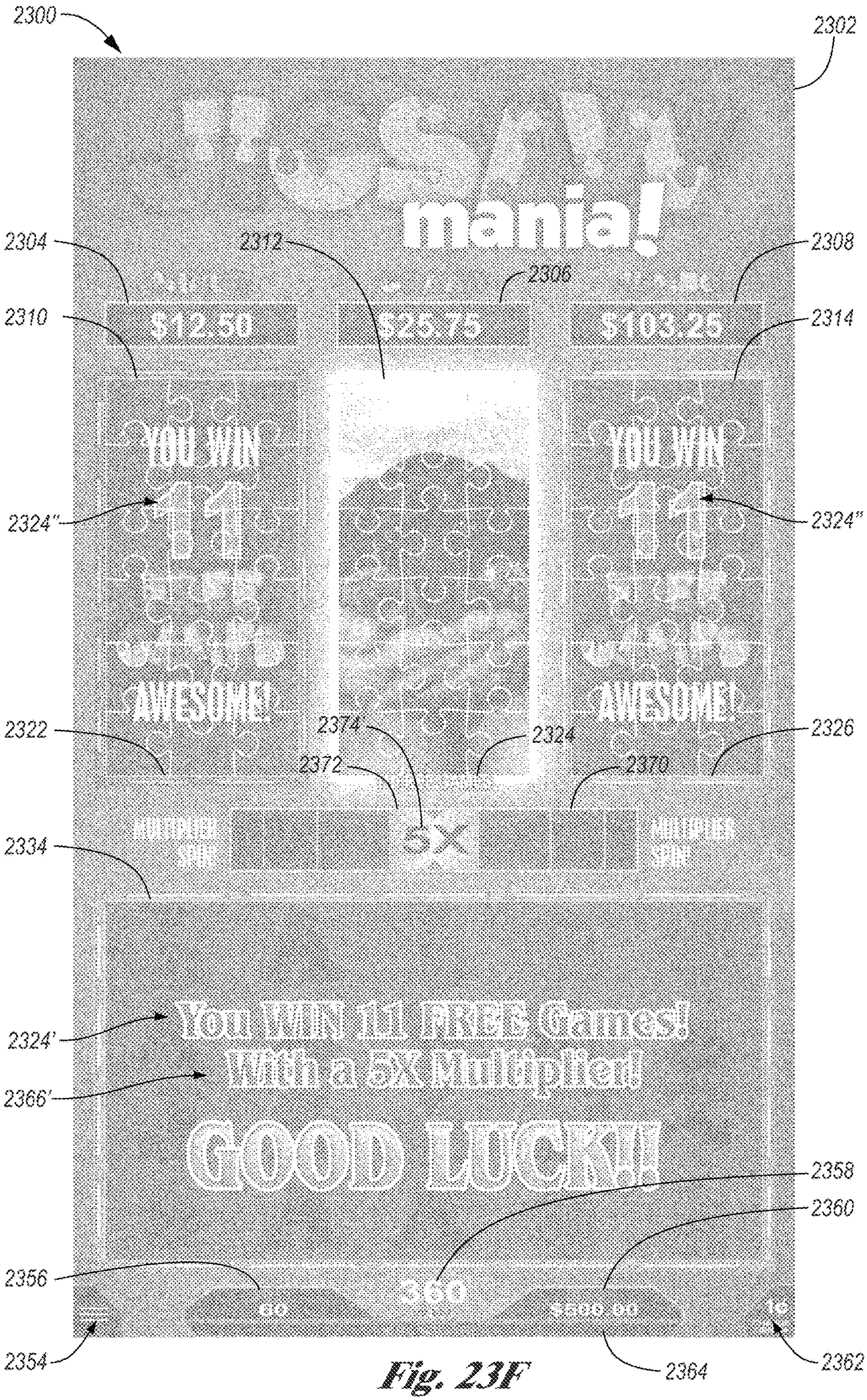
Figure 23G:
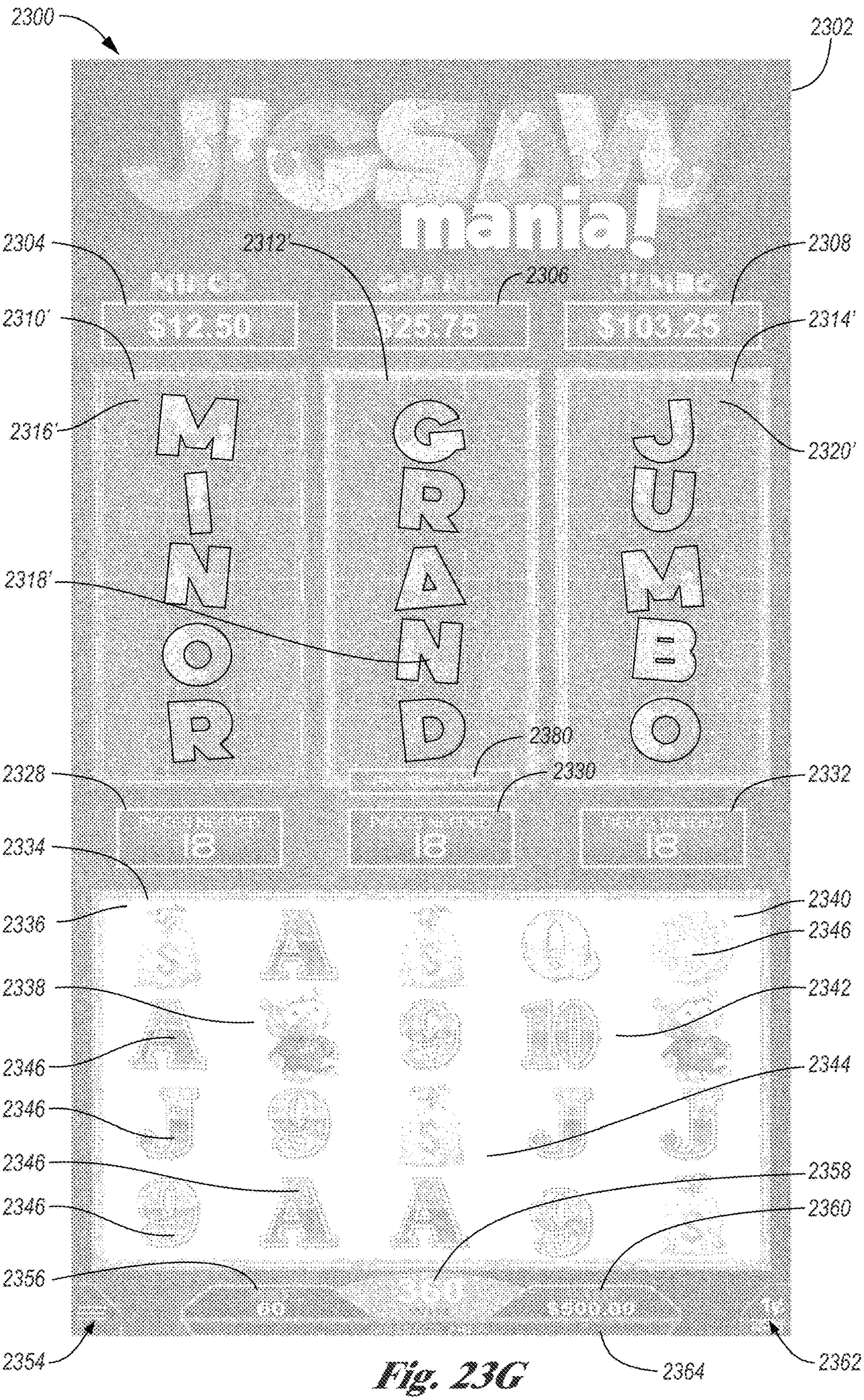
Figure 23H:
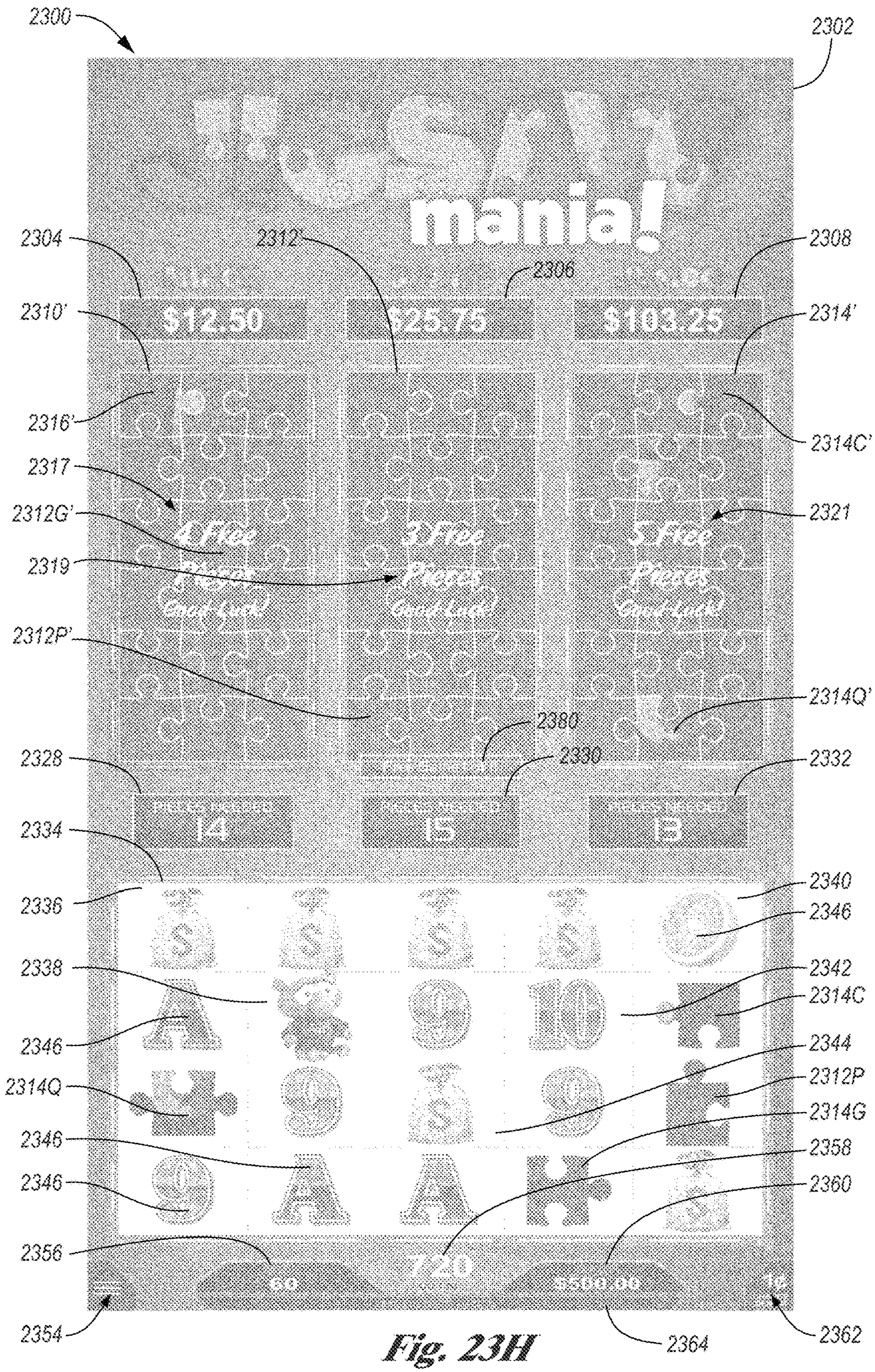
Figure 23I:
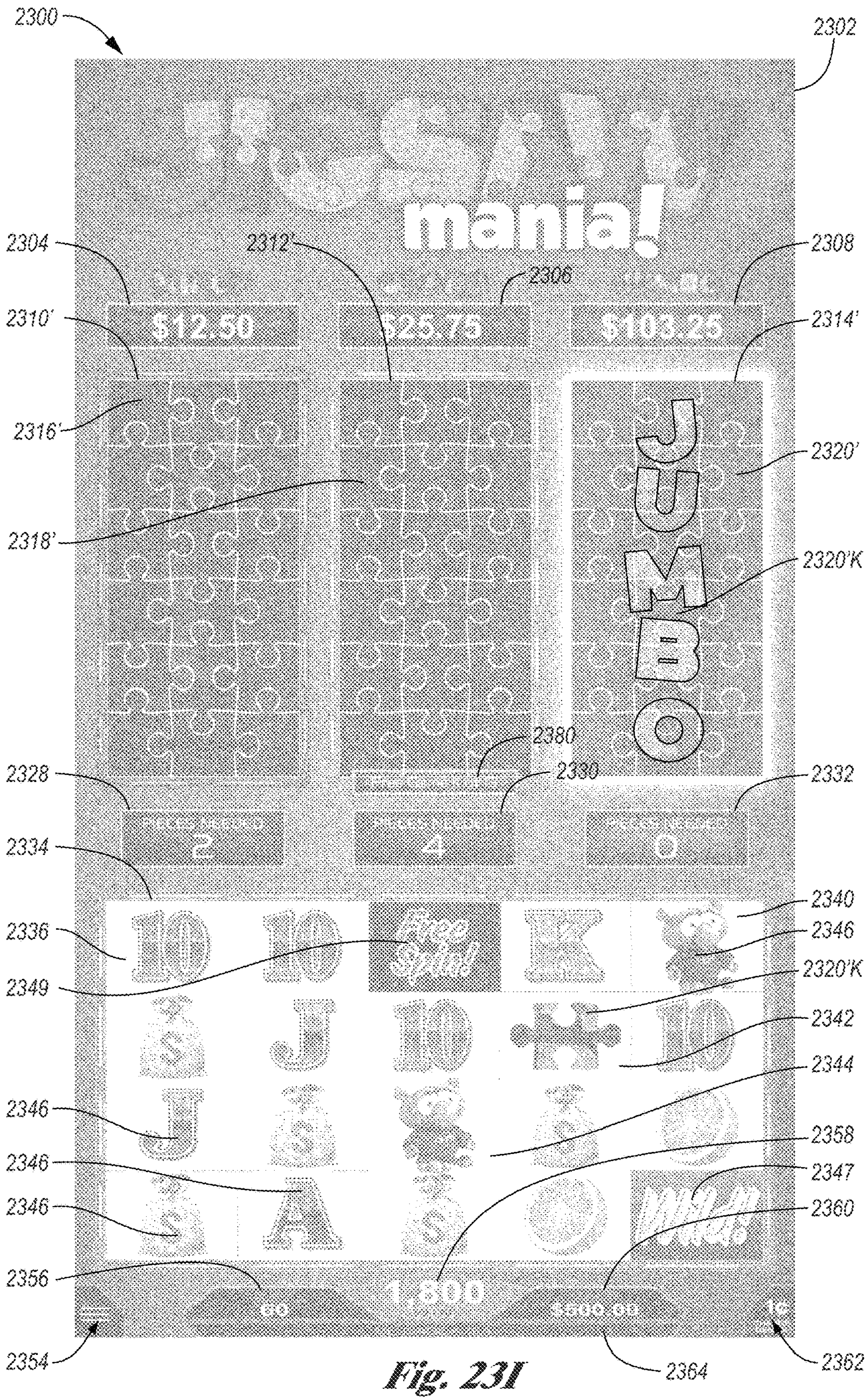
Figure 23J:
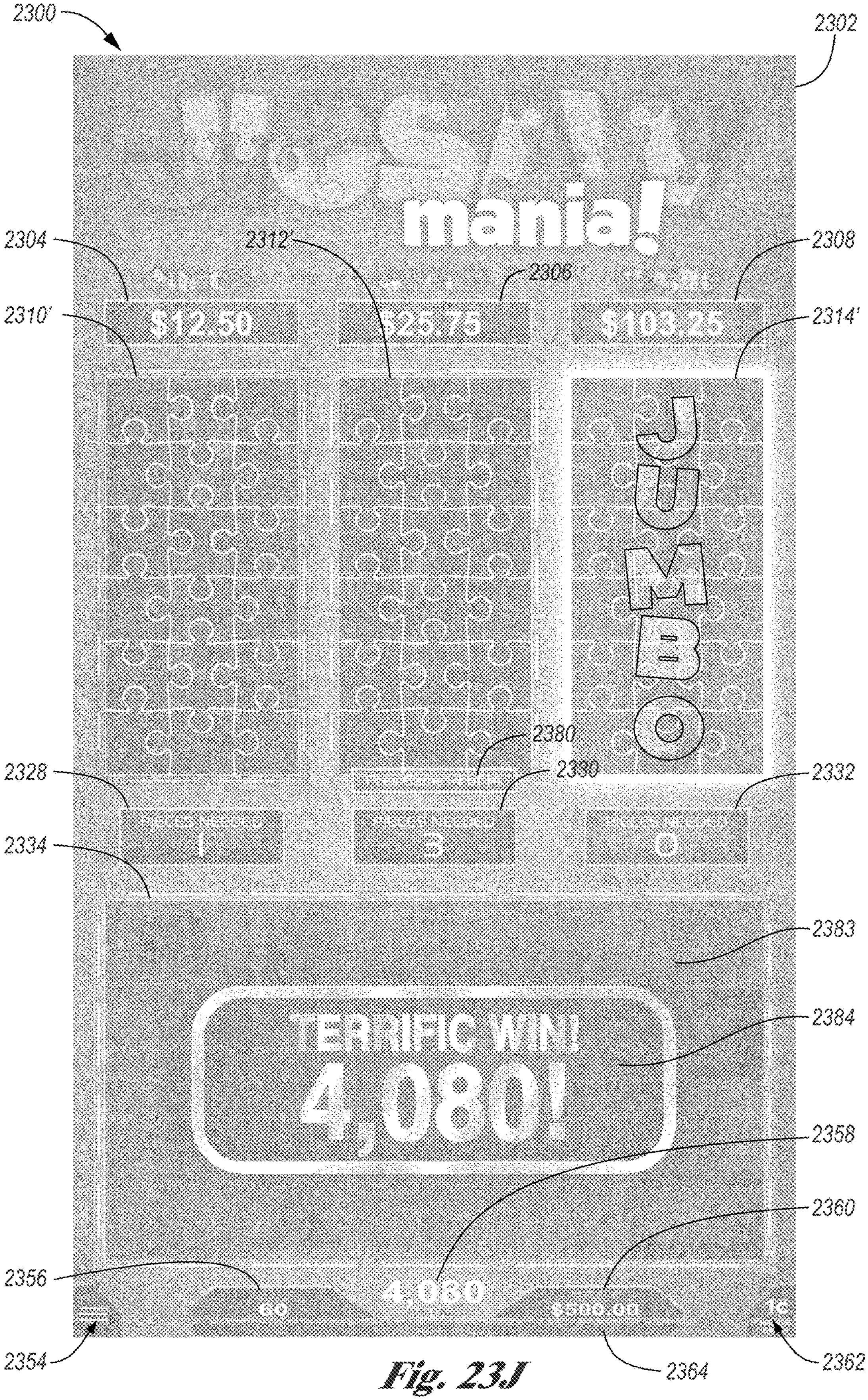
Figure 23K:
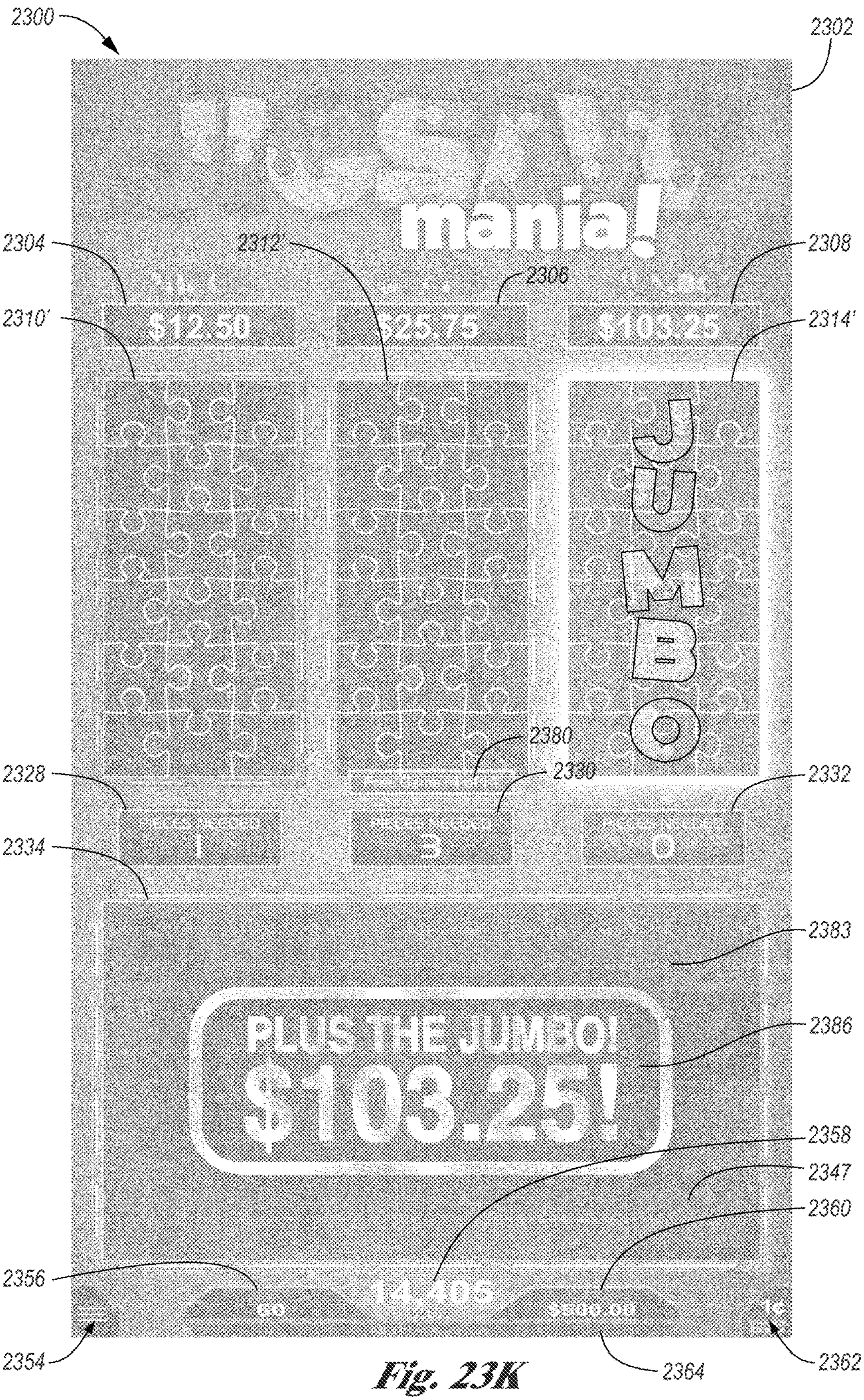
Figure 23L:
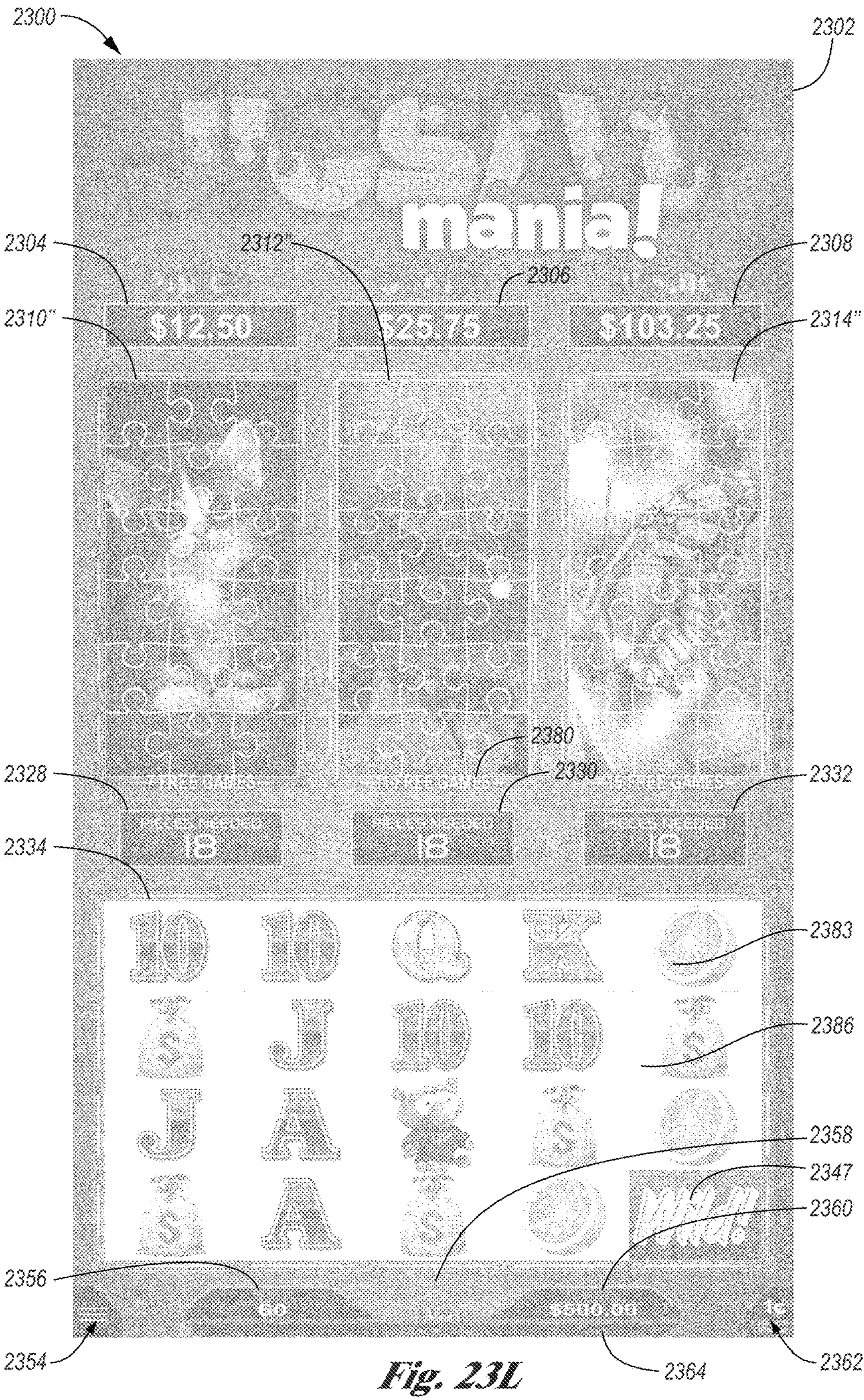

As shown in FIG. 23L, in addition to the play mechanics of the game, other information may be displayed to the player such as a help and/or information button 2354, wager or bet amount 2356, win amount 2358, total cash or credits 2360, a denomination selector button 2362 and a messaging area 2364.

FIGS. 23A through 23L illustrate a possible progression of a jigsaw puzzle game from displaying a starting game display of the two-part game where the jigsaw puzzles are first displayed in a game session until that game is eventually won by the player by solving one or more of the jigsaw puzzles to and through a bonus or feature round and ending with providing a new set of jigsaw puzzles for the next two-part game play session.

Prior to or during the start of a new game, the processor may display a variety of messages or attract animations to attract players such as display messages on special features, number of free games that a player can win, range of multipliers a player may be awarded, number of free games that a puzzle or game may award, etc.

Once a player starts a new game, a number of instant or free jigsaw puzzle pieces may be awarded to the player to maintain excitement in the game. The number of awarded pieces for a particular jigsaw puzzle may be equal to zero and range to the total number of pieces forming a jigsaw puzzle. As illustrated, this would be up to 18 individual pieces per jigsaw puzzle. In such cases, it may be advantageous to alert the player regarding how many instant or free pieces have been awarded to the player as shown in FIG. 23B where a message 2317 is displayed indicating one instant or free piece has been awarded for the left jigsaw puzzle 2310, a message 2319 is displayed indicating one instant or free piece has been awarded for the middle jigsaw puzzle 2312 and a message 2321 is displayed indicating three instant or free piece has been awarded for right jigsaw puzzle 2314. Prior to, simultaneous with or subsequent to messages 2317, 2319, and 2321 being displayed, pieces needed boxes 2328, 2330 and 2332 are updated to reflect how many puzzle pieces remain for each of the plurality of jigsaw puzzles.

Regardless of whether or not instant or free pieces are awarded, video reel game 2334 may be played by pressing a play or start button to initiate a video reel spin. Those skilled in the art will recognize that the one or more puzzles or games need not be solved, finished or concluded for a player to end or start a new video reel game 2334. While some players may choose to finish a particular game and associated bonus or feature round before cashing out or ending play, many players, for various reasons, may choose to cash out or end play prior to the puzzle or game being solved, finished or completed. In cases where a player has cashed out, the puzzles or games may reset to a starting position or the next player may simply pick up where the previous player left off. Often the latter is preferable to attract players that understand that the puzzles or games are closer to being solved, finished or completed and therefore the game is closer to awarding a bonus or feature. This is indeed the case for certain embodiments of the present invention where a number of sub-events need to occur to provide a given award, bonus or feature round, or any other prescribed award. For instance, a first player may advance to a game position as shown in FIG. 23C where 6, 6, and 5 pieces remain for the three jigsaw puzzles, respectively. At this stage, the player may choose to continue to play or chose to cash out or simply leave the game. Of course, if a player has exhausted all credits, they need not and cannot cash out prior to leaving the game. In the alternative, when a player has exhausted all credits or the number of remaining credits is insufficient to meet the minimum bet requirements, the player may add additional funds, either physically by depositing cash or a voucher or by cashless wagering systems. In either case, the same result may occur where a new player may effectively replace that player as the game is in a state generally closer to awarding a bonus or feature than it normally would be upon the start of an entirely new game. In other words, a player may recognize that a number of sub-events have already occurred by virtue of the number of pieces of the puzzles that have already been placed and as may be noted in the pieces needed boxes 2328, 2330 and 2332.

As shown in FIG. 23C, a number of individual jigsaw pieces, 2316A, 2318H and 2320P, appear in the video reel section 2334. As the individual pieces 2316A, 2318H and 2320P appear, they are also automatically or semiautomatically placed within the proper location of jigsaw puzzles 2310, 2312 and 2314. During the individual video reel game spins, no jigsaw puzzle pieces may appear or any number of individual pieces may appear up to the total number of jigsaw pieces remaining.

FIG. 23D illustrates the conclusion of the first part of the two-part game. As shown, the left puzzle 2310 has 2 pieces remaining for completion, right puzzle 2314 has 1 piece remaining and middle puzzle 2312 has 0 piece remaining and thus has been completed. Accordingly, the player has been awarded the 11 free game award as noted in 2324 and banner 2324'. Optionally, the left jigsaw puzzle 2310 and right jigsaw puzzle may be greyed out and middle jigsaw puzzle 2312 may be highlighted to alert the player of the completion result.

FIG. 23E illustrates an optional further award of free game multiplier 2366. As shown, the player is notified to press the Spin button 2368 to start a horizontal wheel spin within horizontal wheel 2372. It may be preferable to either display the top multiplier award or a question mark prior to the player initiating the horizontal wheel spin.

FIG. 23F illustrates the result of the player initiating a spin of horizontal wheel 2372. As shown, the player has been awarded a 5× multiplier for the upcoming free game round, e.g., second part of the two-part game. The player may be further notified by banner 2366'. Those skilled in the art will recognize that awards may take many shapes and forms and are not limited to free games, multipliers and the like and thus free games and multipliers are just representative of the many award types.

As illustrated in FIG. 23G, after the determination of the free games and determination of the multiplier for the free game round, the player is presented with three new jigsaw puzzles 2310', 2312" and 2314', although not all puzzles need to be replaced. In the game illustrated, the left jigsaw puzzle 2310' represents the award of the Minor progressive 2304, the middle jigsaw puzzle 2312' represents the award of the Grand progressive 2306, and the right jigsaw puzzle 2314' represents the award of the Jumbo progressive 2306. As shown, prior to starting the second part of the two-part game, all jigsaw puzzles indicate there are 18 pieces forming each of the three jigsaw puzzles. When play is either initiated by the player or play may be started automatically or semiautomatically, free jigsaw pieces may be awarded to the player, if desired by the game developers. In the game shown, before, during or after the first video reel spin of the bonus or feature game, the player may be awarded free pieces. In the game illustrated, the player has been awarded 4 free pieces for the left jigsaw puzzle 2310', 3 free pieces for the middle jigsaw puzzle 2312', and 5 free pieces for the right jigsaw puzzle 2314'. These free pieces are indicated in the pieces needed boxes 2328, 2330, and 2332 by lowering the initial piece count by the number of free pieces awarded. In addition, to further alert the player, banners 2317, 2319, and 2321, respectively, reiterate the free piece messages. This stage is the second part of the two-part game and where at least part of the bonus or feature award is a number of free games, a free game count box 2380 is provided to indicate to the player how many free games have been played and the total number of free games that have been awarded. Many gaming jurisdictions require such a counter, whether it be counting up the number of free games played or counting down of the free games remaining. FIG. 23G illustrates the first game or video reel spin of the bonus or feature round, as noted in free games box 2380, where the player may win credits via matching symbols in the video reel section 2334 in a lines games, ways game or similar. In addition, a player may be awarded jigsaw puzzle pieces that are manually, automatically or semiautomatically placed in the corresponding jigsaw puzzle. As shown, jigsaw pieces 2312G, 2312P, 2314C, and 2414Q have appeared in the video reel section 2310. Simultaneously or shortly before or after, jigsaw pieces 2312G', 2312P', 2314C', and 2414Q' appear and are placed in jigsaw puzzle 2312' and jigsaw puzzle 2314'.

As illustrated in FIG. 23H, play continues and the player is on game 11 of 13. Although not illustrated, prior games have resulted in the player being awarded two additional free games and thus the total number of free games has changed from a total of 11 free games to the current total shown of 13 free games. The sequence of events that are not shown is detailed below. As shown in the video reel section 2334, a number of symbols and jigsaw puzzle pieces are displayed including two not previously described symbols. One of the symbols is a wild symbol 2347. As well known by those skilled in the art, wild symbols are commonly used in the industry and may be used, where appropriate, to complete any sequence of symbols to produce an award or other awards. Additionally, a free game symbol 2349 is displayed which awards the player an additional free game spin. This is the means by which the number of free games has risen from 11 free games to 13 free games.

As illustrated, the left jigsaw puzzle 2310' has two pieces remaining for completion, middle jigsaw puzzle 2312' has four pieces remaining to completion and right jigsaw puzzle 2314' has been completed with no pieces remaining. In this embodiment, the completion of right jigsaw puzzle 2314' awards the player the Jumbo progressive with a payout as shown in progressive box 2308. In this embodiment, when the right jigsaw puzzle 2314' has been completed, the left jigsaw puzzle 2310' and middle jigsaw puzzle 2312' have been greyed out or otherwise visually diminished and the right jigsaw puzzle 2314' has been highlighted to emphasize the winning outcome to the player. However, as the player has free games remaining, the player may still complete either left jigsaw puzzle 2310' and/or middle jigsaw puzzle 2312' for additional progressive awards. Those skilled in the art will recognize that while progressive awards are awarded to the player in this embodiment, any type of award may be included. In addition, while jigsaw puzzles 2310', 2312', and 2314' include graphics corresponding to the three progressives, 2304, 2306, and 2308, respectively, any other graphics may be used and may or may not correspond to the progressives 2304, 2306, and 2308. For instance, completion of one or more of the plurality of jigsaw puzzles can result in the award of additional multipliers to the player. For example, if the final total award for the second part of the two-part game is X and the player completes one or more of the plurality of jigsaw puzzles, each jigsaw puzzle may provide a multiplier, either fixed or random. If the multiplier for a particular jigsaw puzzle is Y, the payout for the second part of the two-part game equals X multiplied by Y. Those skilled in the art will recognize that the same or similar game features may be applied to many other puzzles or games that include volatility stabilizing sub-events (VSS). As an example, a game similar to the Hasbro® game Battleship, may include one or more targets that when destroyed or completed, provide results similar to previously discussed. In such a scenario, a target graphic may be included along with the number of strikes required to destroy the target. For instance, one or more targets may require 18 strikes to destroy or complete. Similarly, a game variant of dominos may be played where the player completes the game when all the requisite volatility stabilizing sub-event dominos have been played. Like all games and puzzles available for the two-part games, a single game or puzzle may be included or a plurality of games or puzzles may be included. Other games or puzzles may utilize the volatility stabilizing sub-events. For example, Gaming Arts® Vault Cracker™ game and Gaming Arts® Cracker™ require cracking the combination or code to open the vault or ATM. These games are hereinafter described in more detail.

In addition to the volatility stabilizing sub-event (VSS) games discussed, hybrid games and puzzles are possible where volatility stabilizing sub-event (VSS) are coupled with random results to produce games with higher volatility yet still limiting or reducing the probability of "cold streaks." For example, a keno game includes a minimum number of sub-events to be awarded and then coupled with random results to improve the award. For instance, a keno game may require a player to catch a 5-spot for a winning result or completion and then allow for random events to improve to a 6-spot, 7-spot, etc. Other games or puzzles such as Tic-Tac-Toe may be included where the minimum number of sub-events equals the minimum number of "X"s or "O"s needed to form a horizontal, vertical or diagonal winning line combinations. However, in the game of Tic-Tac-Toe, winning line combinations may be blocked by opposing "X" or "O" symbols which may be randomly placed on the Tic-Tac-Toe grid. In such cases, additional random symbol awards or placements may be required to complete or win the game. In some cases, no win is possible resulting in a "cat's" game. As such, the Tic-Tac-Toe game may include volatility stabilizing sub-event (VSS) coupled with random results to produce games with higher volatility yet still limiting or reducing the probability of "cold streaks".

FIG. 23I illustrates the results or conclusion of the final free game of the second-part free game round of the two-part game. As illustrated, free games window 2380 indicates that each of the 14 free games awarded have been completed and a banner 2384 is provided to inform the player of their total win amount of 4,080 credits of the video reel portion of the game. In addition, as shown in FIG. 23J, the player was able to complete the right jigsaw puzzle 2314' and has been awarded the Jumbo progressive amount of $103.25.

After the second part of the two-part game has been completed, the game effectively resets to a state of readiness for the beginning of the next two-part game. As illustrated in FIG. 23K, the jigsaw puzzles 2310, 2312 and 2314 have been replaced by new jigsaw puzzle 2310" depicting a kitten, a middle jigsaw puzzle 2312" depicting a landscape, and a right jigsaw puzzle 2314" depicting a butterfly including different puzzle graphics than the previous game. By doing so, the player enjoys game variety while playing the same game. In practice, a large number of different jigsaw puzzle graphics may be stored in memory Moreover, when multiple electronic gaming machines are placed on the casino floor, each will most often display differing jigsaw puzzles where a player may find one set of jigsaw puzzles more appealing than others and choose to play. In any case, such a game will be recognizable to a previous player yet always appear slightly different and attractive.

Figure 24A:
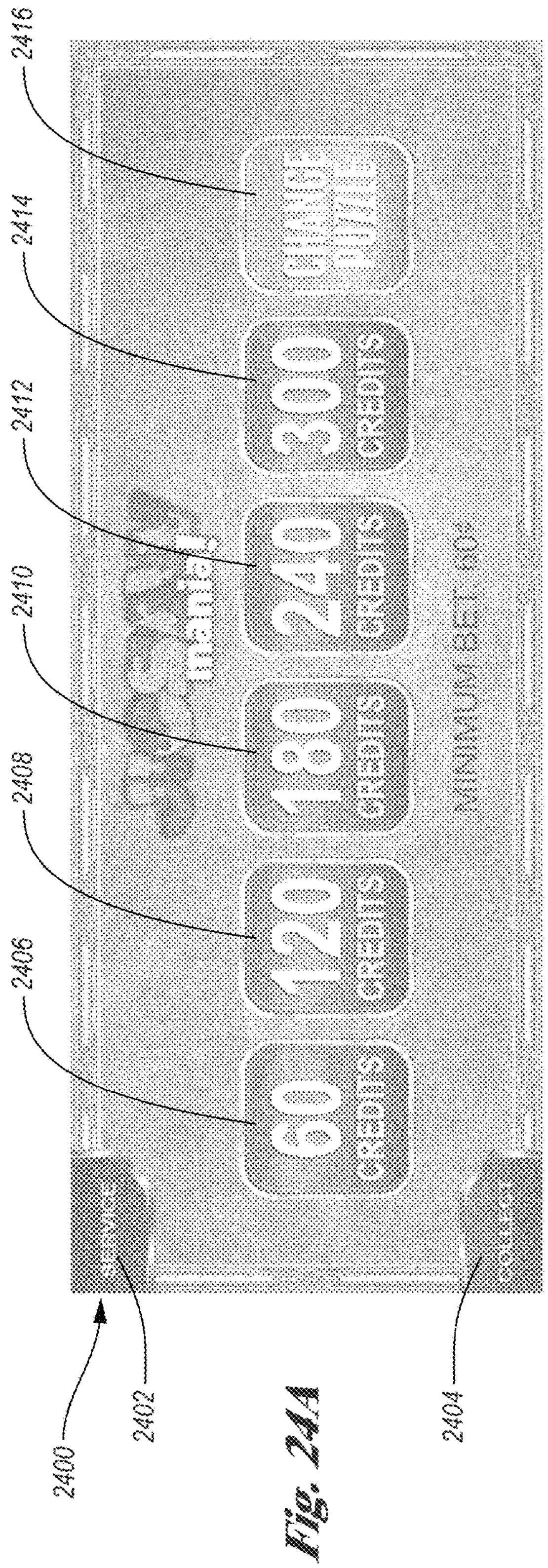
FIGS. 24A through 24F illustrate screen shots of a touch screen button display used in conjunction with the jigsaw puzzle game utilizing volatility stabilizing sub-events (VSS)

In modern electronic gaming machines, it is commonplace that the game includes a touch screen display on the button deck which provides a number of functions that may relate in some fashion to the primary game. As illustrated in FIG. 24A, a touch screen button display 2400 includes wager selection buttons 2406, 2408, 2410, 2412, and 2414. In addition, a service button 2402 and a collect button 2404 are provided. The functionality of these buttons is well known in the art. In addition to the standard buttons, a change puzzle button 2416 is provided allowing the player to replace the existing jigsaw puzzle graphics in the primary game. This allows the player to customize or replace the jigsaw puzzle graphics to new jigsaw puzzle graphics that are more to the player's liking or player's superstitions. In some embodiments, the actuation of the change puzzle button 2416 provides one of more new jigsaw puzzle graphics for players to review. If the player accepts the jigsaw puzzles graphics, the player simply presses the "play" button to begin play on the first part of the two-part game which includes volatility stabilizing sub-events (VSS). In the alternative, the player may again press the change puzzle button 2416 to produce yet another one or more jigsaw puzzle graphics. In one embodiment, when the player holds down the change puzzle button 2416, the jigsaw puzzle graphics scroll for a more rapid viewing of all possible jigsaw puzzle graphics. Those skilled in the art will recognize that the term "press" and "touch," when referring to buttons, are used interchangeably and may apply to both physical and virtual buttons.

Figure 24B:
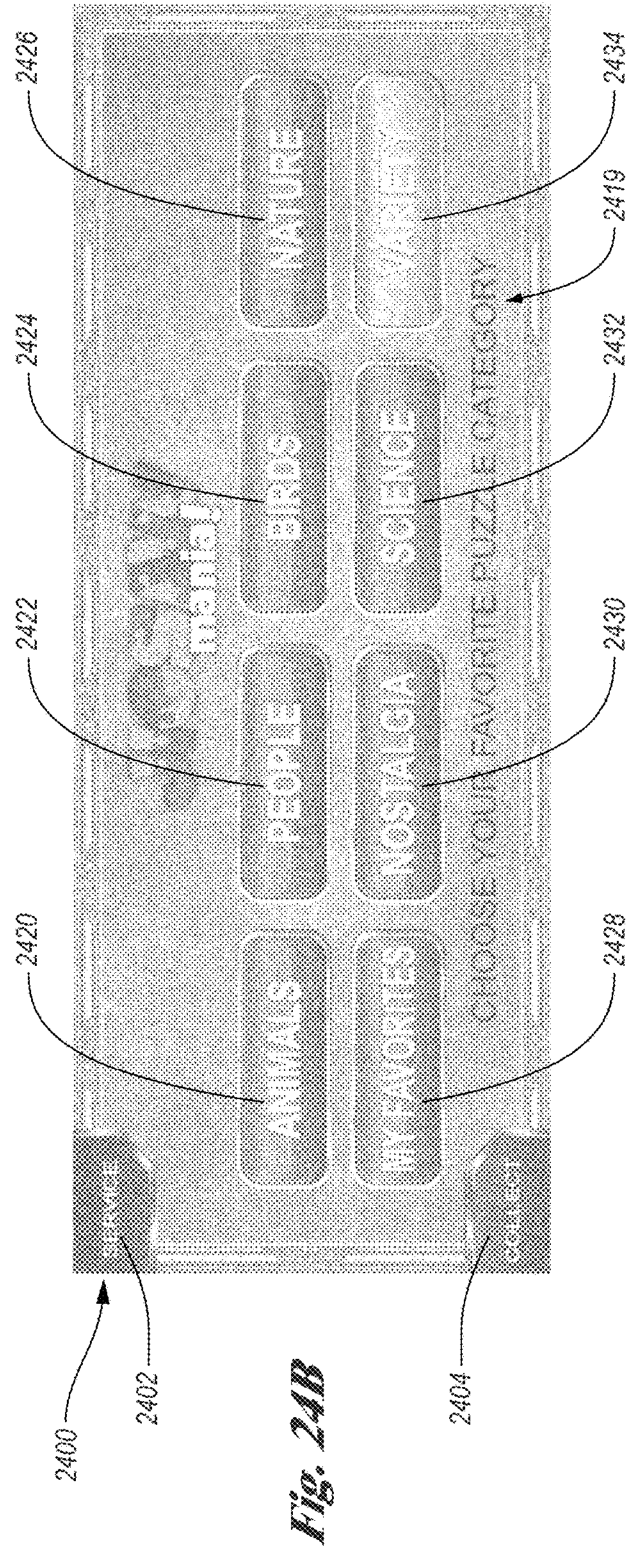

As shown in FIG. 24B, an alternative jigsaw puzzle selection method may be employed. Following the pressing of the change puzzle button 2416, the touch screen button display 2400 provides a new interface for jigsaw puzzle selection. As illustrated, the player is now able to select jigsaw puzzle graphic categories which may appeal to the player as indicated by banner 2419. For instance, a player may select "animals" 2420, "people" 2422, "birds" 2424, "nature" 2426, "my favorites" 2428, "nostalgia" 2430, "science" 2432 or "variety" 2434. Repeated engagement of any of these buttons produces one or more new jigsaw puzzle graphics on the main game display. If the "my favorites" button 2428 is included, it may incorporate a player recall function which saves a players' favorite jigsaw puzzle graphics in memory and tied to a players' players card, cell phone or other means of identification. In such an embodiment, one or more previously selected jigsaw puzzle graphics are displayed on the main game display. If the player accepts the jigsaw puzzles graphics, the player simply presses the "play" button to begin play of the first part of the two-part game which includes volatility stabilizing sub-events (VSS). Those skilled in the art will recognize that many play button options exist for the game designer. These may include one or more physical play buttons or virtual play buttons which may be placed on the button deck, included in the button deck display or, if virtual, located on the main game display, if virtual.

Figure 24C:
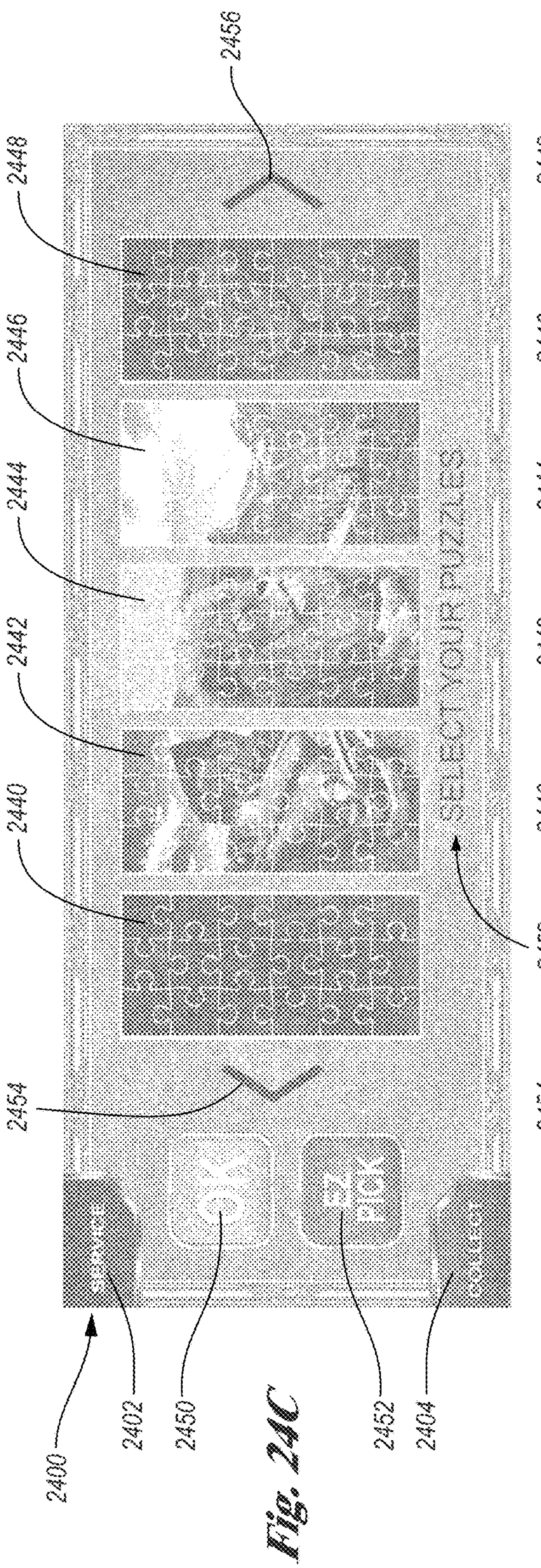

FIG. 24C illustrates another jigsaw puzzle selection method. In this embodiment, when the player presses the change puzzle button 2416 on the touch screen button display 2400, a new interface is provided allowing the player to scroll through the jigsaw puzzle graphics library. The "select your puzzles" banner 2458 alerts the player to this functionality. The various jigsaw puzzle graphics are displayed in windows 2440, 2442, 2444, 2446, and 2448. In the interface illustrated the leftmost and rightmost jigsaw puzzle graphics are greyed out yet still visible should the player choose to go back or move forward by pressing the left arrow 2454 or right arrow 2456. The current jigsaw puzzle graphic selection is not greyed out and appears in windows 2442, 2444, and 2446.

Figure 24D:
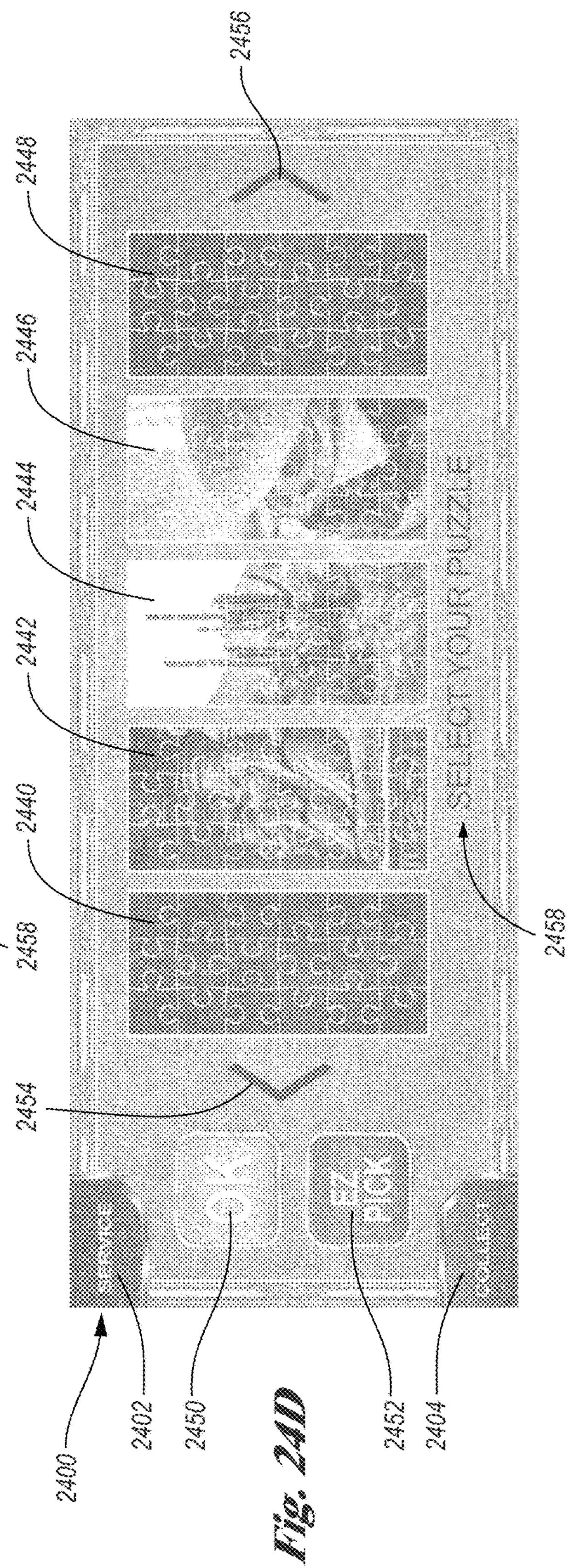

FIG. 24D illustrates a new set of jigsaw puzzle graphics available to the player. If the player accepts the jigsaw puzzles graphics, the player simply presses the "play" button to begin play on the first part of the two-part game which includes volatility stabilizing sub-events (VSS). Alternatively, the player may touch the "OK" button 2450 or touch the "EZ pick" button 2452.

Figure 24E:
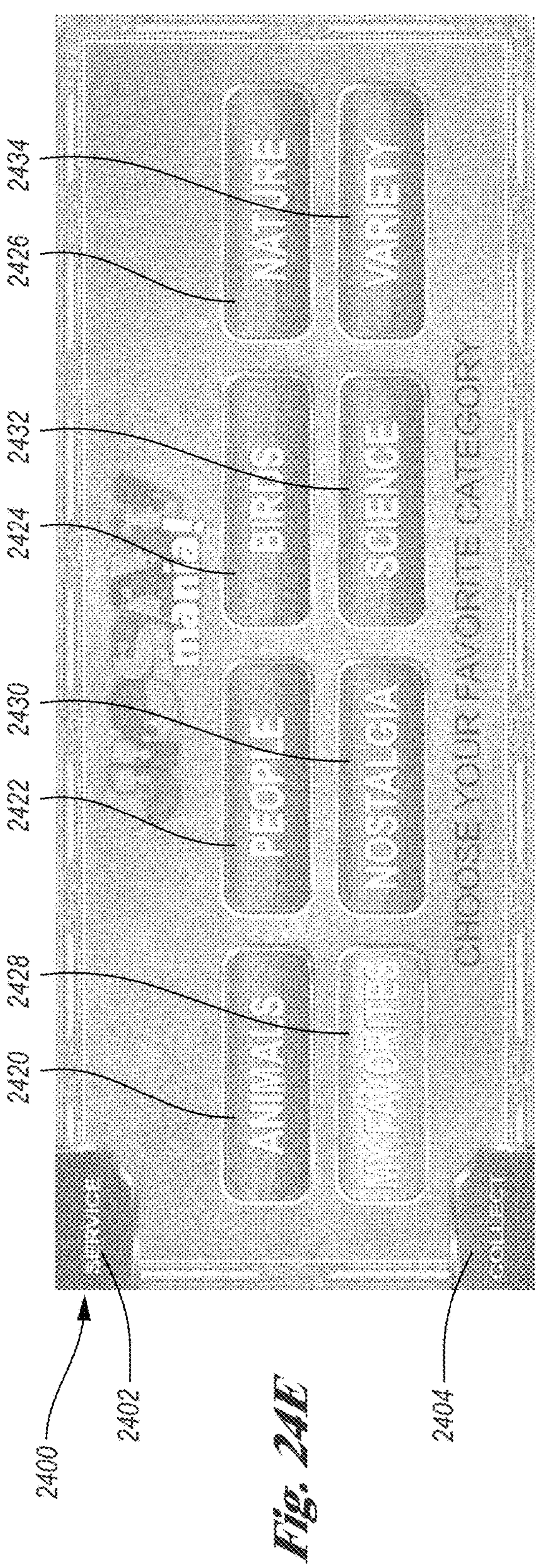
Figure 24F:
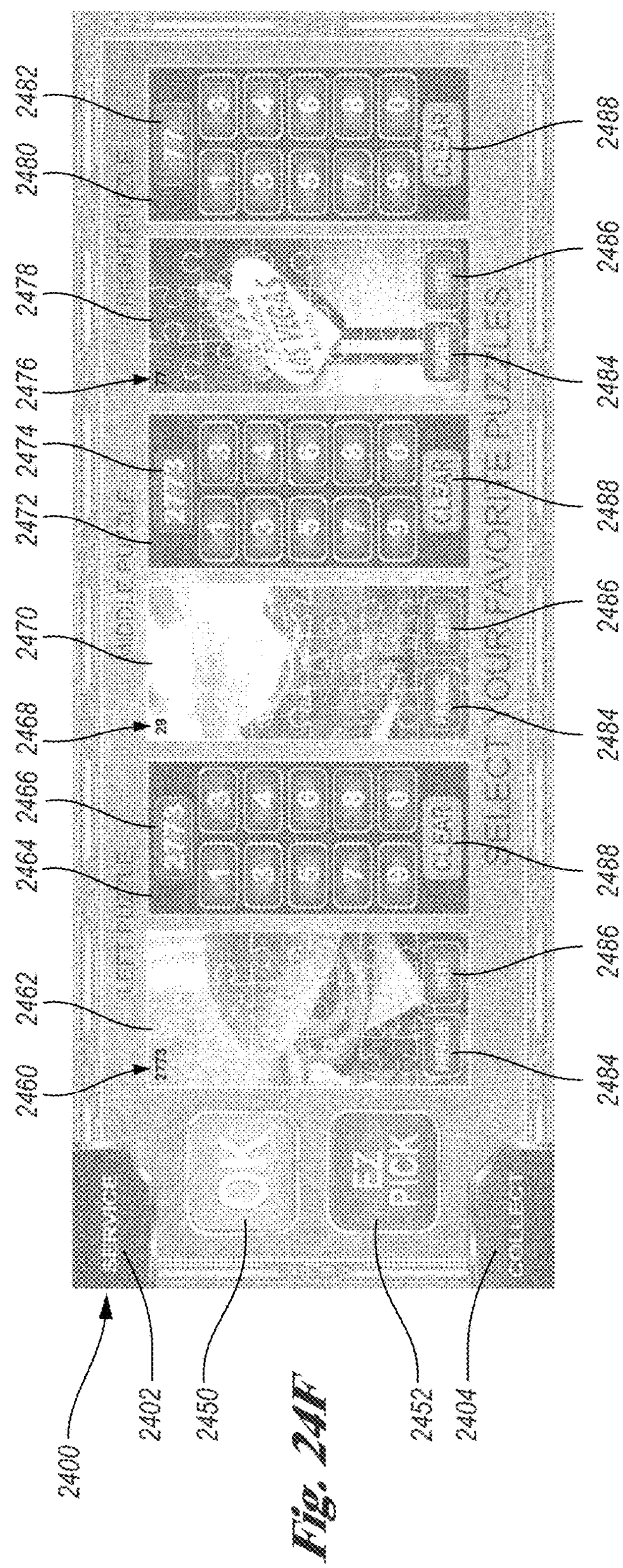

FIG. 24E illustrates a touch screen button display where the "my favorites" button 2428 has been touched changing the interface to an alternative selection screen illustrate in FIG. 24F. As shown in FIG. 24F, an interface is provided which allows the player to select a jigsaw puzzle graphic by identification number or by scrolling from one jigsaw puzzle graphic to another. In this embodiment, the number of jigsaw puzzles equals the number of jigsaw puzzles in the game. Referring to the leftmost jigsaw puzzle selection 2462, a graphic of a hamburger is shown. This graphic is further identified by a reference number 2460 which in this case is 2773 as also shown in window 2466. This reference number 2460 allows the player to enter the reference number on the keypad 2464 to access the jigsaw puzzle graphic from the jigsaw puzzle graphic library. A player may either remember the reference number for a particular jigsaw puzzle graphic or make a note of it for future reference. Also, included within the keypad is a "clear" button 2488 which clears the entry for the player. To aid the player in jigsaw puzzle graphic selection, the interface includes a "previous" button 2484 to recall the last jigsaw puzzle graphic and a "next" button 2486 to advance to the next jigsaw puzzle graphic. Referring to the middle jigsaw puzzle selection 2470, a graphic of a landscape is shown. This graphic is further identified by a reference number 2468 which in this case is 29 as also shown in window 2474. This reference number allows the player to enter the reference number on the keypad 2472 to access the jigsaw puzzle graphic from the jigsaw puzzle graphic library. A player may either remember the reference number for a particular jigsaw puzzle graphic or make a note of it for future reference. Also, included within the keypad is a "clear" button 2488 which clears the entry for the player. To aid the player in jigsaw puzzle graphic selection, the interface includes a "previous" button 2484 to recall the last jigsaw puzzle graphic and a "next" button 2486 to advance to the next jigsaw puzzle graphic. Referring to the rightmost jigsaw puzzle selection 2478, a graphic of a landscape is shown. This graphic is further identified by a reference number 2476 which in this case is 77 as also shown in window 2482. This reference number allows the player to enter the reference number on the keypad 2478 to access the jigsaw puzzle graphic from the jigsaw puzzle graphic library. A player may either remember the reference number for a particular jigsaw puzzle graphic or make a note of it for future reference. Also included within the keypad is a "clear" button 2488 which clears the entry for the player. To aid the player in jigsaw puzzle graphic selection, the interface includes a "previous" button 2484 to recall the last jigsaw puzzle graphic and a "next" button 2486 to advance to the next jigsaw puzzle graphic.

Those skilled in the art will recognize that the many features, functionalities and game mechanics of the embodiments shown may be adapted to many other games or puzzles for either the first part or phase or second part or phase or both parts or phases of two-part games which employ volatility stabilizing sub-events (VSS), either partially or in full or in hybrid scenarios as previously described.

Figure 25A:
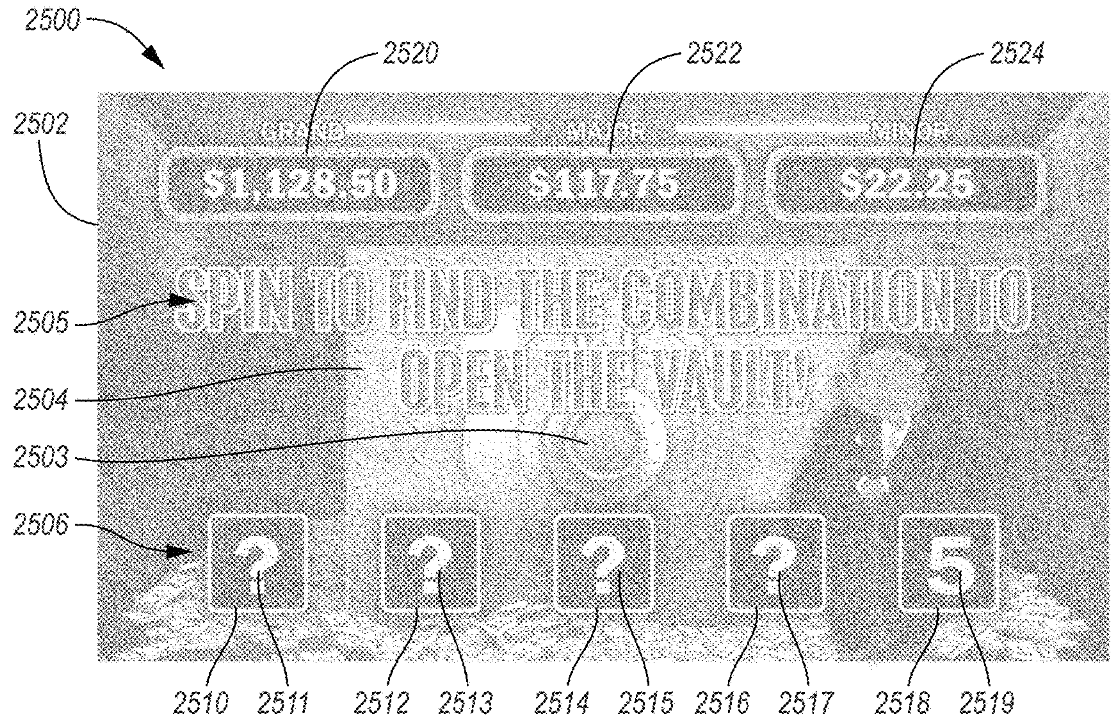
FIGS. 25A through 25X illustrate screen shots of a bank vault themed game utilizing volatility stabilizing sub-events (VSS)

FIG. 25A illustrates another embodiment of a game which employs volatility stabilizing sub-events (VSS), either partially or in full or in hybrid scenarios as previously described. In this case, the game theme is Vault Cracker™ which is being developed by Gaming Arts®. As illustrated, the game is designed for a dual display cabinet but those skilled in the art will recognize that such games, including those games described herein, may exist on single portrait display cabinets, dual display cabinets, or three or more display cabinets.

These style video reel slot machine games, which include games and puzzles as previously described, may be described as a series of individual video reel style slot machine games that are part of a larger two-part slot machine game in which the return to player (RTP) percentage may be divided as the game designer chooses depending on the volatility level desired and the acceptance of the playing public. Recent slot machine game designs have pushed the envelope of volatility higher to appease players with some success, albeit at times short-lived due to catastrophic cold spells for the player. In other words, feast or famine for the player, often leading to a player seldom, if ever, playing that particular game again.

This video reel style slot machine game is part of a larger two-part video reel slot machine game wherein the first part of game includes individual games of the video reel game where credits are won or lost in the first phase or part of the two-part overall volatility stabilizing sub-events (VSS) game. During this phase or part of the two-part game, a volatility stabilizing sub-events (VSS) puzzle or game is included where when finished or concluded allows the player to enter the second phase or part of the game. The second phase or part of the two-part game may also include a volatility stabilizing sub-events (VSS) puzzle or game. The probability of winning during the first phase or part of the game is always low, although a player may have a positive return on occasion. Of course, a player may choose to only play a single game or a portion of the first phase or part of the larger two-part game. However, it is often desirable to allow the next player of that game to pick up where the previous player stopped playing so the two-part slot machine game continues with different players. Generally, the first phase or part of the overall two-part game includes far more plays or spins than the second phase or part of the two-part games, at times 10 to 20 times more spins. However, the opposite may be true for the payouts of the second phase or part of the two-part game whereas payouts per spin or play may be many multiples higher than the first phase or part of the two-part game and where no or fewer credits may be expended in the play of the second phase or part of the two-part game. In addition, other awards may be included in the second phase or part of the two-part game that may not be available during the first phase or part of the two-part game such as progressive awards and the like. Similar or other awards may be associated with finishing or concluding a volatility stabilizing sub-events (VSS) puzzle or game with the same, similar or differing play characteristics during the second phase or part of the two-part game.

With the embodiment of the Vault Cracker™ game, as illustrated, one or more vault combinations may be included where the goal is to find or solve the combination which opens the vault. Within the one or more combinations, a plurality of individual numbers or other indicia are needed to complete the combination and preferably, the numbers or indicia which make up the combination must also be properly sequenced.

As illustrated in FIG. 25A, a combination is required to proceed to the second phase or part of a two-part game whereas the combination includes a plurality of individual numbers or other appropriate indicia. Although only one vault combination is illustrated, those skilled in the art will recognize that multiple vaults and associated combinations may be included in a similar fashion to the jigsaw puzzle game previously described. In addition, the solving of the combination of the one or more vaults may produce a wide variety of awards such as progressive awards, multiplier awards, specific credit awards, free game awards, etc.

For instance, if each of a plurality of vaults produce differing awards, lesser value awards may require fewer numbers or other indicia to solve the combination while higher awards may require a larger set of numbers or other indicia to solve the combination. Regardless of how the individual numbers or other indicia are introduced into the game, they may be automatically placed in their proper location or may require player input to properly place the numbers or other indicia or the numbers may be randomly placed. In the embodiment illustrated, the individual numbers or other indicia are first introduced on the primary video reels of a video reel slot game and then either simultaneously or later appear in the vault combination above if the numbers or indicia are part of the combination solution. If numbers or other indicia which appear in the video reel portion of the game are not part of the combination solution, they may be discarded, removed, or otherwise deemed to have no effect. It is preferable that once a number or other indicia have appeared which are not part of the combination solution, they may be removed from a pool of possible numbers or other indicia so that incorrect numbers or other indicia do not repeatedly occur. As shown in FIG. 25A, the video reel portion includes five vertically oriented virtual reels which correspond to the five numbers or other indicia required to solve the vault combination. Those skilled in the art will recognize that reels and combinations need not correspond in any manner to one another. Although this configuration allows for easy combination recognition by the player, other configurations may also be utilized such as a three numbers or other indicia combination for a 5-reel game or 7 numbers or other indicia for a 5-reel game. Those skilled in the art will recognize that for any of the games or puzzles described which include two or more phases or parts in a two or more-part game which include volatility stabilizing sub-events (VSS), any number of video reels may be included or multiple reel sets may be utilized. Moreover, although often referred to as a first or second phase or part of a two-part game, more or less phases or parts may be included and the number of parts of a two-part game may include more than a two-part game such as a three-part game or a four-part game.

It is not necessary that the probability of awarding a sub-event is the same for each sub-event. For instance, the probability for awarding a sub-event at the beginning of a game may be higher than the probability for later awards. In the case of a vault game, sub-event combination numbers or other indicia in the beginning of the game may have a higher probability of occurrence as opposed to combination numbers or other indicia that occur toward the end of the combination solution.

When the volatility stabilizing sub-events (VSS) are implemented, a meter of some type, as well known in the art, such as circular meters, bar graphs, pie style meters, etc., may be employed providing the player an indication of how many discrete sub-events have occurred and therefore, how many additional sub-events remain or need to occur to trigger the bonus, feature, or secondary game. Such metering may be an exact representation or may be approximate or even skewed to further entice a player. For a vault style game and similar, the number of remaining sub-events, i.e., the number or other indicia necessary to produce a combination solution to complete the game, may be visible and serve the purpose of providing a visual indication of how close the player may be to a bonus, feature, secondary game, or similar. For instance, in the vault game illustrated requiring five numbers or other indicia to solve the combination, if four numbers or other indicia remain to be solved, a player is alerted that they are somewhat far from determining the final combination solution. Conversely, if only one number or other indica remains, the player is alerted that the game progress is close to the final combination solution and entry into the second phase or part of the two-part game. Such indication of progress toward a bonus, feature, or secondary game may be required in certain gaming jurisdictions in the United States (commercial or tribal casinos) or other international gaming jurisdictions.

FIG. 25A illustrates an upper game interface 2500 and a lower game interface 2530 for a vault style game including a vault 2504, vault door 2503, upper game display 2502 and a lower game display 2532. Some embodiments of the vault style game may include one or more static or progressive awards which may be equal or unequal depending on design goals. As illustrated, the game includes a Minor progressive 2524, a Major progressive 2522 and a Grand progressive 2520. As previously described, one or more vault combinations 2506 may be included in the game and preferably located on the upper display 2502. The player may be alerted to the goal of the game by banner 2505. In the vault game illustrated, the combination includes five separate numbers or other indicia which are required to solve the combination. Each of the five combination numbers or other indicia is located in boxes 2510, 2512, 2514, 2516, and 2518. Within each box 2510, 2512, 2514, 2516, and 2518 are numbers or other indicia or question marks 2511, 2513, 2515, 2517 and 2519, respectively, with the question marks indicating that the correct number or indicia is yet to appear or be placed in the proper location.

Figure 25B:
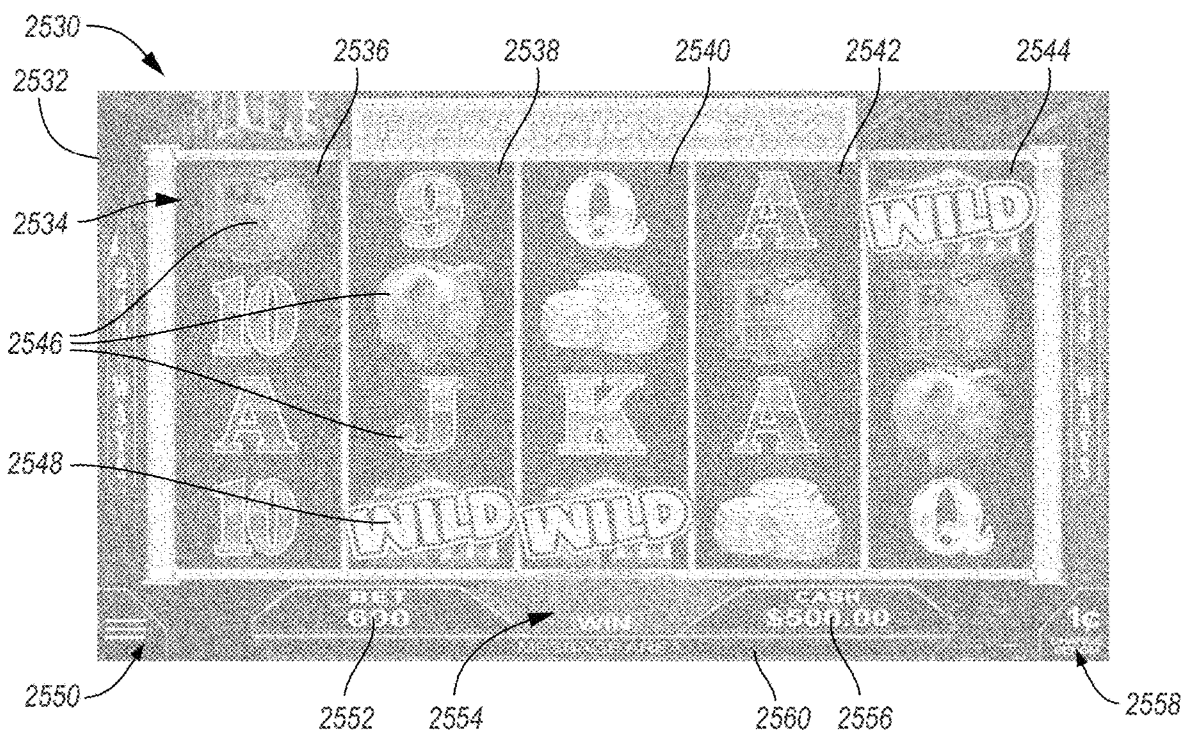

FIG. 25B illustrates the lower display 2532 containing a video reel section 2534 which further includes four lines and five vertically oriented virtual reels 2536, 2538, 2540, 2542, and 2544. Within each of the video reels, symbols 2546 or wild symbols 2548 may appear. Wild symbols 2548 may include a single wild or if desired may be expanding wilds which may cover all of the reel vertically or may migrate to other reels or positions. Although the interface indicates this is a "ways" game, "line" games may work equally as well.

As play progressives, it may be advantageous for the player to understand how close or how far a combination may be from completion. As illustrated, when many or most of the combination boxes 2510, 2512, 2514, 2516, and 2518 contain a question mark, the player is alerted that many numbers or other indicia remain to be found to form a combination solution. However, when one or few combination solution numbers or other indicia remain, the player is alerted that they are closer to achieving a combination solution which will lead to the second phase or part of the two-part games. While in this game or other similar games, the visual indication of how far or how close a player is from achieving the goal appear to be based on the number of correct numbers or other indicia, these are also a visual representation of how many volatility stabilizing sub-everts (VSS) have occurred or remain for completion of the first phase or part of the two-part game.

The vault style games also include a primary or secondary video reel game that provides individual awards either through line games or ways game or some other winning criteria. As illustrated, the video reel game display 2534 includes four lines and five vertically oriented reels 2510, 2512, 2514, 2516, and 2518. Thus, the game includes 24 discrete areas for a variety of differing symbols 2546, wild symbols 2547 or other symbols to appear. Those skilled in the art will recognize that many primary or secondary game types may be included within the vault combination style game and not just video reel games. These may include video poker, bingo, keno or any other game suitable for the purpose.

In addition to the play mechanics of the game, other information may be displayed to the player such as a help and/or information button 2550, wager or bet amount 2552, win amount 2554, total cash or credits 2556, a denomination selector button 2558 and a messaging area 2560. As the drawing figures of the screen shots are illustrations only, they may not accurately reflect win amount, credit or cash balances, bets, etc.

Figure 25C:
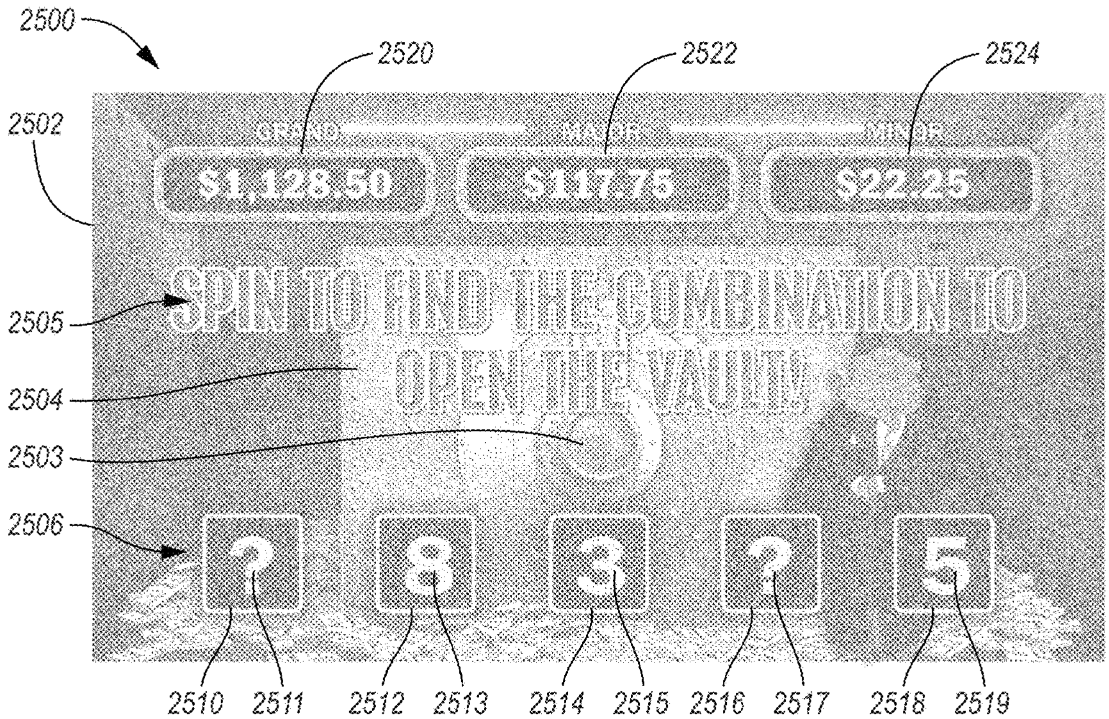
Figure 25D:
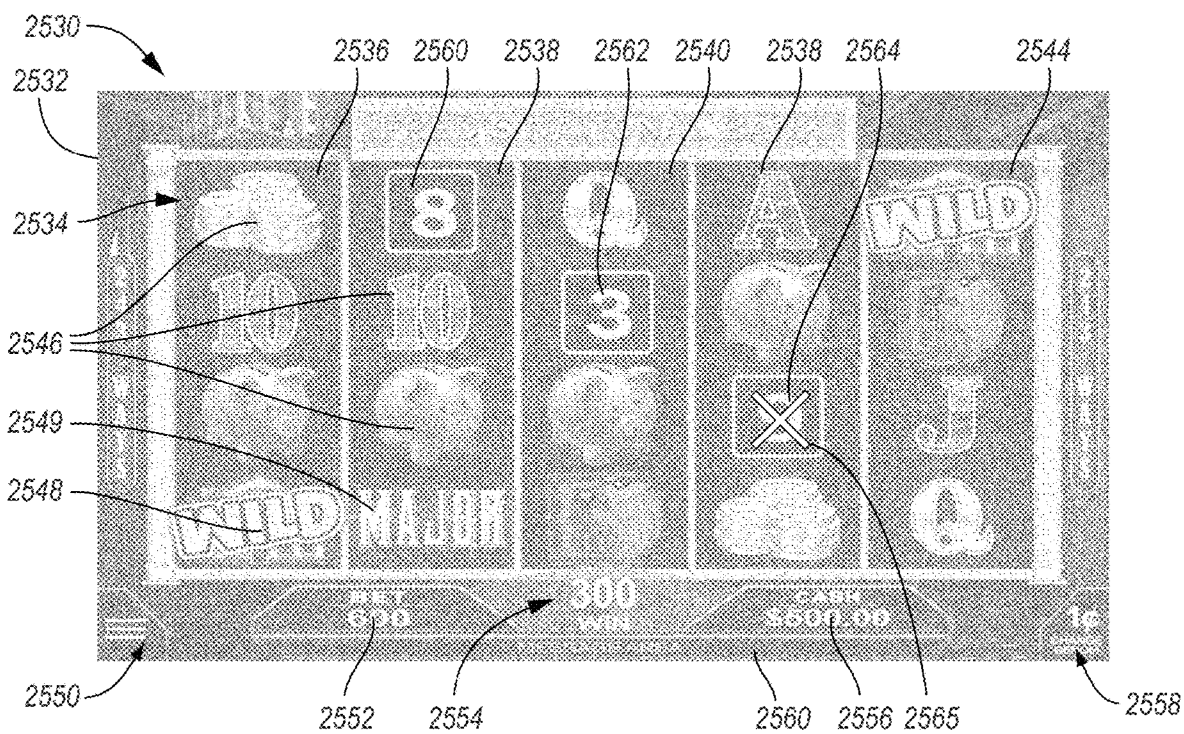
Figure 25E:
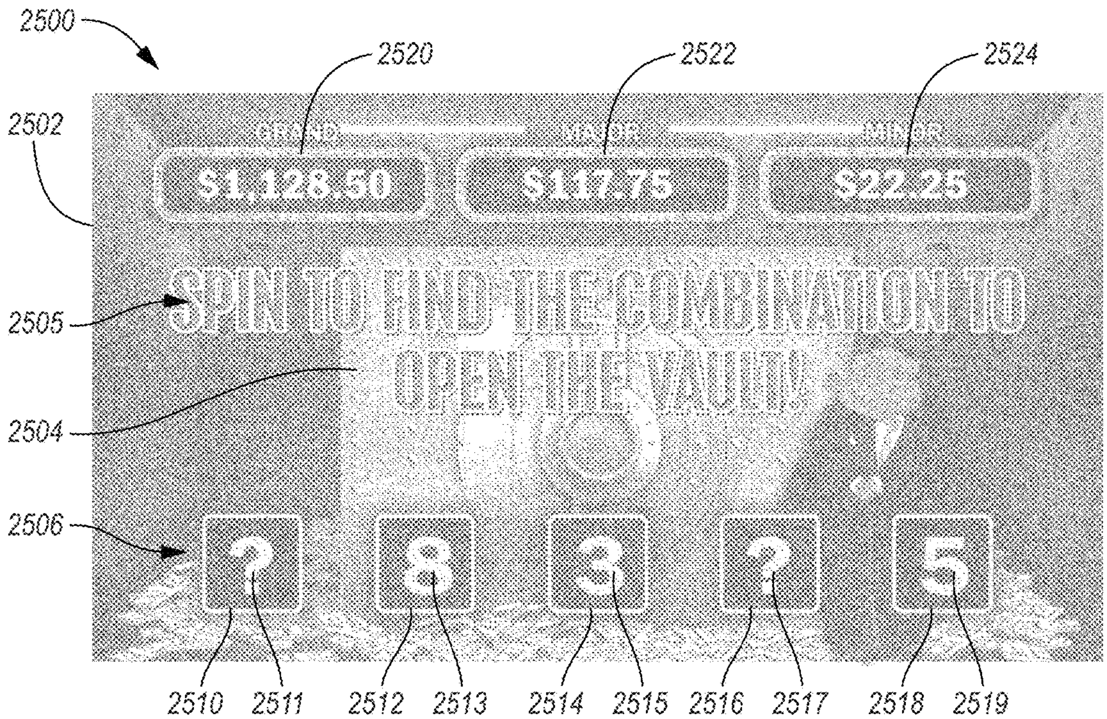
Figure 25F:
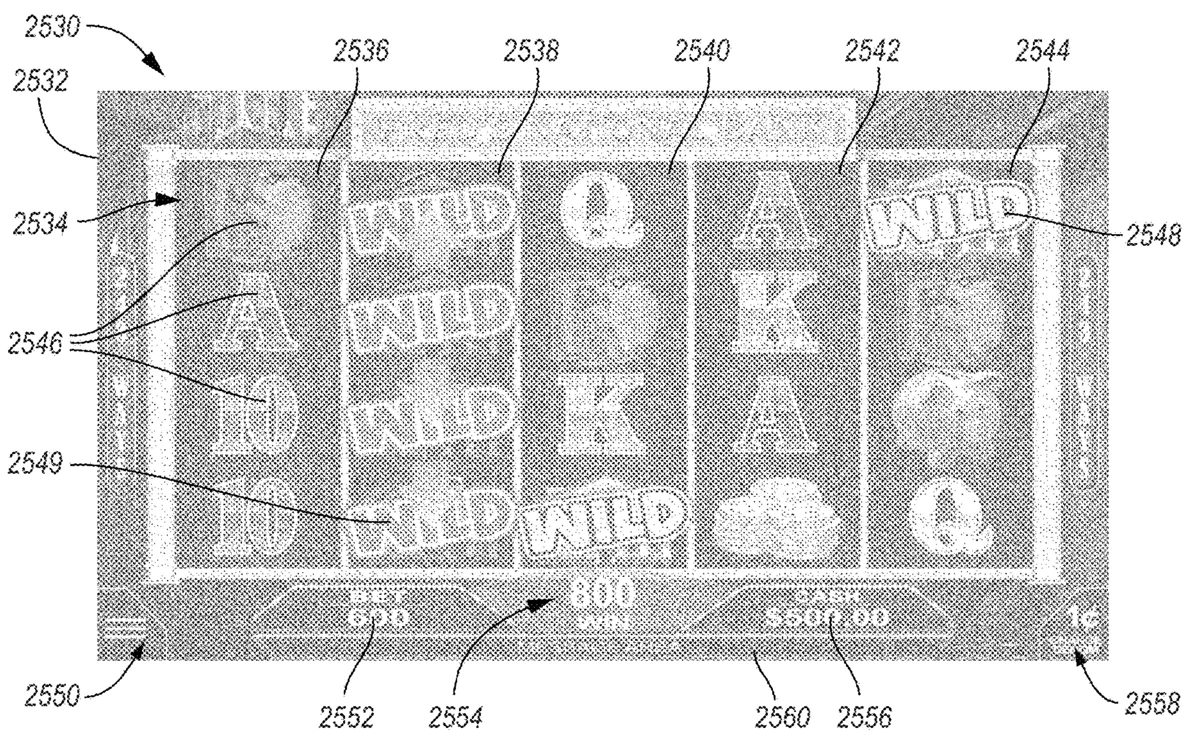
Figure 25G:
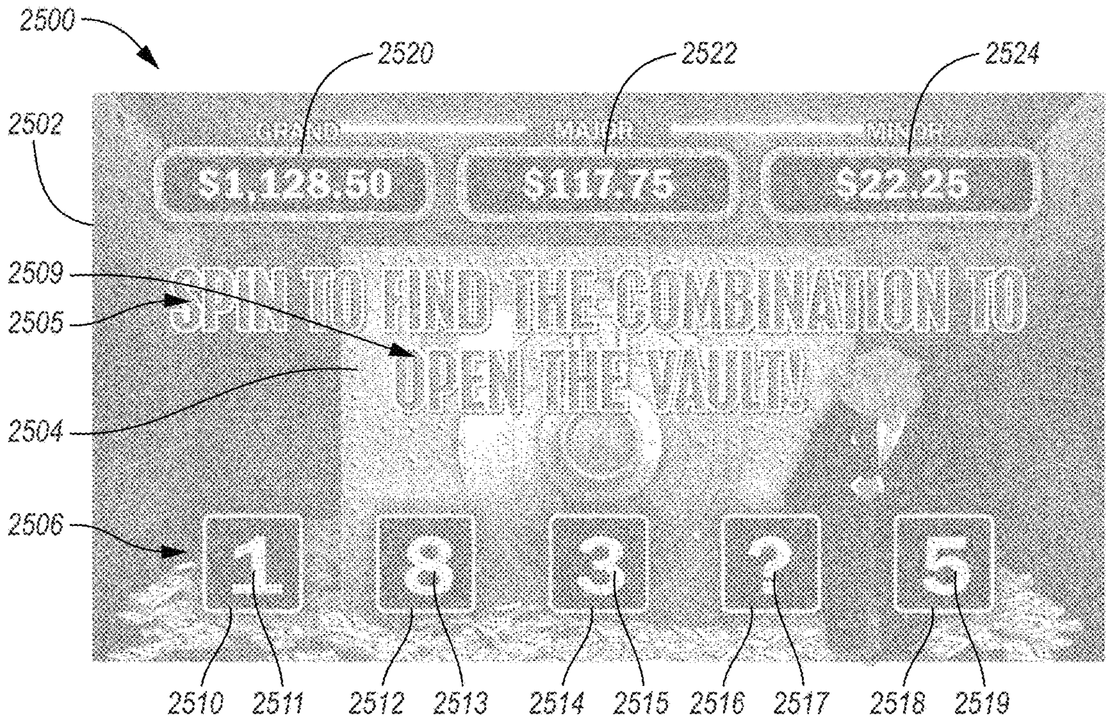
Figure 25H:
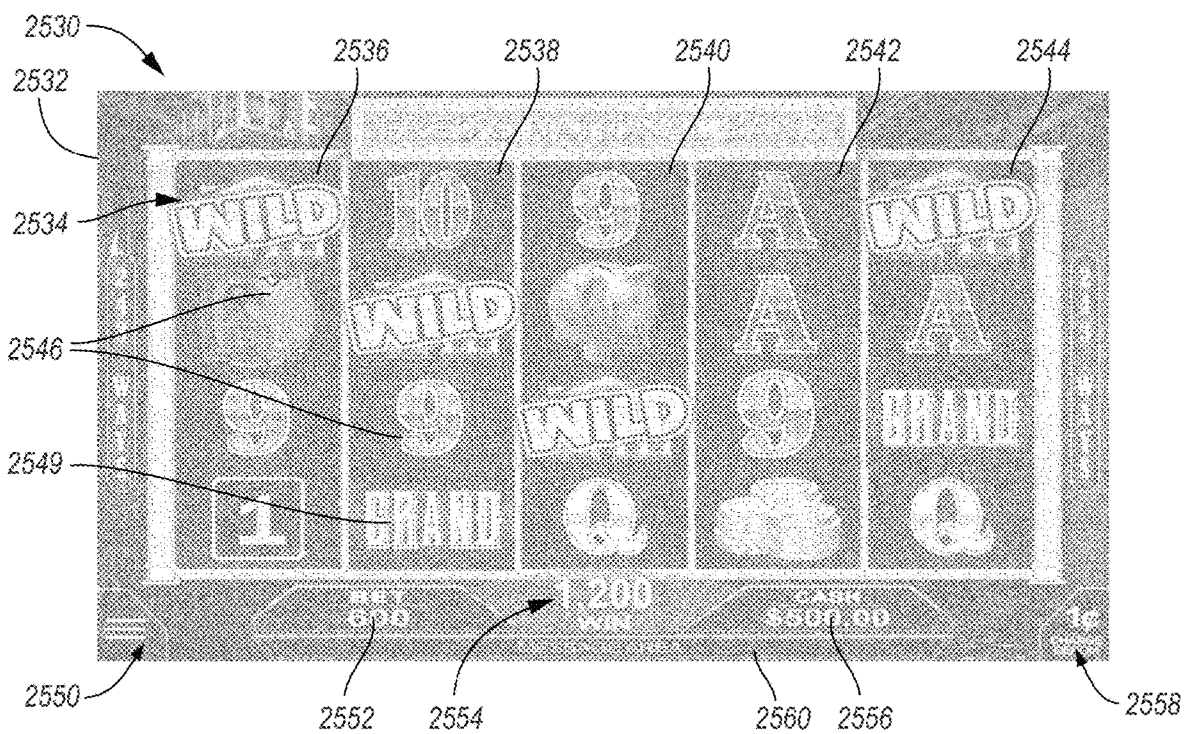
Figure 25I:
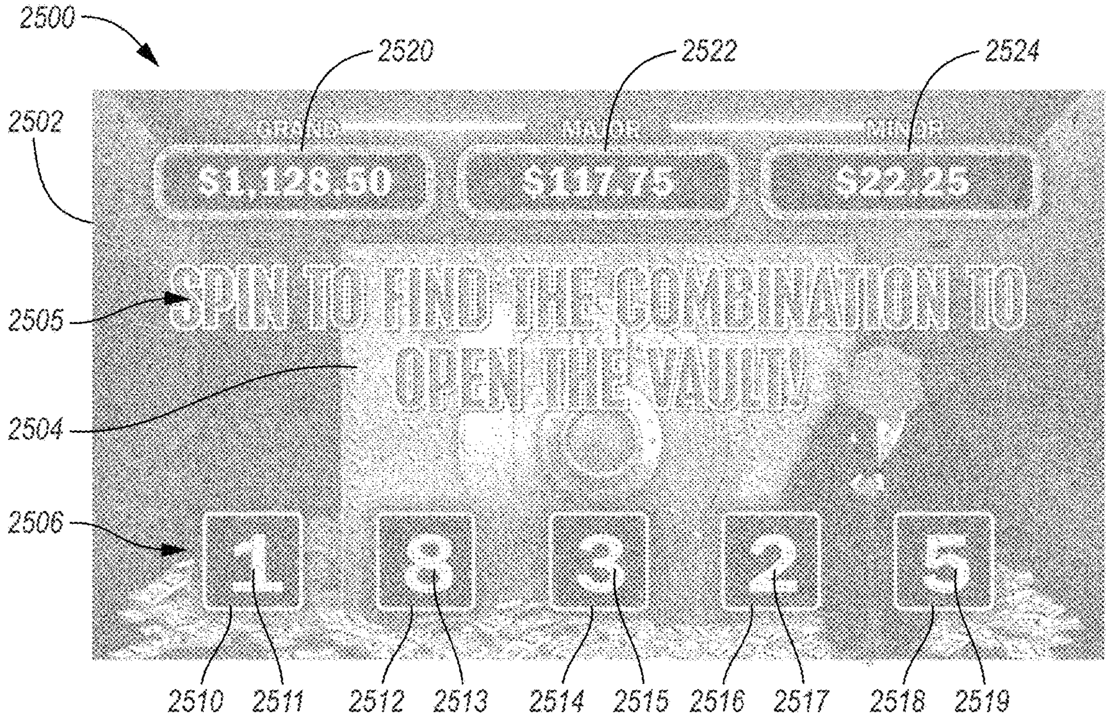
Figure 25J:
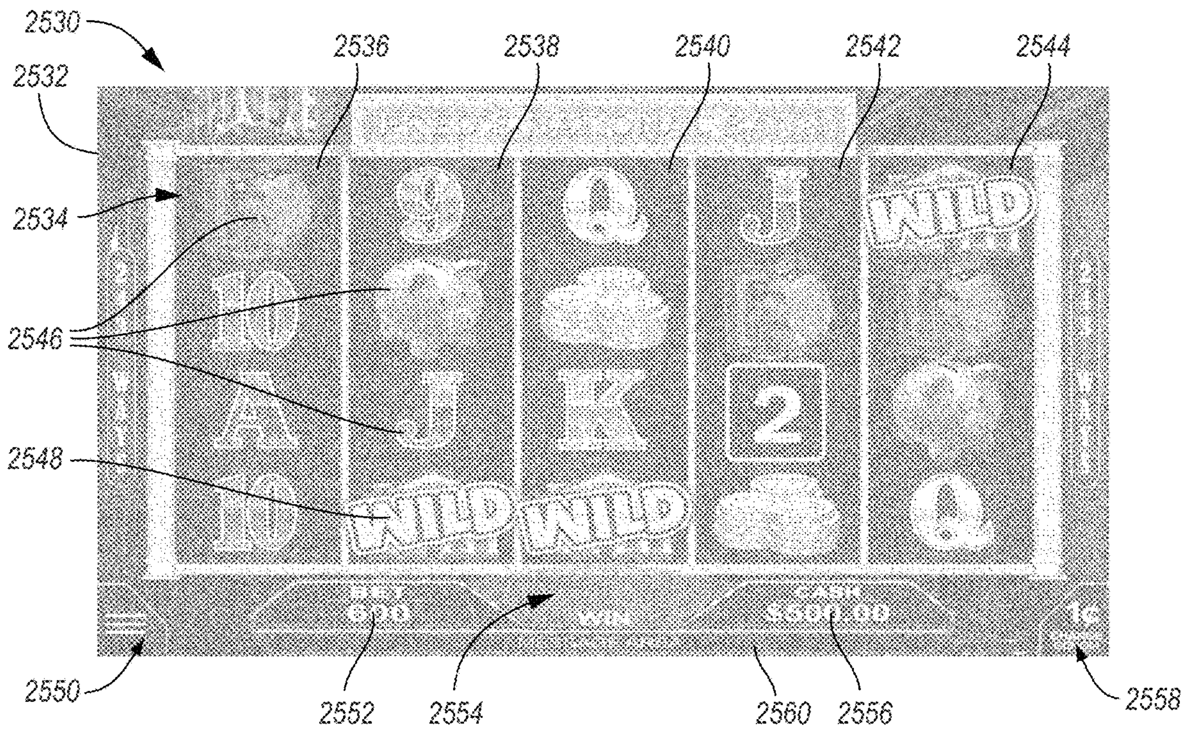
Figure 25K:
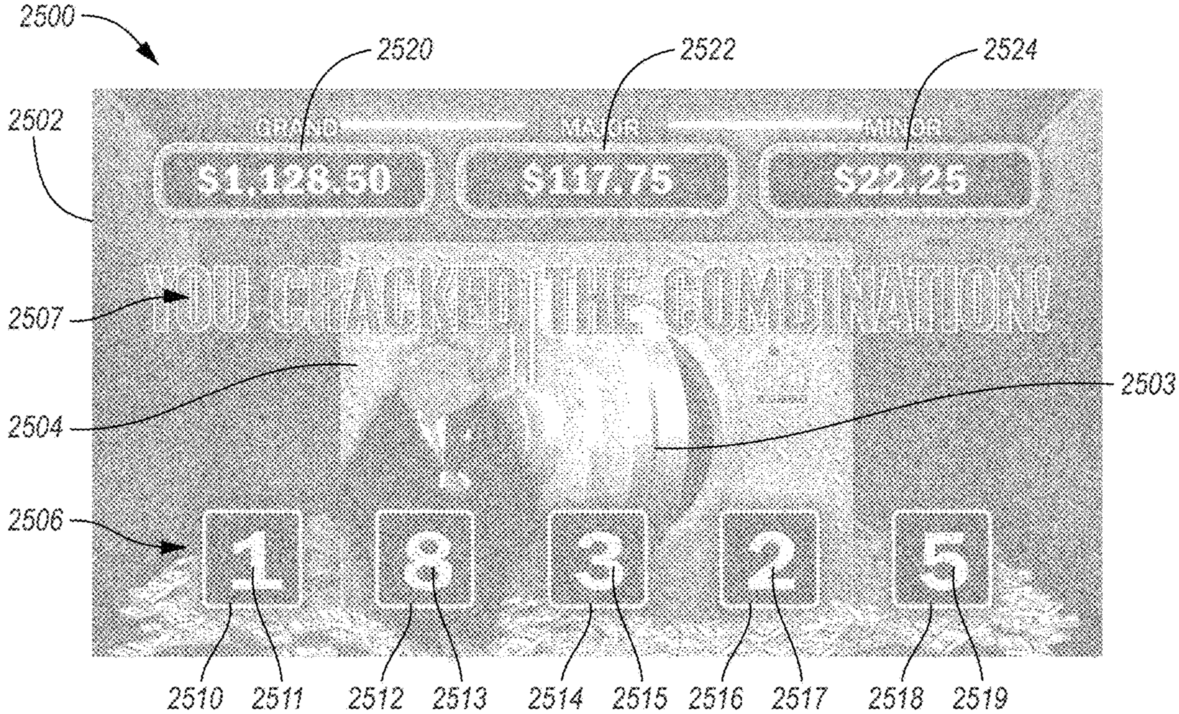
Figure 25L:
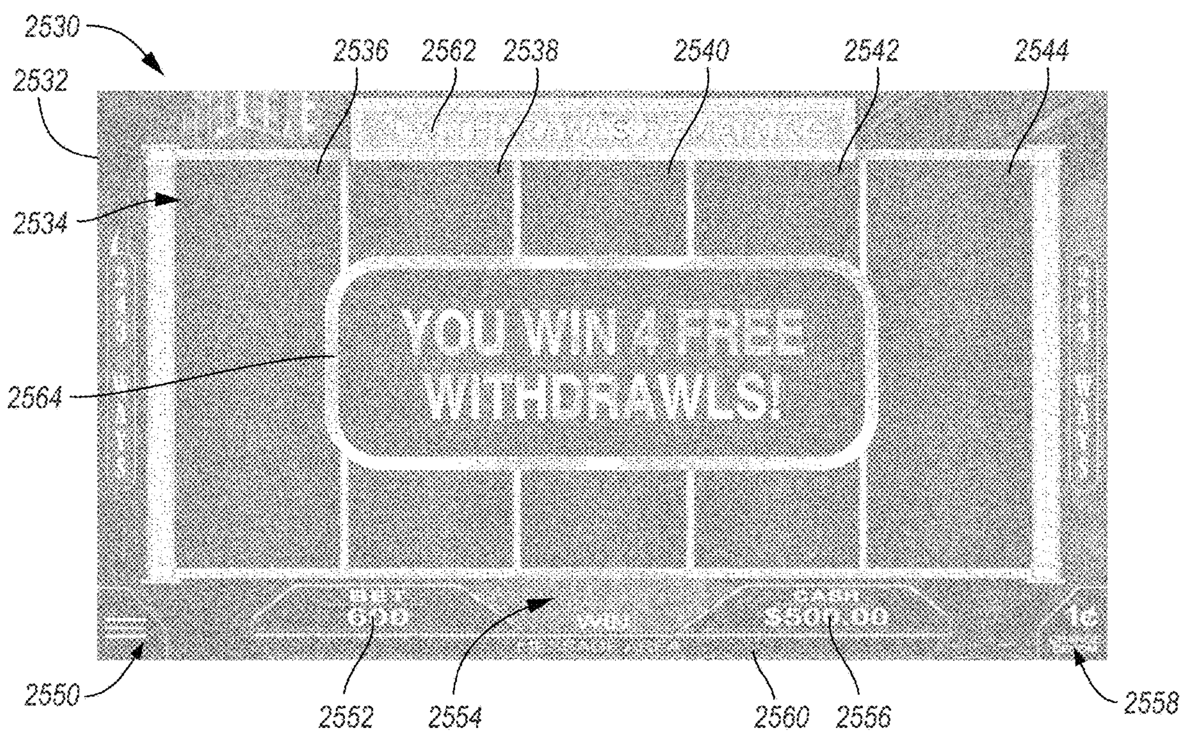
Figure 25M:
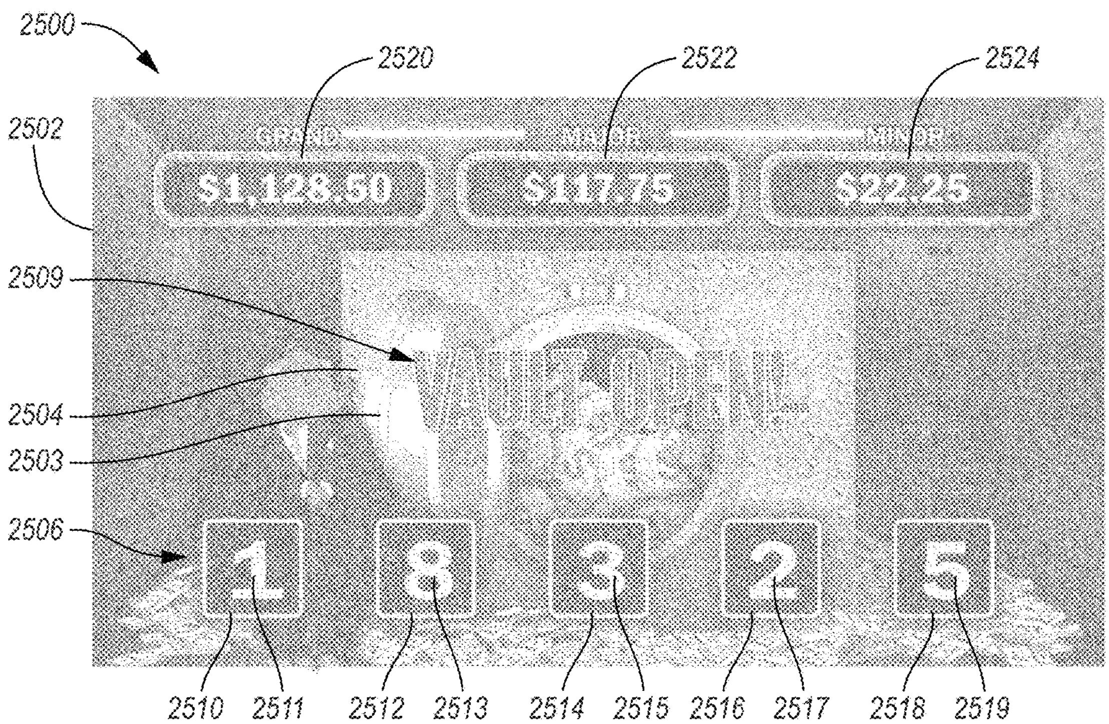
Figure 25N:
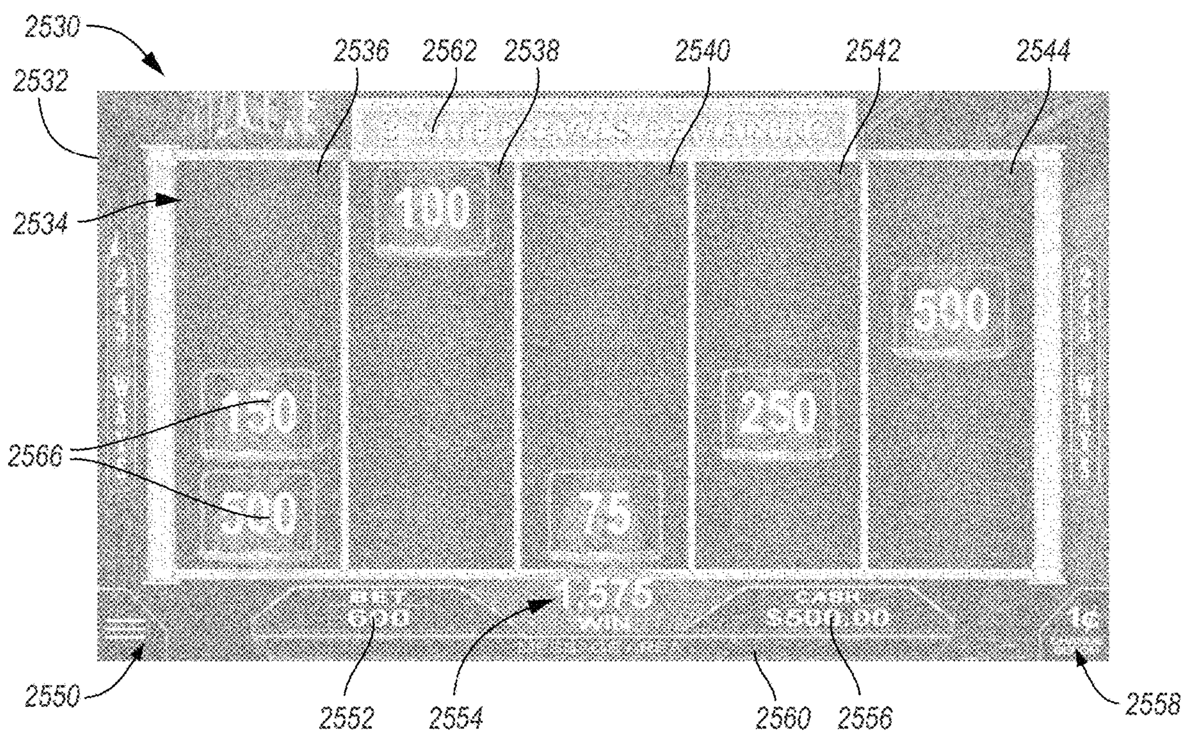
Figure 25O:
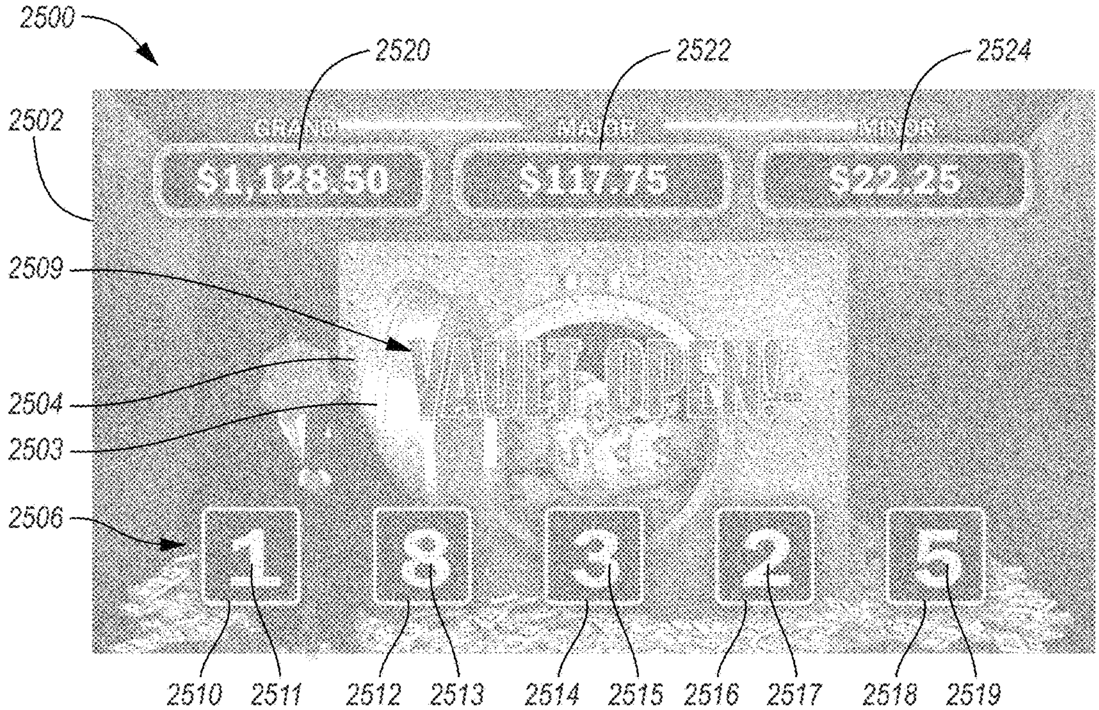
Figure 25P:
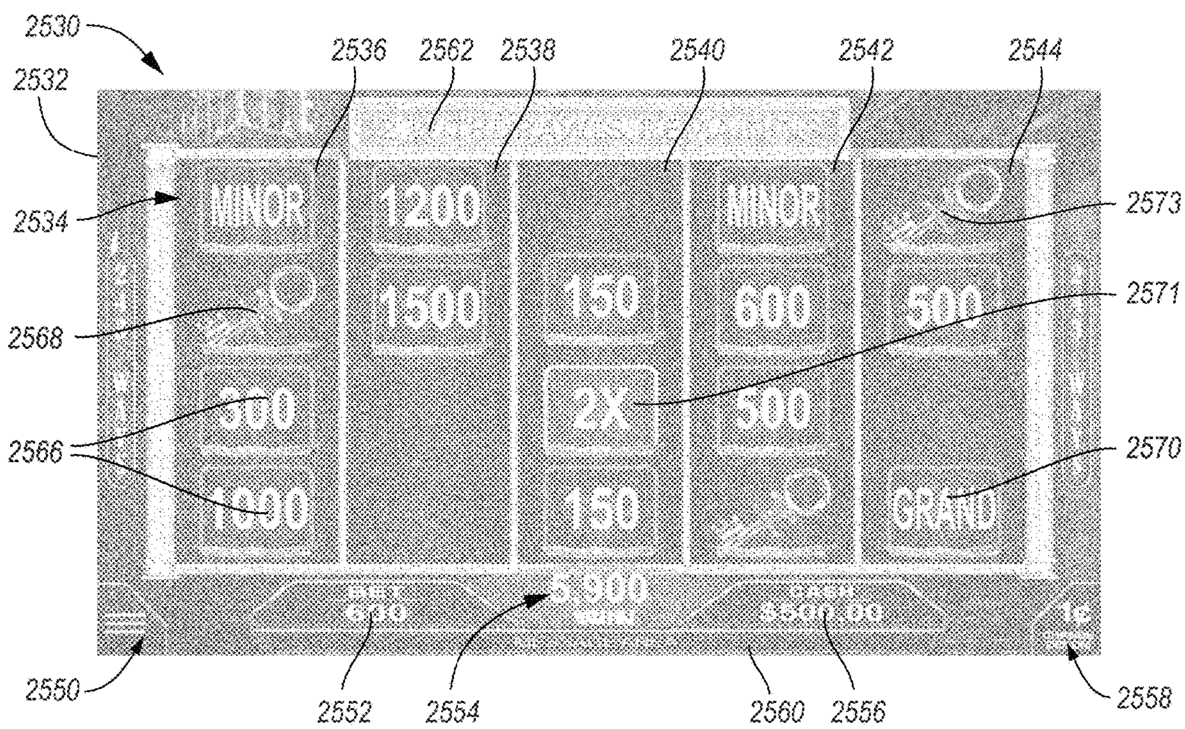
Figure 25Q:
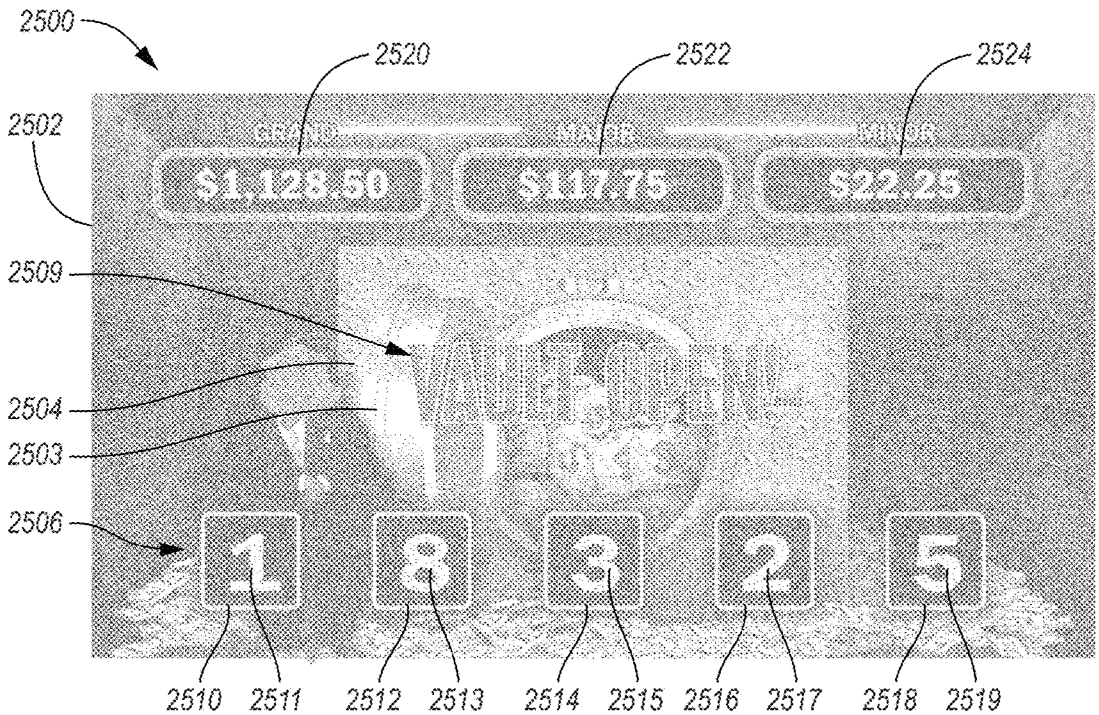
Figure 25R:
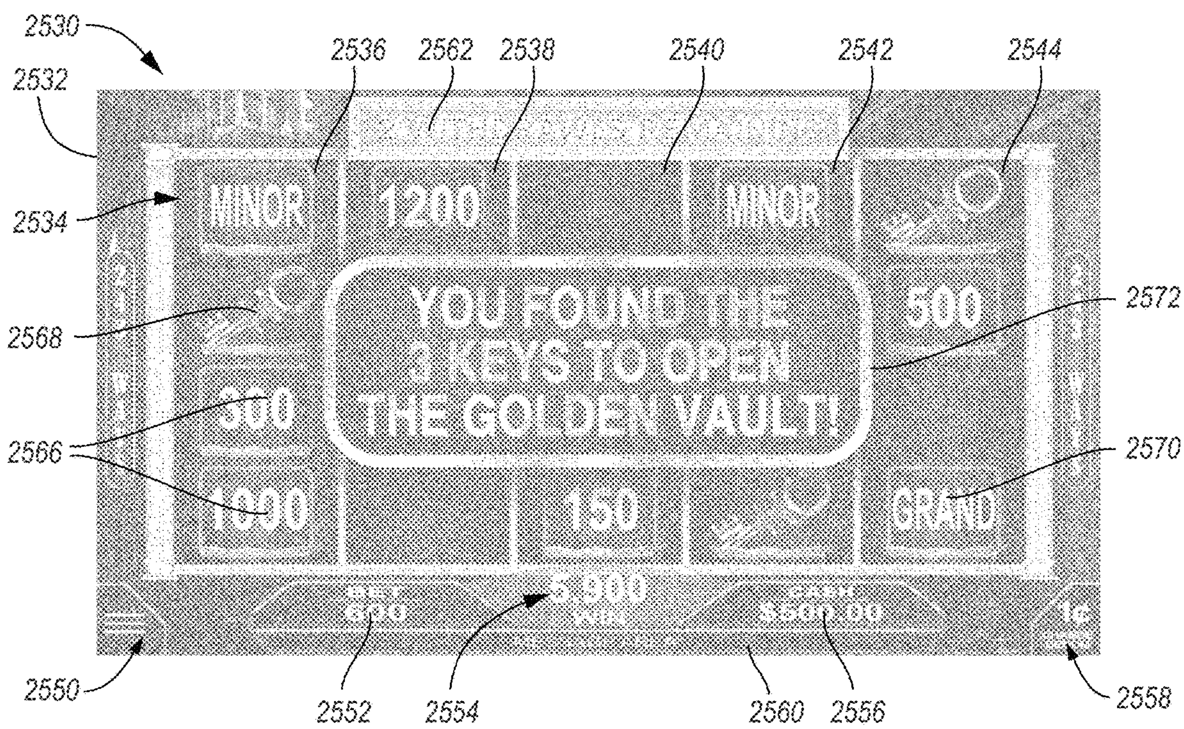
Figure 25S:
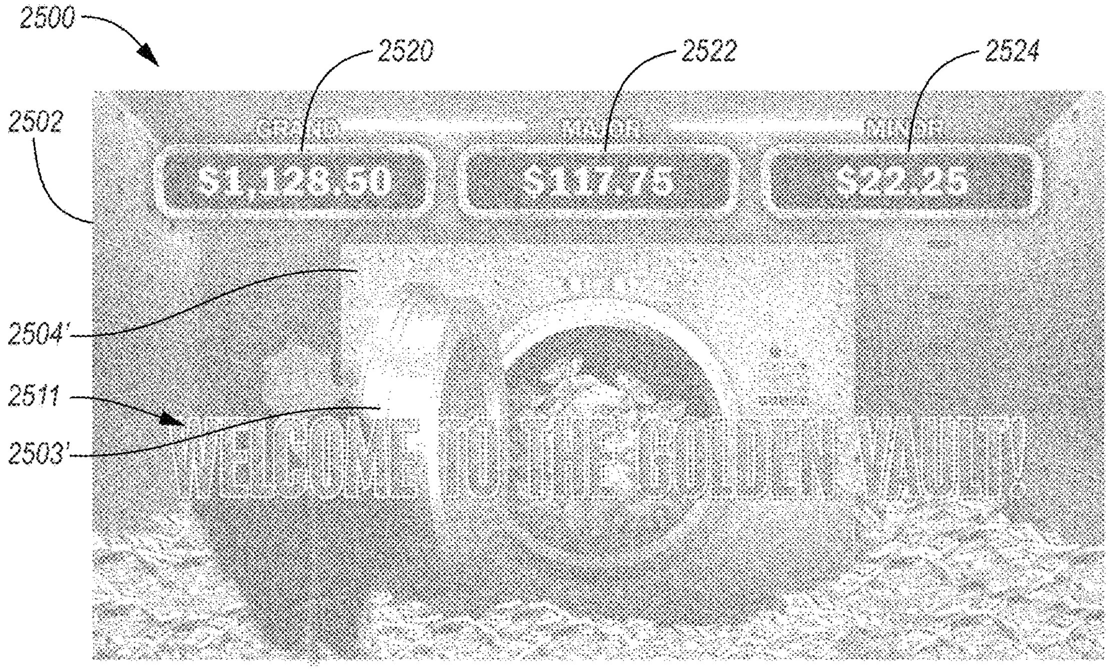
Figure 25T:
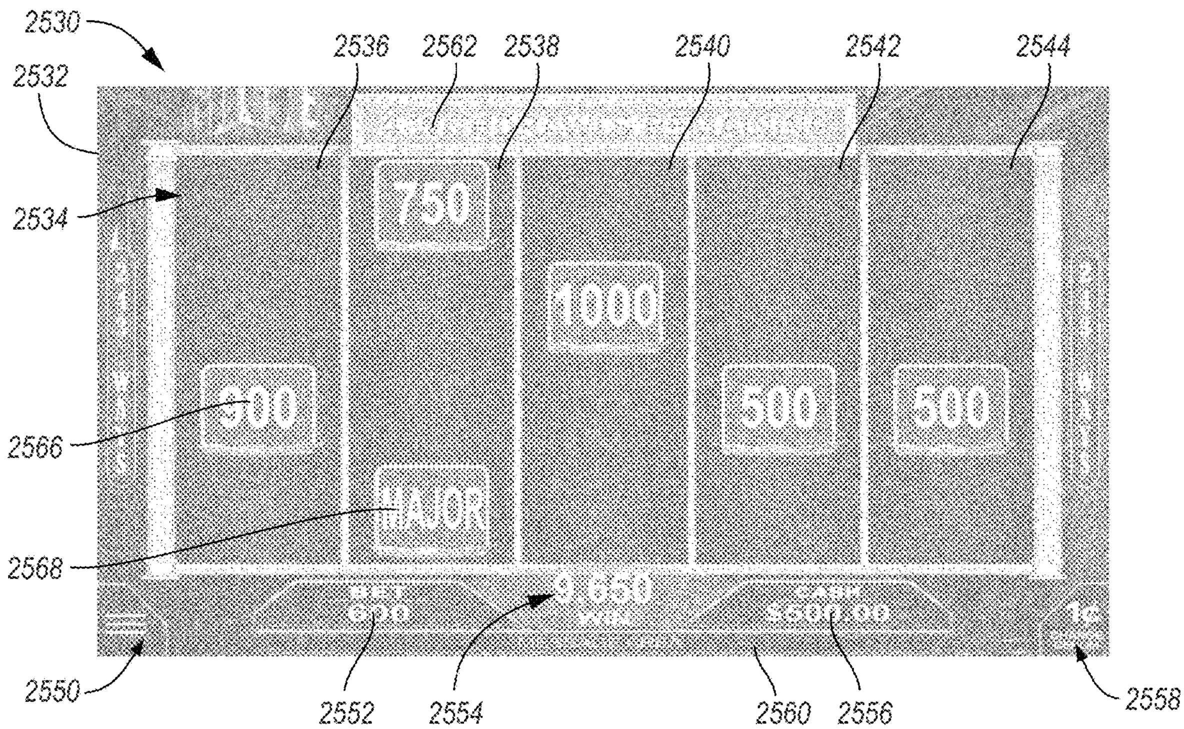
Figure 25U:
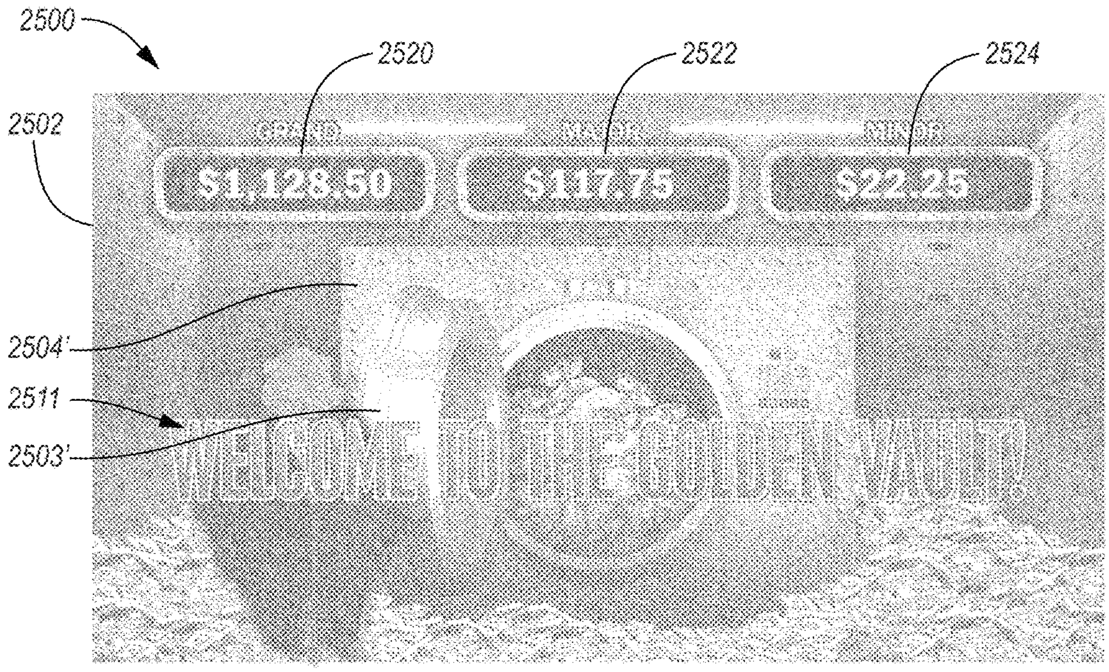
Figure 25V:
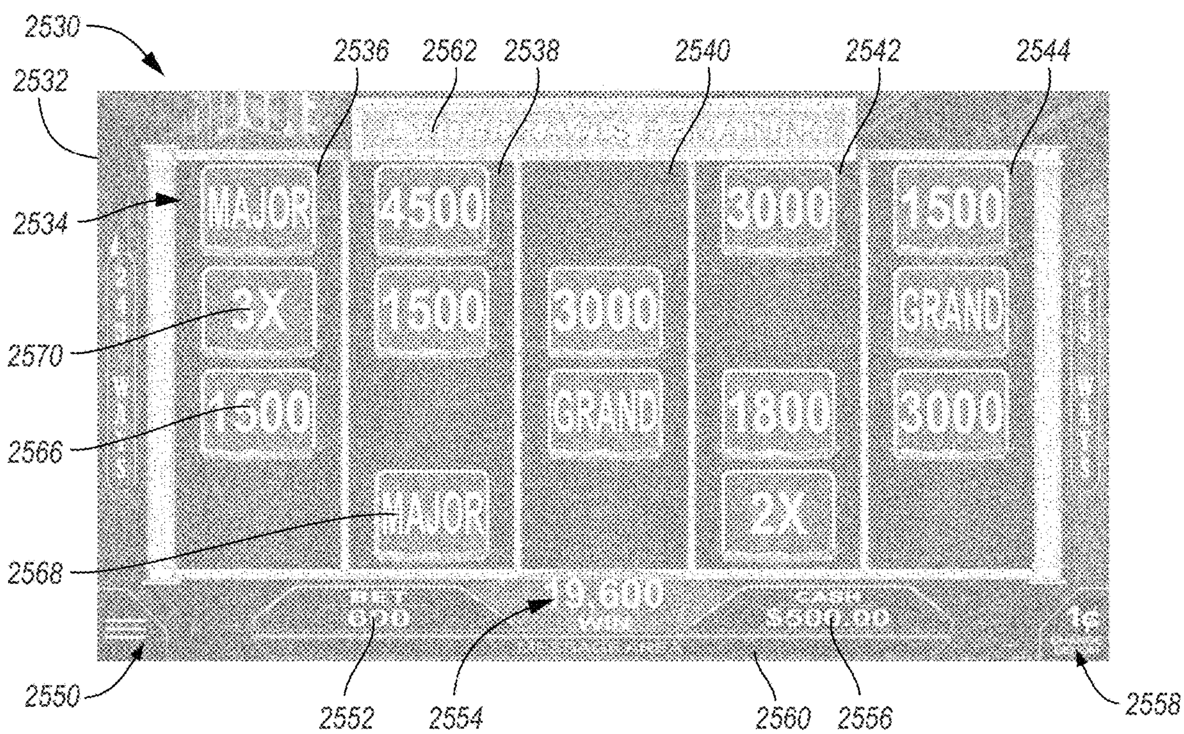
Figure 25W:
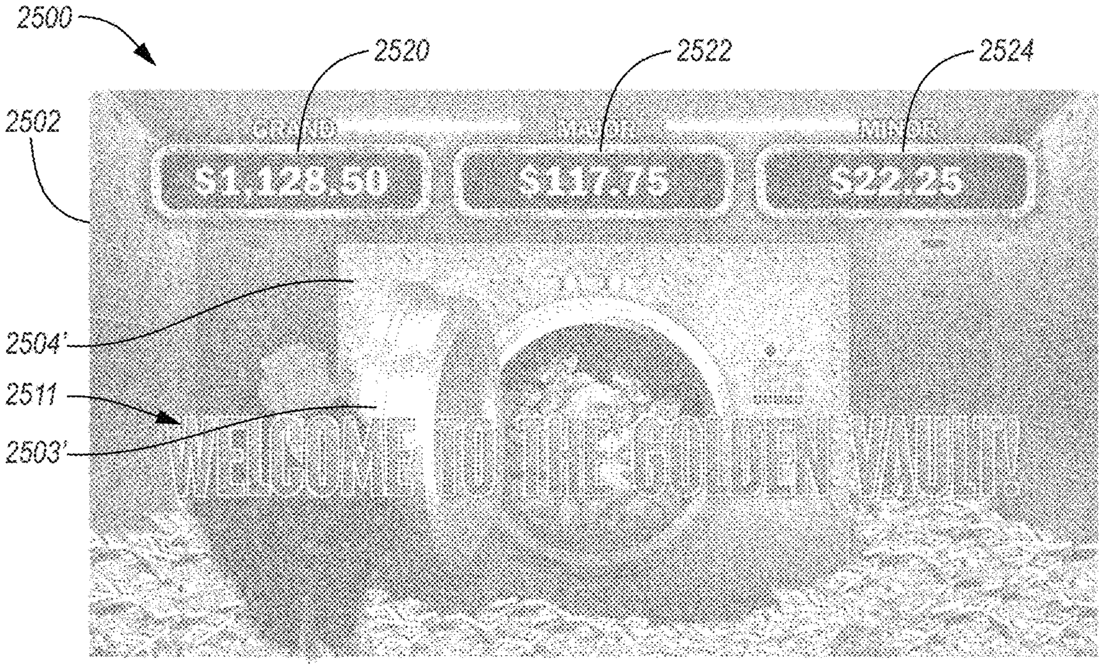
Figure 25X:
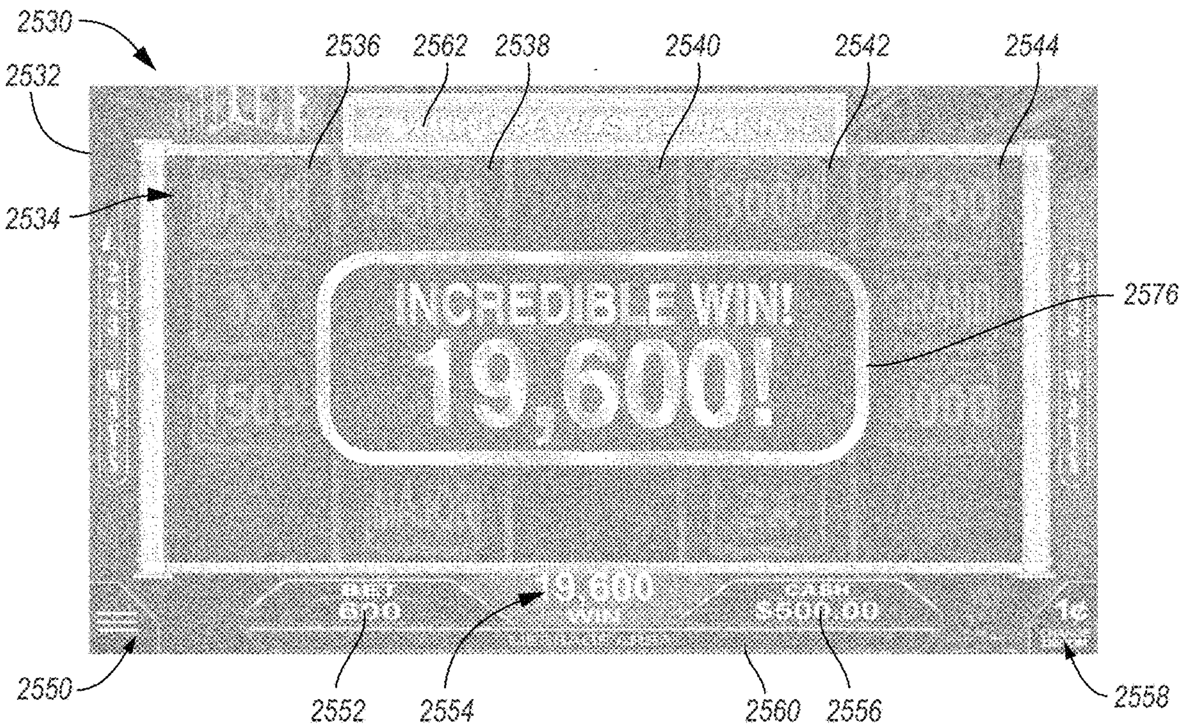

FIGS. 25A through 25X illustrate a possible progression of a vault style game from displaying a starting game display of the two-part game where one or more vault combinations are first displayed in a game session until the combination or combinations are solved and then through a bonus or feature round and ending with providing a new set of one or more vault combinations for the next two-part game play session. As illustrated, at the beginning of the first phase or part of the two-part game, all numbers or other indicia may be missing, signified by a question mark, or some or all numbers or other indicia may be revealed at the game onset. The number and location of numbers or other indicia placed may be random or predefined.

After the second part of the two-part game has been completed, the game effectively resets to a state of readiness for the beginning of the multiphase or part of the next two-part game, similar to that illustrated in FIG. 25A.

As noted, FIG. 25A and FIG. 25B illustrate the beginning of a new two phase or part game of a two-part game where one number or indicia has been awarded to the player upon their first play or populated upon completion of the previous two phase or part game of a two-part game. As illustrated, one number or indicia, in this case the number 5, in the fifth number position of the combination has been revealed or awarded. When such case occurs, it may, depending on math model, complete one of a plurality of sub-events necessary to complete the combination solution. In other words, in a particular math model, five sub-events need to occur to complete the solution and one sub-event has been awarded at the start with four sub-events remaining to complete the first phase or part of the two-part game.

FIGS. 25C and 25D illustrate the game progression. At this point, three combination numbers or indicia 2560, 2562, and 2564, have appeared in the reel section 2534. The first number or indicia "8", 2560, has appeared in reel 2, 2538, and as it matches the second position 2512 in the combination solution, it also appears in the combination in the upper display 2502 as shown in box 2512 where the number "8" is visible. Similarly, the second number or indicia "3" 2562 has appeared in reel 3, 2540, and as it matches the second position 2512 in the combination solution, it also appears in the combination in the upper display 2502 as shown in box 2514 where the number "3" is visible. However, the third number or indicia "9", 2564 has appeared in reel 4, 2538, and as it does not match the fourth position 2516 in the combination solution, it does not appear in the combination in the upper display 2502 as shown in box 2512 where the number "?" remains. For convenience in recognizing that the number or indicia does not match, an "X" has been placed over the "9", 2564, to alert the player that the number or indica does not match.

FIGS. 25E and 25F illustrate further game progression. As illustrated, the video reel spin has provided a variety of symbols 2546 along with a "wild" symbol 2548 and a second type "wild" symbol 2549. The second type wild 2549, differs from the first "wild" 2548 as it is an expanding "wild" which expands over the other symbol above and below to provide for a result of four "wild" symbols. It is preferable that the two different "wilds" 2548 and 2549 have a different appearance so the player my differentiate one from the other.

FIGS. 25G and 25H illustrate further progression of the game. As illustrated, the number or indicia "1" has appeared on the first video reel 2536 and as it matches the combination solution in upper display 2502, the number or indicia "1" 2511 in box 2510 is displayed to the player. At this point, four sub-events have occurred with one remaining in the first phase or part of the two-part game.

FIGS. 25I and 25J illustrate further progression of the game. As illustrated, the number or indicia "2" has appeared on the fourth video reel 2542 and as it matches the combination solution in upper display 2502, the number or indicia "2" 2517 in box 2516 is displayed to the player. At this point, all five sub-events have occurred and a combination solution has been found which ends the first phase or part of the two-part game as the player now proceeds to the second phase or part of the two-part game.

FIGS. 25K and 25L illustrate the beginning of the second phase or part of the two-part game. As previously illustrated, in FIGS. 25I and 25J, the player has successfully found the combination solution. Subsequently, a new banner 2507 is displayed on display 2502 stating "You Cracked the Combination" and the vault door 2503 begins to open. In addition, a banner appears on lower display 2532 stating that the player has won or been awarded four free withdrawals. Although called out as "withdrawals", these are effectively free games. The player is also notified of the number of withdrawals remaining in the withdrawal remaining box 2562.

FIGS. 25M and 25N illustrate continuance of the second phase or part of the two-part game. As previously illustrated, in FIGS. 25I and 25J, the player has successfully found the combination solution. Subsequently, a new banner 2509 is displayed on display 2502 stating "Vault Open" and the vault door 2503 continues to open. The first withdrawal or free game is shown where the withdrawal remaining box 2562 has moved from 3 from 4 and the player has been awarded a number of credits or cash prizes 2566 shown in the "Win" area 2554. This style of play is commonly known as a "Hold and Spin" where the awards or prizes 2566 remain for additional spins or throughout the second phase or part of the two-part game. As additional "withdrawals or free games occur, additional "withdrawals" of free games may be awarded whenever additional awards or prizes appear. This is reflected in the withdrawal remining box 2562.

FIGS. 25O and 25P illustrate the continuance of the second phase or part of the two-part game. At this stage, a number of "withdrawals" or free games have occurred with a current total of 2 "withdrawals" or free games remaining. In addition, the player has been awarded a number of additional prizes, has received a multiplier 2571 (and previously received number of multipliers in previous games not shown), a progressive award or prizes symbol 2570 (which when a number of matching progressive awards or prizes appear, a progressive award may occur corresponding to one or more of the three progressives, 2520, 2522, and/or 2524), and three matching special "Golden Key" symbols 2573. As shown in FIG. 25R, when three "Golden Keys" 2573 appear, the "Golden Vault" 2504' is opened as stated in banner 2572. The "Golden Vault" 2504' is a special higher value vault which preferably only occasionally occurs. If the game does not include a "Golden Vault" 2504', the game continues until all withdrawals or free games have been exhausted, the total win calculated, and credits or cash paid to the player. When a "Golden Vault" 2504' is awarded, the previous win may be calculated which may be shown in the "Win" total 2554 or stored in memory and a new "Golden Vault" game continues, starting with fresh prizes 2566', symbols 2568', etc. as shown in FIG. 25T. In the alternative, previous prizes awarded in the non "Golden Vault" portion of the game may remain.

FIGS. 25U and 25V illustrate continuance of the second phase or part of the two-part game when the "Golden Vault" is active. As shown, a number of additional prizes 2566' have appeared along with progressive symbols 2568' and multipliers 2570'. When all withdrawals or free games have been exhausted as shown in the withdrawal remaining box 2562, the second phase or part of the two-part game concludes and the winner is paid the appropriate total of credits or cash which are then added to the total cash shown in the cash window 2556. Optionally, the winner receives an attract banner 2576 indicating their total win as shown in FIG. 25X. After conclusion of the second phase or part of the two-part game, the game effectively resets to the original beginning state as illustrated in FIGS. 25A and 25B.

Figure 26A:
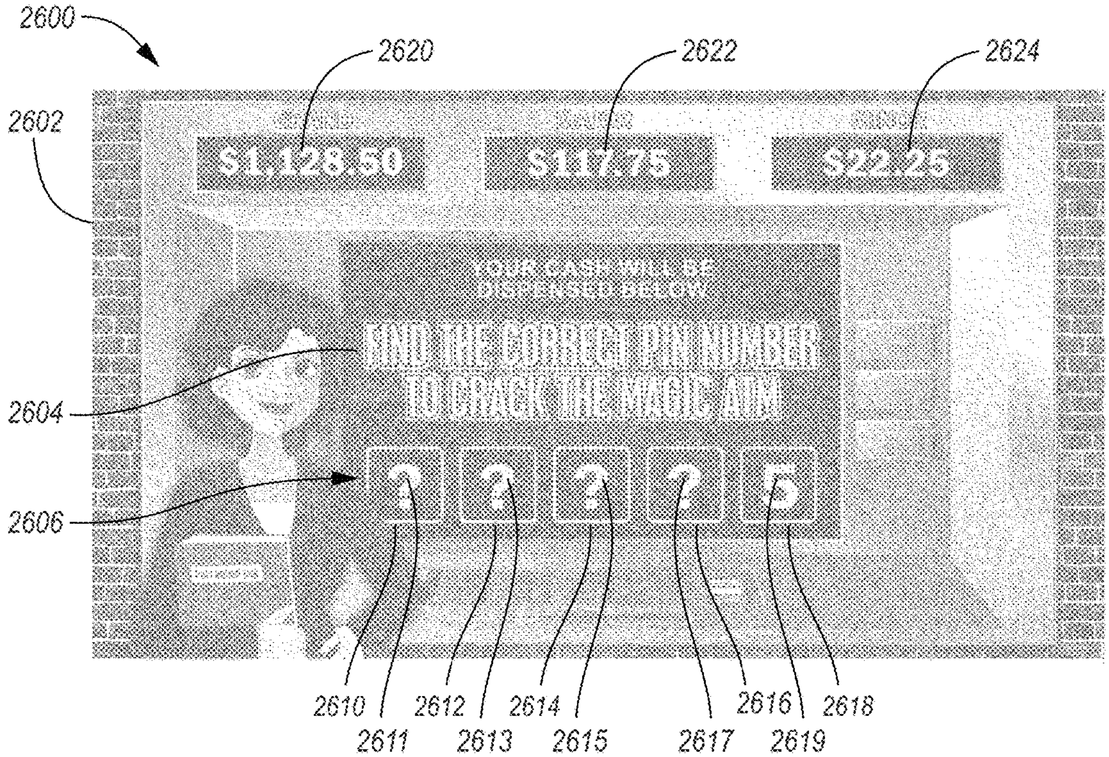
FIG. 26A illustrates a first screen shot of an ATM themed game utilizing volatility stabilizing sub-events (VSS)

FIG. 26A illustrates an upper game interface 2600 and a lower game interface 2630 for a game including an automatic teller machine (ATM) 2604, ATM door 2603, upper game display 2602 and a lower game display 2632. There are a great many similarities between the vault game illustrated in FIGS. 25A through 25X and the ATM style game illustrated in FIGS. 26A and 26B. Some embodiments of the ATM style game may include one or more static or progressive awards which may be equal or unequal depending on design goals. As illustrated, the game includes a Minor progressive 2624, a Major progressive 2622 and a Grand progressive 2620. Similar to the vault game illustrated in FIGS. 25A through 25X, one or more ATM PIN (personal identification number) codes 2506 may be included in the game and preferably located on the upper display 2602. The player may be alerted to the goal of the game by banner 2604. In the ATM game illustrated, the PIN code includes five separate numbers or other indicia which are required to solve the PIN code. Each of the five PIN numbers or other indicia is located in boxes 2610, 2612, 2614, 2616, and 2618. Within each box 2610, 2612, 2614, 2616, and 2618 are numbers or other indicia or question marks 2611, 2613, 2615, 2617 and 2619, respectively, with the question marks indicating that the correct number or indicia is yet to appear or be placed in the proper location.

Figure 26B:
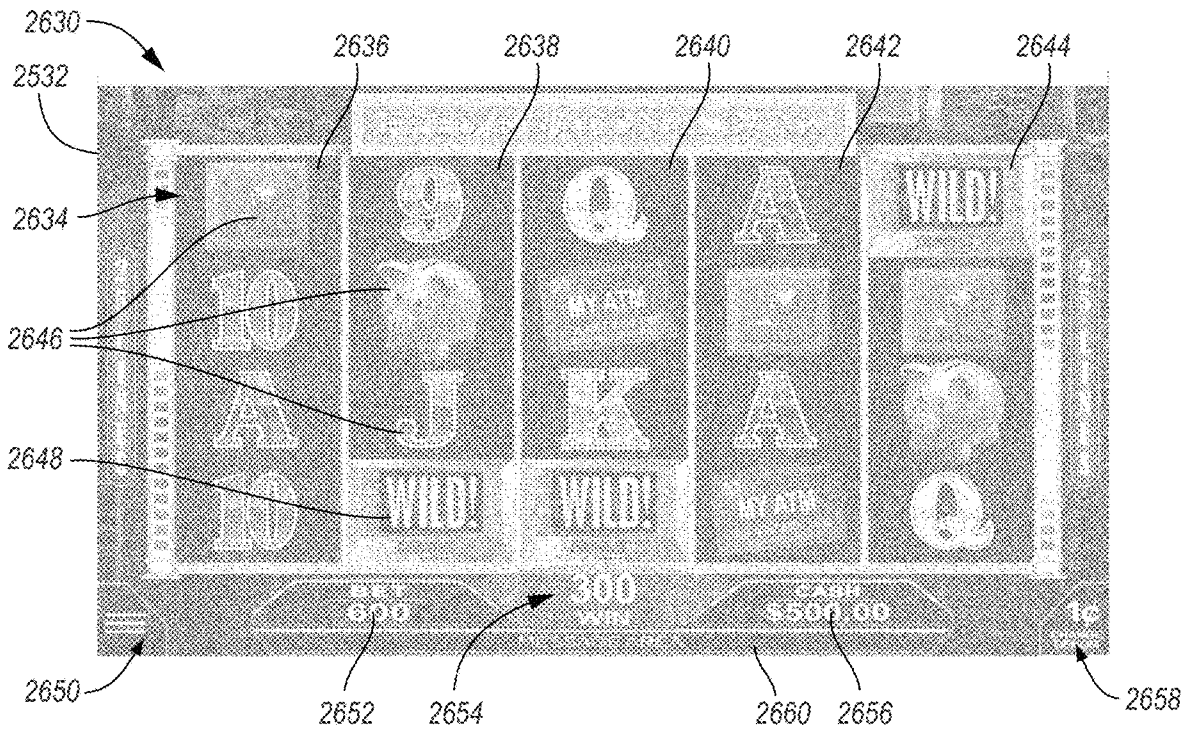
FIG. 26B illustrates a second screen shot of an ATM themed game utilizing volatility stabilizing sub-events (VSS)
Figure 27:
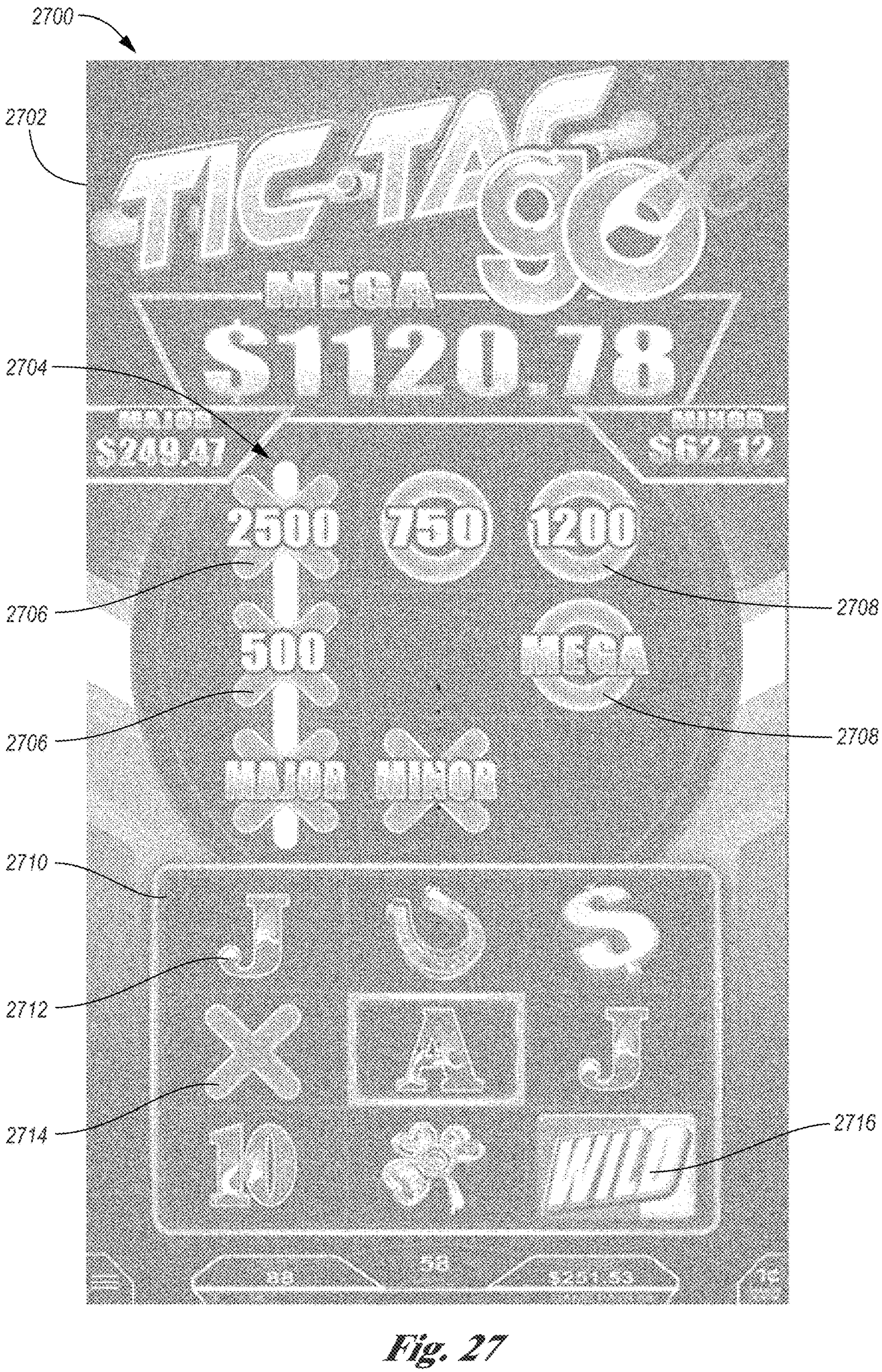
FIG. 27 illustrates a screen shot of a Tic-Tac-Toe themed game utilizing volatility stabilizing sub-events (VSS)

FIG. 26B illustrates the lower display 2632 which contains a video reel section 2634 which further includes four lines and five vertically oriented virtual reels 2636, 2638, 2640, 2642, and 2644. Within each of the video reels, a number of symbols 2646 or wild symbols 2648 may appear.

Wild symbols may include a single wild or if desired may be expanding wilds which may cover all the reel vertically or may migrate to other reels or positions. Although the interface indicates this is a "ways" game, "line" games may work equally as well.

As play progressives, it may be advantageous for the player to understand how close or how far a combination may be from completion. As illustrated, when many or most of the combination boxes 2610, 2612, 2614, 2616, and 2618 contain a question mark, the player is alerted that many numbers or other indicia remain to be found to form a combination solution. However, when one or few combination solution numbers or other indicia remain, the player is alerted that they are closer to achieving a combination solution which will lead to the second phase or part of the two-part games. While in this game or other similar games, the visual indication of how far or how close a player is from achieving the goal appear to be based on the number of correct numbers or other indicia, these are also a visual representation of how many volatility stabilizing sub-everts (VSS) have occurred or remain for completion of the first phase or part of the two-part game.

The ATM style games also includes a primary or secondary video reel game that provides individual awards either through line games or ways game or some other winning criteria. As illustrated, the video reel game display 2634 includes four lines and five vertically oriented reels 2610, 2612, 2614, 2616, and 2618. Thus, the game includes 24 discrete areas for a variety of differing symbols 2646, wild symbols 2647 or other symbols to appear. Those skilled in the art will recognize that many primary or secondary game types may be included within the ATM style game and not just video reel games. These may include video poker, bingo, keno or any other game suitable for the purpose.

In addition to the play mechanics of the game, other information may be displayed to the player such as a help and/or information button 2650, wager or bet amount 2652, win amount 2654, total cash or credits 2656, a denomination selector button 2658 and a messaging area 2660. As the drawing figures of the screen shots are illustrations only, they may not accurately reflect win amount, credit or cash balances, bets, etc.

FIG. 28 illustrates a portrait style display game named Tic-Tac-GO!™ based on the game Tic-Tac-Toe. In the game, the minimum number of sub-events equals the minimum number of "X"s or "O"'s needed to form a horizontal, vertical or diagonal winning line combinations. However, in the game of Tic-Tac-Toe, winning line combinations may be blocked by opposing "X" or "O" symbols which may be randomly placed on the Tic-Tac-Toe grid. In such cases, additional random symbol awards or placements may be required to complete or win the game and, in some cases, a win is not possible resulting in a "cat's" game. As such, the Tic-Tac-Toe game may include volatility stabilizing sub-event (VSS) coupled with random results to produce games with higher volatility yet still limiting or reducing the probability of "cold streaks".

As illustrated, a game interface 2700 is provided including a portrait-oriented display 2702. In the upper portion of the display 2702, a Tic-Tac-Toe game grid 2704 is included where "X"s 2706 or "O"s 2708 are placed. Although one Tic-Tac-Toe grid is shown, more than on Tic-Tac-Toe game may be included in a similar fashion to other games previously discussed. A lower video reel section 2710 is also included where various symbols 2712, "X"s or "O"s symbols, wild symbols, etc., may appear. When predefined patterns of symbols appear, the player wins a predefined prize associated with the predefined winning pattern. In addition, when "X"s or "O"s symbols such as the "X" 2714 appear, they may also populate the Tic-Tac-Toe game above the video reel 2710 portion as illustrated by the "X" 2706 in the Tic-Tac-Toe grid 2704. When the "X"s or "O"'s symbols are aligned vertically, horizontally, or diagonally, additional awards, progressives, features or bonuses may be awarded similar to other games previously described. However, in some cases, no win is possible resulting in a "cat's" game where prizes or awards may be cancelled or carry over to the next Tic-Tac-Toe game displayed.

In one embodiment of the Tic-Tac-Toe game, each position on the 3×3 reel window 2710 is a separate independent reel, meaning 9 reels and RNG draws instead of the traditional three reels and three RNG draws. With a blank board each reel has at least one "X" and one "O" symbol present on each reel and the center position reel has an additional "Go" symbol. If an "X" or an "O" appears on video reels 2710, it is randomly assigned a credit prize or progressive and transfers to the corresponding position on the Tic-Tac-Toe grid 2704. If a position on the Tic-Tac-Go grid is already filled with an "X" or "O, the corresponding position on the reel window uses a reel strip without "X" and "O" symbols present. However, the "Go" symbol remains for the center position reel strip throughout the game.

Player collects "X" and "O" symbols on the Tic-Tac-Go board until either the "X"s or "O"s win by completing a row, column, or diagonal lie of three identical symbols. All awards or prizes assigned to the winning symbol, including symbols not part of the winning row, column, or diagonal are awarded to the player and the board resets to blank.

If the board becomes filled with "X"s and "O"s with no traditional winner, the game results in a cat's game and the game may be canceled as previously described or in the alternative, whichever symbol has the higher count is declared the winner and all prizes associated with the winning symbol are awarded to the player and the board resets. When a "Go" symbol appears on the center position of the video reel window 2710, all prizes "X"s and "O"s on the Tic-Tac-Go board are awarded to the player and the board resets. Free games use a separate Tic-Tac-Go board from the base game and a "Go" symbol are guaranteed to appear on the final spin of the session after which the board resets.

New game development for electronic gaming machines (EGMs) isa very labor intensive and time-consuming exercise as many disciplines are required to develop a game from game conception to a final or semifinal form ready for submission to a gaming laboratory for certification. Game certification is generally required for real money electronic gaming machines that are commonplace in casinos, worldwide. The process for game development for iGaming applications follows a similar process. iGaming is a common name used for real money "interactive gaming" and refers to digital or online gaming that includes a wide variety of games such as online casino games, slot games, poker games, bingo games, keno games, skill-based gaming, sport betting, and many others forms of real money gambling. Similarly, EGMs may also offer a very wide variety of games offered for real money wagering. While EGMs generally are relatively complex devices that reside on casino floors, iGaming platforms may include applications (apps) for smartphones, personal desktop or laptop computers, game consoles, and arcade style machines. Such platforms may also offer such games for free or as freemium game models where play may include the use of digital currency, digital chips, digital gems, or similar.

Traditionally, game development begins with the game concept. The concept may utilize existing game concepts, copying to one degree or another the game play characteristics of an existing game, be based on companion or "clone" games, new and unique game play characteristics, or other game design methods. The new game concept may start with engineering game mechanics, artists' concepts, game math, generally undertaken by game mathematicians to determine the game payouts, hit frequencies, game volatility, etc., and/or game producers who may direct game development in many ways. Often, the various disciplines and personnel required fall under the term "game studios." Game studios may generally include, platform engineers, mechanical engineers, electric and electronic engineers, software engineers, sound engineers, artists, animators, quality assurance and game testing personnel, compliance personnel, who may submit the game to a gaming laboratory, product management supervisors, etc.

Many regulated gaming jurisdictions require extensive testing and review to ensure an electronic gaming machine and associated game is fair to the player and safe to play from mechanical and electrical standpoints. Once electronic gaming machines and associated games are fully developed, it is then generally submitted to a gaming certification laboratory for review and testing of many or virtually all aspects of the electronic gaming machines and associated games. For example, the game math may be analyzed and checked, the laboratory will run simulations for each RTP percentage, check many or all combinations of player inputs, check sound volumes, the verbiage of the help screens, etc. This is all done to ensure that the game is fair to the player. Generally, once approved, nothing may be changed on the game without another round of testing and approvals. In addition, most electronic gaming machines must be thoroughly tested mechanically and electronically by laboratories such as Underwriter Laboratories and others. All electronic gaming machines are tested under many possible safety and/or fault conditions such as power outages, damage, reboots, malfunctions, water damage, tornadoes, hurricanes, etc., and must be able to recall all then current game details such as details of a game in progress, credit amounts, bet amounts, details of last 50 games played, progressive values, game meter values, etc.

Generally, once certified, a game may not be changed once installed. Changing game mechanics, math, etc. is only permissible if those configurability options were included in the original laboratory submission. However, those skilled in the art will recognize that gaming regulations may change, and it may be possible that regulators may allow game changes to be changed on the fly in the future which the embodiment of the present invention anticipates.

Virtually all the game development disciplines and personnel such as platform engineers, mechanical engineers, electric and electronic engineers, software engineers, sound engineers, artists, animators, quality assurance and game testing personnel, compliance personnel who may submit the game to a gaming laboratory, product management supervisors, etc., rely entirely or at least in part on computers and associated software. While most of these positions use computer programs to assist in the game development process, games may take many months or even years to develop depending on the complexity of the game. For example, a new EGM game may require 40 hours of initial concept review, 2,000 hours of artist time, 1,000 hours for an animator, 2,000 hours for the software engineers, 500 hours for mathematicians, 150 hours for the sound engineers, 100 hours for quality assurance engineers, 100 hours for in depth testing, 50 hours for compliance personnel, etc. Despite this heavy investment in time and money, there are no guarantees a particular game will or will not be successful. Even with the investment in time and money and with computer advancements, a great many developed games fail when placed on a casino floor with less than 25% of developed games being marginally successful and less than 2% being considered very successful.

Casino operators place electronic gaming machines and associated games under a variety of sales or lease options. Often a casino purchases electronic gaming machines and associated games at a set sales price. This may be immediate or in many cases after a free trial period which may last from 30 to 180 days or more during which the casino operator evaluates the success or failure of the game based on a variety of performance metrics. Another placement model is a lease option where the casino operator pays the manufacturer a set daily or monthly fee which in many cases allows the casino operator to continue to pay the daily or monthly fee if the electronic gaming machines and associated games perform well enough or if not, either ask for conversion to different game theme or return the electronic gaming machines and associated games to the game manufacturer. Yet another placement option includes a revenue sharing model where the casino operator pays the manufacturer a percentage of the net win of the electronic gaming machines and associated games. For example, a casino operator may retain 80% of the net win of the game while paying the manufacturer the remaining 20% of the net win. In addition, many other placement options exist such as lease to own, manufacturer financed, etc.

Typically, when a new game is placed on a casino floor, the casino slot personnel tracks how well a game or series of games perform. This process involves gathering performance data of the particular game. Casino operators often report on the game performance to the manufacturer of the particular game. If, like many games, the performance is poor, the casino may either request that the game manufacturer replace the game with a different theme, which is known as a game conversion, or demand that the entire electronic gaming machine and associated poor performing game be returned to the manufacturer for credit as applicable.

Electronic gaming machines and associated game performance data may comprise simply how well the game performs compared to the house average or average win per gaming machine. Generally, this is a numerical value where the average performance is considered as 1×, with "x" being the average win of all electronic gaming machines on the casino floor or within a zone within a casino. For example, if a new game performs at 0.5×, it indicates that the game is not being received well by players or is performing poorly with about half the win amount of the average game or game zone and conversely if the new game performs at 1.7×, it indicates that the game is outperforming the average game on the casino floor or zone by 70% and may be considered a successful game. Over time, the electronic gaming machines and associated game performance often vary based on the game increasing in player popularity or decreasing in player popularity. On occasion when a game does well enough, the manufacturer may develop new versions of the game. These games may often have similar titles and themes such as an original game being known as "Dice Seeker" with follow up new games being known as "Dice Seeker Gold", "Ultimate Dice Seeker", etc. Another option for electronic gaming machines and associated games is the addition of a local area progressive (LAP) or wide area progressive (WAP) to the original or new game versions.

Another way to measure electronic gaming machines and associated game performance is by comparing it to a zone average as opposed to the entirety of the casino floor as certain areas of a casino tend to be more popular with players than others. This may be due to proximity of the zone to the casino entrance, traffic patterns, proximity to the casino table games area, proximity to rest rooms, proximity to bars, proximity to "high limit" areas where minimum wagers are generally higher than other areas of the casino, proximity to parking, etc. The zone method of comparing performance is often an accurate measurement of the electronic gaming machines and associated game performance.

As previously discussed, casino operators may gather performance data in many different ways and to different levels with some casino properties gathering minimal performance datasets, sometimes due to smaller size of the casino floor to very large datasets for larger properties or even corporate casino operators who may gather data for many different casino properties within the state or country or countries. Common performance data fields may include any one or more or all of the following. Those skilled in the art will recognize that while any of these data fields may be utilized, this should not be considered as a complete or exhaustive list.

CASINO
AREA
BANK
MACHINE NUM
SERIAL
MFG
GAME TYPE
DENOM
GAME THEME
REELS
MAX BET
CABINET
LEASE FEE PU
FREE PLAY PU
ACT HOLD % NET LF (LEASE FEES)
THEO HOLD % NET LF
ACTIVE UNITS
THEO PER HOUR
UTIL %
HRS/WK>50% UTIL
GAMES PLAYED
JACKPOTS
PLAYS PER MIN.
MIN BET (RATED)
MAX BET (RATED)
ACT WPU NET LF INDEX FLOOR
ACT WPU NET LF INDEX MFG
ACT WPU NET LF INDEX GAMETYPE
ACT WPU NET LF INDEX DENOM
ACT WPU NET LF INDEX AREA
THEO WPU NET LF INDEX FLOOR
THEO WPU NET LF INDEX MFG
THEO WPU NET LF INDEX GAMETYPE
THEO WPU NET LF INDEX DENOM
THEO WPU NET LF INDEX AREA
COIN IN PU INDEX FLOOR
COIN IN PU INDEX MFG
COIN IN PU INDEX GAMETYPE
COIN IN PU INDEX DENOM
COIN IN PU INDEX AREA
DAYS ON FLOOR
NET ACTUAL WIN PER DAY
ACTUAL WIN PER DAY
NET THEO WIN PER DAY
THEO WIN PER DAY
COIN IN PER DAY
GAMES PLAYED PER DAY
AVERAGE BET
OCCUPANCY
THEO WIN PER HOUR
THEO HOLD
ACTUAL HOLD
HOLD VARIANCE
AVG BET/MAX BET
LINES
BET PER LINE
PROG TYPE
HPPUFLOORINDEX
HPPUSECTIONINDEX
30 ZN AVG INDEX
30 ZN AVG
30 CIPUPD
30 CI ZN AVG
60 NTWPUPD
60 VS 90 WPU
60 ZN AVG INDEX
60 ZN AVG
60 CIPUPD
60 CI ZN AVG
90 NTWPUPD
90% ZN AVG
90 ZN AVG
90 CIPUPD
90 CI ZN AVG
MANUF INDEX
NET PROFITABILITY AND OCCUPANCY VS PROP
NET PROFITABILITY AND OCCUPANCY VS MODEL
NET PROFITABILITY AND OCCUPANCY VS BANK
MFR DISPLAY DENOM INDEX
PEAK PERIOD UTILIZATION INDEX

Often such data fields are listed as acronyms to facilitate review by the slot department. For example, acronyms such as WPU stands for Win Per Unit, LF stands for Lease Fee, MANUF stands for Manufacturer, PU stands for Per Unit, CI stands for coin-in (coin-in is the total amount wagered over time, e.g., players wager $0.50-3,730 times in a 24 hour period so the Coin-in Per Day would be $1,865), RTP stands for Return To Player percentage, ZN AVG stands for Zone Average (a zone is an area of the casino floor where one zone performance is measured against a different zone in the casino which may have less or more traffic), THEO stands for theoretical win on a machine which is mathematically calculated and often compared to ACTUAL which very often deviates from the THEO, PUPD stands for Per Unit Per Day, NTWPUD Net Win Per Unit Per Day, etc., as known to the those skilled in the art.

FIG. 28A through FIG. 28E illustrate a typical performance report that may be generated by a casino operator. As illustrated, the data fields in the report may include many different metrics. Casinos may choose to pull their own data or datasets with more or less fields, report daily, weekly, or monthly, or have the capability to generate data in real time. Generally, performance reports are considered the intellectual property of the casino operator and are not widely distributed beyond generating performance reports for selected manufacturers. However, this is not always the case and other methods of obtaining performance data or datasets, may be available through industry publishing sources that collect data from many casinos and report the results of manufacturers and other casinos.

The performance report 2800 of FIGS. 28A through 28E includes a variety of fields and datasets including casino number 2802, area 2804, bank or group number 2806, machine number 2808, machine serial number 2810, manufacturer name or number 2812, game name or theme 2814, denomination or denomination range of the game 2816, game type 2818, reel type 2820, max bet or wager 2822, cabinet type 2824, actual win per unit net of lease fee 2826, theoretical win per unit net of lease fee 2828, coin-in per unit 2830, lease fee per unit 2832, free play per unit 2834, actual hold percentage net of lease fee 2836, theoretical hold percentage net of lease fee 2838, hold percentage variance 2840, arithmetic hold percentage 2842, unit days on floor 2844, active units 2846, theoretical per hour 2848, utility percentage 2850, hours per week above 50% utilization 2852, number of games played 2854, jackpots 2856, min date 2858, plays per minute 2860, average bet or wager 2862, minimum bet or wager (rated) 2864, maximum bet or wager (rated) 2866, actual win per unit net of lease fee index floor 2868, actual win per unit net of lease fee index manufacturer 2870, actual win per unit net of lease fee index game type 2872, actual win per unit net of lease fee index denomination 2874, actual win per unit net of lease fee index area 2876, actual win per unit net of lease fee index floor 2878, theoretical win per unit net of lease fee index manufacturer 2880, theoretical win per unit net of lease fee index game type 2882, theoretical win per unit net of lease fee index denomination 2884, theoretical win per unit net of lease fee index area 2886, coin-in per unit index floor 2888, coin-in per unit index manufacturer 2890, coin-in per unit index game type 2892, coin-in per unit index denomination 2894, and coin-in per unit index area 2896.

Analyzing past game performance may be accomplished in a number of ways including human analysis which may be used to guide the specialized artificial intelligence game design system or specialized artificial intelligence game design system module or component, supervised machine learning and training whereas humans assist training the specialized artificial intelligence game design system or specialized artificial intelligence game design system module or component, unsupervised machine learning whereas the specialized artificial intelligence game design system or specialized artificial intelligence game design system module or component analyzes past game performance autonomously, etc. Those skilled in the art will recognize the terms "artificial intelligence" and "AI" are used interchangeably herein. It is anticipated that the analyzing of past game performance is an iterative process whereby past game performance data is updated either periodically or continually.

Generally, optimizing results utilizing AI and associated machine learning may be directly related to the quantity and quality of the data input into the training models of the specialized AI game design modules or specialized AI game design components or associated machine learning processes. Although, as discussed above, a great many variables may be included in performance data, not all data points are as relevant as others and may be weighted accordingly. Moreover, many of the metrics may be combined into composite metrics and even further combined to produce a small number of relevant metrics. In practice, many in the industry regard the comparison of win per unit to the casino average win per unit or casino zone average win per unit as one of the key overall metric.

While it is important to include data points relating to current game performance, it is just as important to include data points from past performance of games going back months, years, or even decades. Moreover, due to percentages of successful and non-successful games it is not only important to understand which game mechanics, math, graphics, sound, animations, etc., facilitate a successful game, it is just as, or more, important to understand and analyze which game mechanics, math, graphics, sound, animations, etc., generate a failed game. Due to the very high failure rate of games, there may be far more data points available in the negative performance game characteristics than the positive performance game characteristics. Accordingly, analyzing and understanding why games fail is equally important as analyzing and understanding why games succeed. In other words, it is important to analyze both the good and the bad game characteristics over time even if some data may need to be estimated or extrapolated from other data. Analyzing such performance data points and metrics is important given many avid slot players, when interviewed, cannot pin down or even partially explain why they like a particular game. Often, the only responses that a player may give for liking a particular game, even after months of play, is limited to "I feel lucky" or "the game is cute." Accordingly, the true underlying reasons a player may prefer one game over another lies deep within player psychology and subliminal responses which are not readily apparent, even to the player.

Although in a static or closed specialized AI game design system, the system may utilize only then existing data, it is desirable to either incrementally update data or in the alternative provide for an iterative system that is continually updated since games and game characteristics may continually change over time along with player preferences. Those skilled in the art will recognize that the term "specialized" as it relates to specialized AI game design systems and techniques should not and would not be limiting in any way as it only implies that the specialized AI game design system or associated specialized AI game design system modules and/or specialized AI game design system components have been at least partially designed, trained, algorithms developed for or utilized with games of chance game development and associated tasks.

While many datasets have been discussed, there are also many other sources for data mining in the field of gaming such as internet searching, manufacturers' websites, public reporting of games, private reporting of games, social media sites, personal review of games, etc., While allowing for manual data point and dataset entry, once the specialized AI game design system has been partially or fully trained, the specialized AI game design system may automatically update the data points and/or datasets from casino property reports, general reports, or other sources of data as previously described to improve the accuracy of the predictive model. Manual, or other updates may also occur.

One way to interact with the specialized AI game design system is via Natural Language Processing (NLP). NPL, as it relates to the gaming industry, refers to the capability of training computers to comprehend written text and human speech. NLP supervised learning plays a crucial role in extracting meaning from unstructured text found in gaming documents or user communications. Consequently, NLP serves as a primary method for systems to interpret and understand game characteristics, dialogue and text in a supervised or unsupervised learning environment. Moreover, NLP stands as one of the fundamental technologies empowering technical or non-technical game designers to engage with specialized AI game design systems without requiring coding skills. By leveraging NLP, game designers can pose complex queries about game datasets, facilitating intuitive interactions, etc. Unlike structured database information that relies on schemas to provide context and meaning to the data, NLP focuses on parsing and tagging unstructured text to derive its significance. Various tools essential for NLP in the gaming industry encompass categorization, ontologies, tapping, cataloging, annotation, dictionaries, language models, etc. Those skilled in the art will recognize the interactions of NLP and other data point or datasets inputs as applied to the specialized AI game design system and associated processes or processing.

Current game design relies almost entirely on computers and computer software and is a very labor intensive, expensive, and time-consuming endeavor with little true optimization to increase the overall performance results of games as even with these tools, far more games fail than succeed and generally do not include any predictive models or tools within any of the computer processes or systems. The embodiments of the present invention improve these computer processes and systems in many ways including computer and computational speed, computer and computational accuracy, computer efficiency, predictive modeling, etc. While in its optimal form, the specialized AI game design systems may include processing very large volumes and varieties of data and datasets to increase accuracy, those skilled in the art will recognize that computer and computational speed, computer and computational accuracy, computer efficiency, predictive modeling, etc., may be improved even with lesser volumes and varieties of data and datasets that number in the thousands or even less which may lead to improved results and overall game performance even if the veracity of the data may not be perfect.

Those skilled in the art will appreciate that a specialized AI game design system, without training, may produce random, incorrect, or even irrelevant outputs in any or the embodiments described herein. For example, if one were to ask an untrained specialized graphics-based AI game design system to provide a slot machine main game graphic, there is no predicting what the untrained specialized graphics-based AI game design system may generate without an understanding of game history, game performance, game characteristics, and what worked and/or didn't work in the past. Those skilled in the art will recognize that the term graphic or graphical as used herein, and may be used interchangeably, may include a large variety of visual objects or representations which may be included in a game which may include a game background, a primary or secondary game character(s) or element(s), reels, reel boxes, reel symbols, special symbols, credit bars, credit information, bet or wager information, win information, free game information, logos, progressives boxes, etc., any of which may be produced as a drawing, illustration, photograph, virtual photograph, or any other means for generating graphics and/or graphical elements. For instance, an untrained specialized graphics-based AI game design system with minimal understanding of game theory and/or slot machine game theory, when asked to generate a main game graphic or theme, may produce virtually anything and be wildly erratic such as generating an image or animation of a frog's stomach, a tree, a ratchet wrench, a fire hose, a nose, a pillow, a catalytic converter, a worm, human intestines, an asteroid, a virus, a dead animal, a machine screw, etc.

Relative to math, without guidance, the specialized AI game math system module may create a game with one line and 100 reels, 100 lines and one reel, 200 lines and 200 reels, one way to win or 25,000 ways to win, 700 progressives, very dull game volatility, extraordinarily high game volatility, no bonuses, crazy bonuses, simple bonus frequencies in the millions, etc. Similarly, an untrained specialized sound/music effects-based AI game design system module may generate sounds which have little or no correlation to a game theme. For example, an untrained specialized AI game design system may consider a game with a traditional Irish Pub theme, as previously described, and generate sound and music such as dogs barking, whales breaking the surface, a bomb blast, whistles, ocean sounds, techno music, disco music, pop music, hip hop music, rock music, rhythm and blues music, soul music, reggae music, funk music, etc., none of which match the game theme associated with a traditional Irish Pub theme. Accordingly, whether trained by a human, unsupervised training or supervised training, or any combination thereof, the training may guide the specialized AI game design system.

Training may include inputting current and/or past game graphics, current and/or past game features, current and/or past game math, current and/or past game programming code, current and/or past game sound effects or music, current and/or past game characteristics, etc. Moreover, to increase accuracy of the specialized AI game design system, any, many or all game parameters such as game mechanics, game graphics, game math, game programming code, game animations, game sound or music, etc., may be tied to current and/or past game performance thereby allowing the AI system to connect good, average or bad current and/or past game characteristics to game performance. As discussed, performance results may be quite complex and sophisticated while other performance results may be minimal in scope, such as a simple metric of how a current and/or past game performed relative to house average. All performance information and data, regardless of depth and complexity, good performance, average performance, or poor performance, may allow the specialized AI game design system to increase accuracy. For instance, while precise data may not be available, games such as IGT's Cleopatra game released in 1975 or Aristocrat's Buffalo game released in 2008, may still serve as good examples of games that were very popular with players and have stood the test of time. Likewise, the history of slot games includes a great many failed games which many also serve to help train the specialized AI game design system. Although precise performance metrics may not be readily available for many of these legacy games, performance may be estimated and used to help train the specialized AI game design system or a specialized AI game design system module or component. Any information and data may be considered for increasing accuracy of the specialized AI game design system. As past game performance data or datasets may vary in type, scope, complexity, age, human generated, human recalled, computer generated, etc., it is desirable to consolidate, correlate and/or analyze past performance, even if the performance data is incomplete, limited, or substandard, either manually before AI training in conjunction with the specialized AI game design systems before or during training or in the alternative prior to or during specialized AI game design developing, processing, or generation of game computer processor executable instructions or computer readable files. An alternative to developing, processing, or generation of game computer processor executable instructions or computer readable files following the consolidation, correlation and/or analyzing of game performance data includes developing, processing, or generation of game computer processor executable instructions or computer readable files and then refine, reduce, or otherwise edit the game computer processor executable instructions or computer readable files as at least partially dictated, recommended, or as a result of analyzing or reviewing of the consolidated, correlated, and/or analyzed performance data. Under at least any of these conditions, supervised, unsupervised or reinforced training of the specialized AI game design system may occur. Those skilled in the art will recognize the terms developing, processing, or generating may be used interchangeably.

In one embodiment, training continues and is augmented as new performance data is collected. The specialized AI game design system may differ significantly from other AI systems as the volume of data or datasets input may be significantly lower than many AI systems which may process many billions of bits of information and data. Nevertheless, the specialized AI game design system significantly improves game design and resultant performance. While some deep learning AI systems may exhibit an accuracy of 99.999%, it is anticipated that the specialized AI game design system, including artificial neural networks or deep learning systems, may have lower accuracies but still provide significant benefits in the field of game design with improving accuracy as more performance data and datasets, or other information is introduced over time. In other words, limited, incomplete or substandard training data or datasets, which are not conducive for other AI systems, may be conducive for embodiments of the present invention.

Artificial Intelligence (AI) refers to the ability of machines to exhibit human-like intelligence and perform tasks that typically require human intelligence, such as learning, reasoning, perception, and natural language processing. AI-based systems are computer systems that incorporate AI technologies to perform various tasks. These systems can be broadly classified into two categories: rule-based systems and machine learning-based systems. Rule-based systems use a set of rules or logical statements to make decisions and perform tasks. These systems often require human experts to define the rules and can only operate within the confines of the defined rules. Machine learning-based systems, on the other hand, use statistical models and algorithms to learn from data and improve their performance over time. These systems do not necessarily rely on predefined rules but instead learn from patterns and trends in the data. For example, a speech recognition system that uses machine learning to learn from audio data to improve its accuracy. Those skilled in the art will recognize that the term "artificial intelligence" (AI) as used herein includes the broadest possible definitions ranging from the simplest rule-based AI, based on simplistic algorithms which may require complete or partial human direction or intervention, to advanced machine learning and artificial neural networks to generative artificial intelligence which can produce various types of content, including text, graphics, or audio and further developed to include embodiments of the present invention. Moreover, as the science of artificial intelligence advances, the principles of the embodiments of the present invention will nevertheless remain under these broad definitions and not limited by technological advancements.

For example, artificial intelligence utilizing quantum computing is currently being researched and developed, but remains in its infancy. In classical computing, information is stored in bits, which can represent either a 0 or a 1. These bits are the building blocks of data processing and storage. Classical computers perform calculations by manipulating these bits through logic gates, such as "and", "or", and "not" gates. In quantum computing, the basic unit of information is called a quantum bit or qubit. Unlike classical bits, qubits can exist in multiple states simultaneously due to a property called superposition. This means that a qubit can represent both 0 and 1 at the same time, allowing for parallel processing of information. Another fundamental property of quantum computing is entanglement. When qubits are entangled, the state of one qubit becomes correlated with the state of another, regardless of their physical separation. This property enables quantum computers to perform computations on large numbers of possible states simultaneously, leading to potentially exponential computational speed-ups for many computing scenarios. In addition, quantum computing uses quantum gates to manipulate qubits and perform calculations. These gates are similar in function to conventional logic gates but operate on qubits according to the principles of quantum mechanics. While quantum computing has the potential to revolutionize computation and solve certain problems much faster than current computers, embodiments of the present invention will still be applicable although processed differently.

There are several types of machine learning-based systems, including supervised learning, unsupervised learning, and reinforcement learning. Supervised learning involves training a model on labeled data, where the model learns to make predictions based on examples with known outcomes. Unsupervised learning involves training a model on unlabeled data, where the model learns to identify patterns and structures in the data. Reinforcement learning involves training a model through trial and error, where the model learns by providing positive reinforcement or negative reinforcement based on its actions and results and the quality thereof. In the field of game design, supervised learning involves working with a predefined dataset and a clear understanding of how the data is categorized. The purpose of supervised learning is to identify patterns within the data that can be utilized in the game design process. This data or dataset may consist of labeled features that provide definitions and meanings to the data or dataset.

For instance, when designing game graphics, a large collection of images depicting various animals, or virtually any image desired, can be utilized. Each image is accompanied by an explanation or label of the animal depicted. Private and public sources of images, such as the internet, Google, Shutterstock, etc., are available to increase the data and datasets for training purposes. For example, through supervised learning, a machine learning application can be developed to distinguish one animal from another based on this labeled data.

By categorizing the data according to different species such as dogs, cats, humans, witches, genies, princesses, kangaroos, mice, fish, birds, dragons, lizards, insects, and more, the game designer can establish a comprehensive understanding of the attributes and meanings associated with each label. This labeled data serves as the foundation for training the game model, ensuring it accurately reflects the details represented by the labels. Regression analysis is employed for continuous labels, whereas classification is used when the data falls into a finite set of values. Regression analysis in supervised learning assists game designers in understanding the relationships between variables.

As it relates to slot machine game design, the selection of a suitable algorithm is an important component within the specialized AI game design system. Understanding different machine learning algorithms may assist game designers to determine the most suitable types of algorithms for the specific requirement of game design. Representative algorithms are disclosed but those skilled in the art will recognize that many other different style and types of algorithms may be employed including custom algorithms.

Clustering may also play a significant role in slot machine game design. Clustering involves grouping objects with similar parameters into clusters, where objects within a cluster exhibit greater similarity to each other than to objects in other clusters. As an unsupervised learning approach, clustering algorithms interpret the parameters of each item and organize them based on their relative positions within the overall game design.

Bayesian algorithms offer game designers a valuable tool for incorporating their prior beliefs about the desired structure of models, irrespective of the available data. These algorithms may prove particularly useful when game designers have limited data to train a model confidently. By leveraging Bayesian algorithms, game designers can encode their prior knowledge of certain model aspects directly into the system, enhancing its logical coherence and predictability accuracy.

Figure 29:
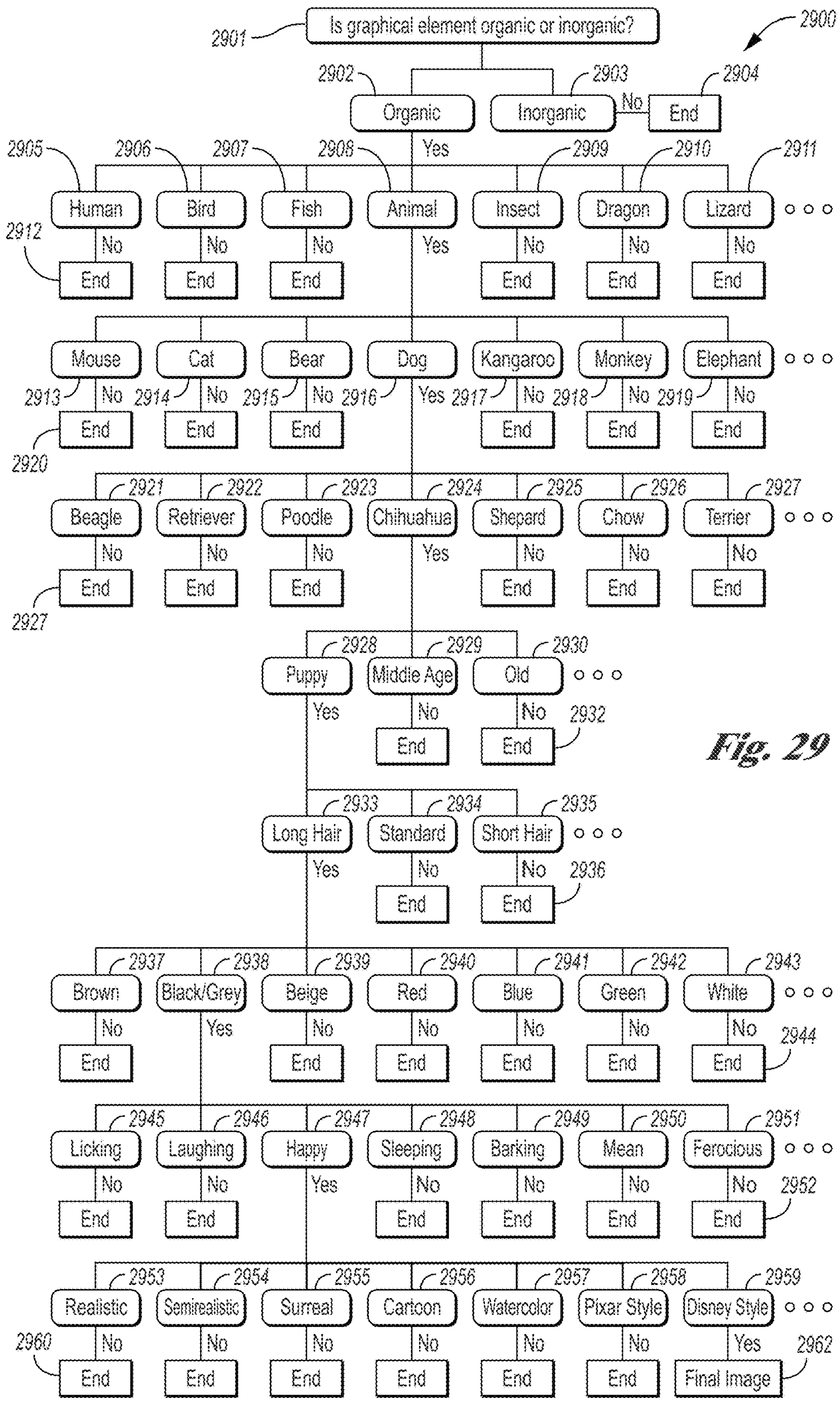
FIG. 29 illustrates an exemplary decision tree which may be utilized to determine instructions, decisions, or determinations according to the embodiments of the present invention.

Decision tree algorithms and similar methods, techniques, and systems of decision making, data science, and data handling, such as those illustrated in FIGS. 29, 30, and 31, serve to help determine the potential outcomes of decisions in slot machine game design. With their branching structure, decision trees and associated techniques represent the various decision results. Those skilled in the art will recognize that FIGS. 29, 30 and 31, and similar drawing figures are illustrative of decision tree algorithms and similar methods, techniques, and systems of decision making, data science, data handling, etc., such that many alternative schemes may exist or be developed.

FIG. 29, for example, illustrates a decision tree 2900 which may be utilized with the embodiments of the present invention to identify and/or produce a graphical character for use in a game in an electronic gaming machine environment. The use of such main graphical characters in a game is commonplace and hopefully resonates with players. In this case, a desired image of the character is an organic animal which is a Chihuahua puppy which has black and grey long hair, is happy and rendered in a Disney Studios style. Those skilled in the art will recognize that the illustration of the decision tree of FIG. 29 can be expanded to include many other variables to further refine the results and as such, FIG. 29 should be considered as representative of the decision techniques only and not necessarily the only way or an exhaustive way to reach a decision or conclusion.

As illustrated in FIG. 29, decision tree 2900 includes a first decision 2901 to decide an outcome or identify an outcome. In this case, the two outcomes coming from block 2901 are either Organic 2902 or Inorganic 2903. In this case, the answer of Inorganic 2903 is No leading to End 2904 or Organic block 2902 is Yes and therefore proceeds to the next decision level to determine or decide the type of organic subject matter which may be Human 2905, Bird 2906, Fish 2907, Animal 2908, Insect 2909, Dragon 2910 or Lizard 2911, etc. The four ellipsis to the right of block 2911 and elsewhere indicate that the number of outcomes may be larger or even far larger than that illustrated. As illustrated, Animal block 2908 has been selected or answered Yes, while all other decisions at that decision level are answered and No resulting in ending the decision as illustrated by End block 2912. The next set of decisions or determinations refines the decision of Animal 2908 with the possible selection of Mouse 2913, Cat 2914, Bear 2915, Dog 2916, Kangaroo 2917, Monkey 2918, and Elephant 2919. In the example illustrated, all decisions are No, resulting in ending the decision as illustrated by End block 2920 except for Yes at block 2916 indicating the selection of Dog. The next set of decisions or determinations refines the decision of Dog 2916 with the possible selection of Dog breeds such as Beagle 2921, Retriever 2922, Poodle 2923, Chihuahua 2924, Shepard 2925, Chow 2926, and Terrier 2927. In the example illustrated, all decisions are No, resulting in ending the decision as illustrated by the End block 2931 except for Yes at block 2924 indicating the selection of Chihuahua 2924. Once Chihuahua block 2924 has been answered in the affirmative, the next decision level indicates the Chihuahua's age as either Puppy 2928, Middle Age 2929, or Old 2930. In this case, Puppy 2928 has been answered as Yes with Middle Age 2929 and Old 2930 answered as No whereas that portion or branch of the decision tree ends as indicated by End block 2932. Once Puppy block 2928 has been answered in the affirmative, the next decision level indicates the Chihuahua's hair or fur type as either Long Hair 2933, Standard 2934, or Short 2935. In this case, Long Hair 2933 has been answered as Yes with Standard length 2934 and Short 2935 answered as No whereas that portion or branch of the decision tree ends as indicated by End block 2936. The next set of decisions or determinations refines the decision of Long Hair 2933 with the possible color selection of Brown 2937, Black/Grey 2938, Beige 2939, Red 2940, Blue 2941, Green 2942, or White 2943. In the example illustrated, all decisions are No, resulting in ending the decision as illustrated by the End block 2944 with the exception of Yes at Black/Grey block 2938 indicating the selection of Black/Grey color 2938. The next set of decisions or determinations refines the decision of Black/Grey fur 2938 with possible mood or action selection of Licking 2945, Laughing 2946, Happy 2947, Sleeping 2948, Barking 2949, Mean 2950, or Ferocious 2951. In the example illustrated, all decisions are No, resulting in ending the decision as illustrated by the End block 2952 with the exception of Yes at Happy block 2947 indicating the selection of Happy 2947. The next set of decisions or determinations refines the decision of Happy 2947 with the possible art style selection of Realistic 2953, Semirealistic 2954, Surreal 2955, Cartoon 2956, Watercolor 2957, Pixar Style 2958, or Disney Style 2959. In the example illustrated, all decisions are No, resulting in ending the decision as illustrated by the End block 2960 with the exception of Yes at Disney Style 2959 indicating the selection of a Disney Style art. Accordingly, the decision or determination has resulted in a Disney Style Happy Black and Grey colored Long Hair Puppy Chihuahua Dog type Animal which is Organic. Such decision trees and similar methods may be supervised, unsupervised, or a combination of both supervised and unsupervised training and/or similar decision or determination making.

FIG. 30 illustrates a set of instructions or decisions or determinations 3000 made relating to game design math models. The four ellipsis at the bottom of the drawing figure indicate that the number of decisions, determinations or outcomes may be larger than that illustrated.

FIG. 31 illustrates a set of instructions or decisions or determinations 3100 made relating to programable game mechanics. The four ellipsis at the bottom of the drawing figure indicate that the number of decisions, determinations or outcomes may be larger than that illustrated.

Those skilled in the art will recognize that the decision or determination or outcomes methods or processes illustrated in FIGS. 29, 30 and 31 may take many forms yet resulting in similar decisions or determinations or outcomes.

FIGS. 32A through 32D illustrate exemplary variables, data points, data fields 3200, etc., which may be included or required in the math-related specialized AI game design system spreadsheet or questionnaire but may be expanded as required. In this case, results of the decision or determination are shown including variables, data points, datasets, and data fields are in a spreadsheet questionnaire style format. Those skilled in the art will recognize many variables, data points, datasets, data fields, etc., may be added or omitted as a game may require and this should be considered as an exemplary list. The questionnaire or spreadsheet may be expanded at any time to include new features, new game mechanics, game math, etc., as game designers routinely create new games, new game math models, new game features or expand existing features, etc. Accordingly, the questionnaire or spreadsheet may evolve over time to be able to accommodate new games and the many variations thereof.

FIGS. 33A through 33J illustrate portions of an Excel spreadsheet 3300 for the game math for the game shown in FIGS. 13A through 13C. Those skilled in the art will recognize that these are exemplary listings, but the figures are illustrative of the game math design process. Accordingly, those skilled in the art will recognize that the specialized AI game design system of the embodiments of the present invention may apply to a variety of gaming or similar applications.

Dimensionality reduction algorithms may be instrumental in slot machine game design as they assist in eliminating redundant or non-useful data that may impede analysis. These algorithms may help remove outliers, redundant information, and other irrelevant data, thereby improving the performance of machine learning systems and predictive accuracy. In the context of analyzing casino performance reports, dimensionality reduction is valuable for enhancing the efficiency of data analysis by adjusting weighting of data and eliminating unnecessary noise.

Instance-based algorithms find application in slot machine game design when game designers seek to categorize new data points based on their similarities to existing training data. Instead of constructing explicit models, instance-based algorithms compare new data with training data and categorize them based on their resemblance to previously encountered exemplary game designs. These algorithms provide a flexible approach in slot machine game design, allowing decisions to be made based on the similarities between new and existing data points and/or datasets.

Conversely, unsupervised learning algorithms are employed to group examples or features within the data or dataset without predetermined labels. In this case, the unlabeled data helps define the parameters and classifications. This process adds labels or annotations to the data, thereby transforming it into a possible supervised learning scenario. Unsupervised learning proves valuable when dealing with large volumes of unlabeled data where the context is unknown to the game designer. Since labeling is not always feasible at this stage, unsupervised learning may serve as an initial step, enabling the analysis of the data before passing it on to a supervised learning process. Those skilled in the art will recognize that the terms data and datasets may be interchangeable in many instances.

The utilization of unsupervised learning algorithms allows game designers to gain insights from extensive amounts of new or past unlabeled data. Similarly, to supervised learning, these algorithms search for patterns within the data. However, the distinction lies in the fact that the data is not already understood. In the gaming context, collecting substantial amounts of data related to a specific game, its performance, and its characteristics can help game designers discern patterns in performance and game features, allowing them to draw connections to previous, current, or future games.

Deep learning, in the context of slot machine game design, utilizes neural networks with multiple layers to learn from and process complex data. These hierarchical neural networks are designed to emulate the functioning of the human brain, allowing computers to handle abstract and loosely defined problems encountered in game design.

In the field of specialized game design, deep learning offers several advantages. It excels at analyzing unstructured data, such as player behavior patterns, preferences, game interactions, game performance, etc. By utilizing deep learning algorithms, slot machine game designers may uncover hidden insights and correlations within this data, enabling them to create more targeted game design with a higher probability of player acceptance and game performance.

The structure of a neural network consists of an input layer, one or more hidden layers, and an output layer. In the case of slot machine game design, the input layer receives various data inputs, such as player demographics, historical game play data, performance data, or even real-time sensory inputs, etc. As the data flows through the hidden layers, complex transformations occur, allowing the neural network to learn intricate features and patterns. Finally, the output layer produces predictions or decisions based on the processed information.

Deep learning models in slot machine game design may involve multiple hidden layers, giving rise to the term "deep" learning. These hidden layers enable the network to learn increasingly abstract representations of the input data, capturing more intricate relationships and optimizing decision-making processes. Through an iterative approach, deep learning algorithms continuously adjust the weights and parameters of the neural network to optimize its performance. This iterative training process involves feeding the network with labeled supervised learning data or allowing it to extract features from unlabeled unsupervised learning data. By iteratively adjusting the network's parameters, deep learning may enable the system to make more accurate predictions and decisions over time as they relate to specialized game design.

In the game design field, deep learning can be leveraged to enhance various aspects of slot machine games. For example, deep learning algorithms can be used to generate visually appealing graphics, animations, themes that align with player preferences, etc. Additionally, by analyzing player data, deep learning can optimize game elements such as payout rates, bonus structures, graphics and animations, sound effects, volatility rates or levels, math models, game mechanics, etc., to maximize player engagement and enjoyment may result in more immersive and captivating gaming experiences for players leading to increased game performance.

Although AI is becoming more widely used and gaining computing power, specialized AI systems are required for the gaming industry to address the many needs in the game design field. Such specialized systems may be used for developing slot machine math models, slot machine software engineering, slot machine game art and graphics, slot machine sound effects, full slot machine game development, slot machine game code testing, slot machine game code diagnostics and editing, help screens and translations, slot machine game analytics and slot game predictive models, etc. These specialized AI systems may exist individually, in any combination or part of a whole system where individual systems may be considered as general specialized AI game design systems which may include specialized AI game design modules or specialized AI game design components. Those skilled in the art will recognize that the various AI game design modules or specialized AI game design components may allow for specific or limited functionality relative to that described and may be considered as sub-modules or sub-mobile components but still be considered as AI game design modules or specialized AI game design components. Although slot machine games are discussed, those skilled in the art will recognize that these systems may have similar or equal utility for other gaming applications such as mobile phone games or apps, desktop games or apps, console games, arcade games, etc. Similar specialized AI systems may be employed in a variety of other technologies and industries such as EGM bill validators, casino management systems, player bonusing and comp programs, and other applications relating to gaming. In addition, similar specialized AI systems may be employed in the medical field, data and/or math intensive applications, virtual reality, augmented reality, mixed reality, entertainment industries, advertising, technical illustrating, patent drawing services, etc.

The embodiments of the present invention reduce the overall time to develop games, increase computer efficiency, increase computing speed, increase computer utility, increase game performance, etc., utilizing one or more specialized AI game design computer programs and associated computer algorithms developed to provide game development process and techniques and may include neural network system and methods of AI computer applications and associated machine learning or training as described herein.

A neural network is a method in artificial intelligence that teaches computers to process data in a way that is inspired by the human brain. Neural networks, which may also be known as artificial neural networks (ANNs) or simulated neural networks (SNNs), are a subset of machine learning and are at the heart of many deep learning algorithms. Neural networks and artificial neural networks and associated deep learning are well suited for specialized AI game development systems and adaptable to any of the embodiments described herein.

In its optimal form, the specialized computer programs and/or specialized AI game design applications and associated machine learning may partially or fully develop any one of the previously listed game aspects such as slot machine math models, slot machine software engineering, slot machine game art and graphics, slot machine sound effects, full slot machine game development, slot machine game code testing, slot machine game code diagnostics and editing, slot machine help screens and translations, slot machine game analytics and slot machine slot game predictive models, slot machine performance analytics and associated recommendations, etc.

An important factor in producing full or partial games or aspects of a game is that the specialized AI game design system include the ability to discern one game from another as it is important that a game manufacturer provide a wide variety of games and game types. In doing so, the specialized AI game design system may produce many differing games based on an understanding or training of the many factors that result in a successful game. For instance, the specialized AI game design system may produce a series of one hundred different game types annually so that casinos do not oversaturate their floors with too many similar games and always have fresh content to appease their players. Accordingly, the specialized AI game design system may produce a wheel style game, a game featuring a dragon, an Asian-themed game, a game with progressives, single progressive games, two progressives games, three progressive games, four progressive games, ten progressive games, games without progressives, games with jackpots, games without jackpots, hold and spin games, move and spin games, fish games, butterfly-themed games, hunting games, virtual mechanical reel games, games with three rows, game with four rows, games with random reel rows, games with four reels, games with five reels, games with six reels, games with variable reel numbers, games with random reel numbers, games with free game features, games with wild features, games called three pot games, games referred to as four pot games, persistent games, non-persistent games, games featuring babies, games with spooky themes, games with animals, outer space-themed games, games based on puzzles or board games, etc.

Moreover, any particular game theme may have many variants such as a dragon which is happy, a dragon that is mean, a dragon that breathes fire, etc., or with many colors or styles, differing volatilities, differing math, differing game mechanics, etc. The number of permutations and combinations is limitless. Over time, the specialized AI game design system may be trained to produce game varieties while understanding that games similar to previously produced games may be acceptable as long as the timing is right. Training of the specialized AI game design system may be optimized by continually updating performance data so the system remains current and understands the many variables that affect long term success of one or more games and the need for replacing game themes over time along with understanding possible shifts in player attitudes and/or preferences.

Game math often requires a significant amount of time and expertise to develop. Although certain formulas and spreadsheets may be used repeatedly by game mathematicians, it is often a labor-intensive process and at times prone to error depending on the level of competence of the game mathematician. To assist the mathematician, the mathematician may utilize well-known math and spreadsheet programs and tools such as Microsoft Excel, Matlab, Mathematica, Python, etc. Generally, once the game math is finished, the mathematical program may produce XML files or similar machine-readable files which interact with the game software and guide game play frequencies, probabilities, awards, progressives (if included), etc.

Utilizing the embodiments of the present invention, even those not trained as game mathematicians, may produce game math utilizing more specialized computer programs and associated computer algorithms developed to allow for a more rapid and efficient game development process which may include (AI applications and associated machine learning.

The specialized computer programs and associated computer algorithms are generally static in as much as while they may produce game math and usable files, they cannot learn from previously generated math outputs, variables entered or data inputs and require the game developer to enter a wide variety of variables, data points, datasets, and data fields necessary to complete tasks. Under such conditions, most or all data entered is necessary to complete the process. Optimally, under the specialized AI game design system, all data points or data fields entered allow the specialized computer programs and associated computer algorithms to produce the game math partially or fully.

As the process evolves, more and more variables, data points, and data fields may be added to the specialized AI game design system programs and associated computer algorithms allowing for producing more complex game math. Use of a specialized AI game math system with machine learning further enhances the process with increased efficiency and performance.

For instance, a game math profile may include many variables, data points, datasets, and data fields which upon entry automatically populate the spreadsheet of the math program whereas the specialized computer programs and associated computer algorithms which may include machine learning may complete the task. Variables, data points, datasets, and data field entry may be constructed in any convenient manner such as a questionnaire or other user-friendly formats so not to require the skill of a trained mathematician although the spreadsheet may also be used by trained mathematicians. In the event certain variables, data points, datasets, and data fields, etc., are missing, the specialized computer programs and associated computer algorithms or the specialized AI game math system may alert the game developer so they may enter the missing or required variables, data points, datasets, data fields, etc., or in the alternative a trained specialized AI game design system may supply the missing or required variables, data points, datasets, data fields, etc.

Those skilled in the art will recognize that the specialized AI game math design system can be programmed to output game math code as desired or needed. Often, game math code is quite extensive and complex but may generally fall under a number of game math categories or types which may include many or all of the following detailed math categories. Embodiments of the present invention relating to specialized AI game math design systems may generate one or more or all of this game math. Those skilled in the art will recognize that this listing should be considered as an exemplary listing and not be considered as an exhaustive list.

Reel Strip Math: Reel strip math involves determining the composition of the reel strips, containing the symbols that appear on each reel. This math determines the number of symbols on each reel and their distribution. It also calculates the frequency of each symbol appearing on the reel strips. By analyzing the reel strip math, mathematicians can assess the probability of landing specific symbol combinations on the reels.

Payline Math: Payline math focuses on the calculations related to the game's paylines. It determines the winning combinations and associated payouts based on the alignment of symbols on the active paylines. This math considers factors such as the number of symbols required for a winning combination, their positions on the reels, and the payouts for different symbol combinations. Payline math helps ensure that the game's pay structure is balanced and offers fair payouts.

Hit Frequency Math: Hit frequency math is a measure of how often a player can expect to achieve a winning outcome on a spin. This math calculates the percentage of spins that result in a win. It takes into account the probabilities of landing winning symbol combinations and determines the overall hit frequency. The hit frequency helps determine the volatility of the slot machine, influencing the frequency of wins versus the size of the payouts. Return to Player (RTP) Math: RTP math focuses on determining the percentage of wagers that the slot machine is designed to return to players over time. It involves calculating the average payout percentage based on the game's payouts, probabilities, and hit frequency. RTP math is critical for ensuring that the game meets regulatory requirements and provides a fair return to players.

Volatility Math: Volatility math relates to the risk/reward profile of the game. It determines the distribution and size of payouts, affecting the volatility or variance of the game. High volatility means that the game has larger payouts but less frequent wins, while low volatility offers more frequent but smaller wins. Over time, player preferences relating to game volatility may change.

Progressive Jackpot Math: Progressive jackpot math focuses on the calculations and mechanics of progressive jackpot features in slot machines. It determines the rate at which the jackpot increments, the odds of triggering the jackpot, and the distribution of jackpot prizes. Progressive jackpot math often involves random triggers, complex probability calculations, and considerations for the contributions from player wagers.

Bonus Feature Math: Bonus feature math deals with the design and balance of bonus rounds or features within the slot machine. It determines the probability of triggering the bonus feature, the potential rewards or prizes, and the overall expected value for players participating in the bonus game. Mathematicians analyze the bonus feature math to ensure that the bonus rounds are engaging, fair, and provide exciting opportunities for players to win additional rewards.

Symbol Weighting Math: Symbol weighting math involves assigning different probabilities or weights to each symbol appearing on the reels. It affects the frequency of symbol occurrences and their impact on the game's outcomes. By adjusting the weights of symbols, mathematicians can control the balance between lower-paying and higher-paying symbols. Symbol weighting math is used to create a desired payout distribution and to ensure that the game's paytable is properly balanced and appealing to players both short and long term.

Scatter and Wild Symbol Math: Scatter and wild symbol math focuses on the behavior and impact of special symbols like scatters and wilds. It determines the probabilities of these symbols appearing on the reels, their functions, such as substitution or triggering bonus features, and the associated payouts or rewards. This game math ensures that scatter and wild symbols contribute to the player excitement and potential for bigger wins.

Viable or Random Rising Reel Math: Variable or random rising reel math calculates how math changes or is impacted when a game does not always have the same number or reels or lines. Variable reel math allows for the reel height or number of symbol openings or spaces to change but in unison and can apply to one or more of the slot machine reels whereas random rising reel math allows for the reel height or number of symbol opening or spaces to change individually.

Puzzle Style Game Math: Puzzle style game math is applicable to games with outcomes based partially or fully on an underlying puzzle or secondary game being fully or partially solved or completed. Examples of puzzle style game math include tic-tac-toe, jigsaw puzzles, hit point style games, etc.

Bonus Buy Math: Bonus buy math relates to the calculations and probabilities associated with the feature that allows players to directly purchase access to a bonus round or other special game features and is available on selected games. This math determines the cost of buying the bonus, the potential rewards, and the expected return on investment for players. Mathematicians analyze the bonus buy math to ensure that the feature provides fair value and an exciting option for players.

Multiplier Math: Multiplier math deals with the calculations and probabilities associated with multiplier features in the game. It determines the probability of multiplier symbols appearing, their associated multiplier values, and their impact on the payouts or winnings. By adjusting the probabilities and values of multipliers, mathematicians can create different levels of excitement and potential for big wins in the game.

Gamble Feature Math: Gamble feature math is used when the slot machine offers a gamble feature that allows players to risk their winnings for a chance to double or multiply them which may be available on some games. This math calculates the probability of winning the gamble, the odds of different outcomes, and the expected value of the gamble feature. Mathematicians analyze the gamble feature math to ensure that the feature offers fair odds and maintains an appropriate balance between risk and reward.

Volatility Stabilizing Sub-event Math: Volatility stabilizing sub-event math may be included in the game math. This math calculates the stabilizing effects of volatility when a single random event is broken down into a number of individual sub-events thereby decreasing the game volatility.

Those skilled in the art will recognize that the AI functionality may be limited until the specialized AI game math design system is sufficiently trained but when adequate training has occurred the specialized AI game math design system will be able to write the game code partially or fully. Moreover, after being trained in performance analysis, it will be possible for the specialized AI game math design system to write entire portions of the game code or even the full game code without human intervention. However, it is anticipated that human oversight may be required until the specialized AI game math design system has been adequately trained. Even then, the specialized AI game math design system may receive updated training on how games in the field are performing along with game details, including competitor's games, although the information may be somewhat superficial relative to games where full game and performance details can be captured and the programming related specialized AI game design system trained accordingly. Continued programming related to specialized AI game design system training, in many or all respects, will most likely be ongoing for the duration of the specialized AI game math design system life cycle.

Although more specialized computer programs and associated computer algorithms have been described, many of the same principles can be applied to general or specialized AI game design applications. AI differs from normal software programs or specialized computer programs and associated computer algorithms in a number of ways. For instance, AI systems can learn from data and improve their performance over time, whereas traditional software or specialized computer programs and associated computer algorithms programs follow pre-defined rules and logic and are effectively static in their functionality. In addition, specialized AI game design systems can adapt to changing conditions and new data, whereas traditional software programs or specialized computer programs and associated computer algorithms require manual updates or modifications to adapt to changes and specialized AI game design systems deal with uncertainty and imperfect data, whereas traditional software programs or specialized computer programs and associated computer algorithms assume and often mandate complete and precise input data. While traditional software programs or specialized computer programs and associated computer algorithms require user input, variable, data point and data fields, specialized AI game design systems, after proper training or machine learning, can operate semi-autonomously or fully autonomously and potentially make decisions without human intervention which is one of the ultimate goals of embodiments of the present invention. As later discussed, the principals of the math based specialized computer programs and associated computer algorithms and its AI counterpart can be expanded so the specialized AI game design systems can produce many or all aspects of game design such as those designed for EGMs and the like. This may include creating game math and corresponding XML game code or similar, game programming code, game artwork, graphics and animations, complete game design, sound effects, game review and testing, game code diagnostics and editing, quality assurance, help and help screen translations, performance analytics, compliance reporting, the creation of game predictability models to increase the success rate of new games as most games tend to fail on the casino floor due to poor performance as measured by coin-in, win per unit compared to either property or zone averages within a casino or any other applicable metrics as previously described. In addition, even successful games may fail over time as the novelty wears off.

The ultimate success of the specialized AI game design system is dependent on a number of factors and the depth of machine learning or AI training. Those skilled in the art will recognize that machine learning is part of the artificial intelligence (AI) system or process and references to AI herein are intended to include not only machine learning, but the many processes, systems, algorithms, and components often included with AI systems and processes along with neural networks, artificial neural networks and associated deep learning systems. These factors include the quality and quantity of data used to train an AI system which may be important to its productivity and efficiency. Ideally, the data should be clear, accurate, and relevant to the problem being solved. Additionally, the more data that is available, the better, as this helps the specialized AI game design systems learn more effectively and efficiently. Specialized AI game design includes identifying the most relevant and informative features of the data that are relevant to the problem being solved and the ultimate of game design. In addition, the choice of algorithms used to train an AI game design system depends on the breadth and scope of data input and the specifics of the game design including creating game math and corresponding XML code or similar, game programming code, game artwork and animations, sound effects, game review and testing, quality assurance, performance analytics, game code diagnostics and editing, compliance reporting, creation of game predictability models, etc. By way of example and as previously discussed, the game math model serves as an example for base parameters and/or hyperparameters that may be applied to creating game math and corresponding XML code or similar, game programming code, game artwork, graphics and animations, complete game design, sound effects, game review and testing, game code diagnostics and editing, quality assurance, help and help screen translations, performance analytics, compliance reporting, the creation of predictability models to increase the success rate of new games, etc.

Regularization techniques can help to prevent overfitting of the specialized AI game design system to the training data. This involves adding penalties or constraints to the model to discourage complex or overly specific solutions.

As the learning process continues, the AI game design system includes significant transfer learning which involves reusing a pre-trained model for a related game design task, rather than training a new model from scratch. This can help to reduce the amount of data and training time required and can improve the accuracy of the specialized AI game design system and associated game performance. As specialized AI game design training is an iterative process, feedback is provided to improve the accuracy and performance of the specialized AI game design system which may involve or include monitoring the system's performance on a validation set, adjusting the model and/or hyperparameters, and retraining the system until the desired level of accuracy and performance is achieved and then very often improving the system over time.

Specialized AI game design systems and associated machine learning can be used to generate new game designs that are more likely to be successful and engaging, by simulating player behavior and preferences with an understanding of player psychology and subliminal player behavior. Specialized AI game design systems and associated machine learning can analyze performance and player data of past or current games to identify which game features or mechanics are most popular and use this information to create new games or modify existing ones. This can help to ensure that new games are more likely to be successful or existing games may be optimized for maximum player engagement and performance. To optimize chances for success, specialized AI game design systems and associated machine learning can be used to balance the game, by adjusting the frequency and value of payouts, game volatility, and the many other game features to optimize player engagement and retention and resultant game performance. Specialized AI game design systems and associated machine learning can analyze player behavior and preferences, along with past and current game performance to determine the optimal payout frequency, volatility, payout size, and other game parameters that maximize player satisfaction. For example, specialized AI game design systems and associated machine learning can use reinforcement learning techniques to optimize the game parameters based on player behavior and adjust the parameters to ensure that the game remains engaging and rewarding with good game performance. Adjustments can even be done on a real time basis as long as the game adheres to laboratory and regulatory regulations and rules.

The AI game design system according to the embodiments of the present invention may be used for many purposes as previously discussed including optimization of new games. For instance, the specialized AI game design system can adjust the payouts and frequencies, based on player behavior and previously entered performance data or metrics from previous games to optimize player satisfaction and engagement. As discussed, the AI game design system can analyze past game and player data to determine which games, game features, volatility, payout frequencies, etc., are most popular with players and adjust the game design accordingly.

Specialized AI game design systems can also be used to adjust the game experience for select player demographic groups, by analyzing player behavior and preferences. Often the player demographics may differ from one casino to the next. These differing player demographics may include player age ranges, average player spend, gender, local market versus tourist markets, player indoctrination of game type for certain markets such as keno-based games in Montana or bingo-based games in Latin America or high video poker penetration in the state of Nevada, etc.

To adapt to these changing demographics, more than one game design may be included and configurable within an EGM after approval by laboratory or gaming authorities. Thereafter, the game manufacturer and/or operator may choose a configurable game profile option that suits their particular demographic. This configurability option is similar to selecting which games to enable for a multi-game EGM but in this case, selecting a player profile. To assist in determining these changing game preferences, the specialized AI game design system can analyze past and current game performance to determine the optimal game characteristics for the typical player profile in a select casino or market. For example, the configurability option may be listed as follows, Game Design A—local, Game Design B—tourist, Game Design C—younger demo, Game Design D—older demo, Game Design E—low player spend, Game Design F—high player spend, etc. To optimize the proper selection of an included game, it may be desirable to list demographic characteristics as opposed to selecting a particular included game where the game or game platform programming makes the decision. By way of example, the best included game may be determined by answering the following questions during initial machine placement or thereafter. Location; tourist or local, average player age range; 25-40, 35-55, 50-70, gender; male or female, average player spend; low, medium, high, special location; Montana, Nevada, Latin America, etc.

Specialized AI game design systems can also be used to analyze player data and predict player behavior, such as which games players are most likely to play. This information can be used to optimize game design and marketing strategies, such as by creating targeted promotions or incentives that are more likely to appeal to specific player segments. Specialized AI game design systems can also be used to predict player turnover and identify which players are most likely to leave a game, so that operators can take proactive steps to retain those players.

The specialized AI game design systems according to the embodiments of the present invention can be used to test games to identify potential bugs or issues that may affect the quality of the game. This can be done through code review and automated testing, where the specialized AI game design systems simulate player behavior and interaction with the game to identify problems, or through manual or automatic testing, where the specialized AI game design systems assist human testers by identifying potential issues and areas for improvement. By using specialized AI Quality Assurance (QA) game design systems for game testing, game designers can identify and fix potential issues before they are submitted to a gaming laboratory or regulated jurisdiction.

Those skilled in the art will recognize that a specialized AI QA game design system can be programmed to check a number of game features to ensure the game is glitch or bug free. Bugs and glitches may often occur during the game design process. Embodiments of the present invention relating to specialized AI QA game design systems may check for and/or correct one or more or all of the following conditions/issues of the game. Those skilled in the art will recognize that this listing should be considered as an exemplary listing and not be considered as an exhaustive list.

Functional Issues: Incorrect symbol placements on the reels, incorrect payouts or missing winning combinations, incorrect behavior of bonus features, such as incorrect triggers or rewards, incorrect handling of player input, such as button clicks or touch gestures, issues with the game's progression or flow, such as incorrect transitions between game states or screens, incorrect handling of game rules, such as bet limits or payline restrictions, issues with game settings, such as sound volume or language selection, etc.

Visual and Audio Issues: Visual glitches or artifacts, such as flickering symbols or misplaced graphics, inconsistent or incorrect animation of game elements, including reels, symbols, or user interface components, inconsistent or missing visual effects, such as transitions or particle effects, Inconsistent or missing sound effects, music, or voiceovers, incorrect synchronization of visual and audio elements, such as mismatched animations and sounds.

Performance Issues: Slow loading times for the game or specific game screens, slow or choppy animation of game elements, such as spinning reels or bonus round animations, high memory usage or memory leaks that can lead to performance degradation, issues with frame rate, causing the game to stutter or lag during gameplay, excessive CPU or GPU usage, impacting the overall performance of the game.

Compatibility and Platform Issues: Compatibility issues with different devices or operating systems, incorrect rendering or scaling of graphics on different screen resolutions or aspect ratios, issues with touch or mouse interactions on different devices or platforms, inconsistent behavior or functionality across different web browsers or mobile platforms, localization or internationalization issues, such as incorrect translations or formatting of text, currencies, or dates.

Usability and User Experience Issues: Unclear or confusing user interface elements, such as buttons, icons, or labels, inconsistent or incorrect feedback to user actions, such as missing or delayed visual or audio cues, accessibility issues, such as lack of support for assistive technologies or color contrast problems, issues with game controls, including responsiveness, sensitivity, or intuitiveness, issues with game tutorials, instructions, or help documentation.

Security and Integrity Issues: Vulnerabilities to cheating or unauthorized access, such as manipulation of game outcomes or player data, inadequate protection of player information, such as insecure data storage or transmission, compliance issues with regulatory requirements, such as random number generation or payout verification, issues with financial transactions, such as incorrect handling of deposits, cash-outs, bonus balances or metering.

Edge Cases and Corner Cases: Testing for unusual or extreme scenarios, such as maximum or minimum bets, balances, or payline combinations, testing for unexpected player actions, such as rapid button presses or unconventional betting patterns, testing for rare or low-probability events, such as hitting a jackpot or triggering specific bonus features.

Game Progression and Balance: Analyzing the overall balance and fairness of the game, including the frequency of wins, payouts, and volatility, verifying that the game's mechanics, probabilities, and payouts align with the specified design and mathematics, analyzing the long-term player experience, including the rate of return to player (RTP).

Those skilled in the art will recognize that the AI functionality may be limited until the specialized AI QA game design system is sufficiently trained but when adequate training has occurred the specialized AI QA game design system is able to check for bugs, glitches or issues partially or fully. However, it is anticipated that human oversight may be required until the specialized AI QA game design system has been adequately trained. Even then, the specialized AI QA game design system may receive updated training on how games in the field are performing along with game details, although the information may be somewhat superficial relative to games where full game and performance details can be captured and the programming related specialized AI game design system trained accordingly. Continued programming related to specialized AI QA game design system training, in many or all respects, will most likely be ongoing for the duration of the specialized sound effects-based AI game design system life cycle.

The specialized AI game design systems according to the embodiments of the present invention can also be used to monitor the performance of slot machine games to identify potential issues or areas for improvement. This can include monitoring the game's speed, responsiveness, and stability, as well as analyzing player feedback and past performance data. By using specialized AI game design systems to monitor game performance, manufacturers and game designers can identify and address potential issues before they impact the player experience, which helps to ensure that the game is engaging and rewarding for players as well as profitable for the operator. Often this may be done incrementally as manufacturers may not always apply for certification in all regulatory jurisdictions. For instance, a game may be released in Nevada only until the manufacturer is satisfied with performance and operational characteristics. If the results are satisfactory, the manufacturer may then seek certification in other jurisdictions or if results are poor, redesign parts of the game or even scrap the game entirely. The specialized AI game design system can assist in this review process by reviewing performance data and identifying the most problematic areas of the game.

As game compliance is mandated in most jurisdictions, the specialized AI game design systems can be used to monitor games for compliance with industry regulations and standards. This can include monitoring the game's payout percentages, fairness, and other metrics to ensure that the game is operating within legal guidelines. Those skilled in the art will recognize that any or all of the embodiments of the present invention may preferably include adapting and adhering to various compliance standards and specifications.

The machine learning process for the specialized AI game design system or training offers many benefits beyond just preparing for game usage. After teaching the system the basics or even advanced features of games, the game designer can input past computer code, graphics files, sound files, etc., to teach the system the many variables of game design. In one embodiment, these files include not only current and future games but older games regardless of whether they have t been successful. Along with these files, the user can input associated performance data for the games into the system. It is not unusual for up to 75% of developed games to fail as the casino floor is quite competitive and players can be quite finicky. Accordingly, much can be learned from failed games along with successful games. A great many reasons for the success or failure of a game resides within the subconscious of players. For instance, what games are most appealing to a new player as a player walks a casino floor and why? Is it the color scheme, the game theme, sound effects, attract animations, cost-to-cover, wager ranges, denomination ranges, progressives, graphic contrasts, help screens, etc. Then, once a player has tried a game, why do they continue to play or abandon the game? Is the abandonment the result of the game animations, art, sound effects, volatility, win frequencies, loss rates, loss of excitement, etc. Currently, most in the game development business cannot pinpoint or analyze all or even a few of the vast subtleties of player acceptance or rejection, especially on a subliminal level and instead rely on intuition and guesswork or almost accept as fact that there is just no good way to predict performance of a future game. Of course, this is a highly flawed method and more guesswork than data science. The specialized AI game design system can assist in this aspect of game design and one can expect that with each game analyzed or developed, the system develops more accurate slot game predictive modeling as machine learning continues. FIG. 34 is a simplified version of FIGS. 28A through 28E which illustrates exemplary game performance data that may be entered into the specialized AI game performance analytics system.

Another benefit of utilizing the specialized AI game design system involves the game code diagnostics and editing process. During the game development process, whether created by humans or partially or fully developed by the specialized AI game design system according to the embodiments of the present invention, game testers may play the game and report any bugs or glitches they find but also report on the great many aspects of how the game plays and reporting bugs and glitches along with recommended corrective measure taken. At least for games developed by humans or partially developed by the specialized AI game design system, edits can be made to the game to hopefully improve game performance or correct issues. However, the editing process is often slow, costly and inefficient. With the specialized AI game design system, edits or corrections can be made in usually short order, measured in minutes and not days or weeks, as opposed to past processes. For instance, if a game has play rates under 500 plays per hour, it may be prone to failure as the coin-in over time will always be less than a similar game with play rates of 1,000 games per hour. A great many factors may influence the play rates such as reel spin time, animation time, free game time, award rollup time, etc. Normally, for a human game designer, working with the game software engineers and mathematicians, this process may take weeks or even months due to the large number of edits necessary to move the play rate from 500 games per hour to a more acceptable 800+ plays per hour. This is often due to the need to not only edit one facet of the game but to also address the many side effects or tangential issues that may result therefrom. Utilizing the specialized AI game design editing system, the editing processing time may be greatly reduced to minutes or hours instead of weeks or months. Similarly, the testing may reveal that a particular theme may just not be appealing to the player in the main game with a character such as a dragon, additional content, color, background, animation types, etc. In this event, the game artists may be required to change the main character from a skinny dragon to a fat dragon and from green to violet, rerigging the 3D model or, if needed, adjust animations, change backgrounds, colors, etc. This process too may take weeks or months to accomplish while the specialized AI game design system can provide the edits more rapidly and render the new content in short order, while even providing the game designer many options to choose from along with recording and bugs or glitches and corrective measure taken, if any.

FIG. 31 illustrates exemplary variables, data points, data fields, etc., 3100 which may be included or required in the programming related specialized AI game design system questionnaire but may be expanded as required. The questionnaire or spreadsheet may also include math or game mechanics related questions and/or answers such as illustrated in FIGS. 32A through 32D to explain game functionalities more fully to game engineers and/or game mathematicians. In the case shown, variables, data points, datasets and data fields are in a spreadsheet questionnaire style format. Those skilled in the art will recognize many variables, data points, datasets, data fields, etc., may be added or omitted as a game may require and this should be considered as an exemplary list and not an exhaustive list. The questionnaire or spreadsheet may be expanded at any time to include new features, new game mechanics, etc., as game designers routinely create new games and new game features or expand existing features. Accordingly, the questionnaire or spreadsheet will evolve over time to be able to accommodate new games. Once the programming related spreadsheet, decision tree or similar is completed, the game may be programmed by the game programmers resulting in program code 3500 as shown in FIGS. 35A through 35F. In the case of the programming related specialized AI game design system, the system may review, compile, and analyze the data included to check for errors or inefficiencies or produce a portion of or the entire appropriate game software code such as C++ for an Ubuntu 20.04 operating system. FIGS. 36A through 36E is an exemplary questionnaire or spreadsheet describing game functionality and characteristics to game programmers and/or game mathematicians or to be input into the programming related specialized AI game design system.

Those skilled in the art will recognize that the programming related specialized AI game design system can be programmed to output game code as desired along with accommodating other operating systems. Other operating systems may also be employed along with codes such as HTML5 for mobile and other devices or applications. Moreover, as new code bases and/or operating systems emerge, the code may be automatically updated for the new code base or operating system. Games with older code bases and/or operating systems may be partially or fully updated to new or differing code bases and/or operating systems automatically. In this way, older games are able to be released or re-released on newer game platforms in far less time than a manual conversion may take. Often, game program code is quite extensive but may generally fall under numbers of different program categories or types which may include many or all of the following. Embodiments of the present invention relating to programming related specialized AI game design systems may generate one or more or all of this programming code. Those skilled in the art will recognize that this listing should be considered as an exemplary listing and not be considered as an exhaustive list.

Graphic Placement Code: This code determines the layout and positioning of graphics elements within the game screen. It involves specifying the coordinates, sizes, and alignments of symbols, backgrounds, buttons, and other visual elements.

Animation Code: Animation code is responsible for creating and managing animations in the game. It handles transitions, movement, and effects of various game elements, such as spinning reels, symbol animations, and transitions between game states.

Reel Spin Timing Code: This code controls the timing and speed of the spinning reels. It handles the acceleration, deceleration, and stopping points of each reel to create a realistic spinning effect. It may also incorporate easing functions or physics-based calculations for smooth and visually appealing animations.

Random Number Generation (RNG) Code: The RNG code generates random numbers to determine the outcome of each spin and the positions of the symbols on the reels. It ensures fairness and unpredictability in the game. Depending on the programming language, the code may use built-in random number generators or implement custom algorithms and may be software or hardware based.

Game Logic Code: Game logic code implements the rules and mechanics of the game. It defines winning combinations, paylines, bonuses, and special features. This code determines how the game evaluates symbol positions, calculates payouts, triggers bonuses, and manages the player's balance and progress.

Sound Effects Code: Sound effects code handles the playback of audio effects in the game. It includes sounds for spinning reels, winning combinations, bonus rounds, and other game events. This code manages the loading, playing, and stopping of sound files, and may also handle volume control and audio mixing.

User Input Code: User input code handles user interactions with the game. It captures and processes user input events, such as button presses, touch gestures, or keyboard input. This code validates and interprets the input, triggers corresponding actions, and updates the game state accordingly.

Payout Calculation Code: Payout calculation code determines the payouts and prizes based on the game rules, winning combinations, and the player's bet. It calculates the payout amount and updates the player's balance accordingly. This code may also handle progressive jackpots, multipliers, and other complex payout scenarios.

Bonus Game Code: If the slot machine game includes bonus rounds or mini-games, the bonus game code implements the specific rules, animations, and rewards for these features. It manages the transition to the bonus game, tracks the player's progress, and handles the outcome and rewards of the bonus round.

Progressive Jackpot Code: If the game includes a progressive jackpot feature, the progressive jackpot code manages its mechanics. This code handles the accumulation of contributions from player bets, triggers random jackpot wins, and calculates and distributes jackpot prizes.

Game State Management Code: Game state management code is responsible for managing the overall game state. It includes variables and data structures that store information such as the player's balance, current bet, and win/loss tracking. This code ensures the synchronization and consistency of the game state across different components.

Localization Code: Localization code enables the game to support different languages, regions, and cultural preferences. It includes language translations, region-specific settings (e.g., date formats, currency symbols), and other localization-related functionalities to adapt the game to different audiences.

Game Configuration Code: Game configuration code allows customization of various game parameters. It enables developers or game administrators to set parameters such as the number of reels, rows, paylines, bet denominations, and other game-specific settings without modifying the underlying code. This code may use configuration files, databases, or other storage mechanisms.

Anti-Cheating and Security Code: Anti-cheating and security code ensures the integrity and security of the game. It implements measures to prevent cheating, unauthorized access, and tampering with game mechanics or player data. This code may include encryption, authentication, and validation mechanisms to protect sensitive information and maintain fair gameplay.

Analytics, Tracking and Metering Code: Analytics, tracking and metering code collects and analyzes gameplay data for monitoring and improving the game. It tracks player statistics, usage patterns, performance metrics, and other relevant data. This code may integrate with analytics platforms or services to gather insights and make data-driven decisions for game optimization.

Those skilled in the art will recognize that the AI functionality may be limited until the programming related specialized AI game design system is sufficiently trained but when adequate training has occurred the programming related specialized AI game design system is able to write the game code partially or fully. Moreover, after being trained in performance analysis, it is possible for the programming related specialized AI game design system to write entire portions of the game code or even the full game code without human intervention. However, it is anticipated that human oversight may be required until the programming related specialized AI game design system has been adequately trained. Even then, the programming related specialized AI game design system may receive updated training on how games in the field are performing along with game details, including competitor games, although the information may be somewhat superficial relative to games where full game and performance details can be captured and the programming related specialized AI game design system trained accordingly. Continued programming related to specialized AI game design system training, in many or all respects, will most likely be ongoing for the duration of the programming related specialized AI game design system life cycle.

FIG. 37 illustrates an exemplary flow chart 3700 relating to the AI iteration process of the specialized AI game design system. The flow chart 3700 includes seeking data 3702 which moves to an input block 3704 and then to computational block 3706 where an output 3708 will be generated, leading to a revision block 3710 which may lead to either a trigger block 3712 or back to input step 3704. Similarly, trigger block 3712 may flow back to the seek data block 3702. This adaptive system allows a specialized AI game design system algorithm to self-learn, assign its own goals, seek new data and information or behavioral input, modify its algorithm(s) on-the-fly and continue to both optimize its own local performance while seeking out adjacent spaces. Revision block 3710 may include inputs, computation, output(s) and revision while the trigger block 3712 may include seek, inputs, computation, outputs and revision.

FIG. 38 illustrates an exemplary flow chart 3800 relating to the AI game performance prediction process of the specialized AI game design system. The flow chart 3800 includes seeking data 3802 which moves to an input block 3704 and then to correlate performance variable high/low block 3706 and proceeds to the predict high performance variables or characteristics 3708 which may generate a full game of at least a portion of a game 3810. Past game performance or datasets will include differences in type, scope, complexity, age, human generated, human recalled, computer generated, etc., it is desirable to correlate the same for best results in conjunction with the specialized AI game design systems. That is, in many instances the performance data may be measured differently by individual casinos. For example, some casinos have in-depth reports while others record limited metrics like, "win per unit vs. house average win per unit" or "win per unit zone vs. zone average win per unit" or like "coin-in per unit vs. house average coin in." In some instances, the performance data may need to be estimated and may utilize human judgment or human recollection. Accordingly, depending on the past performance data, it may be necessary to enter or input dissimilar data in a manner that is useful to the system. For instance, in one embodiment, past performance data may be entered uses tiered scales based on importance (e.g., the important "win per unit vs. house" on a scale from 100 (top performer) to −100 (worst performer) whereas the less important "machine occupancy percentage" may be rated on a scale from 37 (top performer) to −37 (worst performer)).

Following the generation of a full game of at least a portion of a game, the system may run one or more game play scenarios 3812 which may include large scale simulations after which, game scenario optimization 3814 may take place. Following game scenario optimization 3814, performance threshold checks 3816 may be made and if necessary, variables and/or other game mechanics may be revised 3818 at which point the game review will loop back and start the process again or in the alternative output a full game of at least a portion of a game 3820.

This game performance prediction algorithm allows the specialized AI game design system algorithm may call out to the game design algorithm to discretely and/or continually goal seek predetermined performance variables which are most likely positive performance variables and/or game mechanics.

FIG. 39 illustrates an exemplary flow chart 3900 relating to the AI game generation process of the specialized AI game design system. The flow chart 3900 includes input parameters 3902 flowing to image block 3904, motion block 3906, dimension block 3908, sound block 3910, text block 3912, math block 3914, game mechanics block 3916, and test block 3918. At this point, revisions may take place 3922 and either loop back to the image block 3904 or are output at block 3924. Individual AI algorithms of the specialized game design system represent a number of game aspects including image block 3904, motion block 3906, dimension block 3908, sound block 3910, text block 3912, math block 3914, game mechanics block 3916, and test block 3918 or others that may feed forward and back on each other to perform small-world network optimizations as the computation occurs.

FIG. 40 illustrates an exemplary flow chart 4000 relating to the AI large language model human to machine to human translation process of the specialized AI game design system. The flow chart 4000 includes input parameters 4002 flowing to tokenization block 4004 to embedding block 4006 to positional encoding block 4008 to transformer 1 (attention>feedforward) block 4010 to transformer 2 (attention>feedforward) block 4012 to transformer . . . n (attention>feedforward) block 4014 to softmax block 4016 and finally to an output block 4018.

FIG. 41 illustrates an exemplary flow chart 4100 relating to the AI large language model human to machine to human translation process of a full specialized AI game design system. This artificial general intelligence foundational model and universal translator illustrated in the flow chart 4100 may be considered as an optimal full specialized AI game design system as it may include virtually all individual specialized AI game design systems described herein and others, all within one full specialized AI game design system. This system may provide a limited number of artificial neural networks or a great many to achieve the deep learning results desired. Those skilled in the art will recognize that while the full specialized AI game design system illustrated may handle all processes and systems described herein, it may have similar utility for any one or more of the individual specialized AI game design systems or specialized AI game design system modules or specialized AI game design system components.

The artificial general intelligence foundational model and universal translator illustrated in FIG. 41 includes a trigger and input step 4102 wherein the initial system trigger may originate from a human or machine or combination thereof and can be given instructions for how many loops to run and may include a wait function enabling it to sit in a state of stasis until such events occur that trigger computation to commence. In addition, trigger and input step 4102 may make take input from itself and can be of any media format including individual binary bits and quantum qubits, text, image, video, graphics, performance, audio, variables, or collections of these individual elements consolidated into entire files such as spreadsheets, graphics, word documents, etc. During the seek data step 4104, transformer(s) may send specific seek instructions to assist in fine-tuning its parameters, model, or gathering/generating more data and seek responses can be in the format of specific data elements, a reward or outcome variable or a specific goal to seek against. Step 4106 includes a media encoding and transcoding router where the media encoder and transcoder understands the input data type and may change the data type to a different media format or consolidate into a specific file type. The router then directs the individual data elements or file types to a specific neural network 4108*a*, 4108*b* to 4108*n* in the transformer process. Within the transforms, certain neural network guardrails may exist such that the system can remove itself from a continuous loop whereby its efficiency value reaches diminishing returns. Each neuron may attach or disconnect itself to other neurons in the same network, moving closer or further away based on the data it is trained against and each. Neural Networks 4108*a*, 4108*b* and 4108*n* may move closer or further away from one another, attaching and disconnecting as required. Each step in the overall process may be supervised and/or unsupervised and reviewed by another function, neural network, or entire system to improve accuracy against the desired outcome or input mechanism based on probabilities of each potential output, whereby the system selects the element with the highest probability value. Step 4114 includes media output which includes a probability variable whereby the system selects the output with the highest probability variable. The media output may be in any binary bit, quantum qubit, pixel, voxel, signal, variable, audio, video, math, code, graphic, file, etc. The artificial general intelligence foundational model and universal translator illustrated in FIG. 41 may be considered a master algorithm that inputs, reads, understands any input format, translates it to any other input format, does its own goal-seeking and reward behavior, gathers or creates training data in real-time, institutes its own guardrails and optimization networks, and "learns" by feeding its output back into its input mechanism. This method looks at each process step the algorithm takes and ensures that it is correct based on the input and output of the computational engine(s). It may review each small step, small collections of steps, and overall process steps iteratively until it gets it correct based on its own goal-seeking behavior. The full specialized AI game design system engine requires this because of the various media formats and inputs/outputs required for the game design process. Although a very high level of accuracy is generally considered a requirement or goal for autonomous systems, this level of accuracy may be lower for the embodiments of the specialized AI game design systems described and still achieve the improved and/or desired results.

In one embodiment, the specialized AI game design system includes a specialized sound effects-based AI game design system and/or a specialized graphics-based AI game design system. These methods and systems may exist individually or in combination with the previously described specialized AI game design systems which may also be referred to as specialized AI game design system modules or components. Those skilled in the art will recognize that the specialized AI game design system for sound will be very similar to a specialized AI game design system for graphics along with the many other specialized AI game design systems described herein as the specialized graphics-based AI game design system is trained, it will become more and more important and offer greater utility.

Those skilled in the art will recognize that the specialized sound effects-based AI game design system can be programmed to output sound, sound effects and/or music as desired or needed. Often, sound, sound effects and/or music code may be quite elaborate and may generally fall under a number of different game sounds, sound effects and/or music categories or types which may include many or all of the following. Embodiments of the present invention relating to specialized sound effects-based AI game design systems may generate one or more or all of the game sounds, sound effects and/or music. Those skilled in the art will recognize that this listing should be considered as an exemplary listing and not be considered as an exhaustive list.

Reel Spinning Sounds: These are sounds that mimic the spinning motion of the reels. Such sounds create an auditory feedback to simulate the physical experience of the reels spinning. The sounds can vary in intensity and speed based on the state of the game, such as the initial spin, acceleration, deceleration, and stopping of the reels.

Symbol Sounds: Each symbol on the reels can have its own unique sound associated with it. When a symbol appears on a winning payline or is part of a winning combination, its corresponding sound is played to indicate the achievement. Symbol sounds can be tailored to match the theme of the game or evoke excitement and anticipation.

Win Celebration Sounds: These sounds are played when a player achieves a win or hits a significant payout. Such sounds are typically more dramatic, energetic, and celebratory in nature to enhance the player's sense of accomplishment. Win celebration sounds often feature melodies, jingles, or fanfares accompanied by energetic sound effects.

Scatter or Bonus Activation Sounds: When scatter symbols or bonus symbols appear on the reels, specific sounds are played to indicate their activation. These sounds often have a distinct and attention-grabbing quality to alert the player that a special feature or bonus round is triggered.

Bonus Round Sounds: Bonus rounds or mini-games within the slot machine game often have their own unique set of sounds. These sounds help create an immersive experience and set the mood for the bonus game. They can include background music, ambient sounds, and sound effects related to the theme or activities in the bonus round.

Ambient Background Sounds: Ambient background sounds provide a consistent audio atmosphere throughout the gameplay. Such sounds can include gentle background music, ambient nature sounds, or subtle audio textures to enhance the overall immersion and engagement of the player.

User Interface Sounds: These sounds are associated with various user interactions and interface elements in the game. Such sounds include button clicks, slider movements, menu selections, and other sounds that provide auditory feedback to the player's actions. User interface sounds help to make the game more interactive and responsive.

Payout Sounds: Payout sounds are played when the player receives a payout or wins a prize. These sounds can range from simple chimes or bells to more elaborate and exciting sound effects. Payout sounds add a satisfying audio feedback to the player's achievements and contribute to the overall excitement of the game.

Gamble Feature Sounds: If the game includes a gamble feature where players can risk their winnings for a chance to double or multiply them, specific sounds are played during this feature. These sounds can create tension, suspense, or excitement, enhancing the gambling experience.

Intro and Outro Sounds: Intro and outro sounds are played at the beginning and end of the game or bonus rounds. Such sounds set the tone for the gameplay and provide a smooth transition between different game stages. These sounds can include musical cues, sound effects, or voiceovers.

Ambient Casino Sounds: Ambient casino sounds replicate the background noise and atmosphere of a physical casino. Such sounds include sounds of other slot machines, chatter, and general casino ambiance. Ambient casino sounds aim to create a familiar and immersive environment for players.

Sound Feedback for Player Actions: Slot machine games may include sound feedback for specific player actions or events, such as changing the bet amount, adjusting settings, or triggering certain features. These sounds provide immediate feedback to the player's actions and help enhance the interactive experience.

Transition Sounds: Transition sounds are played during transitions between different game states, such as moving from the base game to a bonus round or returning to the base game after a bonus feature. These sounds help smoothen the transitions and maintain the player's engagement.

Error or Warning Sounds: If the player performs an invalid action or encounters an error, specific sounds can be played to indicate the error or provide a warning. These sounds help in communicating to the player that something has gone wrong or that they need to take corrective action.

Ambient Soundtrack or Music: Slot machine games may include an ambient soundtrack or background music that plays throughout the gameplay. This music sets the mood, complements the game's theme, and enhances the overall audiovisual experience.

Those skilled in the art will recognize that the AI functionality may be limited until the specialized sound effects-based AI game design system is sufficiently trained but when adequate training has occurred the specialized sound effects-based AI game design system is able to write the game sound, sound effects and music partially or fully. Moreover, after being trained in performance analysis, it will be possible for the specialized sound effects-based AI game design system to write entire portions of the game code or even the full game code without human intervention. However, it is anticipated that human oversight may be required until the specialized sound effects-based AI game design system has been adequately trained. Even then, the specialized sound effects-based AI game design system may receive updated training on how games in the field are performing along with game details, including competitor's games, although the information may be somewhat superficial relative to games where full game and performance details can be captured and the programming related specialized AI game design system trained accordingly. Continued programming related to specialized sound effects-based AI game design system training, in many or all respects, will most likely be ongoing for the duration of the specialized sound effects-based AI game design system life cycle.

An important part of the specialized graphics-based AI game design system is for the system to have access to a wide variety of graphics, including, but not limited to, large graphic libraries such as those produced by Google or Shutterstock where images, videos, 3D models, music, etc., can be legally licensed for use by third parties. In addition, it is important for the specialized graphics-based AI game design system to have access to large font libraries for text-based or copy requests or processing such as those offered by Myfonts.com or others. Once the specialized graphics-based AI game design system has these files within the system or access thereto, the specialized graphics-based AI game design system is able to modify the graphics files as instructed or desired. For instance, a particular font may be enlarged, rotated, skewed, recolored, or otherwise manipulated as desired by the human graphics artist or supervisor or after sufficient training by the specialized graphics-based AI game design system itself. Similarly, other images may be manipulated such as a jungle background including greater or less foliage, adding animation, increasing or decreasing the saturation, brightness, contrast, vibrancy, color, etc. Thus, the specialized graphics-based AI game design system produces new graphics which may be specifically tailored to a particular theme. In addition, the specialized animation-based AI game design system can manipulate more complex graphics, including 2D and 3D models. For instance, converting a 2D model or graphic into complete 3D models capable of being rigged and animated, either from scratch or by following the techniques of other 3D models contained within its database. For example, the specialized graphics-based AI game design system may begin with an image of an owl and change the art form from realistic to semi-realistic to cartoon-like to pointillism, etc. In addition, aspects such as the owl's eyes may be made smaller, larger, softer, more intense, recolored, etc. In one embodiment, the specialized graphics-based AI game design system can create 2D models or 3D models which can be partially or fully animated as desired.

After being trained it is possible for the specialized graphics-based AI game design system to produce part of or all the graphics without human intervention, although it is anticipated that human oversight will be required until the programming related to the specialized graphics-based AI game design system has been fully trained. Even then, the specialized graphics-based AI game design system will receive updated training on how games in the field are performing along with game details, including competitor games, although the information may be somewhat superficial relative to games where full game and performance details can be captured and the specialized graphics-based AI game design system trained accordingly. Continued training related to the specialized graphics-based AI game design system training, in many or all respects, will most likely be ongoing for the duration of the specialized graphics-based AI game design system life cycle.

Any number of specialized AI game design modules or combination of specialized AI game design modules may exist or a full feature specialized AI game design system which contains many or all specialized AI game design modules or components may be utilized with the embodiments of the present invention. Those skilled in the art will recognize that specialized AI game design systems produces corresponding methods for specialized AI game design. Various logical stages depicted in the accompanying drawings are presented in a particular order for illustrative purposes. However, it should be understood that these stages may be reordered or combined, and alternative orderings and groupings may be evident to those skilled in the art. Furthermore, the implementation of these stages can be in hardware, firmware, software, or any suitable combination thereof.

As illustrated in FIGS. 42A through 42D, process 4200 begins with the general step of data collection and machine learning training 4202 (with media encoding and transforming router integration). The media encoding and transforming router 4216 is used for data processing. The media encoding and transforming router is employed at this stage to convert, optimize, and preprocess raw data into formats that the AI system can efficiently analyze. This may include standardizing past game source code into a uniform format for AI-based comparison, encoding and compressing video recordings of past games to extract animation characteristics, game mechanics, and mathematical models without loss or minimal of critical details, transforming biometric player data (e.g., eye-tracking, facial expression analysis) into structured datasets for machine learning analysis, and normalizing casino-reported performance data to ensure consistency across different gaming platforms and reporting formats. AI analysis of past games and performance data 4218 includes the system analyzing historical slot game performance to understand successful animation patterns and engagement metrics. Various types of data sources may be considered including human-entered data 4208, casino-reported game performance statistics 4204, biometric data 4212 indicating player preferences, game source code 4206, and video recordings 4210 of previous slot machine games.

The step of extraction of key game characteristics 4220 includes the system extracting critical elements such as game mechanics, mathematical payout structures, previous animation sequences, graphical styles, and sound design which leads to the identification of animation success metrics 4222 whereas the system determines which visual elements and animations have contributed to successful player engagement and which factors led to lower-performing games. The step of pattern recognition and learning 4224 includes the system refining its animation strategies by correlating animation styles, motion sequences, and thematic designs with successful and unsuccessful game performance. This is followed by the step of establishing a baseline for new animations 4226 whereas the system generates a framework for new animations based on patterns observed in high-performing games while avoiding elements that contributed to poor player engagement.

The next general step is the input of new game specifications 4228 includes the process of AI or human input of graphic elements 4230. This process begins with a human or an AI-generated description of the main game character, additional game symbols, and other relevant graphical assets. This step is followed by inputting information regarding the theme and background definition 4232 whereas the system or a human defines the overall theme of the slot game, specifying elements such as mythology, futuristic, nature-based, fantasy, or high-voltage electricity styles. This general step also includes review of the style consistency and art direction 4234 which ensures that all graphical elements adhere to a consistent art direction based on the defined theme, aligning with past successful styles. The general step of new game specifications 4228 also includes inputting asset submission and refinement whereas graphics can be submitted manually by artists or generated by AI using a combination of style transfer and procedural generation techniques.

Following the general step 4228 is the general step of AI-driven model generation 4238 which includes 2D or 3D model creation 4240 whereas the system constructs a base 2D sprite or 3D model for each game character, background, symbol, etc., based on the provided specifications. Step 4238 further includes a structural and motion feasibility analysis where the system evaluates how characters and symbols should move, considering slot game constraints such as reel transitions, spin speeds, bonus feature animations, etc. In the final step of AI-driven model generation 4238, automated model adjustments 4244 are made whereas the system enhances or refines graphical details, ensuring that elements are visually optimized for display on slot machine screens with different resolutions and aspect ratios.

The process continues with the general step of AI-driven animation planning 4246 which includes the determination of animation possibilities 4248 whereas the system determines the range of animation sequences based on prior machine learning analysis of past successful slot game animations or as directed by human developers. Part of the process further includes the prioritization of high-impact animations 4250 where the system selects animation types most likely to enhance player engagement, such as symbol spins, character expressions, reel transitions, and bonus triggers. This is followed by motion path and keyframe prediction 4252 where the system predicts the optimal movement paths and keyframe placements to ensure smooth transitions and visually appealing motion.

The general step of the creation of animated sequences 4254 begins with defining what needs to be animated 4256 where the system decides which elements require animation, including symbols, background effects, character motions, and special feature animations. Preferably, this is followed by keyframe generation 4258 where the system generates initial keyframes to establish the movement foundation for the animation sequence. This is then followed by intermediate frame interpolation 4260 whereas the system automatically fills in intermediate frames between keyframes, ensuring fluid motion transitions. The next step includes physics and motion refinement 4262 where the system applies physics-based adjustments such as inertia, elasticity, and acceleration to enhance realism in animations. The following step, if applicable, includes facial and expression animation 4264 if the game includes character interactions whereas the system generates expression-based animations using deep learning-driven facial motion synthesis. In one embodiment, the animation includes particle and special effects integration 4266 where the system introduces effects such as sparks, explosions, or glow effects where necessary to enhance visual appeal. Finally, the system includes frame rate optimization based on slot machine processing power 4268 where the system determines the ideal frames per second (FPS) based on hardware constraints, ensuring smooth animation without overloading processing capabilities.

The next general step includes the integration of the media encoding and transforming router 4270 which includes encoding and format conversion 4272. Once animations are finalized, the media encoding and transforming router converts the animations into optimized file formats suitable for different slot machine hardware configurations or suitable for online gaming platforms. Following this, the next step includes compression and optimization 4274 where the system applies AI-driven compression techniques to reduce file sizes without sacrificing visual quality, ensuring smooth performance on various devices. The next step of resolution scaling and adaptation 4276 is accomplished by the system adjusting animation resolution dynamically to match different display specifications, including high-definition and standard-definition slot screens. The next step includes real-time adaptation for various platforms 4278 whereas the media encoding and transforming router ensures that animations are compatible with both physical slot machines and online gaming platforms by applying necessary format transformations. This is then followed by an error detection and quality control step 4280 where the system verifies that no compression artifacts, visual distortions, or animation delays occur after encoding. This is followed by the final rendering and encoding for deployment 4282 where the transformed and optimized animations are encoded into a format that ensures compatibility with the game engine, slot machine firmware, and any online deployment systems.

The next general step of animation testing and optimization 4284 includes automated performance testing 4286 where the system runs performance tests to ensure the animations do not cause lag, graphical tearing, or visual inconsistencies. This is followed by playback testing in real-time slot machine simulation 4288 where the AI simulates slot machine play to verify that animations synchronize properly with game mechanics and feature triggers. Adjustment of animation timing 4290 includes fine tuning animation timing to match reel spin speeds, payout reveals, and bonus round transitions. The process continues with the compression and rendering optimization 4292 whereas the media encoding and transforming router further refines animation data, balancing quality with performance constraints. Finally, a player engagement prediction analysis 4294 occurs where the AI runs predictive modeling to assess how likely the animations are to enhance player engagement based on historical biometric and gameplay data.

In the final general step of final approval and deployment 4295, human review and approval (if required) 4296 occurs where developers and designers review AI-generated animations, approving or requesting refinements. This is followed by final integration with game code 4297 where once animations pass all tests, the system integrates them into the final slot game build. Following the final game build, game certification and compliance testing 4298 may be introduced as applicable or as required by gaming regulations where the system ensures that animations meet regulatory and compliance standards before the game is certified for casino or online deployment. In one embodiment, the process may include deployment and post-launch performance analysis 4299 where the AI-driven game design system continuously monitors animation performance post-launch, analyzing player engagement and making recommendations for future updates.

Those skilled in the art will recognize that the various steps listed above may not be necessary in all cases and/or additional or differing steps may be required or desirable. Moreover, the sequence of steps is not fixed such that the step sequencing may change as required or desired.

Those skilled in the art will further recognize the sequence of steps listed above is representative of the steps utilized in other areas of game creation such as AI generated game programming, AI generated game graphics, AI generated game math, AI generated game mechanics, AI generated game sound, etc.

As illustrated in FIG. 43, one embodiment of the present invention includes a quality assurance process 4300 which begins with the general step of data collection and machine learning training 4302. Those skilled in the art will recognize that the AI-driven automated defect identification process may also be referred to as a quality assurance (QA) process. The results of this AI-driven automated defect identification process are logged into the system and reported to human reviewers who take corrective measures as they determine appropriate.

The media encoding and transforming router 4316 is used for data processing. The media encoding and transforming router is employed at this stage to convert, optimize, and preprocess raw data into formats that the AI system can efficiently analyze. This includes standardizing past game source code into a uniform format for AI-based comparison, encoding and compressing video recordings of past games to extract animation characteristics, game mechanics, and mathematical models without loss or minimal loss of critical details, transforming biometric player data (e.g., eye-tracking, facial expression analysis) into structured datasets for machine learning analysis, and normalizing casino-reported performance data to ensure consistency across different gaming platforms and reporting formats. AI system analysis of past games and performance data 4218 includes the system analyzing historical slot game performance to understand successful animation patterns and engagement metrics. Various types of data sources are considered including human-entered data 4308, casino-reported game performance statistics 4304, biometric data 4312 indicating player preferences, game source code 4306, video recordings 4310 of previous slot machine games, and/or from game performance reporting services 4314. Those skilled in the art will recognize that any one or more of the data sources 4304, 4306, 4308, 4310, 4312 may be used with the system.

The step of machine learning model training 4320 may include the system extracting critical elements such as game mechanics, mathematical payout structures, previous animation sequences, graphical styles, and sound design which leads to the automated testing general step 4322 which includes automated test execution 4324 where the system runs thousands or millions of automated test cases to analyze game logic, payout calculations, graphical performance, and sound synchronization. Following step 4324, the system enters the defect detection stage 4326 where the system flags inconsistencies, such as incorrect payout distributions, animation lags, broken UI elements, or faulty random number generator (RNG) implementations. The next step includes a comparison to historical data 4328 where the system cross-references detected defects with past issues, recognizing recurring patterns and potential root causes. During the next stage of defect logging and categorization 4330, the system classifies detected issues by severity and impact on gameplay. The system then enters the report generation stage 4332 where the system compiles a structured report, detailing detected issues, affected game areas, and suggested focus points for human review.

The final general stage of the process relies on human review and corrective measures 4334. The first step in this stage includes a human QA review 4336 where game developers analyze AI-generated defect reports, confirm issues, and determine appropriate fixes. During the defect fix implementation step 4338, developers manually apply corrective measures based on the AI-driven automated defect identification findings. Those skilled in the art will recognize that there are many industry terms that relate to defects or problems encountered in code or system review which are largely used interchangeably. These largely interchangeable terms include defects, glitches, anomalies, conflicts, errors, faults, irregularities, exceptions, etc. Although each of these terms may indicate different types of issues, for purposes of the present invention, all indicate AI-driven automated defect identification issues that may occur and be corrected.

Following the defect fix implementation step 4338, regression testing 4340 occurs whereas the system re-runs test scenarios to confirm that resolved issues do not introduce new errors, after which there is a final review and approval stage where human QA testing will verify corrections before approval or certification for game release.

FIG. 44 illustrates another embodiment of the present invention similar to the embodiment illustrated in FIG. 43 but in this embodiment, the system presents defect corrective measures to QA personnel who may either accept or reject such corrective measures or may apply different corrective measures. As illustrated in FIG. 44, the quality assurance process 4400 begins with the general step of data collection and machine learning training 4402. The results of this AI-driven automated defect identification process are logged into the system and reported to human reviewers who take corrective measures as they determine appropriate. The media encoding and transforming router 4416 is used for data processing. The media encoding and transforming router is employed at this stage to convert, optimize, and preprocess raw data into formats that the AI system can efficiently analyze. This includes standardizing past game source code into a uniform format for AI-based comparison, encoding and compressing video recordings of past games to extract animation characteristics, game mechanics, and mathematical models without loss or minimal loss of critical details, transforming biometric player data (e.g., eye-tracking, facial expression analysis) into structured datasets for machine learning analysis, and normalizing casino-reported performance data to ensure consistency across different gaming platforms and reporting formats. AI system analysis of past games and performance data 4218 includes the system analyzing historical slot game performance to understand successful animation patterns and engagement metrics. Various types of data sources are considered including human-entered data 4408, casino-reported game performance statistics 4404, biometric data 4412 indicating player preferences, game source code 4406, video recordings 4410 of previous slot machine games, and/or from game performance reporting services 4414. Those skilled in the art will recognize that any one or more of the data sources 4404, 4406, 4408, 4410, 4412 may be used with the system. The step of machine learning model training 4420 may include the system extracting critical elements such as game mechanics, mathematical payout structures, previous animation sequences, graphical styles, and sound design.

The next general step of automated testing 4422 includes automated test execution 4424 whereas the system runs thousands or millions of automated test cases to analyze game logic, payout calculations, graphical performance, and sound synchronization. Following step 4424, the system enters the defect detection stage 4426 where the system flags inconsistencies, such as incorrect payout distributions, animation lags, broken UI elements, or faulty random number generator (RNG) implementations. The next step includes a comparison to historical data 4428 where the system cross-references detected defects with past issues, recognizing recurring patterns and potential root causes. During the next stage of defect logging and Ai-generated fixes step 4430, the system documents errors and presents possible corrective measures for human approval. Following this step, the step of human review of AI solutions 4432 occurs where human QA personnel approve or reject AI-generated fixes. Approved fixes are implemented automatically, while rejected fixes require manual intervention. If approved, defect fix implementation 4434 occurs where the AI applies approved solutions, while developers handle edge-case corrections. Following implementation automated regression testing 4436 occurs where the system re-executes tests to validate the applied fixes. Finally, the final review and approval step 4438 occurs where the QA personnel confirm the stability of implemented fixes before finalizing game release.

FIG. 45 illustrates another embodiment of the present invention similar to the embodiment illustrated in FIG. 43 but in this embodiment, the system uses an AI automated process to apply corrective measures. As illustrated in FIG. 45, the quality assurance process 4500 begins with the general step of data collection and machine learning training 4502. The results of this AI-driven automated defect identification process are logged into the system and reported to human reviewers who take corrective measures as they determine appropriate. The media encoding and transforming router 4516 is used for data processing. The media encoding and transforming router is employed at this stage to convert, optimize, and preprocess raw data into formats that the AI system can efficiently analyze. This includes standardizing past game source code into a uniform format for AI-based comparison, encoding and compressing video recordings of past games to extract animation characteristics, game mechanics, and mathematical models without loss or minimal loss of critical details, transforming biometric player data (e.g., eye-tracking, facial expression analysis) into structured datasets for machine learning analysis, and normalizing casino-reported performance data to ensure consistency across different gaming platforms and reporting formats. AI system analysis of past games and performance data 4218 includes the system analyzing historical slot game performance to understand successful animation patterns and engagement metrics. Various types of data sources are considered including human-entered data 4508, casino-reported game performance statistics 4504, biometric data 4512 indicating player preferences, game source code 4506, video recordings 4510 of previous slot machine games, and/or from game performance reporting services 4514. Those skilled in the art will recognize that any one or more of the data sources 4504, 4506, 4508, 4510, 4512 may be used with the system. The step of machine learning model training 4520 may include the system extracting critical elements such as game mechanics, mathematical payout structures, previous animation sequences, graphical styles, and sound design.

The next general step of automated testing 4522 includes automated test execution 4524 whereas the system runs thousands or millions of automated test cases to analyze game logic, payout calculations, graphical performance, and sound synchronization. Following step 4524, the system enters the defect detection stage 4526 where the system flags inconsistencies, such as incorrect payout distributions, animation lags, broken UI elements, or faulty random number generator (RNG) implementations. The next step includes a comparison to historical data 4528 where the system cross-references detected defects with past issues, recognizing recurring patterns and potential root causes. The next step of this embodiment includes automated fix implementation 4530 where the system autonomously applies solutions, modifying game code, adjusting mathematical models, and fixing animation, sound errors, etc. To ensure the fix implementation is correct, the system enters the automated regression testing step 4432 where the system continuously retests the game to confirm issue resolution. This embodiment may include continual learning and optimization where the system updates its predictive models based on the outcomes of the applied fixes.

The next general stage of final quality assurance check and deployment 4536 includes a final review 4538 where the system performs an end-to-end evaluation of all game components. The next step of integration of media encoding and transforming router for deployment 4540 includes the router encoding optimized assets into final deployment formats for slot machines and online platforms, compresses game animations, sound, and UI elements to ensure smooth rendering, verifies real-time playback performance for optimal gaming experiences, etc. In most or all regulated gaming environments, game certification is required prior to the game going live for play. This may include GLI or BMM certification that the game(s) meet GLI-11 or similar standards which may change over time. The embodiments illustrated in FIGS. 43 and 44 also require such certification but are not fully automated as human QA personnel are required to finish and approve the defect fix steps. In the embodiment illustrated in FIG. 45, the system may include a complete or partial automated game certification process 4542 where the system ensures compliance with regulatory requirements. The final step is system validation and deployment 4544 certifies the game as defect-free and optimized for release. Although the certification process in the embodiment is automated, the system may also include a human review before actual certification.

Those skilled in the art will recognize that the embodiments illustrated in FIGS. 43, 44 and 45 as described above may not be necessary in all cases and/or additional or differing steps may be required or desirable. Moreover, the sequence of steps are not fixed such that the step sequencing may change as required or desired. Those skilled in the art will also recognize that the embodiments illustrated in FIGS. 43, 44 and 45 as described above may also be employed to review and provide corrective or optimization actions pertaining to game mechanics, game characteristics, optimizing game performance, etc.

Casinos rely on various performance metrics to evaluate the success of slot machines, such as "win per unit," "coin-in per day," "occupancy rates," "zone averages', "days on the casino floor", etc. While these metrics are crucial, they only provide a partial picture. For an AI system to fully understand why some games excel and others underperform, it requires a more nuanced dataset encompassing many aspects of the game, coupled with the application of advanced algorithms to extract actionable insights. Those skilled in the art will recognize the term "slot machine" and/or "land-based gaming machine" include many different style gaming machines such as electronic gaming machines (EGMs), video lottery terminals (VLTs), electronic table games (ETGs), bingo-based gaming machines, nudge style gaming machines, pull-tab based gaming machines, historical horse racing gaming machines (HHR), etc. These differing gaming machines have been designed to comply with differing governmental gaming regulations, but all serve to present gambling games to players.

Game development is a complex, multi-disciplinary process requiring expertise across various domains, including art and animation for creating visually compelling characters, themes, and effects; mathematical modeling for determining hit frequencies, volatility, and payout structures; software engineering and game programming for implementing game logic; sound and music design to enhance player engagement and immersion; and quality assurance and testing to ensure fairness, compliance, and optimal performance. Currently, this process remains largely manual, time-consuming, and expensive. Developing a single game can take months or even years, with no guarantee of success once deployed in a casino or online. Even the most experienced game developers often struggle to explain why certain games outperform others.

Artificial intelligence (AI) provides advantages by analyzing extensive historical performance data to identify patterns that may be imperceptible to human designers. AI can evaluate and answer key questions such as identifying which themes and visual styles have historically performed well or poorly, determining payout structures and volatility models that maximize engagement and revenue, analyzing the impact of sound design and animation on player retention, and recognizing common factors that contribute to game failure. By integrating AI into various aspects of game design, including mathematics, programming, graphics, sound, and animation, games can be developed with a significantly higher probability of success while reducing costs and development time.

Machine learning (ML) adoption in game development delivers rapid and exponential benefits. Even with minimal initial data input, ML can optimize multiple aspects of game creation, including graphics and animation, game mathematics and volatility modeling, mechanic design and testing, and player behavior prediction. Once an ML system reaches a minimal training threshold, e.g., less than 5% of all potentially available data, development costs and time, may be reduced by up to 30% or more. This reduction is driven by the automation of critical processes such as artwork generation, animation sequencing, probability balancing, game programming, and sound design.

While the initial implementation of ML leads to significant efficiency gains, additional data provides diminishing returns. The relationship between efficiency improvement and the percentage of data analyzed may follow a reverse logarithmic curve. For instance, the first 5% of data utilized can provide approximately 30% of the total possible efficiency gains, the next 10% adds an additional 20%, and the next 10% contributes another 7%, etc. As more data is incorporated, the incremental improvements may become less substantial, with the final 10% of data analyzed providing only marginal refinements, such as improving game accuracy by less than 2%. The data utilized for these AI-driven enhancements may range from customer-reported performance metrics, human data entry, to real-time data acquisition, video analysis, and biometric player data.

Unlike traditional methods that require exhaustive data collection before yielding results, AI integration provides immediate value, dramatically reducing costs and development time while significantly improving game success rates. As data processing capabilities advance, additional gains continue at a decreasing rate. However, the most critical improvements in game success rates, such as increasing the game's likelihood of market success from 25% to 50%, occur earlier in the AI adoption process, with further refinements, such as an increase from 50% to 75%, developing later as more data is incorporated. This demonstrates that AI and ML implementation in game development provides substantial benefits early in the process, allowing for smarter, faster, and more cost-effective game design while improving overall player engagement and game performance.

While performance metrics provide a baseline understanding, meaningful insights emerge when the AI analyzes detailed information about the game itself, including its theme. For example, a theoretical game named Cleo's Cash is an Egyptian-themed game set in Cleopatra's era, featuring three progressive jackpots: Grand, Major, and Minor. These progressives are prominently displayed on realistic gold-framed meters, a design choice extended to the reel set, where the gold frames surround the spinning reels, creating a cohesive visual experience.

Visual elements such as background colors, secondary meters, digital button deck graphics, and other aesthetic features significantly impact player engagement. To process this data, computer vision algorithms such as Convolutional Neural Networks (CNNs) can be employed. CNNs are highly effective for pixel-level analysis, enabling the AI to "learn" the visual composition of every element in the game. For example, Cleo's Cash features five vertically oriented spinning reels with four rows of symbols, ranging from standard "Royal" cards (9, 10, J, Q, K, A) to thematic icons like Scarab beetles, King Tut burial masks, Egyptian Anubis, and a "Princess Cleo" character. In one embodiment, CNNs can identify patterns in these visuals, such as the use of specific colors or symbol arrangements and correlate them with player engagement metrics.

Below is an exemplary Python algorithm using a Convolutional Neural Network (CNN) to analyze and process visual elements for slot machine game design, such as those described in Cleo's Cash:

```
import tensorflow as tf
from tensorflow.keras.models import Sequential
from tensorflow.keras.layers import Conv2D, MaxPooling2D, Flatten, Dense, Dropout
from tensorflow.keras.preprocessing.image import ImageDataGenerator
import numpy as np
# Step 1: Load and preprocess image data
def load_data(data_directory, image_size=(128, 128)):
    datagen = ImageDataGenerator(rescale=1./255, validation_split=0.2)
    train_data = datagen.flow_from_directory(
        data_directory,
        target_size=image_size,
        batch_size=32,
        class_mode='categorical',
        subset='training'
    )
    val_data = datagen.flow_from_directory(
        data_directory,
        target_size=image_size,
        batch_size=32,
        class_mode='categorical',
        subset='validation'
    )
    return train_data, val_data
# Step 2: Build the CNN model
def build_cnn(input_shape=(128, 128, 3), num_classes=10):
    model = Sequential([
```

-continued

```
        Conv2D(32, (3, 3), activation='relu', input_shape=input_shape),
        MaxPooling2D((2, 2)),
        Conv2D(64, (3, 3), activation='relu'),
        MaxPooling2D((2, 2)),
        Conv2D(128, (3, 3), activation='relu'),
        MaxPooling2D((2, 2)),
        Flatten( ),
        Dense(128, activation='relu'),
        Dropout(0.5),
        Dense(num_classes, activation='softmax')
    ])
    model.compile(optimizer='adam', loss='categorical_crossentropy', metrics=['accuracy'])
    return model
# Step 3: Train and evaluate the CNN
def train_cnn(model, train_data, val_data, epochs=10):
    model.fit(train_data, validation_data=val_data, epochs=epochs)
    return model
# Step 4: Correlate visual elements with engagement metrics
def analyze_visual_elements(image, model, engagement_data):
    image = tf.image.resize(image, (128, 128)) / 255.0
    image = np.expand_dims(image, axis=0)
    predictions = model.predict(image)
    predicted_class = np.argmax(predictions)
    engagement_correlation = engagement_data.get(predicted_class, "No data available")
    return predicted_class, engagement_correlation
# Usage Example
# Assuming 'slot_game_images' directory contains categorized images for visuals like reels
and symbols
data_dir = 'slot_game_images'
train_data, val_data = load_data(data_dir)
cnn_model = build_cnn(num_classes=train_data.num_classes)
trained_model = train_cnn(cnn_model, train_data, val_data)
# Analyze a sample image (e.g., "Cleo's Cash " symbol)
sample_image = tf.keras.preprocessing.image.load_img('sample_cleo_symbol.jpg',
target_size=(128, 128))
engagement_data = {0: "High engagement", 1: "Moderate engagement", 2: "Low
engagement"}
predicted_class, engagement_correlation = analyze_visual_elements(sample_image,
trained_model, engagement_data)
print(f"Predicted class: {predicted_class}, Correlated engagement:
{engagement_correlation}")
```

Those skilled in the art will recognize that the exemplary algorithm is representative of one of the many algorithms which can be employed as other algorithms can produce similar results.

The above-referenced process begins with data loading and preprocessing, where images of slot game elements, such as reels, symbols, and signage, are prepared for analysis by converting them into a format suitable for training. Next, model building involves designing a CNN with layers dedicated to feature extraction, such as convolutions and pooling, as well as layers for classification. During the training phase, the model learns patterns from labeled data, identifying visual characteristics like symbol arrangements, background colors, and overall design composition. Finally, in the analysis and correlation stage, the trained model evaluates new images, detecting patterns and correlating specific visual elements with player engagement metrics. For example, it might identify that gold-framed reels, as opposed to wooden-framed reels, are associated with higher player engagement in this style game. This systematic approach ensures actionable insights for optimizing game design. This framework can be adapted to evaluate other or all visual features or refine visual designs for improved player engagement.

While the provided CNN algorithm serves as an illustrative example of how computer vision techniques can be applied to analyze visual elements in slot machine game design, it represents only one possible approach. Those skilled in the art will recognize that this algorithm is not definitive or absolute. There are numerous alternative methods and variations that may achieve similar or even superior results depending on the specific context and requirements.

For instance, while CNNs are widely used for image analysis, in one embodiment, alternative architectures such as Vision Transformers (ViTs), Residual Networks (ResNets), or EfficientNets can be employed to enhance performance, scalability, or computational efficiency. The structure of the network, including the number of layers, kernel sizes, and activation functions, can also be customized to suit the complexity of the input data and desired outcomes.

Additionally, in another embodiment, pre-trained models such as VGG, Inception, or MobileNet may be fine-tuned on the specific dataset to accelerate training and improve accuracy. Other algorithmic approaches, like feature engineering combined with classical machine learning methods (e.g., Support Vector Machines or Random Forests), might also be viable for certain applications.

Beyond traditional CNN-based methods, in one embodiment, emerging technologies such as Generative Adversarial Networks (GANs) or attention-based models can be used to offer innovative ways to analyze or enhance visual elements. Furthermore, hybrid approaches that integrate multiple algorithm types can provide robust solutions tailored to complex tasks.

In summary, the provided CNN example may be considered a starting point or but one possible approach, offering a framework that can be adapted, extended, or replaced to align with the unique needs of a project. This flexibility underscores the vast range of possibilities in computer vision and AI, enabling continuous refinement and innovation.

This application includes examples of actual algorithms, such as Convolutional Neural Networks (CNNs) and Deep Q-Learning Networks (DQNs), to illustrate potential approaches for implementing various embodiments of the present invention. However, it should be emphasized that these examples represent only a subset of the possible algorithmic solutions. Those skilled in the art will readily recognize that numerous alternative algorithms, methodologies, and styles may be employed to achieve similar results without departing from the scope or principles of the present invention.

For instance, alternative neural network architectures, such as Vision Transformers (ViTs), Residual Networks (ResNets), or Recurrent Neural Networks (RNNs), may be applied for specific use cases. Reinforcement learning approaches beyond DQN, such as Policy Gradient methods, Proximal Policy Optimization (PPO), or Actor-Critic frameworks, may also provide viable solutions. Additionally, hybrid systems combining supervised, unsupervised, or reinforcement learning can be utilized to optimize performance for particular embodiments.

Different algorithm styles or methodologies, including heuristic-based approaches, rule-based systems, or classical machine learning techniques like Support Vector Machines, Decision Trees, or Random Forests, may also be appropriate depending on the specific application. Furthermore, as machine learning and artificial intelligence technologies evolve, new and improved algorithms may emerge that further enhance the capabilities of the present invention while not departing from the spirit and scope of the present invention.

The inclusion of these specific algorithms is intended to provide clarity and guidance but is not meant to limit the present invention to these particular examples. The flexibility and adaptability of the present invention allow it to incorporate various algorithmic techniques to suit the unique challenges and requirements of different implementations, ensuring its continued relevance and effectiveness in advancing the field.

Understanding game mechanics requires analyzing subtle details like reel spin timing, bounce-back effects, jackpot progression, bet variations, etc. Reinforcement learning algorithms, such as Deep Q Network(s) (DQN), can model how these mechanics influence player decisions over time. By simulating gameplay and optimizing for rewards, these algorithms can identify mechanics that maximize engagement. For example, the AI can simulate thousands, millions, or even billions of spins in Cleo's Cash to evaluate how "Added Wilds," "Multipliers," "Free Games" bonuses, etc., affect player retention and satisfaction.

Below is an exemplary algorithm implementing a Deep Q-Learning Network (DQN) for analyzing and optimizing game mechanics like reel spin timing, bounce-back effects, jackpot progression, and bonuses in a slot game such as Cleo's Cash.

```
import numpy as np
import random
import tensorflow as tf
from collections import deque
# Step 1: Define the environment for Cleo's Cash mechanics simulation
class SlotGameEnvironment:
    def __init__(self):
        self.state = self.reset( ) # Initial game state
    def reset(self):
        # Define the starting state, e.g., initial reels, no bonuses triggered
        return np.zeros((5, 4)) # Example: 5 reels, 4 rows
    def step(self, action):
        # Simulate the result of an action (e.g., spin speed, bet size)
        reward, next_state, done = self.simulate(action)
        return next_state, reward, done
    def simulate(self, action):
        # Simulate game logic: spin results, bonuses triggered, etc.
        # Placeholder logic: Add mechanics here (e.g., Added Wilds, Free Games)
        reward = random.choice([0, 10, 50, 100]) # Example rewards
        next_state = np.random.rand(5, 4) # Random new reel state
        done = random.random( ) < 0.05 # Example: end condition
        return reward, next_state, done
# Step 2: Build the Deep Q-Network
class DQNetwork(tf.keras.Model):
    def __init__(self, action_size):
        super(DQNetwork, self).__init__( )
        self.fc1 = tf.keras.layers.Dense(128, activation='relu')
        self.fc2 = tf.keras.layers.Dense(128, activation='relu')
        self.fc3 = tf.keras.layers.Dense(action_size, activation='linear')
    def call(self, state):
        x = tf.convert_to_tensor(state, dtype=tf.float32)
        x = tf.reshape(x, (1, -1)) # Flatten the state
        x = self.fc1(x)
        x = self.fc2(x)
        return self.fc3(x)
# Step 3: Train the DQN Agent
def train_dqn(episodes=1000, action_size=5):
    env = SlotGameEnvironment( )
    dqn = DQNetwork(action_size)
    optimizer = tf.keras.optimizers.Adam(learning_rate=0.001)
    loss_fn = tf.keras.losses.MeanSquaredError( )
    replay_memory = deque(maxlen=2000)
    gamma = 0.99 # Discount factor
    for episode in range(episodes):
```

-continued

```
    state = env.reset( )
    total_reward = 0
    done = False
    while not done:
      # Epsilon-greedy action selection
      if random.random( ) < max(1 − episode / 500, 0.1): # Decaying epsilon
        action = random.randint(0, action_size − 1)
      else:
        q_values = dqn(state[np.newaxis, ...])
        action = np.argmax(q_values)
      # Perform action
      next_state, reward, done = env.step(action)
      replay_memory.append((state, action, reward, next_state, done))
      total_reward += reward
      state = next_state
      # Train on random mini-batches
      if len(replay_memory) > 32:
        batch = random.sample(replay_memory, 32)
        for s, a, r, ns, d in batch:
          q_update = r + (1 − d) * gamma * np.max(dqn(ns[np.newaxis, ...]))
          q_target = dqn(s[np.newaxis, ...]).numpy( )
          q_target[0, a] = q_update
          with tf.GradientTape( ) as tape:
            q_pred = dqn(s[np.newaxis, ...])
            loss = loss_fn(q_target, q_pred)
          grads = tape.gradient(loss, dqn.trainable_variables)
          optimizer.apply_gradients(zip(grads, dqn.trainable_variables))
    print(f"Episode {episode + 1}/{episodes}: Total Reward = {total_reward}")
# Step 4: Evaluate gameplay mechanics
def evaluate_mechanics(dqn, environment):
  state = environment.reset( )
  done = False
  engagement_metrics = [ ]
  while not done:
    action = np.argmax(dqn(state[np.newaxis, ...]))
    state, reward, done = environment.step(action)
    engagement_metrics.append(reward)
  return np.mean(engagement_metrics)
# Usage Example
slot_env = SlotGameEnvironment( )
train_dqn(episodes=500, action_size=5)
print("Average engagement metrics:", evaluate_mechanics(DQNetwork(5), slot_env))
```

The system begins with an environment that simulates gameplay mechanics for Cleo's Cash, including reel spins, bonuses, and other features. Rewards are tied to player engagement metrics, such as player retention and satisfaction, providing the foundation for learning. A Deep Q-Network (DQN) is then employed to optimize actions, such as timing adjustments for spins or bonus mechanics, based on simulated player interactions and rewards. During the training phase, the agent explores the environment, experimenting with different actions while refining its strategy to maximize long-term rewards. Finally, in the evaluation stage, the AI analyzes gameplay elements to identify mechanics, such as Added Wilds, Hold and Spin Features, Expanding Wilds, Cash-on-Reels, Multiple Game Bonus Features, Wheel Based Bonuses, Symbol Swapping Features, Free Games, Persistent Gameplay, Perceived Persistence Gameplay etc., that significantly enhance player satisfaction and retention.

Through thousands or millions of simulated spins, the DON identifies the most effective gameplay mechanics, enabling designers to fine-tune features like bonus timing and jackpot triggers for optimal player engagement. This process ensures that game designs are not only entertaining but also strategically optimized for success.

Although the provided code and algorithm represent one possible approach to implementing the described functionality, those skilled in the art will recognize that it is not the only method available. This algorithm is intended as an illustrative example rather than a definitive solution. Numerous alternative algorithms and methodologies can achieve similar outcomes, potentially with variations in efficiency, scalability, or accuracy, depending on the specific application and context.

For instance, while a Deep Q-Learning Network (DQN) is used here for reinforcement learning, other reinforcement learning approaches, such as Policy Gradient methods, Actor-Critic algorithms, or Proximal Policy Optimization (PPO), may be used with other embodiments to provide equally viable or even superior results. Similarly, the structure and design of the neural network itself can be modified, leveraging advanced architectures such as CNNs or Transformers to process complex state representations more effectively.

Moreover, different optimization techniques, hyperparameter configurations, or even entirely distinct machine learning paradigms, such as supervised or unsupervised learning, can be adapted based on the problem's requirements. Non-machine-learning approaches, like rule-based systems or heuristic algorithms, might also provide viable alternatives in specific cases.

In essence, this example serves as a framework, and its adaptability ensures that developers can modify or replace components to suit evolving technologies, datasets, or project goals. This flexibility highlights the dynamic nature of artificial intelligence and its capacity for continuous improvement and innovation.

Animations play a key role in engaging players, from simple 2D effects to complex 3D modeled sequences. The AI can leverage GANs to analyze and optimize animations. GANs learn from existing animations, identify the elements that players find most appealing based on the success or failure of previous games, and even generate new animations that align with successful design principles. In one embodiment, with Cleo's Cash, GANs enhance the realism of Princess Cleo's flowing hair or eye movements or improve the timing of attract animations to better capture player attention.

In one embodiment, sound design, including win chimes, background music, large payout effects, etc., are analyzed using audio feature extraction algorithms like Mel-Frequency Cepstral Coefficients (MFCCs). These algorithms decompose sound into its fundamental components, enabling the AI to evaluate characteristics such as pitch, volume, and duration. Combined with Natural Language Processing (NLP) for analyzing player feedback, the AI assess how sounds influence player engagement and recommend improvements.

To understand player behavior, in one embodiment, the AI employs clustering algorithms such as K-Means or DBSCAN to segment players based on their gameplay patterns. This includes metrics like bet frequency, time spent on bonuses, or responsiveness to attract animations. Predictive modeling techniques, such as Gradient Boosting Machines (GBMs) or Random Forests, can then forecast how certain game features might appeal to different player segments. For example, the AI might discover that players in one cluster are drawn to traditional high volatility games, while another group prefers visually rich, story-driven themes like Cleo's Cash.

To predict the success or failure of a new game, the AI can utilize Multi-Layer Perceptrons (MLPs) or other deep learning architectures to process multi-modal data, including visuals, mechanics, animations, sounds, player behavior, etc. These models can identify complex, non-linear relationships between features and performance metrics, providing a holistic assessment of a game's potential.

To achieve this depth of understanding, the AI can be trained using the game's source code, including math files, animations, graphic assets, sound, etc. When such resources are unavailable, unsupervised learning techniques like Autoencoders can help extract features from alternative data sources, such as gameplay videos. These techniques allow the AI to infer mechanics, animations, and probabilities with a significant level of accuracy, even when direct data is limited, e.g., 4 hours of game play.

This comprehensive approach ensures that the AI moves beyond surface-level metrics to develop a detailed understanding of a game's design, visuals, mechanics, math, and player engagement strategies. By combining advanced algorithms with diverse data sources, the AI can make meaningful comparisons across games, identify patterns in player preferences, and pinpoint the features that contribute to a game's success. Furthermore, reinforcement learning can optimize game mechanics for maximum player satisfaction, while computer vision and GANs refine visual and animation elements.

By integrating these advanced algorithms, the AI becomes a powerful tool for slot game analysis and design or derivatives thereof such as online or mobile. It not only enhances the understanding of existing games but also provides actionable insights for creating new games tailored to evolving player preferences. This capability represents a transformative leap in game development, enabling the industry to produce games that are both engaging and profitable, meeting the diverse expectations of players across a great many demographics and experience levels. Those skilled in the art will recognize that although exemplar slot machine game development is referenced, the present invention also relates to other game environments such as online, mobile, etc. As used herein, the terms "slot machine games", "gaming machine," "online gaming platform," "mobile gaming platform", etc., refer to various types of gaming systems, including but not limited to land-based gaming machines, such as slot or electronic gaming machines (EGMs), video lottery terminals (VLTs), electronic table games (ETGs), nudge style gaming machines, pull-tab based gaming machines, bingo-based gaming machines, historical horse racing gaming machines (HHR), etc.; online gaming platforms, such as remote server-based gaming, browser-based casino games, cloud-hosted gaming services, and real-time interactive gambling experiences; and mobile gaming platforms, such as dedicated gaming applications, progressive web applications, and cloud-streamed casino games playable on smartphones, tablets, and other portable devices. A game can be initially developed for one platform and later adapted, modified, or optimized for another platform using the methods and systems described herein.

In some embodiments, a game originally developed for a land-based gaming machine, such as an EGM, VLT, ETG, or those listed above, is adapted for use on an online and/or mobile gaming platform. This adaptation includes recompiling, modifying, or converting the game's executable instructions and computer-readable files to function on different operating systems, gaming architectures, or remote servers. It also involves restructuring graphical assets, animations, and visual effects to accommodate different screen resolutions, aspect ratios, refresh rates, and mobile display constraints while preserving the original user experience. In addition, the adaptation process includes adjusting or replacing physical user interface (UI) elements, such as button-based controls or physical touchpoints, with on-screen virtual controls, touchscreen gestures, haptic feedback, or adaptive UI components for mobile or online play. Furthermore, game mechanics and logic can be modified to account for differences in latency, bandwidth constraints, and network synchronization inherent in online or mobile environments. Additional adaptation measures involve ensuring regulatory compliance for remote play, including secure authentication, geolocation verification, age restrictions, and digital wallet integration for cashless transactions. In some embodiments, cloud-based or hybrid gaming architectures are used, allowing certain processing tasks, such as random number generation, AI-driven game adjustments, or real-time event synchronization, to be performed on a remote server rather than locally on a gaming machine.

Conversely, in some embodiments, a game originally developed for online or mobile play is adapted for deployment on a land-based gaming machine, such as an EGM, VLT, or ETG. This adaptation involves reconfiguring the game's software to run on dedicated land-based gaming hardware instead of cloud-based or distributed architectures. Additionally, the adaptation process includes integrating support for physical casino components, such as monetary input devices (bill acceptors, ticket-in-ticket-out (TITO) systems), cashless wagering, player tracking systems, and mechanical or electromechanical interfaces. UI elements can also be modified to fit non-touch interfaces, such as physical buttons, levers, or keypads, while ensuring a consistent gameplay experience with the online or mobile version. Other modifications include optimizing animations and media assets for high-resolution dedicated gaming displays, adjusting game mechanics to account for land-based gaming regulations, altering payout structures and return-to-player (RTP) percentages to comply with jurisdiction-specific gaming requirements, etc. For example, a mobile-first slot game featuring gesture-based spinning mechanics may be adapted for a land-based machine, such as an EGM, VLT, or ETG, by replacing gesture interactions with physical spin buttons, integrated LED displays, enhanced sound effects, etc., to simulate a casino gaming experience.

Whether adapting from land-based, such as EGMs, VLTs, or ETGs, to online/mobile or from online/mobile to land-based, such as EGMs, VLTs, or ETGs, the adaptation process may utilize AI-powered game design and media processing technologies. In some embodiments, AI-based game design systems are used to analyze past game performance, identifying patterns in player engagement, wagering behavior, and game longevity to optimize adaptation strategies. In one embodiment, AI-driven media encoding and transcoding routers are used to convert graphical assets, animations, and video elements into different resolutions, formats, or compressions suitable for the target platform. Additionally, in another embodiment, AI-based transformation techniques are employed to reformat audio files for different speaker configurations, such as stereo for mobile play and surround sound for land-based, such as EGMs, VLTs, or ETGs, machines. In some implementations, AI-driven media encoding and transcoding routers automate the game scaling process, allowing assets and UI components to be dynamically resized for different aspect ratios and display types. In some embodiments, AI-based player behavior analysis is performed in real time, enabling dynamic game adjustments based on engagement patterns, preferred wagering behaviors, or betting frequencies. For example, an AI-driven system can analyze gameplay patterns from a land-based slot machine and use that data to dynamically adjust volatility levels or bonus round frequencies in the mobile version to maintain similar levels of player engagement.

In some embodiments, a media encoding and transcoding router may be employed. A media encoding and transcoding router is a device which uses AI to convert, compress, or optimize video, audio, or image files into formats suitable for various devices or platforms. It routes files through processes to ensure compatibility, reduce file sizes, enhance quality, or apply AI-driven adjustments like resolution upscaling, noise reduction, or real-time format adaptation, all with limited on no human intervention. Those skilled in the art will recognize that a media encoding or transcoding router may perform any one or more of these functions and still be considered a media encoding or transcoding router.

Those skilled in the art will further recognize that the term "media encoding and transcoding router" broadly refers to any device, system, software, or combination thereof capable of one or more of the following functions, processing media files, such as video, audio, or images, by modifying, encoding, transcoding, compressing, or optimizing them for compatibility, performance, quality enhancement, etc. This includes AI-driven or automated processes that adjust bit rates, apply real-time format conversions, enhance resolution, or optimize content for different devices and platforms. Any variation in naming, implementation, or integration does not exclude a system from falling under this definition, provided it performs one or more of these core functions.

Encoding, as used herein, refers to the process of converting data from one format into another for purposes such as storage, transmission, or compatibility with different devices and software systems. Encoding includes, but is not limited to, compression using lossy or lossless methods, format conversion from one encoding scheme to another, bitrate adjustments to optimize streaming, encryption or digital rights management (DRM) application to secure content, embedding metadata such as subtitles or watermarks, AI-optimized encoding where artificial intelligence determines optimal encoding parameters, error resilience methods such as forward error correction (FEC) for data integrity, and multi-layer encoding to generate multiple representations of the same content for adaptive streaming (e.g., DASH or HLS). Encoding can be performed using AI-based decision-making, probabilistic inference, or algorithmic processes to ensure that the output meets predefined performance criteria. Those skilled in the art will recognize that the term encoding can include any one or more of these functions.

Transforming, as used herein, refers to any modification that alters the structure, presentation, or properties of a media file, whether or not encoding is involved. Transforming includes, but is not limited to, resolution scaling through upscaling or downscaling, frame rate conversion to match playback requirements, noise reduction and enhancement using AI-driven processes, color space adjustments such as converting from SDR to HDR, aspect ratio adjustments for display format compatibility, speech-to-text or text-to-speech conversion, content-adaptive modifications that adjust brightness, contrast, sharpness, or scene dynamics, neural network-based inference for style transfer, face tracking, or content-aware modifications, and seamless format adaptation where a media file is dynamically modified for real-time playback conditions. Transforming may include AI-driven enhancements, structural changes, or real-time modifications that adapt media for specific use cases. Those skilled in the art will recognize that the term transforming can include any one or more of these functions.

A media encoding and transcoding router can operate using AI-driven or algorithmic processes to achieve one or more of the following: changing input data to a different media format or consolidating multiple input data types into a specific file format, routing and directing the processed media to a specific neural network for transformation or further processing within an AI-driven pipeline, and selecting an output based on a higher probability variable, wherein the router or associated AI system evaluates multiple possible outputs and determines the suitable result based on statistical inference, probability weighting, confidence scores, or other machine learning-based selection methods. An output based on a higher probability variable as opposed to the highest probability variable may be the result of the many interactions which the system may encounter. In some embodiments, the output may actually be classified as a lower probability variable due to the many interactions encountered which in totality provide the optimal overall probability of the system as a whole. Many embodiments can include hundreds or thousands or more such interactions and game interplays.

One of the core functions of an AI-driven media encoding and transcoding router is to evaluate multiple possible outputs and make an informed selection. If the system does not prioritize an output based on probability weighting or does not generate an output at all, it essentially becomes a non-intelligent, passive system rather than an active AI-driven decision-making tool. Without probability-based selection or higher probability output, the system might default to random, arbitrary, or inefficient choices, reducing consistency and performance. If no output is selected, the system fails to complete its intended task, making it non-functional for real-world applications. AI-based systems rely on training data, inference models, and complex processing to improve efficiency and automation. If the system does not select an optimal, higher probability, or even viable output, it wastes computational resources by running calculations without producing a useful result. In real-time applications, such as live video transcoding or AI-enhanced image processing, failing to select an output could cause latency issues, errors, or complete system failure. In batch processing applications, the system can generate multiple outputs with no ranking or selection, requiring manual intervention, which greatly negates the benefits of AI-driven systems.

Those skilled in the art will recognize that the term encoding is not limited to format conversion but includes any one or more of compression, optimization, AI-driven decision-making, and encryption, among other processes. Similarly, those skilled in the art will also recognize that the term transforming is broader than simple modification and includes at least one of more AI-based enhancements, real-time adjustments, and structural changes to media properties. The presence of AI-driven decision-making, probability weighting, or adaptive selection within encoding or transforming processes qualifies a system under the definition of a media encoding and transcoding router. Those skilled in the art will also recognize that any system performing one or more of these functions, whether standalone, integrated within software, or operating in a distributed cloud framework, should fall under this definition.

Adapted games can be deployed across platforms using various technologies, including cloud-based gaming environments, where a single game instance can be streamed across different devices; hybrid architectures, where a game can function both as a land-based and online/mobile experience with necessary modifications; and cross-platform game engines, which enable a single codebase to be compiled for multiple environments, such as a unified game engine that outputs both a land-based and mobile version. In some implementations, real-time compatibility layers may be incorporated, allowing a game to seamlessly transition between land-based and online/mobile gaming environments without requiring complete redevelopment.

As land-based and online/mobile gaming platforms are governed by different regulatory frameworks, the adaptation process may include compliance measures specific to each jurisdiction. These measures may include adjusting payout structures, ensuring compliance with gaming commission regulations, and implementing authentication measures such as blockchain-based player verification, biometric logins, or two-factor authentication (2FA) for mobile and online play. AI-based compliance monitoring may be used to ensure that game settings dynamically adjust to meet jurisdictional requirements.

The methods and systems described herein provide explicit support for adapting games between land-based gaming machines, online, and mobile platforms. This includes but is not limited to (i) porting land-based slot machine games to online and mobile platforms, (ii) porting online and mobile games to land-based gaming machines, (iii) utilizing AI-driven automation to modify game assets, mechanics, and performance parameters for cross-platform compatibility, and (iv) ensuring regulatory compliance when transitioning games between different gaming environments. The AI-based adaptation processes described herein allow for seamless integration of game content across multiple gaming platforms, reducing development time and optimizing performance. By leveraging AI-driven encoding, transcoding, and game design methodologies, the systems described in this disclosure facilitate the efficient and scalable adaptation of games across land-based gaming machines, online, and mobile platforms while maintaining gameplay integrity and regulatory compliance.

To optimize its analysis, an AI system must deeply understand pertinent mathematical details of a slot game, leveraging advanced algorithms to analyze and extract actionable insights. These details include mathematical frameworks, visual design, soundscapes, player behavior, and engagement factors. The following sections outline key areas of analysis and the algorithms that may be employed to achieve a comprehensive understanding. The extent of human interaction in the process may be variable depending on circumstances and level of machine learning.

Mathematical elements form one of the foundations of slot game performance analysis. These include the Return to Player (RTP) percentages for both base and bonus games, probabilities and payouts for winning combinations, bonus or feature characteristics, the dynamics of progressive or jackpot awards, etc.

Algorithms for mathematical modeling play a crucial role in optimizing slot machine game design and performance. Markov Chains are used to model state transitions within a game, such as symbol landings, payouts, bonus triggers, etc., providing a framework to predict gameplay dynamics. Monte Carlo Simulations simulate thousands, millions, or even billions of gameplay iterations to estimate the probabilities of rare events, such as hitting progressive jackpots, enabling more accurate probability assessments. Bayesian Networks analyze probabilistic relationships between game variables, such as the impact of a symbol's appearance on payout distributions, offering deeper insights into interconnected game mechanics. Additionally, Gradient Boosting Machines (GBMs) and Random Forests are employed to identify and weigh critical mathematical variables that influence player engagement and retention. Together, these algorithms provide a robust foundation for data-driven game design, enhancing both player experience and game performance.

For instance, in a "line" game, a win may involve two adjacent "9" symbols on reels 1 and 2, counting from left to right, paying 0.1× the player's bet or wager, while five Scarab symbols in a specific line across all reels might yield a much larger payout such as 200× where x represents the player's wager. These outcomes are calculated using Dynamic Programming, which efficiently computes probabilities across all permutations and combinations of symbol placements.

In "ways" games, where symbols can appear anywhere on consecutive reels or similar, the AI employs Combinatorial Analysis to calculate the probabilities of various outcomes and their contributions to overall payouts.

The visual appeal of a slot machine game, including themes, symbol designs, color schemes, etc., is essential for attracting and engaging players. Algorithms for visual analysis play a critical role in optimizing these elements. Convolutional Neural Networks (CNNs) analyze images to detect patterns in visual components such as color saturation, color vibrance, color contrast, symbol arrangement, overall aesthetic harmony, etc. Generative Adversarial Networks (GANs) are employed to create new visual designs or refine existing ones, testing their appeal using player engagement metrics. Principal Component Analysis (PCA) simplifies complex visual datasets to identify the most impactful factors influencing player interest.

For example, CNNs can evaluate the visual elements of Cleo's Cash by analyzing the gold-framed reels, intricate Scarab symbols, detailed depictions of Princess Cleo, etc. These design features can then be correlated with performance metrics, such as "win per unit per day", "coin-in per day", player retention rates, etc., to determine their effectiveness. This data-driven approach ensures that visual designs are not only aesthetically pleasing but also optimized for maximum player engagement and game performance.

Animations, ranging from simple 2D effects to complex 3D sequences, significantly influence player immersion.

Algorithms play a key role in refining game animations to maximize player engagement and visual appeal. Reinforcement Learning (RL) simulates player interactions to optimize animation timing and effects, ensuring smooth and captivating transitions. Time-Series Analysis evaluates the temporal impact of animations, such as attract sequences or bonus win celebrations, determining how these moments influence player retention. Generative Adversarial Networks (GANs) are used to generate or refine animations, creating smoother transitions and more dynamic visual effects. For example, in Cleo's Cash, the 3D animated Princess Cleo, with her flowing hair and ornate jewelry, can be enhanced using GANs to test variations in color palettes and movement sequences, boosting visual engagement and overall appeal.

In one embodiment, the AI systems relating to graphics and animation analysis and creation is adapted for use in similar environments as previously described. The core AI-driven methodologies developed for applications such as AI-based content generation, animation sequencing, sound design, and predictive engagement modeling are broadly applicable to digital content creation. Just as AI is used in various applications to analyze past performance, generate new content, and optimize engagement, these same techniques can be employed to study prior media, predict player preferences, and automate content generation. The shared foundational AI models, training datasets, and machine learning architectures used in AI-driven development provide a directly translatable framework for AI-assisted visual and audio content generation.

In one embodiment, the AI system analyzes historical digital media using the same types of AI models and algorithms employed in performance evaluation and engagement optimization. Just as AI-driven analytics assess structures, interaction patterns, user performance, user retention, etc., AI-based content analysis can examine various aspects, including artistic and visual style patterns, motion and physics modeling, narrative and structural analysis, engagement and sentiment tracking, and market and trend analysis. AI models trained on existing visual media can detect patterns in color schemes, shading techniques, framing methods, and stylistic fidelity, similar to how AI analyzes graphical styles and visual effects. Deep learning algorithms can be used to generate frame interpolation, motion smoothing, and fluid movements, similar to how AI is used to refine motion sequences and procedural movement patterns. AI can evaluate scene transitions, pacing, and structural elements, just as AI assesses the organization of interactive experiences and structured workflows. AI-driven behavioral analytics, such as eye tracking, facial expression recognition, and physiological monitoring, can assess emotional responses to digital sequences, mirroring AI-driven evaluation of interaction patterns and engagement metrics. Additionally, AI models used to track content trends, thematic preferences, and audience demographics can be adapted to analyze broader trends in visual and auditory content consumption. By leveraging the same machine learning-based performance analytics used in various applications, AI-powered content creation benefits from proven AI methodologies that ensure data-driven optimization.

In one embodiment, the AI-driven techniques used for asset creation, animation, and procedural generation are directly repurposed for broader content production. These AI models can generate AI-based character and scene generation using deep learning models to produce digital character models, background environments, scene layouts, etc., similar to how AI generates structured assets in other applications. AI-assisted motion and frame interpolation can be employed, as with AI-driven motion sequencing, where AI can be trained to generate fluid motion sequences, realistic physics-based movement, and automated keyframe interpolation. AI-powered soundtrack and audio processing can utilize speech synthesis models and generative music AI to create natural-sounding voiceovers, adaptive compositions, and synchronized sound effects. AI-based scene composition and scene structuring can allow AI models to analyze spatial environments and optimize framing, adjusting composition, subject positioning, and visual pacing to enhance animation effectiveness. These shared AI methodologies demonstrate that the transition between AI-assisted interactive media and AI-assisted content creation is seamless, allowing for additional application of AI tools and optimization techniques.

In some embodiments, a fully integrated AI-driven content generation system is developed using the same modular AI architecture applied to AI-assisted design. AI-based character and scene design can employ generative AI models to create unique digital characters, environments, and structured sequences, just as AI generates procedural assets. AI-assisted motion capture and animation can implement deep learning models for motion physics and movement, ensuring smooth transitions and realistic motion sequencing. AI-driven voice acting and soundtrack generation can utilize text-to-speech synthesis, deep learning-based voice models, and adaptive sound processing to create high-quality voiceovers and dynamic background scores. AI-based rendering and post-processing optimization can leverage AI-driven rendering acceleration techniques similar to those used for real-time graphical optimization, reducing computational workload and improving final content quality.

Sound design profoundly influences player behavior by amplifying the excitement of wins, building anticipation, and maintaining interest. Advanced algorithms can analyze and optimize audio elements to ensure they complement animations, gameplay, and overall player experience, creating a fully immersive and engaging environment.

Audio algorithms play a vital role in enhancing the sound design of slot games to maximize player engagement. Mel-Frequency Cepstral Coefficients (MFCCs) extract key audio features like pitch, rhythm, and tone, ensuring sounds are finely tuned to complement gameplay. Recurrent Neural Networks (RNNs) analyze sequences of sounds, such as transitions between base and bonus game music, to maintain seamless auditory experiences. Clustering Algorithms, like K-Means, categorize sounds into celebratory, ambient, or attention-grabbing types, correlating them with player engagement metrics. For instance, AI can evaluate whether the trumpet blast accompanying a large win in Cleo's Cash should be adjusted in duration or volume to maximize its impact on player excitement.

Understanding player behavior is essential for tailoring games to different demographics. Advanced algorithms analyze player preferences, habits, and responses, providing insights to optimize game features and ensure they resonate with a wide range of players, from casual users to experienced gamblers. This data-driven approach ensures games are engaging, satisfying, and profitable across diverse audiences.

Advanced algorithms analyze player behavior to tailor games for maximum engagement. Clustering algorithms like K-Means and DBSCAN segment players based on factors such as betting patterns, session lengths, or responsiveness to bonuses, revealing distinct player types. Predictive modeling using techniques like Gradient Boosting Machines (GBMs) and Random Forests forecasts how specific game features will appeal to these player segments. Meanwhile, Reinforcement Learning optimizes game mechanics by simulating player interactions and iterating for maximum engagement. For instance, one player cluster can favor high volatility games with straightforward mechanics, while another prefers immersive, story-driven themes like Cleo's Cash.

Neurotransmitter and emotional response analysis, when available and utilized, begins with understanding psychological triggers which can be useful in designing engaging games. AI evaluates how game designs stimulate neurotransmitter activity, such as dopamine release, to enhance player satisfaction. EEG signal processing monitors brainwave activity to identify neural responses to in-game events. Behavioral tracking algorithms analyze indirect arousal indicators, such as eye-tracking and heart rate variability, while Sentiment Analysis via natural language processing (NLP) processes player feedback to gauge emotional reactions, etc. These insights allow the AI to fine-tune features like bonus round anticipation, jackpot visuals, and immersive game moments, ensuring players remain engaged and excited throughout their gaming experience.

Each factor analyzed is assigned a relative importance during the AI's evaluation process. While some patterns, such as the appeal of vibrant colors or immersive themes, can seem obvious, the AI leverages machine learning to evaluate an almost infinite number of factors, many beyond human comprehension.

In a best-case scenario, casinos provide detailed performance metrics, including dozens of data points such as "Win per unit per day" or "Coin-in per day", etc. However, in some cases, only minimal data can be available, such as general feedback: "The game is performing well," "The game is average," or "The game is performing poorly." The AI must accommodate this wide range of reporting granularity, using its learning models to extract insights from both rich datasets and sparse feedback.

Combining these elements, the AI employs multi-modal analysis to holistically evaluate a game's success potential or probable failure.

Advanced algorithms enable a holistic or comprehensive approach to analyzing and optimizing game design by integrating data across multiple dimensions. MLPs synthesize information from visuals, sounds, mechanics, and player behavior to provide thorough assessments of game performance. Autoencoders extract latent features from gameplay videos or incomplete datasets, uncovering hidden patterns and insights. Gradient Boosting Machines (GBMs) identify and rank the key features that drive player engagement, offering actionable insights. This holistic modeling allows the AI to (i) predict a game's success or failure, recommend targeted optimizations, and adapt designs to meet evolving player preferences, ensuring games remain relevant, engaging, and competitive, or (ii) automatically adjust game characteristics.

By integrating advanced algorithms like CNNs, GANs, RL, Bayesian models, etc., the AI system becomes a powerful tool for game analysis. It evaluates mathematical, visual, auditory, and behavioral data to identify patterns that drive success. Importantly, the AI accommodates varying levels of data detail, from extensive metrics to minimal feedback, making it adaptable to different scenarios. This capability ensures the system not only enhances existing games but also guides the development of new, innovative titles, either directly or indirectly. By leveraging these insights, the embodiments of the present invention create experiences that are engaging, well performing, and tailored to the diverse expectations of players, optimizing long-term success in a competitive market.

One optimal scenario for entering data about a game is to have access to its complete source code, including math files, game logic, animations, graphics, sound effects, and other assets. This level of detail enables precise analysis of every aspect of the game, from its mechanics to its visual and auditory design. Such data also allows the AI system to model complex interactions, identify trends, and predict player engagement with higher accuracy. When applied to multiple games from a specific designer or manufacturer, this approach builds a robust dataset, potentially encompassing hundreds of games from a single year and even reaching back to the introduction of video slots in the 1980s. This historical context enables the AI to trace the evolution of game design and player preferences and predict future player trends.

The embodiments of the present invention are beneficial to established manufacturers with extensive archives, as well as smaller or newer developers who can lack the resources to provide such comprehensive data. For these cases, alternative data collection methods and advanced algorithms can help approximate similar levels of insight.

When source code is limited or unavailable, gameplay sessions may be recorded and analyzed frame by frame, allowing the system detailed herein to extract valuable insights about game mechanics, animations, and probabilities. Object detection algorithms like YOLO and Faster R-CNN identify symbols, animations, and game elements within video frames. For example, the AI detects when a Scarab symbol appears in Cleo's Cash or track when a progressive amount increases. Optical Character Recognition (OCR) extracts text from gameplay videos, such as jackpot values or bonus descriptions, providing additional context for analysis. Temporal Convolutional Networks (TCNs) analyze sequential events in gameplay, such as bonus triggers or symbol landings, to reconstruct game flow and better understand timing and other mechanics. Dynamic Time Warping (DTW) compares sequences of events, identifying patterns in timing and animations, like the duration of reel spins or win celebrations. This multi-algorithmic approach allows for a detailed analysis of gameplay, even without access to source code, ensuring that critical data is captured and utilized for game optimization.

For low-probability events, such as progressive jackpots with odds exceeding 3,000,000:1, the embodiments of the present invention employ simulations and theoretical modeling to analyze and predict their occurrence. Monte Carlo Simulations run thousands or millions of game iterations to estimate the frequency of these rare events and their impact on the game's return-to-player (RTP). Meanwhile, Bayesian Inference dynamically updates probability estimates as additional gameplay data becomes available, refining predictions for triggers like progressive or jackpot payouts. Together, these algorithms provide precise insights into rare game events, enabling better design and optimization of gameplay mechanics.

Player biometrics provide valuable insights into emotional and physiological reactions to gameplay, revealing how design elements influence engagement. While real-time measurement of neurotransmitter activity is challenging, the embodiments of the present invention offer indirect methods as practical alternatives.

In one embodiment, advanced algorithms for biometric analysis provide deep insights into player engagement and emotional responses during gameplay. Signal processing for EEG data detects neural activity, using techniques like Fourier Transforms and Wavelet Transforms to extract features such as alpha or gamma wave activity, which indicate levels of excitement or focus. Multimodal machine learning integrates multiple biometric inputs, EEG, heart rate variability, eye-tracking data, etc., to develop a comprehensive profile of player engagement. Clustering algorithms like K-Means and DBSCAN segment players based on biometric responses, such as arousal levels or attention spans, enabling game features to be tailored to different player types. Additionally, Recurrent Neural Networks (RNNs) analyze temporal biometric data, such as changes in heart rate during high-stakes moments, to predict emotional peaks and enhance game design for maximum impact. Together, these algorithms create a powerful toolkit for optimizing player experiences and engagement.

Visual and animation quality is crucial for player engagement. The embodiments of the present invention analyze symbol designs, background colors, character animations, attract sequences, etc., to identify what resonates with players.

Advanced algorithms for visual and animation analysis optimize both the aesthetic and functional aspects of game design. CNNs detect patterns in visual elements such as color contrast, symbol clarity, and character details. For example, CNNs can analyze the gold-framed reels in Cleo's Cash and correlate their visual appeal with performance metrics to enhance player engagement. Generative Adversarial Networks (GANs) create or refine visual elements and animations by learning from successful designs. GANs can improve a 3D model like Princess Cleo, optimizing features such as her jewelry, hair motion, or facial expressions for maximum player appeal. Time-Series Analysis evaluates the temporal dynamics of animations, such as the duration of bonus sequences or the timing of reel spins, ensuring they are engaging without being overly lengthy. Together, these algorithms enhance the visual and animation quality of games, driving player satisfaction and retention.

Sound plays a key role in creating an immersive gaming experience. In one embodiment, the system(s) evaluates audio elements, including background music, win chimes, and jackpot celebrations, to optimize their effectiveness.

Audio analysis algorithms are crucial for optimizing sound design and enhancing the emotional impact of games. Mel-Frequency Cepstral Coefficients (MFCCs) extract key audio features like pitch, tone, and rhythm to evaluate how sounds influence player emotions. Spectrogram Analysis visualizes sound frequencies over time, enabling the AI to identify and refine the most engaging auditory patterns. Recurrent Neural Networks (RNNs) analyze sequential audio data, ensuring smooth transitions between elements such as base game music and bonus round celebrations, creating cohesive and impactful soundscapes. These algorithms work together to deliver immersive audio experiences that captivate players and elevate gameplay.

To fully understand game performance, the embodiments of the present AI system integrate data from diverse sources, assigning relative importance to each factor during analysis.

As used herein, the analysis or analyzing of past game performance and/or similar refers to any evaluation, interpretation, or utilization of historical game data, whether manually entered, algorithmically processed, AI-driven, or any combination thereof, to inform, optimize, or develop game design elements, game chance mechanics, or other aspects of a gaming machine. This includes both extremely simple human-entered observations (e.g., games performed above house average, game performed at house average, game performed below house average, noting that dragon-themed characters outperform generic reptiles or that red and gold color schemes are more engaging than green and turquoise) up to and including highly complex AI-driven analyses that evaluate extensive datasets. These datasets can include, but are not limited to, win per unit per day, occupancy percentages, average bet size, session length, volatility profiles, hit frequency, progressive jackpot engagement, player retention rates, lifespan of a game on the casino floor, etc.

One of the most prominent and widely accepted metrics in determining slot machine game performance is "win per unit per day" (WPUPD). This metric is calculated by averaging the daily net revenue (house win) generated by an individual gaming machine. Casinos often compare a game's WPUPD against the average WPUPD of all slot machines in a given venue or a specific gaming zone within the casino. A baseline factor of 1.00× represents the gaming venue's average WPUPD or "house average", with games exceeding this threshold (e.g., 2.00× indicating double the average WPUPD) performing exceptionally well, while underperforming games (e.g., 0.20× indicating 20% of the average WPUPD) can be candidates for removal or redesign. Many casinos report such data to the manufacturers but often will hold competitor data as confidential. In addition, many companies are engaged in reporting such data such as Eilers & Krejcik Gaming, Reel Metrics, etc.

The analysis of past game performance can involve manual or automatic input of WPUPD trends by casino operators or AI-driven pattern recognition across thousands of gaming machines, tracking how different themes, game mechanics, pay structures, and graphical styles impact WPUPD and other metrics. By analyzing these variations over time, AI-driven models can predict which design choices are likely to enhance future game performance.

In addition to WPUPD, the analysis of past game performance may include other key performance indicators (KPIs) commonly used in the gaming industry, such as: Occupancy percentage: The percentage of time a slot machine is actively played compared to its available time on the casino floor; Average bet size: The average amount wagered per spin, which can indicate whether a game appeals more to casual or high-stakes players; Session length and time on device: The average duration a player remains engaged with a specific game before cashing out or moving to another machine; High vs. low win amounts: The frequency and distribution of small, medium, and large payouts, influencing player perception of fairness and entertainment value; Days on the casino floor: Tracking how long a game remains profitable before experiencing a decline in engagement and revenue given many slot machines experience a natural drop-off in performance over time, requiring casinos to rotate or replace underperforming games; Volatility index and hit frequencies: The frequency of winning spins and payout distributions, impacting perceived entertainment value and player retention; and Player retention and return rates: measuring whether players return to a specific game over time or abandon it in favor of competitors.

These metrics can be entered manually by humans or automatically collected, processed, and analyzed by AI models to detect trends and optimize future game designs.

AI-driven systems can process billions of gameplay records to pinpoint optimal pixel placements for visual elements, game math optimizations for ideal volatility, mechanical adjustments that extend a game's profitable lifespan, sound effects, etc. AI models can even incorporate biometric data (e.g., eye-tracking heat maps, facial expression analysis, or heart rate monitoring) to assess how players react to different graphical styles, payout structures, or game pacing.

The term "analysis" and/or similar also encompasses the evaluation of competitor games, either through manual observation or AI-driven video analysis of competitor slot machines in action. AI models can examine player engagement patterns, payout cycles, and game design trends from competitor titles to predict which features will perform well in future releases.

Additionally, market-wide gaming data can be analyzed to detect regional trends, demographic preferences, or cultural influences affecting game performance. For example, a machine optimized for a Las Vegas casino with frequent tourist players can require different volatility settings than a machine designed for a local casino with a high percentage of repeat visitors. By integrating these insights, gaming machines can be dynamically adjusted based on evolving player behavior.

The analysis of past game performance is not static but rather an adaptive and evolving process. AI-driven game design systems can continue to refine game mechanics, payouts, and engagement strategies in real-time based on incoming player data or utilize for future game design. For instance, a game that initially launches with a WPUPD of 0.80× can be adjusted dynamically by tweaking bonus round frequency, bet multipliers, RTP, visual engagement features, sound volumes, etc., to increase player retention and elevate performance toward or above the casino's 1.00× baseline.

AI models can also learn from historical data spanning decades, analyzing the performance of slot machines from early mechanical reels to modern digital displays. This allows designers to detect long-term industry shifts and anticipate the next generation of game preferences before they emerge.

Whether the analysis is as simple as a human entering a preference for a dragon character or as complex as an AI-driven model processing terabytes of gameplay data, all fall under the scope of the analysis of past game performance and/or similar terminology.

In one embodiment, a holistic AI system integrates advanced algorithms to optimize all aspects of game development by analyzing and refining critical elements. Gradient Boosting Machines (GBMs) identify and rank the most impactful factors driving game success, such as visual themes, soundscapes, and bonus mechanics. MLPs process multi-modal data, incorporating visuals, audio, game math, and player behavior, to predict overall game performance and player engagement. Autoencoders extract hidden features from incomplete datasets, such as gameplay videos without detailed source files, uncovering valuable insights to enhance design and functionality. Bayesian Networks model probabilistic relationships between game features and player engagement, continuously refining insights as new data is introduced. Together, these algorithms enable a holistic AI system to deliver data-driven recommendations and optimize game design for maximum impact and performance.

The AI-based system detailed herein is designed to accommodate varying levels of data granularity, ensuring it can deliver actionable insights regardless of the data's depth. While some casinos provide detailed performance metrics, others can offer only minimal feedback, such as "The game is performing well" or "The game is average." To address this variability, the embodiments of the present invention employ a combination of supervised, unsupervised, and reinforcement learning techniques.

Supervised Learning trains on detailed datasets to predict game success based on historical trends, enabling the system to optimize future game designs with precision. Unsupervised Learning clusters games with limited data, identifying patterns and extracting insights from minimal feedback. Reinforcement Learning adds another layer of adaptability, allowing the AI to iteratively improve by simulating player interactions and learning which adjustments maximize engagement and performance over time.

This multi-faceted approach ensures the AI can effectively analyze and optimize games, whether working with extensive data or sparse inputs, while continually refining its capabilities to meet the diverse needs of the gaming industry.

The AI system according to the embodiments of the present invention combines all the data, which can include millions or billions of data points, into a unified framework. Machine learning techniques including supervised, partially supervised, unsupervised, and reinforcement learning can be employed to train the system.

Using supervised learning, the AI-based system(s) learns from labeled datasets, associating specific game characteristics (e.g., red and blue color schemes) with performance metrics like WPU or TOD.

EXAMPLE ALGORITHM

```
from sklearn.ensemble import RandomForestRegressor
#Input: Game features and performance metrics
X=[["red-blue", 3×5, "bonus type A"], ["green-turquoise", 4×5, "bonus type B"]]
y=[1.2, 0.8] #WPU ratios
model=RandomForestRegressor( )
model.fit(X, y)
predictions=model.predict([["gold-blue", 3×5, "bonus type C"]])
```

Unsupervised Learning detects patterns in unlabeled data, such as correlations between attract animations and player engagement.

Example: Clustering Games Based on Visual Styles and Animations

```
from sklearn.cluster import KMeans
#Input: Features like color schemes and animation durations
data=[["gold-blue", 5.2], ["red-green", 4.8], ["blue-white", 6.0]]
kmeans=KMeans(n_clusters=3)
clusters=kmeans.fit_predict(data)
```

Reinforcement Learning simulates gameplay to optimize designs based on iterative feedback. For example, testing variations in reel spin timings to maximize engagement.

The AI-based system according to the present invention combines advanced algorithms with diverse datasets to deliver unprecedented insights into game performance. Whether using CNNs for visual analysis, GANs for animation refinement, or Monte Carlo simulations for probability modeling, the system evaluates one or every facet of a game, from its mechanics to math to its emotional impact. By accommodating both rich and sparse datasets, the AI-based system adapts to different scenarios, predicting success or failure and guiding the creation of innovative, engaging games. This comprehensive system represents an advancement in slot game development, ensuring games meet evolving player preferences and market demands with precision and creativity.

The algorithms and methods described herein provide a robust foundation for optimizing AI-driven slot machine game development. However, those skilled in the art will recognize that alternative approaches can yield comparable results, and the methods outlined should not be considered absolute. As machine learning technology continues to advance, new or improved techniques are likely to emerge, further enhancing the efficiency and capabilities of the system without altering its fundamental principles of the present invention. This flexibility ensures that the present invention remains adaptable and relevant in a rapidly evolving technological landscape.

It is important to emphasize that while the AI-based system and its associated algorithms offer a comprehensive approach, not all components are required for the system to deliver utility. The modular nature of the design allows for incremental adoption, enabling the system to evolve and learn over time. Even implementing a fraction of the described methods or parameters provides a platform that significantly outperforms traditional human-driven game development, which often relies on intuition and guesswork, even when informed by experience.

As the AI-based system(s) can continually refine its capabilities through machine learning, it will unlock new opportunities for innovation in game design, streamlining workflows, and delivering insights that would be difficult if not impossible for humans to achieve. This dynamic and iterative nature of the present invention ensures the system(s) remains at the forefront of slot machine game development.

Embodiments of the present invention relate to specialized AI-driven quality assurance (QA) systems and methods for testing and reviewing slot machine style games. By leveraging access to some or even all game assets, including source code, math files, graphic files, animation files, sound files, etc., the system automates the QA process to detect, report, and resolve errors across various game facets or even every aspect of game development. The embodiments of the present invention aim to streamline QA, enhance game quality, and ensure compliance with regulatory and player expectations.

Slot machine game development traditionally involves labor-intensive QA processes performed by human testers. These processes include examining programming code, verifying mathematical calculations, evaluating graphics, animation, sound assets, etc., for errors that could compromise game performance, regulatory compliance, player experience, etc. Mistakes such as logic errors, incorrect payouts, distorted visuals, poorly synchronized audio, etc., often go unnoticed during manual testing, potentially leading to operational failures and regulatory breaches. The specialized AI-driven QA system addresses these challenges by partially or fully automating comprehensive testing using advanced algorithms and leveraging access to development files, when available. This ensures high-quality games while reducing development time and human labor.

The specialized AI-driven QA system performs an analysis of slot machine games, utilizing its access to game files. This access enables the system to detect issues, recommend corrective actions, and even autonomously resolve errors with high accuracy. It evaluates some or all critical components of a game, including programming code, mathematical logic, graphics, animations, sound design, etc.

The methods and algorithms previously described in detail for analyzing various aspects of slot games, including but not limited to game code, mathematics, graphics, animations, and sound, may also be employed as part of the AI-driven quality assurance (QA) system. These algorithms, individually or in combination, are integral to the QA system's ability to identify errors, optimize performance, improve game characteristics to enhance game performance, and/or ensure compliance with game specifications and regulatory requirements.

As used herein, the term "analysis", "analyze", "analyzing", and any similar terminology refers to the evaluation, interpretation, or utilization of historical game data, whether manually entered, algorithmically processed, AI-driven, or a combination thereof, to guide, optimize, or develop game design elements, game mechanics, and overall performance for a gaming machine. This encompasses a wide spectrum of methodologies, ranging from simple human observations (e.g., manually noting that a game performed above or below a casino's house average, or that dragon-themed characters outperform generic reptiles) to complex AI-driven analyses that assess extensive datasets down to the finest detail, such as individual pixel performance, game math optimizations, and real-time player engagement patterns.

The analysis may be based on casino-reported data, internally generated statistics, third-party market intelligence, or external sources such as competitor game performance, biometric feedback, and industry trend reports. By considering both qualitative insights and quantitative data models, this analysis ensures a broad and evolving approach to game optimization.

One of the most widely recognized and industry-accepted metrics in evaluating slot machine performance is "win per unit per day" (WPUPD), calculated as the average daily net revenue generated by a gaming machine. Casinos frequently compare individual game WPUPD against an established house average to assess performance. A baseline factor of 1.00× represents the casino's average WPUPD, with games exceeding this (e.g., 2.00×, indicating double the average WPUPD) performing well, while underperforming games (e.g., 0.20×, indicating only 20% of the average WPUPD) may be reconfigured or replaced.

The analysis of past game performance may rely on WPUPD trends collected through manual reporting by casino operators or AI-driven assessments of thousands of machines across multiple venues. Additionally, market research firms such as Eilers & Krejcik Gaming, Reel Metrics, and others provide WPUPD and game performance reports, which can further contribute to the analytical framework.

Beyond WPUPD, the analysis of past game performance may incorporate a range of additional key performance indicators (KPIs) commonly used in the gaming industry, including but not limited to: Occupancy percentage: The percentage of time a gaming machine is actively played relative to its availability on the casino floor. Average bet size: The average wager per spin, providing insight into player behavior and game appeal to different betting demographics. Session length and time on device, the duration of an average gameplay session, which can indicate engagement levels and player retention. High vs. low win amounts: The distribution of small, medium, and large payouts, influencing perceived entertainment value. Days on the casino floor: The lifespan of a game before its revenue generation declines, which may prompt replacement or redesign. Volatility index and hit frequencies: The statistical likelihood of winning spins and payout distributions, shaping the player's perception of risk and reward. Player retention and return rates: Data measuring whether players repeatedly engage with a specific game or abandon it for alternatives.

These metrics may be manually entered, automatically recorded, or analyzed using AI models that detect trends and optimize future game development. Those skilled in the art will recognize that the performance examples listed, only represent a small subset of all possible performance metrics.

The analysis of past game performance may range from basic human-entered insights to highly sophisticated AI-driven assessments such as manual input & observation. Casino operators, designers, or analysts may enter simple performance evaluations such as noting whether a game meets or exceeds house averages. Additional qualitative insights. such as which themes, colors, sounds, or character types resonate with players, can be documented manually to inform future designs. For example, industry professionals may observe that Asian-inspired aesthetics featuring red and gold hues tend to sustain stronger WPUPD than Western-themed games with muted color palettes. Similarly, games featuring licensed intellectual property (e.g., movies, celebrities, or sports teams) may perform better than original, non-branded content, AI-Driven Data Processing: Advanced machine learning models can process billions of gameplay records to identify and refine optimal game features. AI may analyze pixel placement for graphical elements, volatility models, bonus round engagement levels, and even audio feedback optimization to enhance player retention and maximize revenue. Biometric and behavioral analysis may incorporate biometric feedback, including eye-tracking heat maps, facial expression analysis, and heart rate monitoring, to assess how players react to various game elements. These insights can guide design decisions such as the ideal timing for visual effects, sound effect variations, and bonus round structuring to maintain player engagement.

The term "analyze", "analysis" or "analyzing" and/or similar also extends to evaluating competitor games, either through manual assessments by industry experts or AI-driven video analysis of competing slot machines in operation. AI models may track player engagement trends, payout cycles, and gameplay mechanics from competitor games to predict which design elements are likely to succeed in future releases.

Furthermore, AI-driven analysis may incorporate regional market data, demographic preferences, and cultural influences affecting game performance. For example: A Las Vegas casino with a high volume of tourists may benefit from low-volatility, high-entertainment games designed for short-term play sessions, while a local casino with repeat customers may require higher volatility games that maintain long-term player engagement and reward loyalty, while a specific geographic market may show a preference for historically themed games, while another favors modern, pop-culture-based themes.

AI-driven models can adapt to shifting player behavior, seasonal trends, and competitive pressures, ensuring that new game designs align with market demands.

The analysis of past game performance is normally not a static process; it is a continuously evolving and adaptive methodology. AI-driven game design systems may refine game elements in real-time based on incoming player data or use past performance insights to guide the creation of next-generation gaming experiences.

For example, a game launch with an initial WPUPD of 0.80× may be dynamically adjusted over time by modifying the bonus round frequency, bet multipliers, return-to-player (RTP) percentages, visual engagement factors (e.g., color enhancements, animation timing), sound design (e.g., adjusting background music or jackpot celebration sounds), etc.

By analyzing decades of historical game data, from mechanical reel slot machines to modern AI-driven digital slots, AI can anticipate industry shifts and shape the future of game development.

Whether the analysis is as simple as a human noting a dragon character's popularity or as complex as an AI-driven system processing terabytes of gameplay data, all variations fall under the scope of phrase or term "including the analysis of past game performance", "analyzing game performance", and similar terminology which may be part of the AI-driven QA system and process as a whole.

For instance, in one embodiment, algorithms such as Convolutional Neural Networks (CNNs) and Generative Adversarial Networks (GANs), previously detailed for graphic and animation analysis, are utilized to detect and correct inconsistencies in visual assets or missing animation frames. Similarly, mathematical algorithms like Monte Carlo simulations, Bayesian networks, and Gradient Boosting Machines (GBMs) may be applied to verify Return to Player (RTP) calculations, payout structures, and statistical fairness of game outcomes. Programming code analysis may incorporate Natural Language Processing (NLP) for error detection and logic validation, while sound analysis can leverage tools such as Mel-Frequency Cepstral Coefficients (MFCCs) and Recurrent Neural Networks (RNNs) to ensure audio quality and synchronization.

By employing these algorithms in a QA context, the system automates the detection and resolution of defects or issues, ensuring that all game components function as intended and meet the desired quality standards. Furthermore, these algorithms enable the QA system to perform individual or holistic analysis, correlating findings across multiple domains to ensure consistency and coherence in the overall game design. Thus, the methods and algorithms previously described are not only applicable to the analysis of slot games but also foundational to the operation of the AI-driven quality assurance system.

In one embodiment, a media encoding and transcoding router is utilized for leveraging AI to process video, audio, or image files, converting, compressing, or optimizing them into formats suitable for diverse devices and platforms. This technology routes media files through workflows to ensure compatibility, reduce file sizes for efficient storage or transmission, enhance overall quality, and apply sophisticated AI-driven enhancements such as resolution upscaling, noise reduction, and real-time format adaptation. Operating with minimal or no human intervention, such routers streamline complex tasks into automated, precise operations. Those skilled in the art will recognize that a media encoding and transcoding router may perform any one or combinations of these functions while still being classified as a media encoding and transcoding router.

Those skilled in the art will recognize the term media encoding and transcoding router broadly refers to any device, system, software, or combination thereof capable of processing media files, such as video, audio, or images, by modifying, encoding, transcoding, compressing, or optimizing them for compatibility, performance, or quality enhancement. This includes AI-driven or automated processes that adjust bit rates, apply real-time format conversions, enhance resolution, or optimize content for different devices and platforms. Any variation in naming, implementation, or integration does not exclude a system from falling under this definition, provided it performs one or more of these core functions. The media encoding and transcoding router may operate using AI-driven or algorithmic processes to achieve one or more of the following: change input data to a different media format or consolidate multiple input data types into a specific file format, route and direct the processed media to a specific neural network for transformation or further processing within an AI-driven pipeline, select an output based on a higher probability variable, wherein the router or associated AI system evaluates multiple possible outputs and determines the suitable result based on statistical inference, probability weighting, confidence scores, or other machine learning-based selection methods.

One of the core functions of an AI-driven media encoding and transcoding router is to evaluate multiple possible outputs and make an informed selection. If the system does not prioritize an output based on probability weighting or does not generate an output at all, it essentially becomes a non-intelligent, passive system rather than an active AI-driven decision-making tool. Without probability-based selection or higher probability output, the system might default to random, arbitrary, or inefficient choices, reducing consistency and performance. If no output is selected, the system fails to complete its intended task, making it non-functional for real-world applications.

AI-based systems rely on training data, inference models, and complex processing to improve efficiency and automation. If the system does not select an optimal or even viable output, it wastes computational resources by running calculations without producing a useful result. In real-time applications (e.g., live video transcoding or AI-enhanced image processing), failing to select an output could cause latency issues, errors, or complete system failure. In batch processing applications, the system may generate multiple outputs with no ranking or selection, requiring manual intervention, which greatly negates the benefits of AI-driven systems.

When direct access to source code is available, the specialized AI-driven QA system examines logic structures, syntax, and overall functionality to identify defects or issues such as syntax errors, logic flaws, performance inefficiencies, compatibility problems, etc. For example, the system can pinpoint a missing semicolon causing bonus rounds to fail or detect an inefficient loop leading to slow performance. Similarly, the specialized AI-driven QA system verifies the accuracy of mathematical calculations governing the game's RTP, payout probabilities, progressive jackpots, etc. By analyzing math files, the system ensures correct payout structures, symbol probabilities, and jackpot growth or incrementation mechanics, identifying errors such as misaligned probabilities, miscalculated RTP values, regulatory compliance, etc.

In one embodiment, the system evaluates graphical assets for quality and technical consistency, flagging issues like incorrect aspect ratios, poor resolution, missing textures, inconsistent color schemes, etc. For instance, the specialized AI-driven QA system can detect a reel symbol rendered at a resolution too low for modern displays, causing pixelation. Animation files are reviewed for smoothness, synchronization, frame continuity, etc., with the system identifying missing frames, choppy playback, or poorly synchronized animations. In sound design, the specialized AI-driven QA system examines audio files for clarity, volume balance, and synchronization with visual elements. AI-driven QA system detects problems such as imbalanced sound effects, distorted audio, or improper triggered cues, such as jackpot sounds playing at incorrect times.

The QA system operates in various embodiments to accommodate varying levels of automation and may be utilized independently or in any combination. In an identification-only embodiment, AI-driven QA system detects defects or issues across all components, logs them with detailed explanations, and presents them for human review. Once developers make corrections, the specialized AI-driven QA system reruns QA tests and simulations to verify that the issues are resolved. In this embodiment, the system not only identifies issues but also suggests corrective actions based on best practices and its training data. Developers can either implement the recommendations manually or approve automatic corrections. Another embodiment is autonomous, where the specialized AI-driven QA system identifies and resolves issues independently. For example, AI-driven QA system might fix a missing bracket in the code, re-render a distorted graphic, or adjust sound levels for consistency, etc. After applying corrections, the system logs its actions and conducts simulations to ensure that all fixes are effective, and no new errors have been introduced. Moreover, the AI-driven QA system may recommend or autonomously apply changes to game mechanics, math, animations, etc., to enhance game performance.

The system utilizes advanced algorithms tailored to each component of the game. Programming code and mathematical logic may be analyzed using NLP, Bayesian networks, Monte Carlo simulations, and GBMs. Graphical and animation files are evaluated using CNNs and GANs, which detect and optimize visual inconsistencies. Sound analysis employs algorithms such as Mel-Frequency Cepstral Coefficients (MFCCs) and recurrent neural networks (RNNs) to evaluate sound quality, timing, and synchronization.

After detecting and correcting defects or issues, the system may conduct simulations to validate the integrity of the game. By running thousands or millions of simulated spins, the system verifies that all identified issues have been resolved, mathematical models are consistent, and gameplay functions correctly under various scenarios. This ensures that no new errors are introduced during the correction process and that the game operates as intended.

The specialized AI-driven QA system offers significant advantages over traditional manual testing methods. By leveraging access to game assets, AI-driven QA system performs comprehensive analysis and detects errors that may be missed by human testers. AI-driven QA system's ability to recommend or autonomously apply corrections reduces development time and ensures a consistent level of quality across all components and adheres to gaming regulations. The system's scalability allows it to handle multiple games simultaneously, making it ideal for large-scale development projects. Additionally, AI-driven QA system's advanced algorithms provide unparalleled accuracy in identifying and resolving complex issues, improving overall game reliability, player satisfaction, optimizing game performance characteristics, etc.

The specialized AI-driven QA system optimizes slot machine game development by automating the detection, reporting, and resolution of defects or errors across all critical components. AI-driven QA system's ability to leverage access to source code, math files, graphics, animations, sound files, etc., ensures a thorough and precise QA process. By accommodating varying levels of automation, identification-only, recommendation-based, and fully autonomous, the system integrates seamlessly into diverse workflows, enhancing efficiency while maintaining high standards. This sets a new benchmark for quality assurance in the gaming industry, ensuring the production of engaging, reliable, and compliant games while reducing development costs and timelines.

A critical requirement for deploying a slot machine game in any regulated gaming jurisdiction is that it must undergo rigorous testing and certification to ensure compliance with regulatory standards. This process, typically conducted by specialized independent testing laboratories such as Gaming Laboratories International (GLI) or BMM Testlabs, is highly complex, time-consuming, and expensive. These testing organizations evaluate various aspects of the game, including its math models, software integrity, hardware reliability, security features, help screens, etc., to ensure that the game operates as intended and adheres to all regulatory requirements.

Despite extensive internal QA testing conducted by the game manufacturer before submission, errors or issues often surface during the testing laboratory's evaluation. When this occurs, the testing laboratory may reject the game and require the manufacturer to correct the identified problems before resubmitting the game for validation. This process of correcting and resubmitting the game for further testing is commonly referred to as a "respin." Respins are themselves complex, time-consuming, and costly. Depending on the severity and nature of the issues, respins may range from a single round of corrections to multiple iterations, significantly delaying the game's deployment and adding significant cost for the manufacturer.

Even after internal QA by the manufacturer and certification by a testing laboratory, problems can still arise when the game is placed into operation on casino floors. In such cases, the manufacturer may need to contact the casino operator and request that the affected games be taken offline to implement repairs. Typically, this involves removing the game's original software, clearing the RAM, and installing updated or corrected software via a new solid-state drive (SSD) or similar. While inconvenient and disruptive, these field repairs are critical to maintaining game integrity and player trust.

The consequences of undetected defects or issues can escalate further if the problems involve incorrect payouts, especially those resulting in overpayments to players. In such scenarios, casino operators may suffer significant financial losses until the issue is identified and resolved. Manufacturers are often required to reimburse the casino for these losses, which can amount to hundreds of thousands or even millions of dollars. These incidents not only damage the manufacturer's reputation but can also lead to strained relationships with its casino clients. To mitigate these risks, many manufacturers purchase specialized insurance policies designed to cover financial losses associated with flawed game code and/or game malfunctions.

The potential for such catastrophic issues underscores the importance of robust QA and certification processes. A single undetected flaw can result in substantial financial repercussions and damage to brand credibility. Testing laboratories play a vital role in identifying and resolving these issues, but the iterative nature of the process, particularly with respins, highlights the inefficiencies and costs involved in current practices. Innovations in specialized AI-driven QA systems help manufacturers detect and resolve defects or issues more effectively before submitting games for certification, reducing the likelihood of respins and post-deployment failures. Such advancements significantly lower costs, improve time-to-market, and enhance the overall reliability of slot games in regulated environments.

As noted above, GLI is a globally recognized authority in gaming certification and testing, ensuring that slot machines comply with regulatory gaming standards in jurisdictions worldwide. GLI testing protocols, particularly those outlined in technical standards like GLI-11 for gaming devices, cover every critical aspect of slot machine functionality, security, compliance, etc. These protocols ensure that slot machines meet strict requirements for randomness, fairness, reliability, and player protection.

A key element of GLI testing is the evaluation of the Random Number Generator (RNG). The RNG must demonstrate true randomness, unpredictability, and non-repeatability to ensure fair outcomes and the RNG may be either hardware or software based. Statistical tests, such as chi-squared analysis, frequency tests, and runs tests, are applied to validate randomness, while entropy analysis ensures the randomness source is secure and reliable. Alongside RNG testing, GLI rigorously examines the mathematical models underlying the slot machine games. Typically, this function is manually performed by a game mathematician using tools like Excel or similar. These tests verify the RTP percentage, hit frequency, jackpot mechanics, etc., ensuring payouts and probabilities align with the game's specifications and regulatory requirements.

GLI protocols also involve comprehensive functionality testing to confirm that all game features work as intended under various conditions. This includes verifying paylines, payouts, bonus triggers, special features like multipliers or free spins, etc. Hardware components, such as bill validators, printers, and touchscreens, undergo durability and performance tests, while physical security measures, including locks and access controls, are examined to prevent tampering or fraud. Furthermore, GLI tests software security by authenticating the code running on the machine, evaluating encryption mechanisms, and ensuring secure storage and communication of sensitive data.

Error handling is another critical area of GLI testing. Slot machines must demonstrate reliable recovery from unexpected scenarios, such as power outages, communication interruptions, or hardware malfunctions. Additionally, regulatory-specific requirements, such as responsible gaming features (e.g., bet limits, self-exclusion tools) and localization for language and currency, are tested to meet the jurisdictional standards where the machine will operate.

The certification process includes an extensive validation of game logic. GLI tests the logical flow of the game, ensuring all game states, transitions, and outcomes operate as intended. For example, base game outcomes must transition seamlessly into bonus rounds, jackpots must trigger as specified, and all gameplay scenarios must be accounted for. Once testing is complete, GLI provides a certification report, summarizing the tests conducted, results achieved, and any recommendations for adjustments. This certification report is essential for demonstrating compliance with regulatory authorities. Once a game is approved and certified, the testing laboratory issues compliance letters for desired gaming jurisdictions in what is referred to as the "letter writing" process or stage, with a fee for each letter.

The disclosed specialized AI-driven QA system can play a pivotal role in supporting pre-certification testing to streamline compliance with GLI protocols. By analyzing game assets, such as source code, math files, graphics, etc., the specialized AI-driven QA system can identify and resolve issues before submission to GLI. For example, the specialized AI-driven QA system can simulate millions or even billions of game rounds to verify RNG behavior, RTP accuracy, hit frequencies, etc., with statistical precision. AI-driven QA system can also identify edge cases in game logic that manual testing might overlook, ensuring all possible gameplay scenarios are validated. Additionally, the specialized AI-driven QA system can test and optimize visual, sound, animation elements, etc., further reducing the likelihood of issues during GLI certification.

GLI testing protocols are an essential part of ensuring slot machine compliance, fairness, and reliability. The specialized AI-driven QA system complements these protocols by automating error detection and resolution, enhancing accuracy, and reducing development time. Together, these processes ensure high-quality slot machines games that meet regulatory standards while providing a secure and engaging player experience.

These organizations perform rigorous certification processes that involve extensive manual testing of source code, mathematical models, graphics, animations, sound files, etc. This process is labor-intensive, time-consuming, and expensive, with certification timelines sometimes stretching over several months. Manufacturers bear significant costs and may face further delays when defects or issues are identified, necessitating corrections and resubmission for additional testing. A specialized AI-driven QA system presents a transformative opportunity for these laboratories, automating much of the certification process and significantly reducing timelines and costs while enhancing accuracy.

With access to all game assets, including source code, math files, graphics, animations, sound, etc., the specialized AI-driven QA system can systematically evaluate virtually every aspect of a slot machine game. For programming code, the specialized AI-driven QA system leverages machine learning models to identify syntax errors, logic flaws, and inefficiencies that could cause crashes, unintended behavior, or slow performance. Mathematical validation is performed using statistical algorithms and simulations to verify RTP calculations, payout probabilities, and progressive jackpot mechanics, ensuring compliance with game specifications and regulatory requirements. Graphical assets are analyzed using CNNs to detect issues such as incorrect resolutions, aspect ratios, or missing textures, while GANs refine animations and address problems like skipped frames or poor synchronization. Audio files are reviewed with tools like MFCCs and RNNs to identify distortions, imbalanced volumes, or improperly triggered sound cues.

The specialized AI-driven QA system excels in simulating gameplay at scale, running millions of game rounds in a fraction of the time required for manual testing. This ensures the randomness and fairness of outcomes, validates the proper functioning of bonus triggers, and uncovers low-probability edge cases that might be missed by human testers. Edge cases, such as rare jackpot combinations or unusual gameplay scenarios, are detected through exhaustive testing of all possible game states, addressing a critical gap in traditional certification processes.

By automating large portions of the certification workflow, the specialized AI-driven QA system significantly reduces testing timelines, potentially shrinking them from months to days. Tasks that previously required extensive human involvement, such as verifying mathematical models or testing gameplay scenarios, can now be completed with far greater efficiency. This acceleration allows manufacturers to bring games to market faster, minimizing delays and reducing associated costs. Laboratories, in turn, can handle a higher volume of certifications without increasing their staff or resources, lowering overall expenses for manufacturers while maintaining or even improving testing standards.

The system's enhanced accuracy further strengthens the certification process. Human testing is limited by time, resources, and the potential for oversight, whereas the specialized AI-driven QA system can analyze every scenario with consistency and precision. This reduces the likelihood of post-deployment issues, such as incorrect payouts or malfunctions, that could result in costly recalls or regulatory penalties. Over time, the system could evolve to fully automate the certification process, with human involvement limited to mechanical testing and final oversight and approval, streamlining workflows and further reducing costs.

For manufacturers, the adoption of AI-driven QA technology means faster certification, fewer respins, and reduced testing fees. The improved reliability of the certification process also mitigates the risk of costly errors or malfunctions after deployment, enhancing brand reputation and customer satisfaction. For testing laboratories, the specialized AI-driven QA system enables them to increase throughput and expand their certification capacity without compromising quality.

The specialized AI-driven QA system represents an advancement in the slot machine certification process for organizations like GLI and BMM Testlabs. By automating complex and labor-intensive tasks, the system drastically reduces certification timelines and costs while achieving a higher standard of accuracy and reliability. Its ability to detect low-probability edge cases and validate comprehensive compliance with regulatory standards makes it a superior alternative to traditional manual testing.

Building on the foundational capabilities as described above, which focus on identifying and resolving technical issues, the following embodiments extend the scope of a specialized AI-driven QA system to include predictive analysis aimed at improving player acceptance and overall game performance. This approach evaluates programming, math, graphics, animations, sound files, etc., not only for functionality but also for their alignment with player preferences. The specialized AI-driven QA system analyzes these elements individually or holistically, providing actionable recommendations designed to optimize gameplay, enhance engagement, and increase revenue potential. By predicting player likes and dislikes, the system identifies opportunities for improvement, generating logs with detailed suggestions that human developers can review and implement, often with AI assistance.

In programming, the specialized AI-driven QA system evaluates gameplay mechanics and responsiveness, recommending adjustments that enhance the pacing and flow of the game. For example, if reel spin times are too short, such as under 2.1 seconds, the specialized AI-driven QA system might suggest adding 0.3 seconds to create a more satisfying visual progression. Conversely, if spin times are excessively long, such as 5.9 seconds, the specialized AI-driven QA system might recommend shortening them by 3.1 seconds to maintain player engagement and coin-in levels. The system also identifies overly extreme bounce-back effects during reel spins, which can detract from realism, suggesting smoother animations to align with player expectations. Memory management issues, such as memory leaks that degrade game performance over time, are flagged for resolution, while code conflicts that cause unintended behaviors are pinpointed for correction. Additionally, the specialized AI-driven QA system is configured to suggest enhancing gameplay elements like bonus round transitions or jackpot animations to ensure seamless and visually appealing experiences that resonate with players.

In the realm of mathematics, the specialized AI-driven QA system focuses on balancing volatility, RTP, payout structures, etc., to align with player preferences. If the base game volatility is too high, resulting in long stretches of play without wins, the specialized AI-driven QA system recommends adjustments to create a steadier stream of smaller payouts, fostering a sense of progress. For bonus rounds, the specialized AI-driven QA system might suggest increasing volatility to heighten excitement, offering players a chance at larger, more dramatic rewards. The system analyzes the RTP relationship between base and bonus games, recommending increases to the base game RTP if it is disproportionately low, ensuring players remain engaged outside of bonus rounds. Pay tables are scrutinized for their standard deviation and coefficient of variation; if these metrics fall outside optimal ranges, the specialized AI-driven QA system proposes adjustments to create a more balanced distribution of payouts. For example, if a pay table heavily skews toward rare, high-value rewards, leaving the lower and mid-tier rewards underutilized, the system may recommend redistributing payouts to improve player satisfaction.

Graphics play a critical role in capturing and maintaining player interest, and the specialized AI-driven QA system evaluates visual elements for their thematic consistency and appeal. For instance, in a game like Cleo's Cash, the specialized AI-driven QA system might identify that a plain desert background lacks the immersive quality players expect in an Egyptian-themed game and suggest replacing it with imagery of pyramids and/or the Sphinx. Similarly, if progressive jackpot frames use modern neon lighting graphics and animations inconsistent with the historical setting, the specialized AI-driven QA system may recommend and/or generate ornate gold frames reflective of the Egyptian period. Graphics with incorrect aspect ratios or resolutions that result in distorted visuals are flagged for re-rendering or resizing. Beyond these fixes, the specialized AI-driven QA system might propose more dramatic visual enhancements, such as adding animated visual effects to progressive jackpot meters or refining character designs to make them more expressive and appealing.

Animations are another area where the specialized AI-driven QA system can significantly enhance player engagement. Missing or incomplete animations, such as those for special reel symbols, are identified and flagged, with the specialized AI-driven QA system recommending new animations to highlight these elements and draw player attention. If animations run too long, negatively impacting the number of games played per hour, the system suggests shortening them to balance visual appeal with gameplay efficiency. For example, a jackpot animation that plays for 11 seconds might be reduced to 4 seconds to maintain excitement without disrupting the game flow or coin-in. Similarly, if frame rates are below 60 FPS or another predetermined level, the specialized AI-driven QA system recommends interpolating additional frames, leading to an acceptable frame rate to improve smoothness. For bonus round transitions, the specialized AI-driven QA system could suggest incorporating dynamic animations, such as cascading symbols or a character interaction, to create a more memorable experience.

Sound is a vital component of player immersion, and the specialized AI-driven QA system reviews audio files for balance, quality, and alignment with gameplay. If the volume of certain sounds is disproportionate, such as a win celebration sound that drowns out background music, the system recommends adjustments to stabilize the audio experience. Equalization issues, where certain frequencies are overly sharp or muted, are flagged for correction. Sounds perceived as annoying or offensive, such as repetitive or overly harsh effects, are identified and replaced with alternatives that align better with player preferences. For example, a small win celebration sound might be toned down or replaced with a subtle chime, while major jackpot sounds are enhanced for greater impact. The specialized AI-driven QA system also evaluates sound synchronization, ensuring that effects like reel stops or bonus triggers occur in perfect harmony with the visuals.

In one embodiment, the specialized AI-driven QA system operates holistically, analyzing all components simultaneously to ensure that recommended changes across programming, math, graphics, animations, sound, etc., work cohesively. For instance, if the specialized AI-driven QA system suggests increasing reel spin times, it also evaluates how this adjustment impacts animations, sound effects, and game pacing. By considering the interplay of all elements, the system ensures that changes enhance the overall player experience rather than creating unintended conflicts.

This collaborative model relies on human developers to review and implement AI-generated recommendations. Logs are detailed, explaining the rationale behind each suggestion and its anticipated impact on player engagement and game performance. Human developers can use AI-assisted tools to refine solutions, such as interpolating missing animation frames or rebalancing audio levels, ensuring creative control remains intact while leveraging the system's analytical power.

The enhancements offered by the embodiments of the present invention enable slot machine games to achieve higher levels of player satisfaction, retention, and revenue generation. By identifying and addressing potential shortcomings before deployment, the system reduces the likelihood of post-release adjustments and associated costs. This approach not only improves the technical and aesthetic quality of games but also ensures that they resonate more deeply with players, fostering longer play sessions and greater loyalty.

A partial or fully automated embodiment of the present invention represents a more advanced implementation of a specialized AI-driven QA system for slot machine games, building on the capabilities of the prior described embodiment but eliminating the need for human involvement in identifying and implementing changes. In this partial or fully automated system, the specialized AI-driven QA system not only detects issues and opportunities for improvement but also autonomously applies the necessary changes to optimize game performance and player acceptance. By leveraging machine learning and advanced algorithms, the system ensures games are fully optimized across programming, math, graphics, animations, sound, etc., without requiring manual intervention. This approach drastically reduces development time, enhances accuracy, and enables manufacturers to deliver high-performing games that resonate with players more efficiently.

The specialized AI-driven QA system of this embodiment directly accesses and autonomously adjusts most or all game assets, source code, math files, graphics, animations, sound, etc., to optimize performance. Each component is analyzed and refined with minimal or no human oversight, ensuring seamless integration of changes that enhance the game's appeal and functionality. In one embodiment, extensive logs are created to memorialize any defects or changes.

In programming, the specialized AI-driven QA system evaluates the codebase for gameplay mechanics, responsiveness, efficiency, etc. For example, if reel spin times fall outside the optimal range for player engagement, the system automatically adjusts them to between 2.6 and 2.8 seconds, ensuring a satisfying pacing and acceptable coin-in levels. Overly extreme reel bounce-back effects are smoothed automatically to align with player expectations, while memory leaks or inefficiencies in code structure are identified and repaired in real time. Conflicting logic in the code is resolved autonomously, ensuring smooth operation and eliminating the risk of game freezes or unintended behaviors. Additionally, the specialized AI-driven QA system can dynamically optimize gameplay elements such as bonus transitions or the timing of reel stops to create a more polished experience.

In mathematical optimization, the specialized AI-driven QA system analyzes and adjusts volatility, RTP, payout structures, etc., to align with player preferences. For instance, if the base game volatility is too high, leading to long stretches without wins, otherwise known as "cold streaks", the system autonomously recalibrates the payout frequency to offer more consistent rewards. Conversely, if bonus games lack excitement due to low volatility, the specialized AI-driven QA system increases the reward range to create a more thrilling player experience. The system automatically adjusts RTP ratios between the base game and bonus rounds, ensuring a balance that retains players during regular gameplay while maintaining the allure of high-stakes bonus rounds. Pay tables are refined by analyzing their standard deviation and coefficient of variation, with the specialized AI-driven QA system redistributing payouts to balance small, medium, and large wins in a way that enhances player satisfaction. If overall RTP values are incorrect, the system recalculates and applies changes, prioritizing modifications that maximize player enjoyment, such as favoring medium-tier wins over negligible payouts.

For graphics, the specialized AI-driven QA system autonomously evaluates and modifies visual elements to enhance thematic consistency and appeal. For example, in a game like Cleo's Cash, the specialized AI-driven QA system might detect that the existing plain desert background lacks immersive appeal and replace it with a detailed Egyptian landscape featuring pyramids, camels, chariots, and the Sphinx. Progressive jackpot frames designed with modern neon lights could be replaced with ornate gold frames consistent with the game's historical setting, without requiring human input. Graphics with incorrect aspect ratios or resolutions are automatically resized or re-rendered by the system, ensuring visual consistency across all assets. The specialized AI-driven QA system might also enhance minor visual details, such as adding subtle visual effects to jackpot meters or refining character animations for a more dynamic presentation.

In animation, the specialized AI-driven QA system identifies and resolves issues such as missing frames, excessive animation lengths, and low frame rates. For example, if a jackpot animation is overly long and disrupts the number of games played per hour, the system shortens it to a duration that maintains excitement without slowing gameplay. Missing frames in animations are interpolated and added seamlessly, ensuring smooth motion, while animations for special symbols that are absent are generated and inserted autonomously. For instance, if frame rates fall below 60 FPS, the system enhances the animation quality by interpolating additional frames or refining existing sequences. Bonus round transitions might also be improved with new animations generated by the specialized AI-driven QA system to create more memorable and visually engaging player experiences.

Sound optimization is fully automated, with the specialized AI-driven QA system analyzing audio files for volume balance, clarity, and alignment with gameplay. If sound effects are too loud or too soft relative to other audio elements, the specialized AI-driven QA system adjusts their volumes to create a cohesive audio experience. Equalization issues, such as overly sharp or muted frequencies, are resolved automatically. Sounds that are identified as offensive or annoying, such as repetitive or jarring effects, are replaced with alternatives that better suit the game's theme and tone. For example, if the celebration sound for a small win is disproportionately dramatic, the system reduces its intensity or replaces it with a more subtle chime. Major win sounds are enhanced for greater impact, ensuring that audio cues align with player expectations and enhance the overall experience.

One of the key strengths of this embodiment is its holistic approach. Changes made in one area, such as reducing reel spin times, are automatically evaluated for their impact on related components, such as sound timing or animation pacing. This ensures that all adjustments work cohesively, creating a seamless and polished final product. For example, if the specialized AI-driven QA system shortens reel spin times, it simultaneously adjusts the corresponding sound effects and animation lengths to maintain synchronization and player immersion.

After making adjustments, the specialized AI-driven QA system conducts extensive simulations to validate the changes and ensure the game functions optimally. Thousands or millions of game rounds are simulated to confirm that payout structures, RTP values, bonus triggers, and other mechanics are working as intended. The system also evaluates player-centric metrics, such as engagement potential and session durations, predicting the game's performance in real-world settings. If further refinements are needed, the specialized AI-driven QA system iteratively adjusts and revalidates the game until all metrics align with desired outcomes.

The fully automated nature of this embodiment offers unprecedented efficiency, reducing the time required for game optimization from weeks or months to mere hours or days. By eliminating the need for human intervention, the system minimizes labor costs while achieving far greater accuracy in detecting and resolving issues. The specialized AI-driven QA system's ability to analyze and refine virtually every aspect of the game holistically ensures that all components work together seamlessly, delivering an optimal player experience. Additionally, the system's capacity to identify and address low-probability edge cases that might elude human testers further enhances game reliability and reduces post-launch issues.

This embodiment represents a higher-level specialized AI-driven QA system, partially or fully automating the process of detecting, resolving, and optimizing game elements to improve player acceptance and performance. By autonomously refining programming, math, graphics, animations, sound, etc., the system ensures that slot machine games meet the highest standards of quality and appeal. Using the holistic approach, advanced simulation capabilities, and rapid processing times make the AI-driven QA system detailed herein an invaluable tool for manufacturers seeking to deliver engaging and high-performing games to market with unmatched efficiency and precision at greatly reduced development time and cost.

A media encoding and transcoding router, as described herein, refers to any system, device, software, or combination thereof that utilizes AI or other computational techniques to convert, compress, optimize, enhance, adapt media files, etc., including but not limited to video, audio, images, etc., for compatibility across different devices, platforms, or formats. This includes routing media through various processes such as resolution scaling, noise reduction, format conversion, bit rate adjustment, real-time adaptive streaming, etc., with modest or even no human intervention. Those skilled in the art will understand that variations in implementation, naming conventions, specific feature sets, etc., do not exclude a system from being considered a media encoding and transcoding router as described herein even if the media encoding and transcoding router may be referred by a different name.

Those skilled in the art will also recognize a media encoding and transcoding router encompasses any hardware, software, or hybrid system that applies AI-driven or algorithmic processes to modify, encode, transcode, or optimize media files. This includes, but is not limited to, changing formats, compressing data, enhancing quality, reducing latency, adjusting resolution, or dynamically adapting content for various playback environments. The specific terminology used to describe such a system, whether as a media encoding and transcoding router or under another term, does not limit its classification within the scope of this disclosure. Any system performing one or more of these functions falls within the definition of a media encoding and transcoding router even if the media encoding and transcoding router is referred to by another name.

The router may operate using AI-driven or algorithmic processes to achieve one or more of the following: change input data to a different media format or consolidate multiple input data types into a specific file format, route and direct the processed media to a specific neural network for transformation or further processing within an AI-driven pipeline, select an output based on a higher probability variable, as will be further described, as opposed to outputs with a lower probability variable, wherein the router and associated AI system evaluates multiple possible outputs and determines the suitable result based on statistical inference, probability weighting, confidence scores, or other machine learning-based selection methods.

In some embodiments, the router may utilize transformer-based neural networks, recurrent neural networks (RNNs), convolutional neural networks (CNNs), or other AI architectures to analyze and predict optimal or preferred output formats, compression techniques, resolution scaling, media characteristics, etc. The probability-based selection process can be determined based on one or more of the following: semantic understanding of content (e.g., recognizing speech patterns, object identification, scene analysis in video, etc.), error minimization (e.g., selecting an encoding format that results in the least data loss or highest fidelity), optimization for specific playback environments (e.g., choosing a compression method based on bandwidth constraints), inference from historical data (e.g., training the system to recognize and prioritize formats that historically yield the best results for specific applications).

Those skilled in the art will recognize the media encoding and transcoding router can function independently, as part of a larger AI-driven processing pipeline, or within a distributed computing environment. Any system that performs one or more of these tasks listed above falls within the scope of the definition of a media encoding and transcoding router, regardless of the implementation details or terminology used as those skilled in the art will recognize.

The embodiments of the present invention include utilizing the at least partially developed executable instructions or computer readable files to present and allow play of the game of chance on a gaming machine or computer. In so doing, games or portions thereof may be tested, played, and presented during all levels of development up to and including actual play in casinos and the like. The partially developed executable instructions or computer readable files may be related to EGM-based games, iGames, console games, online games, etc. Moreover, the at least partially developed executable instructions or computer readable files may relate to complete games or features thereof (e.g., sound).

The present invention should not be limited in scope to the specific embodiments described herein. Various modifications, in addition to those explicitly mentioned, will be apparent to those skilled in the art based on the description and drawings provided. Such modifications are intended to fall within the scope of the invention.

I claim:

1. A method for developing a game of chance, the method comprising: generating at least in part executable instructions or computer-readable files for the game of chance using an artificial intelligence (AI) game design system, wherein the AI game design system is at least partially trained using machine learning including analyzing past or current game of chance characteristics data and past game performance from other previously deployed games of chance, wherein at least partial development of the game of chance occurs prior to: (i) a first submission of the game of chance to an independent testing laboratory for approval or certification, or (ii) allowing play of the game of chance for real-money play in a regulated gaming environment following approval or certification by the independent testing laboratory;

wherein the past or current game of chance characteristics data comprises one or more of: source code, gameplay videos, manually entered game characteristics, media files, math files, biometric player data, player behavior data, or any combination thereof;

wherein the AI game design system is further configured or adapted using manually entered input data to update the AI game design system based on one or more of: user ratings, game design selections, game characteristics, game attributes, game elements, relative rankings, evaluative critiques, preference indicators, game performance metrics, or comparative assessments of game features or outputs, to adjust AI model parameters or associated functions;

processing input or output data using a preprocessing component utilizing a media encoding and transcoding router configured to (i) change input data type to a different media format or convert or consolidate the input data into a specific format or file type and (ii) direct the changed or consolidated input data type to a specific neural network in a transformer process and select an output with a higher probability variable and forward the converted or consolidated data to at least one neural network; and utilizing, at least in part, the executable instructions or computer-readable files to present and allow play of the game of chance for (i) an electronic a gaming machine, the electronic gaming machine including at least one of: a monetary input device configured to receive a physical item associated with a monetary value and/or enable cashless wagering, a user interface, at least one processor for running the at least partially developed executable instructions or computer-readable files related to the game of chance, a game display, and memory in communication with the at least one processor.

2. The method of claim 1, wherein the AI game design system generates one or more of: computer-readable graphic files, executable programming files, audio files, animation files, mathematical files, or quality assurance files.

3. The method of claim 2, wherein the mathematical files include volatility parameters, payout structures, return-to-player distributions, and/or bonus round configurations.

4. The method of claim 2, wherein the computer-readable graphic files include symbol designs, background artwork, themed visual assets, or visual effects.

5. The method of claim 2, wherein the audio files include win celebration sounds, background music, ambient effects, or bonus round sound effects.

6. The method of claim 2, wherein the animation files include interpolated frames, character or symbol motions, transition effects, or pacing adjustments.

7. The method of claim 2, wherein the executable programming files define game flow, logic rules, memory allocation, user responsiveness, or reel timing behavior.

8. The method of claim 2, wherein the quality assurance files include test scenarios, validation checks, output reports, or corrective suggestions relating to game performance.

9. The method of claim 1, wherein the preprocessing component media encoding and transcoding router processes media files for compatibility, formatting, compression, or playback optimization across one or more gaming platforms.

10. The method of claim 1, wherein the preprocessing component media encoding and transcoding router selects an output with a higher probability variable based on weighting, scoring estimates, or projected performance derived from AI analysis.

11. The method of claim 1, wherein the AI game design system employs supervised learning, unsupervised learning, reinforcement learning, or any combination thereof.

12. The method of claim 1, wherein the computer-readable files comprise at least one of: graphic files, sound files, animation files, programming code, or mathematical files.

13. The method of claim 1, wherein the executable instructions include one or more of: logic code for game operation, probability engines, bonus trigger mechanisms, win evaluation code, reel spin sequencing, memory allocation routines, or code governing random number generation.

14. A method for developing a game of chance, the method comprising: generating at least in part executable instructions or computer-readable files for the game of chance using an artificial intelligence (AI) game design system, wherein the AI game design system is at least partially trained using machine learning including analyzing past or current game of chance characteristics data and past game performance data, wherein at least partial development of the game of chance occurs prior to: (i) a first submission of the game of chance to an independent testing laboratory for approval or certification, or (ii) allowing play of the game of chance for real-money play in a regulated gaming environment following approval or certification by the independent testing laboratory;

wherein the past or current game characteristics data comprises one or more of: source code, gameplay videos, manually entered game characteristics, media files, math files, biometric player data, player behavior data, or any combination thereof;

wherein the past game performance data comprises one or more of: win per unit per day, occupancy rate data, coin-in, hold percentage, player bet amount, manually entered game performance data, or any combination thereof;

wherein the AI game design system is further configured or adapted using manually entered input data to update the AI game design system;

processing input or output data using a preprocessing component configured to convert or consolidate the input data into a specific format or file type and forward the converted or consolidated data to at least one neural network within a transformer-based AI system;

an electronic a gaming machine configured to utilize, at least in part, the executable instructions or computer-readable files to present and allow play of the game of chance, the electronic gaming machine including at least one of:

(i) a monetary input device configured to receive a physical item associated with a monetary value and/or enable cashless wagering;

(ii) a user interface;

(iii) at least one processor for executing the at least partially developed executable instructions or computer-readable files related to the game of chance;

(iv) a game display; and (v) a memory in communication with the at least one processor.

15. The method of claim 14, wherein the AI game design system generates one or more of: computer-readable graphic files, executable programming files, audio files, animation files, mathematical files, or quality assurance files.

16. The method of claim 15, wherein the mathematical files include volatility parameters, payout structures, return-to-player distributions, and/or bonus round configurations.

17. The method of claim 15, wherein the computer-readable graphic files include symbol designs, background artwork, themed visual assets, or visual effects.

18. The method of claim 15, wherein the audio files include win celebration sounds, background music, ambient effects, or bonus round sound effects.

19. The method of claim 15, wherein the animation files include interpolated frames, character or symbol motions, transition effects, or pacing adjustments.

20. The method of claim 15, wherein the executable programming files define game flow, logic rules, memory allocation, user responsiveness, or reel timing behavior.

21. The method of claim 15, wherein the quality assurance files include test scenarios, validation checks, output reports, or corrective suggestions relating to game performance.

22. The method of claim 14, wherein the preprocessing component processes media files for compatibility, formatting, compression, or playback optimization across one or more gaming platforms.

23. The method of claim 14, wherein the preprocessing component selects an output with a higher probability variable based on weighting, scoring estimates, or projected performance derived from AI analysis.

24. The method of claim 14, wherein the AI game design system employs supervised learning, unsupervised learning, reinforcement learning, or any combination thereof.

25. The method of claim 14, wherein the computer-readable files comprise at least one of: graphic files, sound files, animation files, programming code, or mathematical files.

26. The method of claim 14, wherein the executable instructions include one or more of: logic code for game operation, probability engines, bonus trigger mechanisms, win evaluation code, reel spin sequencing, memory allocation routines, or code governing random number generation.

27. A method for developing a game of chance, the method comprising: generating at least in part executable instructions or computer-readable files for the game of chance using an artificial intelligence (AI) game design system, wherein the AI game design system is at least partially trained using machine learning including analyzing past or current game of chance characteristics data and past game performance data, wherein at least partial development of the game of chance occurs prior to: (i) a first submission of the game of chance to an independent testing laboratory for approval or certification, or (ii) allowing play of the game of chance for real-money play in a regulated gaming environment following approval or certification by the independent testing laboratory;

wherein the AI game design system is further configured or adapted using manually entered input data to update the AI game design system;

a media encoding and transcoding router to (i) change input data type to a different media format or consolidate the input data type to a specific file type and (ii) direct the changed or consolidated input data type to a specific neural network in a transformer process and select an output with a higher probability variable; and utilizing, at least in part, the executable instructions or computer-readable files to present and allow play of the game of chance for (i) an electronic a gaming machine, the electronic gaming machine including at least one of: a monetary input device configured to receive a physical item associated with a monetary value and/or enable cashless wagering, a user interface, at least one processor for running the at least partially developed executable instructions or computer-readable files related to the game of chance, a game display, and a memory in communication with the at least one processor.

28. The method of claim 27, wherein the past or current game characteristics data comprises one or more of: source code, gameplay videos, manually entered game characteristics, media files, math files, biometric player data, player behavior data, or any combination thereof.

29. The method of claim 27 wherein the past game performance data comprises one or more of: win per unit per day, occupancy rate data, coin-in, hold percentage, player bet amount, manually entered game performance data, or any combination thereof.

30. The method of claim 27, further comprising executable programming files defining game flow, logic rules, memory allocation, user responsiveness, or reel timing behavior.

31. The method of claim 27, wherein the computer-readable files comprise at least one of: graphic files, sound files, animation files, programming code, or mathematical configuration files.

32. The method of claim 27, wherein the AI game design system employs supervised learning, unsupervised learning, reinforcement learning, or any combination thereof.

33. A system for developing a game of chance, the system comprising:

an artificial intelligence (AI) game design system configured to generate, at least in part, executable instructions or computer-readable files for a game of chance, the AI game design system being at least partially trained using machine learning including analyzing past or current game of chance characteristics data and past game performance from other previously deployed games of chance, wherein at least partial development of the game of chance occurs prior to: (i) a first submission of the game of chance to an independent testing laboratory for approval or certification, or (ii) allowing play of the game of chance for real-money play in a regulated gaming environment following approval or certification by the independent testing laboratory;

wherein the past or current game of chance characteristics data comprises one or more of: source code, gameplay videos, manually entered game characteristics, media files, math files, biometric player data, player behavior data, or any combination thereof;

wherein the AI game design system is further configured or adapted using manually entered input data to update the AI game design system based on one or more of: user ratings, designer selections, relative rankings, evaluative critiques, preference indicators, game performance metrics, or comparative assessments of game features or outputs, to adjust AI model parameters or associated functions;

a preprocessing component media encoding and transcoding router configured to (i) change input data type to a different media format or convert or consolidate input data into a specific format or file type and (ii) direct the changed or consolidated input data type to a specific neural network in a transformer process and select an output with a higher probability variable and forward the converted or consolidated data to at least one neural network;

an electronic a gaming machine configured to present and allow play of the game of chance using, at least in part, the executable instructions or computer-readable files, the electronic gaming machine including at least one of:

(i) a monetary input device configured to receive a physical item associated with a monetary value and/or enable cashless wagering;

(ii) a user interface;

(iii) at least one processor for running the executable instructions or computer-readable files related to the game of chance;

(iv) a game display; and (v) a memory in communication with the at least one processor.

34. The system of claim 33, wherein the AI game design system generates one or more of: computer-readable graphic files, executable programming files, audio files, animation files, mathematical files, or quality assurance files.

35. The system of claim 34, wherein the mathematical files include volatility parameters, payout structures, return-to-player distributions, and/or bonus round configurations.

36. The system of claim 34, wherein the computer-readable graphic files include symbol designs, background artwork, themed visual assets, or visual effects.

37. The system of claim 34, wherein the audio files include win celebration sounds, background music, ambient effects, or bonus round sound effects.

38. The system of claim 34, wherein the animation files include interpolated frames, character or symbol motions, transition effects, or pacing adjustments.

39. The system of claim 34, wherein the executable programming files define game flow, logic rules, memory allocation, user responsiveness, or reel timing behavior.

40. The system of claim 34, wherein the quality assurance files include test scenarios, validation checks, output reports, or corrective suggestions relating to game performance.

41. The system of claim 33, wherein the preprocessing component media encoding and transcoding router processes media files for compatibility, formatting, compression, or playback optimization across one or more gaming platforms.

42. The system of claim 33, wherein the selection of an output with a higher probability variable by the media encoding and transcoding router is based on weighting, scoring estimates, or projected performance derived from AI analysis.

43. The system of claim 33, wherein the AI game design system employs supervised learning, unsupervised learning, reinforcement learning, or any combination thereof.

44. The system of claim 33, wherein the computer-readable files comprise at least one of: graphic files, sound files, animation files, programming code, or mathematical files.

45. The system of claim 33, wherein the executable instructions include one or more of: logic code for game operation, probability engines, bonus trigger mechanisms, win evaluation code, reel spin sequencing, memory allocation routines, or code governing random number generation.

46. A system for developing a game of chance, the system comprising:

an artificial intelligence (AI) game design system configured to generate, at least in part, executable instructions or computer-readable files for a game of chance, being at least partially trained using machine learning including analyzing past or current game of chance characteristics data and past game performance data, wherein at least partial development of the game of chance occurs prior to: (i) a first submission of the game of chance to an independent testing laboratory for approval or certification, or (ii) allowing play of the game of chance for real-money play in a regulated gaming environment following approval or certification by the independent testing laboratory;

wherein the past or current game of chance characteristics data comprises one or more of: source code, gameplay videos, manually entered game characteristics, media files, math files, biometric player data, player behavior data, or any combination thereof;

wherein the past game performance data comprises one or more of: win per unit per day, occupancy rate data, coin-in, hold percentage, player bet amount, manually entered game performance data, or any combination thereof;

wherein the AI game design system is further configured or adapted using manually entered input data to update the AI game design system;

a preprocessing component configured to convert an input data type into a different media format or consolidate the input data into a specified file type, and to route the converted or consolidated data to at least one neural network within a transformer-based AI system;

an electronic a gaming machine configured to utilize, at least in part, the executable instructions or computer-readable files to present and allow play of the game of chance, the electronic gaming machine including at least one of:

(i) a monetary input device configured to receive a physical item associated with a monetary value and/or enable cashless wagering;

(ii) a user interface;

(iii) at least one processor for executing the at least partially developed executable instructions or computer-readable files related to the game of chance;

(iv) a game display; and (v) a memory in communication with the at least one processor.

47. The system of claim 46, wherein the AI game design system generates one or more of: computer-readable graphic files, executable programming files, audio files, animation files, mathematical files, or quality assurance files.

48. The system of claim 47, wherein the mathematical files include volatility parameters, payout structures, return-to-player distributions, and/or bonus round configurations.

49. The system of claim 47, wherein the computer-readable graphic files include symbol designs, background artwork, themed visual assets, or visual effects.

50. The system of claim 47, wherein the audio files include win celebration sounds, background music, ambient effects, or bonus round sound effects.

51. The system of claim 47, wherein the animation files include interpolated frames, character or symbol motions, transition effects, or pacing adjustments.

52. The system of claim 47, wherein the executable programming files define game flow, logic rules, memory allocation, user responsiveness, or reel timing behavior.

53. The system of claim 47, wherein the quality assurance files include test scenarios, validation checks, output reports, or corrective suggestions relating to game performance.

54. The system of claim 46, wherein the preprocessing component processes media files for compatibility, formatting, compression, or playback optimization across one or more gaming platforms.

55. The system of claim 46, wherein the preprocessing component selects an output with a higher probability variable based on weighting, scoring estimates, or projected performance derived from AI analysis.

56. The system of claim 46, wherein the AI game design system employs supervised learning, unsupervised learning, reinforcement learning, or any combination thereof.

57. The system of claim 46, wherein the computer-readable files comprise at least one of: graphic files, sound files, animation files, programming code, or mathematical files.

58. The system of claim 46, wherein the executable instructions include one or more of: logic code for game operation, probability engines, bonus trigger mechanisms, win evaluation code, reel spin sequencing, memory allocation routines, or code governing random number generation.

59. A system for developing a game of chance, the system comprising:

an artificial intelligence (AI) game design system configured to generate, at least in part, executable instructions or computer-readable files for a game of chance, wherein the AI game design system is at least partially trained using machine learning, including analyzing past or current game of chance characteristics data and past game performance data, wherein at least partial development of the game of chance occurs prior to: (i) a first submission of the game of chance to an independent testing laboratory for approval or certification, or (ii) allowing play of the game of chance for real-money play in a regulated gaming environment following approval or certification by the independent testing laborator;

wherein the AI game design system is further configured or adapted using manually entered input data to update the AI game design system;

a media encoding and transcoding router to (i) change input data type to a different media format or consolidate the input data type to a specific file type and (ii)

direct the changed or consolidated input data type to a specific neural network in a transformer process and select an output with a higher probability variable;

an electronic a gaming machine configured to utilize, at least in part, the executable instructions or computer-readable files to present and allow play of the game of chance, the electronic gaming machine including at least one of:

(i) a monetary input device configured to receive a physical item associated with a monetary value and/or enable cashless wagering;

(ii) a user interface;

(iii) at least one processor for running the at least partially developed executable instructions or computer-readable files related to the game of chance;

(iv) a game display; and (v) a memory in communication with the at least one processor.

60. The system of claim 59 wherein the game of chance characteristics data comprises one or more of: source code, gameplay videos, manually entered game characteristics, media files, math files, biometric player data, player behavior data, or any combination thereof.

61. The system of claim 59 wherein the past game performance data comprises one or more of: win per unit per day, occupancy rate data, coin-in, hold percentage, player bet amount, manually entered game performance data, or any combination thereof.

62. The system of claim 59, further comprising executable programming files defining game flow, logic rules, memory allocation, user responsiveness, or reel timing behavior.

63. The system of claim 59, wherein the computer-readable files comprise at least one of: graphic files, sound files, animation files, programming code, or mathematical files.

64. The system of claim 59, wherein the AI game design system employs supervised learning, unsupervised learning, reinforcement learning, or any combination thereof.

* * * * *